(12) United States Patent
Nandakumar

(10) Patent No.: US 11,182,992 B2
(45) Date of Patent: Nov. 23, 2021

(54) LOCKER ADAPTION SYSTEM AND RELATED METHOD FOR CONSUMER IN-DOOR, OUT-DOOR AND CURBSIDE GOODS DELIVERY AND PICKUP SERVICES AND FOR MERCHANT STORE PICKUP SERVICES

(71) Applicant: Gopal Nandakumar, San Antonio, TX (US)

(72) Inventor: Gopal Nandakumar, San Antonio, TX (US)

( * ) Notice: Subject to any disclaimer, the term of this patent is extended or adjusted under 35 U.S.C. 154(b) by 0 days.

(21) Appl. No.: 16/867,555

(22) Filed: May 5, 2020

(65) Prior Publication Data

US 2020/0265665 A1    Aug. 20, 2020

Related U.S. Application Data

(63) Continuation of application No. 16/271,365, filed on Feb. 8, 2019, now Pat. No. 10,643,413, which is a
(Continued)

(51) Int. Cl.
*G07C 9/00* (2020.01)
*G06Q 10/08* (2012.01)
(Continued)

(52) U.S. Cl.
CPC ..... *G07C 9/00817* (2013.01); *G06K 7/10297* (2013.01); *G06K 19/06028* (2013.01); *G06K 19/06037* (2013.01); *G06K 19/0723* (2013.01); *G06Q 10/087* (2013.01); *G06Q 10/0836* (2013.01); *G06Q 10/0838* (2013.01); *G07C 9/00* (2013.01); *G07C 9/00896* (2013.01); *G07C 9/215* (2020.01); *G07F 17/10* (2013.01); *G07C 9/00912* (2013.01); *G07C 2009/00928* (2013.01); *G07F 17/12* (2013.01)

(58) Field of Classification Search
CPC ........................................................ G07F 7/00
See application file for complete search history.

(56) References Cited

U.S. PATENT DOCUMENTS

| | | | | |
|---|---|---|---|---|
| 9,223,315 | B2 * | 12/2015 | Irwin | ............ G05D 3/00 |
| 9,934,483 | B1 * | 4/2018 | Sangani | .......... B65G 1/1378 |
| 2001/0045449 | A1 | 11/2001 | Shannon | |

* cited by examiner

*Primary Examiner* — Benyam Haile
(74) *Attorney, Agent, or Firm* — Gunn Lee & Cave, PC

(57) ABSTRACT

The present invention relates to a locker and system for secured delivery of goods to consumer wherein the locker may be 1) positioned within a building or home such that one door is accessible outside the building or home and a second door is accessible within the building or home; 2) positioned on a property, potentially near a curbside and accessible to a delivery vehicle from a street; or 3) positioned at a commercial location such that one door is accessible to the public and a second door is accessible to the workers at the commercial location. Delivery may occur via drone or human with selected access given to the designated locker door. In accordance with the foregoing objects, an embodiment of the present invention generally comprises a service provider, a service client, an operator (seller or inspector), an end user (buyer or end user), and at least one chamber having at least one remotely controlled electronic door in communication with a service provider, service client, and/or operator.

15 Claims, 59 Drawing Sheets

Related U.S. Application Data continuation-in-part of application No. 16/268,077, filed on Feb. 5, 2019, now abandoned, which is a continuation of application No. PCT/US2017/045799, filed on Aug. 7, 2017.

(60) Provisional application No. 62/628,250, filed on Feb. 8, 2018, provisional application No. 62/371,506, filed on Aug. 5, 2016, provisional application No. 62/371,518, filed on Aug. 5, 2016, provisional application No. 62/371,530, filed on Aug. 5, 2016.

(51) Int. Cl.
| | | |
|---|---|---|
| *G06K 19/06* | (2006.01) | |
| *G06K 19/07* | (2006.01) | |
| *G06K 7/10* | (2006.01) | |
| *G07F 17/10* | (2006.01) | |
| *G07C 9/20* | (2020.01) | |
| *G07F 17/12* | (2006.01) | |

```
Representative Schema for Locker Owner Database

Owner Id (PK)
Maintenance Sequence Number (PK)                    27-1
Maintenance Date Time
Status (Valid Values A = Active, I = Inactive)
First Name
Middle Name
Last Name
Address Line 1
Address Line 2
City
State
Zip 1
Zip 2
Phone
Mobile Phone Number (I)
Mobile Device Identifier (I)
eMail Address (I)
Latitude (I)
Longitude (I)
Password
```

Note: PK: Primary Key Fields
I - Indexed Field

FIGURE 27

Representative Schema for Merchant Database

Merchant Id (PK)  28-1
Location Id (PK)
Maintenance Sequence Number (PK)
Maintenance Date Time
Status (Valid Values A = Active, I = Inactive)
Merchant Name
Location Name
Contact First Name
Contact Middle Name
Contact Last Name
Address Line 1
Address Line 2
City
State
Zip 1
Zip 2
Phone
Mobile Phone Number
eMail Address (I)
IP Address (I)
Latitude (I)
Longitude (I)
Radius in Miles
AuthCodeApiYN (Valid Values Y = Yes; N = No)
AuthenticationApiYN (Valid Values Y = Yes; N = No)
Password Note: PK: Primary Key Fields
I - Indexed Field

FIGURE 28

| Representative Schema for Goods Carrier Database |
|---|
| Goods Carrier Id (PK)     29-1 |
| Location Id (PK) |
| Maintenance Sequence Number (PK) |
| Maintenance Date Time |
| Status (Valid Values A = Active, I = Inactive) |
| Goods Carrier Name |
| Location Name |
| Contact First Name |
| Contact Middle Name |
| Contact Last Name |
| Address Line 1 |
| Address Line 2 |
| City |
| State |
| Zip 1 |
| Zip 2 |
| Phone |
| Mobile Phone Number |
| eMail Address (I) |
| IP Address (I) |
| Package Pickup Url |
| Latitude (I) |
| Longitude (I) |
| Radius in Miles |
| AuthCodeApiYN (Valid Values Y = Yes; N = No) |
| AuthenticationApiYN (Valid Values Y = Yes; N = No) |
| PackagePickupApiYN (Valid Values Y = Yes; N = No) |
| Password |

Note: PK: Primary Key Fields
I - Indexed Field

FIGURE 29

Representative Schema for Locker Database

Owner Id (PK)  30-1
Locker Number (PK)
Maintenance Sequence Number (PK)
Maintenance Date Time
Status (Valid Values A = Active; I = Inactive)
Location Type
(Valid Values for Consumer Locker: I = Indoor; K = Kitchen; G = Garage; R = Common Room; F = Fence; D = Outdoor; C = Curbside; O = Other)
(Valid Values for Merchant Locker: L = Drive-Thru Lane; W = Waiting Area; B = Both)
Number of Doors (Valid Values 1 = One, 2 = Two)
Front Side Lock Type (Valid Values B=Not Used; N = Networked; S = Standalone)
Front Side Lock Serial Number (I)
Front Side Lock Status (Valid Values L = Locked; U = Unlocked)
Front Side Lock Password
Back Side Lock Type (Valid Values B = Not Used; N = Networked; S = Standalone)
Back Side Lock Serial Number (I)
Back Side Lock Status (Valid Values L = Locked; U = Unlocked)
Back Side Lock Password
Back Side Cover (Valid Values C = Covered; U = Uncovered)
Admin Switch Restricted (Valid Values Y = Yes; N = No)
Maximum Package Width (Valid Values are 1 thru 72 in inches)
Maximum Package Height (Valid Values: 1 thru 72 in inches)
Maximum Package Depth (Valid Values: 1 thru 72 in inches)
Number of Bins
Drone Access Allowed (Valid Values : Y = Yes; N = No)
Truck Access Allowed (Valid Values: Y = Yes; N = No)
Manual Access Allowed (Valid Values: Y = Yes; N = No)
Locker Latitude
Locker Longitude
Directions Text
Directions Map Note: PK: Primary Key Fields
I - Indexed Field

FIGURE 30

Representative Schema for Authorization Code Database

Owner Id (PK)
Locker Number (PK)
Locker Side (Valid Values: F) (PK)
Goods Carrier Id (PK)
Tracking Number (PK)
Maintenance Sequence Number (PK)
Request Type (Valid Values: D = Delivery; P = Pickup)
Authcode (I)
Entry Date
Entry Time
Expiration Date
Expiration Time
Authcode Status (Valid Values: A = Active, U = Used, E = Expired, C = Cancelled)
Usage Type (Valid Values: S = Single; M = Multiple)
Signature 31-1

Note: PK: Primary Key Fields
I - Indexed Field

FIGURE 31

Representative Schema for Authentication Database

Owner Id (PK)
Locker Number (PK)
Locker Side (Valid Values: F = Front; B = Back) (PK)
Request Date (PK)
Request Time (PK)
Requestor Type (Valid Values: O = Owner; D = Authorized Mobile Device; M = Merchant; G = Goods Carrier ) (PK)
Requestor Id (PK)
Requestor Sub Id (PK)
Tracking Number
Expiration Date
Expiration Time
Authentication Status (Valid Values: A = Active; U = Used; E = Expired; C = Cancelled)

32-1

Note: PK: Primary Key Fields
I - Indexed Field

FIGURE 32

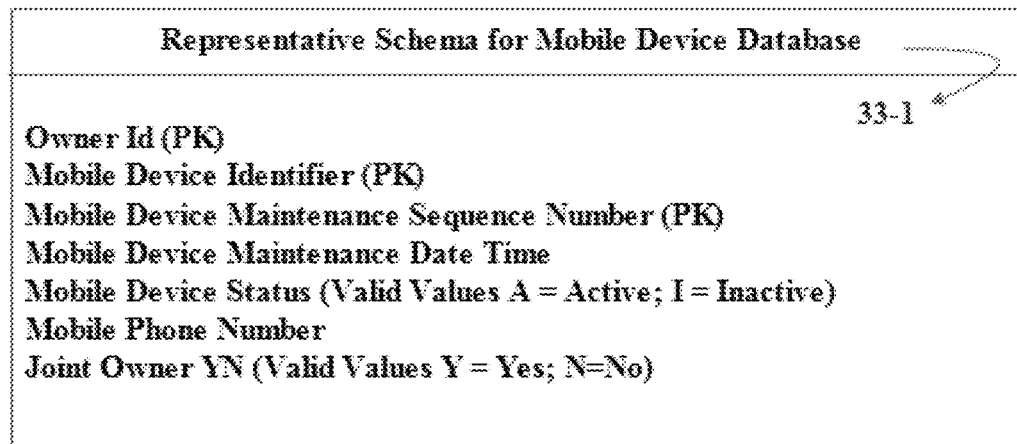
FIGURE 33
FIGURE 34-L

Owner Information

| | |
|---|---|
| Owner Id: | 7890 |
| Status: | Active ▼ |
| First Name: | First |
| Middle Name: | M |
| Last Name: | Last |
| Address Line 1: | 123 Any Street |
| Address Line 2: | |
| City: | Any City |
| State: | Any State |
| Zip 1: | 11111 |
| Zip 2: | 1111 |
| Phone: | 111 111 1111 |
| Mobile Phone Number: | 222 222 2222 |
| Mobile Device Identifier: | 190286351788253 |
| eMail Address: | FL@xyz.com |
| Latitude | -40.391034 |
| Longitude | 16.280194 |
| Password: | |

Submit

FIGURE 35-L

Merchant Information

| Field | Value |
|---|---|
| Merchant Id | 8211 |
| Location Id | 65 |
| Status: | Active |
| Merchant Name | ABC Decoration |
| Location Name | Any Location |
| Contact First Name: | First |
| Contact Middle Name: | M |
| Contact Last Name: | Last |
| Address Line 1: | 123 Any Street |
| Address Line 2: | |
| City: | Any City |
| State: | Any State |
| Zip 1: | 11111 |
| Zip 2: | 1111 |
| Phone: | 111 111 1111 |
| Mobile Phone Number: | 222 222 2222 |
| eMail Address: | FL@xyz.com |
| IP Address: | 82.981.326.784 |
| Latitude: | -42.630199 |
| Longitude: | 17.430875 |
| Service Area (Radius in Miles): | 500 |
| AuthCode API (Yes/No): | Yes |
| AuthenticationAPI (Yes/No): | Yes |
| Password: | |

Submit

FIGURE 36-L

| | Goods Carrier Information |
|---|---|
| Goods Carrier Id: | 8211 |
| Location Id | 65 |
| Status: | Active ▼ |
| Goods Carrier Name: | American Courier Service |
| Location Name: | Any Location |
| Contact First Name: | First |
| Contact Middle Name: | M |
| Contact Last Name: | Last |
| Address Line 1: | 123 Any Street |
| Address Line 2: | |
| City: | Any City |
| State: | Any State |
| Zip 1: | 11111 |
| Zip 2: | 1111 |
| Phone: | 111 111 1111 |
| Mobile Phone Number: | 222 222 2222 |
| eMail Address: | FL@xyz.com |
| IP Address: | 19.201.878.390 |
| Package Pickup Url: | https://acs.com/pickup.cfm |
| Latitude: | -42.630199 |
| Longitude: | 17.430875 |
| Service Area (Radius in Miles): | 1500 |
| AuthCode API (Yes/No): | Yes ▼ |
| Authentication API (Yes/No): | Yes ▼ |
| PackagePickup API (Yes/No): | Yes ▼ |
| Password | |

36-D

Submit

FIGURE 36-D

FIGURE 37-L

Consumer Locker Information

| | | |
|---|---|---|
| Owner Id (Consumer): | 7890 | |
| Locker Number: | 2 | 37-D |
| Status: | Active ▼ | |
| Location Type | Kitchen ▼ | |
| Number of Doors: | 1 ▼ | |
| Front Side Lock Type: | Networked ▼ | |
| Front Side Lock Serial Number: | 2309174 | |
| Back Side Lock Type: | Not Used ▼ | |
| Back Side Lock Serial Number: | | |
| Back Side Cover: | Uncovered ▼ | |
| Admin Switch Restricted (Yes/No): | Yes ▼ | |
| Package Size Width (In inches): | 25 | |
| Package Size Height (In inches): | 30 | |
| Package Size Depth (In inches): | 25 | |
| Number of Bins: | 1 ▼ | |
| Drone Access Allowed (Yes/No): | No ▼ | |
| Truck Access Allowed (Yes/No): | No ▼ | |
| Manual Access Allowed (Yes/No): | Yes ▼ | |
| Locker Latitude: | -40.391834 | |
| Locker Longitude: | 16.280194 | |
| Directions Text: | On the kitchen window which is on the way to garage | |
| Directions Map: | C://myinfo/locker/map ▼ | |
| | Submit | |

FIGURE 37-D

FIGURE 37-M-L
FIGURE 37-M-D

FIGURE 38-L

Authcode Information

Owner Id: 7890
Locker Number: 1
Locker Side (Front/Back): Front
Goods Carrier: Next Day Air Service
Tracking Number: 210372839012837
Request Type (Delivery/Pick up): Delivery
Signature: 

---

Locker Number: 1
Locker Side (Front/Back): Back ▼
Goods Carrier: American Courier Service ▼
Tracking Number (Add): [         ]
Request Type (Delivery/Pick up): [   ▼   ]

---

Locker Number: 2
Locker Side (Front/Back): Front ▼
Goods Carrier: American Courier Service ▼
Tracking Number (Add): 3829874837615253
Request Type (Delivery/Pick up): Pick up ▼

---

Locker Number: 2
Locker Side (Front/Back): Back ▼
Goods Carrier: American Courier Service ▼
Tracking Number (Add): [         ]
Request Type (Delivery/Pick up): [   ▼   ]

Submit

FIGURE 38-S

Authcode Information

38-D

| | |
|---|---|
| Owner Id: | 7890 |
| Locker Number: | 2 |
| Locker Side: | Front |
| Goods Carrier: | American Courier Service ▼ |
| Tracking Number (Add): | 3829874837615253 |
| Request Type: | Pick up |
| Bin Number: | 1 |
| Authcode: | 382253 |
| Expiration Date: | 12/10/2017 |
| Expiration Time: | 5:00 PM |
| Authcode Status: | Active |
| Usage Type: Single or Multiple | Single ▼ |

Submit

Order pick up request will be sent to Goods Carrier American Courier Service.

FIGURE 38-D

FIGURE 39-L
FIGURE 39-S

FIGURE 39-D
FIGURE 40-L

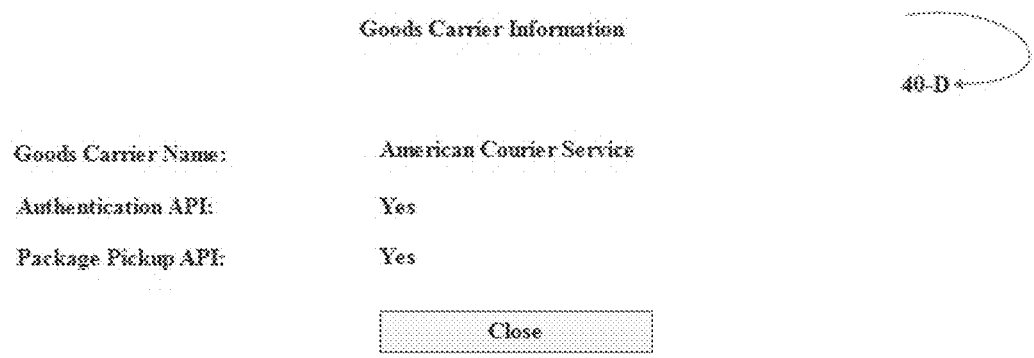
FIGURE 40-D

Authcode Request API

```
<AuthcodeRequest>
    <RequestorType></RequestorType>
    <RequestorId></RequestorId>
    <RequestorSubId></RequestorSubId>
    <Password></Password>
    <RequestType></RequestType>
    <AccessType></AccessType>
    <ServiceType></ServiceType>
    <GoodsCarrierName></GoodsCarrierName>
    <TrackingNumber></TrackingNumber>
    <LockSerialNumber></LockSerialNumber>
    <Address1></Address1>
    <Address2></Address2>
    <City></City>
    <State></State>
    <Zip></Zip>
    <Latitude></Latitude>
    <Longitude></Longitude>
    <PackageWidth></PackageWidth>
    <PackageHeight></PackageHeight>
    <PackageDepth></PackageDepth>
    <ExpirationDate></ExpirationDate>
    <ExpirationTime></ExpirationTime>
</AuthcodeRequest>
```

Authcode Response API

```
<AuthcodeResponse>
    <RequestorType></RequestorType>
    <RequestorId></RequestorId>
    <RequestorSubId></RequestorSubId>
    <ReturnCode></ReturnCode>
    <SuccessMsg></SuccessMsg>
    <ErrorMsg></ErrorMsg>
    <TrackingNumber></TrackingNumber>
    <LockSerialNumber></LockSerialNumber>
    <LockType></LockType>
    <LockerLatitude></LockerLatitude>
    <LockerLongitude></LockerLongitude>
    <DroneYN></DroneYN>
    <TruckYN></TruckYN>
    <ManualYN></ManualYN>
    <ExpirationDate></ExpirationDate>
    <ExpirationTime></ExpirationTime>
</AuthcodeResponse>
```

Authentication Request API

```
<AuthenticationRequest>
    <RequestorType></RequestorType>
    <RequestorId></RequestorId>
    <RequestorSubId></RequestorSubId>
    <Password></Password>
    <RequestType></RequestType>
    <TrackingNumber></TrackingNumber>
    <LockSerialNumber></LockSerialNumber>
    <ExpirationMinutes></ExpirationMinutes>
</AuthenticationRequest>
```

FIGURE 43-A

Authentication Response API

```
<AuthenticationResponse>
    <RequestorType></RequestorType>
    <RequestorId></RequestorId>
    <RequestorSubId></RequestorSubId>
    <ReturnCode></ReturnCode>
    <SuccessMsg></SuccessMsg>
    <ErrorMsg></ErrorMsg>
    <TrackingNumber></TrackingNumber>
    <LockSerialNumber></LockSearialNumber>
    <RecipientSignature></RecipientSignature>
    <ExpirationDate></ExpirationDate>
    <ExpirationTime></ExpirationTime>
</AuthenticationResponse>
```

FIGURE 43-R

ABC Decoration

Order Confirmation:
Order Number: 123983728
Confirmation Number: A2301B193

Address Label Copy:

From:
ABC Decoration,
123 Any Street,
Any City, Any State 11111-1111

To:
Mr. First Last
123 Any Street,
Demo City, Demo State 22222-2222

Goods Carrier:
American Courier Service

Tracking Number:
3829874837615253

[X] Delivery Instructions:
Code: 1234
Locker Number: 2
Locker is near the Garage

FIGURE 46

Representative Schema for Store Pickup Database

Merchant Id (PK)    50-1
Location Id (PK)
Order Number (PK)
Maintenance Sequence Number (PK)
Consumer Id
CheckedIn ((Valid Values: Y = Yes; N = No)
Authcode (I)
Locker Number
Locker Side (Valid Values: F = Front; B = Back)
Authenticated ((Valid Values: Y = Yes; N = No)
Entry Date
Entry Time
Expiration Date
Expiration Time
Authcode Status (Valid Values: A = Active, U = Used, E = Expired, C = Cancelled)

Note: PK: Primary Key Fields
I - Indexed Field

FIGURE 50

Store Pickup Authcode Request API

```
<StorePickupAuthcodeRequest>
    <MerchantId></MerchantId>
    <LocationId></LocationId>                                 51-A
    <Password></Password>
    <AccessType></AccessType>
    <OrderNumber></OrderNumber>
    <ConsumerId></ConsumerId>
    <CheckedIn></CheckedIn>
    <LockSearialNumber></LockSearialNumber>
    <AuthCode></AuthCode>
    <ExpirationDate></ExpirationDate>
    <ExpirationTime></ExpirationTime>
</StorePickupAuthcodeRequest>
```

FIGURE 51-A

StorePickupAuthcode Response API

```
<StorePickupAuthcodeResponse>
    <MerchantId></MerchantId>
    <LocationId></LocationId>
    <ReturnCode></ReturnCode>
    <SuccessMsg></SuccessMsg>
    <ErrorMsg></ErrorMsg>
    <OrderNumber></OrderNumber>
    <ConsumerId></ConsumerId>
    <CheckedIn></CheckedIn>
    <LockerNumber></LockerNumber>
    <LockerSide></LockerSide>
    <LockSerialNumber></LockSerialNumber>
    <Authenticated></Authenticated>
    <AuthCode></AuthCode>
    <ExpirationDate></ExpirationDate>
    <ExpirationTime></ExpirationTime>
</StorePickupAuthcodeResponse>
```

FIGURE 51-R

Store Pickup Locker Status Request API

```
<StorePickupLockerStatusRequest>
    <MerchantId></MerchantId>
    <LocationId></LocationId>
    <Password></Password>
</StorePickupLockerStatusRequest>
```

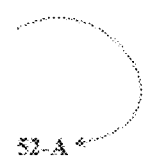

FIGURE 52-A

StorePickup Locker Status Response API

```
<StorePickupLockerStatusResponse>
    <MerchantId></MerchantId>
    <LocationId></LocationId>
    <ReturnCode></ReturnCode>
    <SuccessMsg></SuccessMsg>
    <ErrorMsg></ErrorMsg>
    <NoOfLockers></NoOfLockers>
    <Lockers>
        <Locker>
            <LockerNumber></LockerNumber>
            <LocationType></LocationType>
            <NoOfDoors></NoOfDoors>
            <FrontSideLockType></FrontSideLockType>
            <FrontDoorLockSerialNumber></FrontDoorLockSerialNumber>
            <FrontSideLockStatus></FrontSideLockStatus>
            <BackSideLockType></BackSideLockType>
            <BackDoorLockSerialNumber></BackDoorLockSerialNumber>
            <BackSideLockStatus></BackSideLockStatus>
            <OrderNumber></OrderNumber>
            <CheckedIn></CheckedIn>
        </Locker>
    <Lockers>
</StorePickupLockerStatusResponse>
```

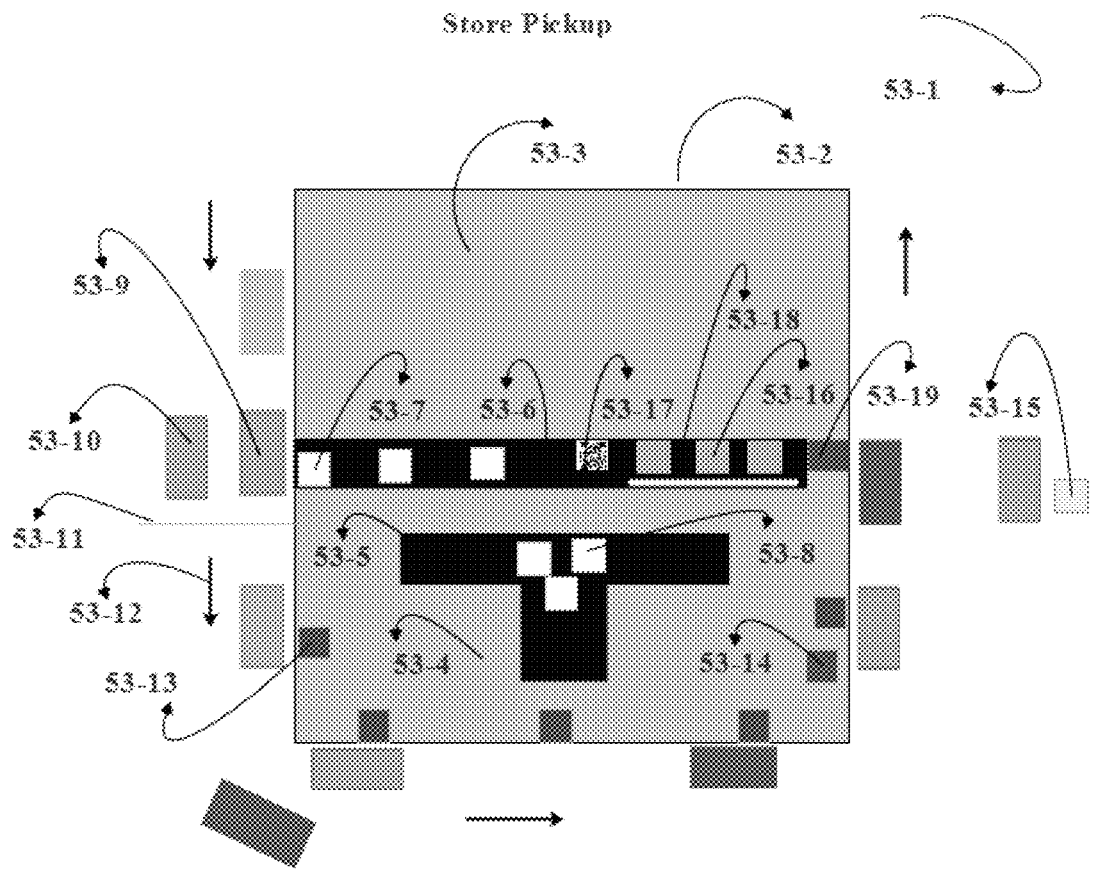

FIGURE 53

LOCKER ADAPTION SYSTEM AND RELATED METHOD FOR CONSUMER IN-DOOR, OUT-DOOR AND CURBSIDE GOODS DELIVERY AND PICKUP SERVICES AND FOR MERCHANT STORE PICKUP SERVICES

CROSS REFERENCE TO RELATED APPLICATION

This application is a continuation of U.S. application Ser. No. 16/271,365 filed Feb. 8, 2019 which is set to issue as U.S. Pat. No. 10,643,413, which claims the benefit and priority of U.S. Provisional Application Ser. No. 62/628,250 filed Feb. 8, 2018 entitled Locker Adaption System and Related Method for Consumer In-Door, Out-Door and Curbside Goods Delivery and Pickup Services and for Merchant Store Pickup Services and is a continuation-in-part of U.S. application Ser. No. 16/268,077 filed Feb. 5, 2019 entitled Chamber having at least one remotely controlled door and system for securely passing or delivering goods or securely passing people which claims the benefit of PCT Application Serial No. PCT/US17/45799 filed Aug. 7, 2017, which is an international application that claims the benefit of and priority to each of the applications listed below:

(1) U.S. Application Ser. No. 62/371,506 filed Aug. 5, 2016 titled Self-service security goods scanning stations with one or more self-service security goods scanner chambers with two or more remotely controlled electronic doors, accessible to one or more users with or without one or more security x-ray scanners;

(2) U.S. Application Ser. No. 62/371,518 filed Aug. 5, 2016 entitled Self-service security body scanning stations with one or more self-service security body scanner chambers with three or more remotely controlled electronic doors, accessible to one or more users with or without one or more security body scanners;

(3) U.S. Application Ser. No. 62/371,530 filed Aug. 5, 2016 entitled Electronic security storage stations with one or more electronic security storage boxes with one or more remotely controlled electronic doors, accessible to one or more users.

and Each application noted above is incorporated by reference.

STATEMENT REGARDING FEDERALLY SPONSORED RESEARCH OR DEVELOPMENT

Not applicable.

1. FIELD OF THE INVENTION

The present invention relates to goods passage protocols for Consumer In-Door Goods Services use a Secured Private Area (Private Area) within Physical Structures with at least one Secured Electronic Locker where the Secured Electronic Locker is owned by consumers (Consumer Locker) that incorporates one or more electronically controlled doors that are operated as standalone or operated as part of a network where legal residents of the Private Area and the owners of the Consumer Locker are one and the same where the Consumer Locker is used by the consumer locker owners and by users authorized by the consumer locker owners where the users are referred as authorized users for use in securely leaving goods inside the Consumer Locker either by the consumer locker owners or by the authorized users and for use in securely picking up goods from the Consumer Locker either by consumer locker owners or by authorized users and the Consumer Locker is physically attached to the Private Area and being used as bi-directional goods passage pathway in between outside of the Private Area and inside of the Private Area with at least one electronically secured door that is common between outside of the Private Area and inside of the Consumer Locker and facing outside of Private Area where the electronically secured common door is accessible to the consumer locker owners and authorized users and with at least one electronically or mechanically secured door that is common between the inside of the Consumer Locker and inside of the Private Area and facing inside of Private Area where the electronically or mechanically secured common door is accessible only to consumer locker owners and the electronically or mechanically secured common door may be part of the Consumer Locker or part of the Private Area or both.

It also relates to goods passage protocols for use in in-door goods delivery services where goods are left into Consumer Lockers that are securely attached to Private Areas of Secured Physical Structures from outside of Private Areas by authorized users of the Consumer Lockers and goods that are left are picked up from the Consumer Lockers from inside of Private Areas by owners of the Consumer Lockers.

It also relates to goods passage protocols for use in in-door goods pickup services where goods are left inside Consumer Lockers that are securely attached to Private Areas of Secured Physical Structures from inside of Private Areas by owners of the Consumer Lockers and the goods that are left are picked up from the Consumer Lockers from outside of Private Areas by authorized users of the Consumer Lockers.

The present invention also relates to goods passage protocols for Consumer In-Door Goods Services use a Secured Area consists of a Secured Private Area (Private Area) with at least one Secured Common Area (Common Area) that are attached to each other where the Common Area may be indoor or outdoor and incorporates one or more electronically controlled doors that are operated as standalone or operated as part of a network where legal residents of the Private Area and Common Area are one and the same where the Common Area is used by the legal residents and by users authorized by the legal residents where the users are referred as authorized users for use in securely leaving goods inside the Common Area either by the legal residents or by the authorized users and for use in securely picking up goods from the Common Area either by legal residents or by authorized users where the Common Area is used as bi-directional goods passage pathway in between outside of the Secured Area and inside of the Private Area with at least one electronically secured door that is common between outside of the Secured Area and inside of the Common Area and facing outside of the Secured Area where the electronically secured common door is referred as common area outer door and is accessible to the legal residents and authorized users and with at least one electronically or mechanically secured door that is common between the inside of the Common Area and outside of the Private Area and facing inside of Private Area where the electronically or mechanically secured common door is referred as common area inner door and is accessible only to legal residents and the common area inner door may be part of the Common Area or part of the Private Area or both.

It also relates to goods passage protocols for use in in-door goods delivery services where goods are left from outside of Secured Areas into Common Areas that are securely attached to Private Areas where the Common Areas and the Private Areas are part of the Secured Areas by authorized users of the Common Areas and the goods that are left are picked up from the Common Areas from inside of the Private Areas by legal residents of the Common Areas and Private Areas.

It also relates to goods passage protocols for use in in-door goods pickup services where goods are left from Private Areas into Common Areas by legal residents of the Common Areas and Private Areas where the Private Areas and Common Areas are attached to each other within Secured Areas and the goods that are left are picked up from the Common Areas from outside of Secured Areas by authorized users of the Common Areas.

The present invention also relates to goods passage protocols for Out-Door Goods Services use at least one Secured Electronic Locker where the Secured Electronic Locker is owned by consumers (Consumer Locker) that incorporates one or more electronically controlled doors that are operated as standalone or operated as part of a network and placed within the boundaries of Private Property where legal owners of the Private Property and the owners of the Consumer Locker are one and the same where the Consumer Locker is used by the consumer locker owners and by users authorized by the consumer locker owners where the users are referred as authorized users for use in securely leaving goods inside the Consumer Locker either by the consumer locker owners or by the authorized users and for use in securely picking up goods from the Consumer Locker either by consumer locker owners or by authorized users and the Consumer Locker is used as a holding area for bi-directional goods passage between the authorized users and the locker owners.

It also relates to goods passage protocols for use in out-door goods delivery services where goods are left into Consumer Lockers that placed within the boundaries of locker owners' property by authorized users of the Consumer Lockers and the goods that are left are picked up from the Consumer Lockers by owners of the Consumer Lockers.

It also relates to goods passage protocols for use in out-door goods pickup services where goods are left into Consumer Lockers that are placed within the boundaries of locker owners' property by owners of the Consumer Lockers and the goods that are left are picked up from the Consumer Lockers by authorized users of the Consumer Lockers.

The present invention also relates to goods passage protocols for Consumer Curbside Goods Services use at least one Secured Electronic Consumer Locker (Locker) that incorporates one or more electronically controlled doors that are operated as standalone or operated as part of a network and placed within the boundaries of Private Property but closer to curbsides and accessible to delivery trucks where legal owners of the Private Property and the owners of the Consumer Locker are one and the same where the Consumer Locker is used by the consumer locker owners and by trucks authorized by the consumer locker owners where the trucks are referred as authorized trucks for use in securely leaving goods inside the Consumer Locker either by the consumer locker owners or by the authorized trucks and for use in securely picking up goods from the Consumer Locker either by consumer locker owners or by authorized trucks and the Consumer Locker is used as a holding area for bi-directional goods passage between the authorized users and the authorized trucks.

It also relates to goods passage protocols for use in consumer curbside goods delivery services where goods are left into Lockers, that are placed within the boundaries of locker owners' property but closer to curbsides and accessible to delivery trucks, by authorized trucks of the Consumer Lockers and the goods that are left are picked up from the Consumer Lockers by owners of the Consumer Lockers.

It also relates to goods passage protocols for use in consumer curbside goods pickup services where goods are left into Lockers, that are placed within the boundaries of locker owners' property but closer to curbsides and accessible to delivery trucks, by owners of the Consumer Lockers and the goods that are left are picked up from the Consumer Lockers by authorized trucks of the Consumer Lockers.

It also relates to goods passage protocols for use in securely leaving goods into Consumer Lockers and for use in securely picking up goods from the Consumer Lockers where the Consumer Lockers can have one or more additional racks and when the Consumer Lockers have more than one rack, each rack will be assigned a unique number within each Consumer Locker and rack numbers will be displayed in machine readable format as well as in human readable format so that goods can be left into specific rack or can be picked up from specific rack.

It also relates to goods passage protocols for use in securely leaving goods into Consumer Lockers and for use in securely picking up goods from the Consumer Lockers where the Consumer Lockers can also have additional compartments outside the Consumer Lockers where those compartments can be used to pass goods that are less valuable and need not be secured.

It also relates to goods passage protocols for use in securely leaving goods into Consumer Lockers and for use in securely picking up goods from the Consumer Lockers where the doors of the Consumer Lockers that are accessible to authorized users and consumer locker owners can be operated by Standalone Locks and the Consumer Lockers would be known as Standalone Consumer Lockers.

It also relates to goods passage protocols for use in securely leaving goods into Consumer Lockers and for use in securely picking up goods from the Consumer Lockers where the doors of the Consumer Lockers that are accessible to authorized users and consumer locker owners of the Consumer Lockers can be operated by Networked Locks connected to Networked Lock Servers and the Consumer Lockers would be known as Networked Consumer Lockers.

It also relates to goods passage protocols for use in securely leaving goods into Standalone Consumer Lockers and for use in securely picking up goods from the Standalone Consumer Lockers by authorized users and consumer locker owners of the Standalone Consumer Lockers can only be Humans.

It also relates to goods passage protocols for use in securely leaving goods into Networked Consumer Lockers and for use in securely picking up goods from the Networked Consumer Lockers by authorized users and consumer locker owners of the Networked Consumer Lockers where the authorized users can be Humans, Drones with automated delivery and/or pickup mechanism, Driver-Driven Trucks with automated delivery and/or pickup mechanism and Driver-Less Trucks with automated delivery and pickup mechanism.

It also relates to goods passage protocols for use in securely leaving goods into Networked Consumer Lockers and for use in securely picking up goods from the Consumer Lockers by authorized users and consumer locker owners of the Networked Consumer Lockers where the Networked Consumer Lockers can be set to be accessible to Humans by the locker owners.

It also relates to goods passage protocols for use in securely leaving goods into Networked Consumer Lockers and for use in securely picking up goods from the Consumer Lockers by authorized users and consumer locker owners of the Networked Consumer Lockers where the Networked Consumer Lockers can be set to be accessible to Drones by the locker owners.

It also relates to goods passage protocols for use in securely leaving goods into Networked Consumer Lockers and for use in securely picking up goods from the Consumer Lockers by authorized users and consumer locker owners of the Networked Consumer Lockers where the Networked Consumer Lockers can be set to be accessible to Trucks by the locker owners.

It also relates to goods passage protocols for use in securely leaving goods into Dummy Consumer Lockers by shippers, for use in securely picking up goods from Dummy Consumer Lockers by Drones where the Dummy Consumer Lockers are without locks when the Dummy Consumer Lockers are placed in a restricted area like a fenced-in area.

It also relates to goods passage protocols for use in securely leaving goods into Dummy Consumer Lockers by Drones, for use in securely picking up goods from Dummy Consumer Lockers by recipients where the Dummy Consumer Lockers are without locks when the Dummy Consumer Lockers are placed in a restricted area like a fenced-in area.

It also relates to over the counter order passage protocols for use in securely leaving goods into Store Pickup Lockers by sellers, for use in securely picking up goods from Store Pickup Lockers by buyers where the Store Pickup Lockers are placed inside merchant locations.

It also relates to drive-thru order passage protocols for use in securely leaving goods into Store Pickup Lockers by sellers, for use in securely picking up goods from Store Pickup Lockers by buyers where the Store Pickup Lockers are placed in drive-thru lanes.

BACKGROUND OF THE INVENTION

Increasingly consumers are placing online delivery orders with e-tailers (retailer selling goods via electronic transactions on the Internet) over the internet and with retailers over the phone. Consumers can be legal residents of single or multiple-family homes. For example, USPS (United States Postal Service) alone delivered approximately 750 million packages during 2016 holiday season and UPS (United Parcel Service of America) is expecting to deliver approximately 750 million packages during 2017 holiday season.

The e-tailers and retailers are accepting and processing delivery orders without having a means for the delivery persons or for drones to leave the goods inside recipients' living quarters without delivery persons or drones entering into the living quarters, without providing a means for delivery persons to leave the goods securely and guarded within the boundaries of intended recipients' property and without providing a means for Drones or Delivery Trucks to automatically transfer goods into Networked Consumer Lockers which are similar to mail boxes where mails are dropped.

The e-tailer and retailers engage outside delivery companies or use their own delivery services to deliver online orders. These delivery services use delivery trucks and delivery persons to deliver the goods. Without a secured way for the delivery persons to deliver the goods to intended recipients the delivery persons leave the goods at the intended recipients' front doors which is generally called door delivery or porch delivery. Some delivery services are trying to use Drones for dropping the delivery within the boundaries of intended recipients' property which is generally called drone delivery. This may work only for single-family homes and only for the goods that are safe to be dropped and safe when exposed to harsh atmosphere.

When packages are left at the porches unguarded they are susceptible for theft and thieves stealing unguarded packages from porches are called Porch Pirates and the process is called Porch Piracy. Porch Pirates typically tail a delivery driver and pounce on the merchandise as soon as the driver is out of sight. Without a viable option for intended recipients to receive packages other than porch delivery, the intended recipients are using deterrent gadgets like video cameras and alarms with sensors so that the intended recipients may get an alert and the alarm will go off. These gadgets do not prevent Porch Piracy but may deter Porch Pirates. Determined Porch Pirates can still steal the packages. Also, the intended recipients may not be online to receive the alert, by the time they receive the alert the packages might have already been stolen. Also, because these gadgets use sensors which are susceptible for any movement not just from Porch Pirates' movements, the intended recipients receive many false alerts. Companies like August Home and Ring provide such gadgets. August Home provides Doorbell Cam whereas Ring provides Ring Bell. Because the occurrence and the loss due to Porch Piracy is very significant, even law enforcement officers are becoming creative and are using GPS trackable bait packages to apprehend Porch Pirates. These UPS trackable bait packages have a device inside the package that will broadcast its whereabouts that can be viewed by law enforcement officers on their computer or mobile devices in real time. Law enforcement officers leave these GPS trackable bait packages in front of home door steps selected at random and wait for a Porch Pirates to pick up the package and then chase them to apprehend. Unfortunately, these techniques may not work, because the Porch Pirates can easily determine whether the stolen package is a bait package just by opening the package after stealing. Because, just by opening the package, the Porch Pirates can determine whether the stolen package is a bait, the package can be thrown away and the law enforcement officers can never be able to catch the Porch Pirates.

A report from insuranceQuotes.com released in December 2015 finds that an estimated 23 million Americans have had packages stolen from their homes. When packages are sent via the U.S. Postal Service, FedEx, UPS or other goods carriers are stolen after being left at recipients' locations, home or renter's insurance can help pay for the loss—minus any deductible. Unfortunately, most of the time the value of the packages sent each time would be much less than the deductible which may usually be more than $1000.00. Moreover, the premium for subsequent periods would raise because of one or more claims. Of course, the shippers may purchase insurance for the packages sent. The package insurance may not cover after the packages have been delivered to recipients' door steps. Moreover, the package insurance premiums are high compared to the value of the packages.

According to a report, published by NBC Nightly News on Dec. 11, 2015, the online retail sales for 2015 was estimated to reach $334 billion. According to a research report commissioned by August Home and conducted by Edelman Intelligence published on Oct. 25, 2016 about 11 million U.S. homeowners have had a package stolen within the past year with the average value of packages stolen costing $200 or more to replace. The study was commissioned by August Home to promote their product August Lock and Doorbell Cam.

As an alternative to Porch Delivery some e-tailers and shipping companies have setup neighborhood delivery stations, with a group of delivery lockers, placed in the recipients' neighborhoods. The delivered goods must be picked up by the recipients from the delivery lockers. This is nothing different than US Postal Service holding mails or shipping companies holding parcels or retailers providing online order pick-up counters in their physical locations.

As an alternative to Porch Delivery and neighborhood delivery some employers have setup office delivery stations where the employees can opt to get the deliveries to their work locations. The delivered goods must be picked up by the recipients from their work location delivery lockers. This is nothing different than neighborhood delivery stations.

Currently several lockers are readily available that can provide door delivery where the lockers can be used by the delivery persons to securely leave the deliveries inside the lockers placed at recipients' door steps. These lockers have locks that can be opened with keys and combinations.

The most popular locker with a key is the Elephant Trunk Drop Boxes, like the one predominantly used by shipping companies to accept shipping packages. But, unfortunately the elephant trunk occupies most of the inner package space and only small and non-fragile packages can be dropped in. When many of the e-tailers are pharmacies, grocery merchants, restaurants and big item sellers etc., the Elephant Truck Drop Boxes may not be the best solution.

The example for a locker with a combination lock is Porch Pirate Bag. The delivery person can leave the goods inside an unlocked bag and then lock the bag with a combination lock left with the bag. The code to unlock the combination lock is preset by the Porch Pirate Bag owner. Porch Pirate Bags can be secured with a cable and lock to a front door, side gate, porch post or anywhere in the general area where packages are normally left. Once it is locked, delivery persons cannot open the bag to place the goods. They must wait until the bag is unlocked again by the bag owner or leave the package outside the bag. Because it is made of fabric, Porch Pirates can cut the fabric. Moreover, the Porch Pirates can lock the Porch Pirate Bag so that the delivery person cannot open the Porch Pirate Bag.

It is also possible for home owners to guard the packages left at their door steps without having a locker using package guard services. Such a service is provided by Package Guard where the delivery person would place the packages one above the other on top of the Package Guard. When a package stacked on the Package Guard is removed without the permission of the recipient the Package Guard will sound an alarm, but will not prevent the Porch Pirate from stealing the packages. Again, this is only a deterrent and cannot prevent.

Many times, the packages may be thrown away at the front doors causing damages to contents of the package.

Currently several companies like Walmart and Amazon are providing delivery services where the delivery persons can open the front door and leave the package. In order for them to provide this service Walmart has partnered with August Home to use their August Lock which is a door lock and Doorbell Cam which is video recording device and Amazon has partnered with Kwikset and Vale for electronic door looks and has developed its cloud cam known as Amazon Cloud Cam for video recording. The delivery person can use their cell phone or enter a one-time code sent to their cell phone to open the front door just one time and leave the deliveries inside the home. For security reasons all the activities of the delivery person will be recorded using a video camera. Unfortunately, the service using a combination of door locks and video cameras has several flaws.

A similar service could be offered without an electronic door lock and video camera just by providing a small opening in the door through which the goods could be dropped and would have similar flaws.

Many homes may already have security systems with alarms and with or without central monitoring service. Such security systems may already use security cameras and additional security cameras would be redundant and incur additional cost for recipients. Also homes with security systems get police permits. When any door or window is opened, or any movement or any noise sensed by sensors, the security system must be turned off immediately, if the security system is already on. Otherwise, the security system will immediately turn on the siren, notify the police and the monitoring company, if the security system is monitored. When law enforcement is notified about a security breach, then an officer will immediately be dispatched. When false alarms occur more than a few times then the home owner will be charged with a hefty fee.

Homes without a security system is a prime target for burglary. Burglars may not know whether a home is equipped with a security system or not. Delivery men entering into homes to provide Delivery Service would know whether a home is using a security system or not. This means that the intended recipients are giving away important security information.

Many homes have pets that are not on a leash while inside their homes. How the pets would react when a stranger enters a home when pet owners are not present is unknown. Also, delivery persons may not know the layout of the home where they are making the delivery and may get hurt. It is not clear who will be responsible for any mishap that can occur. If the home owners are liable, then it may not be acceptable to them.

Given the fundamentally flawed state of the art with respect to delivering goods to intended recipients' secured areas it is therefore the overriding object of the present invention is to improve over the prior art of delivery persons leaving the goods unguarded on porches or the prior art of delivery persons entering into recipients' secured private or living or business quarters by providing a system and related method by which the goods to be delivered will be safely delivered and protected until they are picked up safely from inside or outside of the intended recipients' private or living or business quarters or by providing a system and related method by which the goods will be automatically and safely transferred from Drones into inside or outside of intended recipients' private or living or business quarters where the delivered goods will be protected until they are picked up safely by intended recipients. or by providing a system and related method by which the goods will be automatically and safely transferred from Trucks to intended recipients' curbside where the delivered goods will be protected until they are picked up safely by intended recipients.

Given the fundamentally flawed state of the art with respect to picking up goods from intended recipients' buildings it is therefore the overriding object of the present invention is to improve over the prior art of shippers leaving the goods unguarded on porches or the prior art of goods carriers entering into shippers' secured private or living or business quarters by providing a system and related method by which the goods to be picked up will be safely protected until they are picked up safely from inside or outside of the intended shippers' private or living or business quarters by providing a system and related method by which the goods to be picked up will be automatically and safely transferred into Drones from inside or outside of intended recipients' private or living or business quarters where the goods to be picked up will be protected until they are picked up safely by goods carriers or by providing a system and related method by which the goods to be picked up will be automatically and safely transferred into Trucks from intended shippers' curbside where the goods to be picked up will be protected until they are picked up safely by goods carriers.

Goods can be delivered or picked up without triggering alarm monitoring systems and without entering the intended recipients' private or living or business quarters and the intended recipients can retrieve or leave the goods from inside of their private or living or business quarters. Such services could be called as Protected Consumer In-Door Delivery Services and Protected Consumer In-Door Pickup Services respectively and collectively be called as Protected Consumer In-Door Goods Services. Goods can also be delivered safely to porches or can be picked up safely from porches without leaving them on the porch that is accessible to Porch Pirates. Such services could be called as Protected Out-Door Delivery Services and Protected Out-Door Pickup Services respectively and collectively be called as Protected Consumer Out-Door Goods Services. Goods can also be automatically transferred from Drones or Delivery Trucks into Networked Consumer Lockers and vice versa without leaving them unattended on the curb. Such services could be called as Protected Curbside Delivery Services and Protected Curbside Pickup Services respectively and collectively be called as Protected Consumer Curbside Goods Services.

Such Protected Consumer In-Door Goods Services, Protected Consumer Out-Door Goods Services and Protected Consumer Curbside Goods Services can be easily and economically provided by the adaption of Networked Consumer Lockers built by using Networked Locks that are already available and/or will be available in the future.

Such Protected Consumer In-Door Goods Services and Protected Consumer Out-Door Goods Services can also be easily and economically provided by the adaption of Standalone Consumer Lockers built by using Standalone Locks that are already available and/or will be available in the future.

Such Protected Consumer In-Door Goods Services can also be easily and economically provided by using secured Common Areas which are protected by doors operated by using Networked Locks that are already available and/or will be available in the future or Standalone Locks that are already available and will be available in the future.

Such Protected Consumer In-Door Goods Services can also be easily and economically provided by using secured Common Areas which are protected by doors or garage doors or gates operated by using Networked Locks that are already available and/or will be available in the future or Standalone Locks that are already available and/or will be available in the future. Doors or garage doors or gates used for Common Areas will generally be referred as common area doors.

Increasingly buyers are placing online orders with retailers for pick-up of the orders thru verbal communication and with face to face communication at over the counters or at drive-thru windows placed in drive-thru lanes at retailer physical locations. Because of the fundamental design with over the counters and with drive-thru windows only one order can be processed at a time per counter or per drive-thru lane and only with verbal communication and face to face. Because of the fundamental design with drive-thru windows the wait time for buyers to pick up the orders is significantly high, and the number of orders handled by sellers is significantly low. According to an annual report from QSR Magazine (www.foodandwine.com/fwx/food/drive-thru-slower-2016) the average wait time for drive-thru orders in 2016 was 226.3 seconds. The wait times does not include the wait time spent by the buyers before starting verbal communication with the seller. The Longer wait times at drive-thru windows not only affect the buyers and sellers but also adversely affect the environment.

Given the fundamentally flawed state of the art with respect to over the counter pickups and drive-thru pickups it is therefore the overriding object of the present invention is to improve over the prior art of counter pickups and drive-thru pickups by providing a system and related method by which delivery counters and the drive-thru windows can be replaced with over the counter lockers and drive-thru lockers.

Such Counter Store Pickup and Drive-Thru Store Pickup can also be easily and economically provided by using unlimited number of counter store pickup lockers per location and/or by using unlimited number of drive-thru store pickup lockers per drive-thru lane.

BRIEF SUMMARY OF THE INVENTION

For the sake of clarity owners of lockers can be Consumers or Merchants. Lockers owned by Consumers will be referred as Consumer Lockers. Lockers owned by Merchants will be referred as Store Pickup Lockers. Locks used in the front side of lockers can be Networked or Standalone. Lockers that use Networked locks in the front side of lockers will be referred as Networked Lockers. Lockers that use Standalone locks in the front side of lockers will be referred as Standalone Lockers.

In accordance with the foregoing objects, the present invention-a locker adaption system for adapting Consumer Lockers and/or Common Areas with at least one door for Protected Consumer In-Door Goods Services or for Protected Consumer Out-Door Goods Services or for Protected Consumer Curbside Goods Services-generally uses:
  Consumer Lockers Capable of having Networked Locks
    Capable of controlling doors connected to the Networked Locks
    Having lock and unlock switches
    Displaying a lock identification number in QR Code and/or Bar Code and/or Text format etc.
    Capable of accepting manual request through switches to unlock or lock the controlling doors with or without authorization code manual input through an optional key pad
    Capable of accepting contactless request to unlock or lock the controlling doors from drones and/or delivery trucks
    Capable of displaying messages in response to request through switches
    Capable of being part of a Networked Lock Server
    Having an option to include keypad
    Having an option to include display screen
    Having options to include scanners to read machine readable code such as QR Code, Bar Code and Text etc.
    Having options to include devices for contactless transfer of data such as Radio Frequency Identifiers (RFID), Bluetooth and Near Field Communication etc.

Having an option to include bins with bin numbers displaced in QR Code and/or Bar Code and/or Text format etc.

Having an option to include bins with bin numbers in Radio Frequency Identifiers (RFID), Bluetooth and Near Field Communication etc.

The Networked Lock Server capable of accepting authorization code requests through an API from authorized merchants and goods carriers The Networked Lock Server capable of accepting locker advance authentication requests through an API from authorized merchants and goods carriers The Networked Lock Server capable of accepting authorization code requests through mobile apps or through web sites from consumer locker owners The Networked Lock Server capable of accepting advance authentication requests through a mobile app or through web sites from consumer locker owners The Networked Lock Server capable of accepting advance authentication requests through a mobile app from authorized users such as joint consumer locker owners and delivery/pickup persons Lockers Capable of having Standalone Locks
  Capable of controlling doors connected to the Standalone Locks
  Displaying a lock identification number in QR Code and/or Bar Code and/or Text format etc.
  Having an option to include keypad
  Capable of accepting requests through switches to unlock or lock the controlling doors with authorization code input through key pad
  Capable of being programmed to store authorization codes by authorized owners and joint owners
  Having an option to include bins with bin numbers in QR Code and/or Bar Code and/or Text format etc.

The lockers with Networked Locks and/or Standalone Locks being used for Protected Consumer In-Door Goods Services
  Capable of having a door facing exterior with hollow back facing the interior and Capable of being installed in temporarily secured barriers like sliding windows
  Capable of having a door facing exterior and another door facing interior and Capable of being installed in permanently secured barriers like openings in walls The lockers with Networked Locks and/or Standalone Locks being used for Protected Consumer Out-Door Goods Services
  Capable having a door with closed back
  Capable of being installed within boundaries of locker owners' property but in the exterior and accessible to delivery persons
  Lockers with Networked Locks would also be accessible to drones The lockers with Networked Locks being used for Protected Consumer Curbside Goods Services
  Capable having a door with closed back
  Capable of being installed within boundaries of locker owners' property but in the exterior but closer to curbside and accessible to delivery trucks In accordance with the foregoing objects, the present invention-a locker adaption system for adapting Consumer Lockers and/or Common Areas with at least one door for Protected Consumer In-Door Goods Services or for Protected Consumer Out-Door Goods Services or for Protected Consumer Curbside Goods Services-generally comprises for consumer locker owners Means to select appropriate locations and install lockers for Protected Consumer In-Door Goods Services
  Means to select appropriate door and/or gates of Secured Common Areas to install locks in the doors and/or gates for Protected Consumer In-Door Goods Services
  Means to select appropriate locations and install lockers for Protected Consumer Out-Door Goods Services
  Means to select appropriate locations and install lockers for Protected Consumer Curbside Goods Services
  Means to select appropriate doors and/or gates and install locks in the appropriate doors and/or gates for Protected Consumer In-Door Goods Services
  Means to register Networked Consumer Lockers and doors with Networked Locks with service providers
  Means to use service providers to accept/deny requests from Networked Locks to lock and/or unlock the Networked Locks through authentication of owners, merchants, goods carriers and authorized users
  Means to use service providers to add/update one-time use authorization code as well as unlimited use authorization codes that can be used by authorized users to unlock and/or lock
  Means to register Standalone Consumer Lockers and doors with Standalone Locks with service providers for merchants
  Means to register Merchants with service providers
  Means to add/update request for authorization code to unlock and/or lock Consumer Lockers and/or doors and/or gates with Locks
  Means to provide advance authentication for delivery persons and/or drones and/or delivery trucks to unlock or lock Networked Lockers for goods carriers
  Means to register goods carriers with service providers
  Means to add/update request for authorization code to unlock and/or lock Consumer Lockers and/or doors and/or gates with Locks
  Means to provide advance authentication for delivery persons and/or drones and/or delivery trucks to unlock or lock Networked Lockers for authorized users
  Means to use full or one or more parts of tracking number, as pre-determined by locker owners, to lock or unlock Consumer Lockers and/or doors and/or gates
  Means for authorized users registered with consumer locker owners to request service providers for a code to lock or unlock Consumer Lockers and/or doors and/or gates
  Means for authorized users registered with consumer locker owners to request service providers for advance authentication to lock or unlock Consumer Lockers and/or doors and/or gates
  Means to request merchants for a code to lock or unlock Consumer Lockers and/or doors and/or gates which request will be forwarded by the merchants to service providers
  Means to request merchants for advance authentication to unlock or lock Consumer Lockers and/or doors and/or gates which request is forwarded by the merchants to service providers
  Means to request goods carriers for a code to lock or unlock Consumer Lockers and/or doors and/or gates which request will be forwarded by the merchants to service providers Means to request goods carriers for advance authentication to lock or unlock Consumer Lockers and/or doors and/or gates which request will be forwarded by the goods carriers to service providers for delivery drones Means to request merchants for advance authentication to unlock or lock which request will be forwarded by the merchants to service providers Means to request goods carriers for advance authentication to unlock and/or lock which request will be forwarded by the goods carriers to service providers for delivery trucks Means to request merchants for advance authentication to unlock and/or lock which request will be forwarded by the merchants to service providers Means to request goods carriers for advance authentication to unlock and/or lock which request will be forwarded by the goods carriers to service providers In accordance with the foregoing objects, the present invention-a locker adaption system for adapting Merchants Lockers for Counter Store Pickup or Drive-Thru Order Pickup-generally comprises for buyers Means to get counter store pickup locker number where the order is placed Means to unlock the counter store pickup locker Means to pick-up order from unlocked counter store pickup locker Means to view and select an available drive-thru store pickup locker Means to lock an available drive-thru store pickup locker Means to pick-up orders from unlocked drive-thru store pickup locker for sellers Means to own and install counter store pickup lockers Means to view and select an available counter store pickup locker Means to load order and lock counter store pickup locker Means to own and install internal and external drive-thru store pickup lockers Means to receive order information and drive-thru store pickup locker number Means to place orders into internal drive-thru store pickup lockers and/or send the orders to external drive-thru store pickup lockers and to unlock the lockers It is now noted that as used herein an "networked lock" shall for purposes of the present invention be expressly defined to mean "locking device which operates by means of electric current with an electronic control assembly connected to the locking device that use magnets, solenoids, motors or other mechanism to actuate the locking device by either supplying or removing power, where the electronic control assembly is also connected to a networked lock server thru an internet or intranet, where the electronic control assembly is also identifiable to the networked lock server thru a unique identifier to the networked lock server, where the networked lock is registered by an owner where the owner can be a consumer or a merchant using the unique identifier with the networked lock server, where the unique identifier with or without additional information can be displayed as a machine readable code such as bar code, QR code etc., and/or can be displayed as a human readable text and/or can be electronically communicated to devices such as blue tooth, radio frequency identifiers, near field communication devices and the like, where the electronic control assembly can lock or unlock the locking device upon verification of a request received thru electric switches connected to the electronic control assembly to lock or unlock the locking device with or without a code received thru a keypad connected to the electronic control assembly, where the electronic control assembly can also lock or unlock the locking device when a request is received from authorized devices using a wireless protocol and a valid cryptographic digital key, where the electronic control assembly may or may not be part of a smart home."

It is now noted that as used herein a "standalone lock" shall for purposes of the present invention be expressly defined to mean "a standalone lock which operates as a standalone lock where the standalone lock can be programmed using a key pad attached to the standalone lock for a reasonable number of one-time use codes and for a reasonable number of repeat use codes, where the one-time and/or repeat use codes can be used to lock and/or unlock the standalone lock, where the standalone lock may have lock and unlock button, where the standalone lock may be opened with or without a handle, the standalone lock may or may not have a handle and the standalone lock can be registered by an owner where the owner can be a consumer with a service provider."

It is now noted that as used herein an "authorized user" shall for purposes of the present invention be expressly defined to mean "an owner of a mobile device where the mobile device has been authorized as an authorized mobile device by consumer locker owners (O) of specified lockers as well as delivery/pick up persons acting on behalf of goods carriers (G) where the goods carriers (G) are registered with service providers (P) and delivery/pick up persons acting on behalf of merchants (M) where the merchants (M) are registered with service providers (P)." The owner of the mobile devices could be joint legal owners of consumer lockers other than the registered consumer locker owner (O) as well as could be delivery/pick up persons themselves.

It is now noted that as used herein an "front door" shall for purposes of the present invention be expressly defined to mean "a door of a locker that is controlled by front side lock where the type of the front side lock can be 'networked' or 'standalone' or 'not used' and the front side lock type 'not used' will be valid only for lockers accessible by drones."

It is now noted that as used herein a "networked locker" shall for purposes of the present invention be expressly defined to mean "a locker which incorporates a networked lock to lock and/or unlock the front door attached to the locker."

It is now noted that as used herein a "standalone locker" shall for purposes of the present invention be expressly defined to mean "a locker which incorporates a standalone lock to lock and/or unlock the front door attached to the locker."

It is now noted that as used herein a "dummy locker" shall for purposes of the present invention be expressly defined to mean "a locker which incorporates no lock to lock and/or unlock the front door attached to the locker." A dummy locker can be used only by drones and when the locker is placed inside a restricted area like a fenced-in area.

It is now noted that as used herein a "locker" shall for purposes of the present invention be expressly defined to mean "a locker that is a networked or standalone locker unless the locker is specifically mentioned as networked locker or standalone locker."

It is now noted that as used herein a "default authorization code" shall for purposes of the present invention be expressly defined to mean "a one-time authorization code that can be used to unlock the front door of a locker and the one-time authorization code is a pre-determined pattern of a tracking number where the goods pertaining to the tracking number needs to be either delivered to the locker or to be picked up from the locker and the pre-determined pattern will be clearly posted near the locker so that the delivery or pickup person can unlock the locker." For example, the pre-determined pattern to determine a one-time authorization might be such as 4 characters starting from $5^{th}$ character or last 6 characters of tracking number and the like.

It is now noted that as used herein a "networked common area" shall for purposes of the present invention be expressly defined to mean "a common area which incorporates a networked lock to lock and/or unlock a door of the common area where the door is operable by authorized users who are not the consumer locker owners of the networked lock and by consumer locker owners of the networked lock."

It is now noted that as used herein a "standalone common area" shall for purposes of the present invention be expressly defined to mean "a common area which incorporates a standalone lock to lock and/or unlock a door of the common area where the door is operable by authorized users who are not the consumer locker owners of the standalone lock and by consumer locker owners of the standalone lock."

It is now noted that as used herein an "common area" shall for purposes of the present invention be expressly defined to mean "a common area that is a networked or a standalone common area unless the common area is specifically mentioned as networked common area or standalone common area."

It is now noted that as used herein an "common area outer door" shall for purposes of the present invention be expressly defined to mean "a door of a common area that incorporates a networked or a standalone lock and is operable by authorized users who are not legal residents of the common area."

It is now noted that as used herein an "common area inner door" shall for purposes of the present invention be expressly defined to mean "a door of a common area that incorporates a networked or a standalone lock and is operable exclusively by legal residents of the common area."

It is now noted that as used herein a "goods handlers" shall for purposes of the present invention be expressly defined to mean "any delivery person making goods delivery or goods pickups and same as delivery persons."

It is now noted that as used herein an "authorized owner of locker" or "owner of locker" or "locker owner" shall for purposes of the present invention be expressly defined to mean "a person or entity that currently owns or rents or leases or have full and sole control in authorizing other persons or entities to lock or unlock by way of one-time code or permanent code or by way of mobile or web site or applications or interfaces provided by a locker network with whom the locker is registered by the person or entity."

It is now noted that as used herein an "consumer in-door goods lockers" shall for purposes of the present invention be expressly defined to mean "any locker that can provide Protected Consumer In-Door Goods Services."

It is now noted that as used herein an "consumer in-door goods common areas" shall for purposes of the present invention be expressly defined to mean "any common area that can provide Protected Consumer In-Door Goods Services."

It is now noted that as used herein an "consumer out-door goods lockers" shall for purposes of the present invention be expressly defined to mean "any locker that can provide Protected Consumer Out-Door Goods Services."

It is now noted that as used herein a "consumer curbside goods lockers" shall for purposes of the present invention be expressly defined to mean "any locker that can provide Protected Consumer Curbside Goods Services."

It is now noted that as used herein a "kitchen lockers" shall for purposes of the present invention be expressly defined to mean "any locker that can provide Protected Consumer In-Door Goods Services and easily accessible to kitchen and/or perishable goods can be stored." Consumer Locker owners (O) can designate any locker as a "kitchen locker." Lockers can be used for the following goods services:
  Protected Consumer In-Door Goods Services
  Protected Consumer Out-Door Goods Services
  Protected Consumer Curbside Goods Services
  Counter Store Pickup and Drive-Thru Order Pickup
Protected Consumer in-Door Goods Services In at least some implementations of the present invention, the locker adaption system for the purpose of providing Protected Consumer In-Door Goods Services generally comprises installation of Consumer Lockers in buildings at specific locations, where the Consumer Lockers have a single door in the front and a hollow opening in the back, where the owners of the Consumer Lockers and legal residents of the buildings are one and the same, where the specific locations are barriers temporarily secured like a vertical sliding or horizontal sliding or hanging window with one or more latches that separate exterior from interior where the exterior being the area available for the authorized users or drones of the Consumer Lockers to provide Protected Consumer In-Door Goods Services and the interior being area available for the authorized owners of the Consumer Lockers to receive the Protected Consumer In-Door Goods Services. When the windows are closed and latched from interior, the windows cannot be opened from interior or exterior and goods cannot be passed thru the windows. The consumer locker owners from the interior of the building would keep the windows closed and latched all the time except when the consumer locker owners from the interior needs to pick up the delivered goods or to leave goods inside the Consumer Lockers for pickup. The frame of the Consumer Locker back side, that is hollow, would be tightly attached to the exterior side of the temporary barrier and the single door of the Consumer Locker would be accessible to authorized users and/or drones For Protected Consumer In-Door Goods Delivery, the authorized users or drones would open the door of the Consumer Locker and leave the goods inside the Locker, the consumer locker owners could easily see the content of the Consumer Locker thru the window, the consumer locker owners would simply unlatch and open the window and pick up the delivered goods from the Locker. For Protected Consumer In-Door Goods Pickup, the consumer locker owners would simply unlatch and open the window and leave the goods to be picked up into the Locker, the authorized users or drones would open the door of the Consumer Locker and pick up the goods from inside the Locker. If the Consumer Lockers are Standalone Consumer Lockers then drones may not be able to provide the Protected In-Home Goods Services, because drones may not be able to communicate with Standalone Consumer Lockers.

In at least some implementations of the present invention, the locker adaption system for the purpose of providing Protected Consumer In-Door Goods Services generally comprises installation of Consumer Lockers in buildings at specific locations, where the Consumer Lockers have two doors one in the front and one in the back, where the owners of the Consumer Lockers and legal residents of the buildings are one and the same, where the specific locations are permanent opening that could be a hollow space where an existing window is removed or an opening cut in the wall joining the exterior and the interior, where the exterior being the area available for the authorized users or drones of the Consumer Lockers to provide Protected Consumer In-Door Goods Services and the interior being area available for the owners of the Consumer Lockers to receive the Protected Consumer In-Door Goods Services where the front door of the Consumer Locker would be facing the exterior and where the back door of the Consumer Locker would be facing the interior. The consumer locker owners from the interior of the building would keep the back door closed and locked all the time except when the consumer locker owners from the interior needs to pick up the delivered goods or needs to leave goods for pickup. When the front door of the Consumer Lockers is unlocked by authorized users or by drones the authorized users or drones can deliver the goods into the Consumer Lockers or pick up the goods from the Consumer Lockers When the back door of the Consumer Locker is unlocked by the consumer locker owners of the Consumer Lockers the consumer locker owners can pick up the delivered goods from the Consumer Lockers or leave the goods into the Consumer Lockers that need to be picked up. The back side of the Consumer Locker would be tightly attached to the exterior side of the permanent opening or the front side of the Consumer Locker would be tightly attached to the interior side of the permanent opening and the front door of the Locker. When the back side of the Consumer Locker is tightly attached to the exterior side of the permanent opening then the Consumer Locker would be protruding on the exterior side. When the front side of the Consumer Locker is tightly attached to the interior side of the permanent opening then the Consumer Locker would be protruding on the interior side. A sensor can also be added to the back door of the Consumer Lockers to connect to an existing or future security system. For Protected Consumer In-Door Goods Delivery, the authorized users or drones would open the front door of the Consumer Locker and leave the goods inside the Locker, the consumer locker owners would open the back door of the Consumer Locker and pick up the delivered goods from the Locker. For Protected Goods Pickup, the consumer locker owners would simply open the back door of the Consumer Locker and leave the goods to be picked up inside the Lockers, the authorized users or drones would open the front door of the Consumer Locker and pick up the goods from the Consumer Lockers. If the Consumer Lockers are Standalone Consumer Lockers then drones may not be able to provide the Protected Consumer In-Door Goods Services, because drones may not be able to communicate with Standalone Consumer Lockers.

In at least some implementations of the present invention, the locker adaption system for the purpose of providing Protected Consumer In-Door Goods Services generally comprises attachment of Locks to doors connecting outside of a secured area with a common area in the inside of the secured area where the consumer locker owners of Locks and legal residents of common area are one and the same where the common area in the inside of the secured area is also connected thru one or more doors to private area in the inside of the secured area where the common area in the inside of the secured area is accessible to both legal residents of the private area and authorized users of common area whereas the private area in the inside of the secured area is accessible only to legal residents of the private area. The legal residents of the private area would keep the door connecting outside of the secured area with common area in the inside of the secured area and the door connecting private area with common area in the inside of the secured area closed all the time and when the door connecting outside of the secured area with common area in the inside of the secured area is unlocked by authorized users of common area the authorized users of common area can deliver the goods inside the common area or pick up the package for shipping from the common area. When the door connecting outside of the secured area with common area in the inside of the secured area or any one of the doors connecting the common area with private area in the inside of the secured area is unlocked by legal residents of the private area, the legal residents of the private area can pick up the delivered goods from the common area or leave packages for shipping that needs to be picked up within the common area. The common area may not be part of an electronic monitoring system even when the private area is part of an electronic monitoring system so that the electronic monitoring system will not sound alarm or notify the monitoring servers when the door connecting outside of the secured area with common area in the inside of the secured area is opened. This would enable the authorized users of common area to deliver or pickup goods without triggering the electronic monitoring system. The common area can be an enclosed in-door area or can be a garage or can be an out-door area with an enclosed fence.

Protected Consumer Out-Door Goods Services

In at least some implementations of the present invention, the locker adaption system for the purpose of providing Protected Consumer Out-Door Goods Services generally comprises installation of Consumer Lockers in within the boundaries of a property but outside secured building where the Consumer Lockers have just one door with all the other sides closed, where the owners of the Consumer Lockers and owners of the property are one and the same, where the Consumer Lockers are accessible to authorized users or drones of the Consumer Lockers to provide Protected Out-Door Goods Services and the Consumer Lockers are accessible to owners of the Consumer Lockers to receive Protected Out-Door Goods Services. The consumer locker owners would keep the door of the Consumer Locker closed all the time except when the consumer locker owners need to pick up the delivered goods or need to leave packages for shipping. When the door of the Consumer Lockers is unlocked by authorized users or by drones the authorized users or drones can deliver the goods into the Consumer Lockers or pick up the goods from the Consumer Lockers. When the door of the Consumer Locker is unlocked by the consumer locker owners of the Consumer Lockers the consumer locker owners can pick up the delivered goods from the Consumer Lockers or leave packages for shipping inside the Consumer Lockers that needs to be picked up. If the Consumer Lockers are Standalone Consumer Lockers then drones may not be able to provide the Protected Consumer Out-Door Goods Services, because drones may not be able to communicate with Standalone Consumer Lockers.

Protected Consumer Curbside Goods Services

In at least some implementations of the present invention, the locker adaption system for the purpose of providing Protected Consumer Curbside Goods Services generally comprises installation of Consumer Lockers within the boundaries of a property but outside secured building and closer to curbside of the property where the Consumer Lockers are accessible to delivery trucks and have just one door with all the other sides closed, where the owners of the Consumer Lockers and owners of the property are one and the same, where the Consumer Lockers are accessible to authorized users or drones or driver-driven delivery trucks or driver-less trucks to provide Protected Consumer Curbside Goods Services and the Consumer Lockers are accessible to owners of the Consumer Lockers to receive Protected Consumer Curbside Goods Services. The consumer locker owners would keep the door of the Consumer Locker closed all the time except when the consumer locker owners need to pick up the delivered goods or need to leave packages for shipping for pickup. When the door of the Consumer Lockers is unlocked by authorized users or by driver-driven delivery trucks or driver-less delivery trucks the authorized users or driver-driven delivery trucks or driver-less trucks can deliver the goods into the Consumer Lockers or pick up the packages for shipping from the Consumer Lockers. When the door of the Consumer Locker is unlocked by the consumer locker owners of the Consumer Lockers the consumer locker owners can pick up the delivered goods from the Consumer Lockers or leave the packages for shipping inside the Consumer Lockers that needs to be picked up. If the Consumer Lockers are Standalone Consumer Lockers then driver driven delivery trucks or driver-less trucks may not be able to provide the Protected Consumer Curbside Goods Services, because driver-driven or driver-less delivery trucks may not be able to communicate with Standalone Consumer Lockers.

Counter Store Pickup and Drive-Thru Order Pickup

In at least some implementations of the present invention, the locker adaption system for providing Counter Store Pickup generally comprises installation of Store Pickup Lockers where front side of the Store Pickup Lockers is accessible for buyers from indoor area of the seller and back side is accessible for sellers and the Store Pickup Lockers can be available for sellers only from inside where the pickup orders are prepared. The Store Pickup Lockers available for sellers from indoor area of the seller can be referred as Counter Store Pickup lockers. The legal owners of the Store Pickup Lockers and sellers are one and the same. The sellers can leave the pickup orders inside the Counter Store Pickup lockers. The Store Pickup Lockers can be a one door Store Pickup Locker with a door on the front side and a hollow back side. The Store Pickup Locker can also be a two door Store Pickup Locker with a door on the front side and a door on back side. The front door of the Store Pickup Locker will be installed with Networked lock. The Store Pickup Lockers can be used for passage of goods from seller to buyer and one or more such Store Pickup Lockers can be installed by the sellers. The buyers would pick up the orders that are left by the sellers inside the Counter Store Pickup lockers.

In at least some implementations of the present invention, the locker adaption system for providing Drive-Thru Store Pickup generally comprises installation of Store Pickup Lockers where front side of the Store Pickup Lockers is accessible for buyers from drive-thru lanes and back side is accessible for sellers and the Store Pickup Lockers can be available for sellers from inside or outside of a building where the pickup orders are prepared. The lockers available for sellers from inside of the building can be referred as Drive-Thru Store Pickup Internal lockers while the lockers available for sellers from outside of the building can be referred as Drive-Thru Store Pickup External lockers. The legal owners of the Store Pickup Lockers and sellers are one and the same. The sellers can leave the pickup orders inside the internal lockers whereas the sellers can transport the pickup orders to external lockers by means of drones or y tubes or by any other means. The Store Pickup Lockers can be a one door Store Pickup Locker with a door on the front side and a hollow back side. The Store Pickup Locker can also be a two door Store Pickup Locker with a door on the front side and a door on back side. The front door of the Store Pickup Locker will be installed with Networked lock. The Store Pickup Lockers can be used for passage of goods from seller to buyer in a drive-thru lane and one or more such Store Pickup Lockers can be installed by the sellers. The buyers would pick up the orders that are left by the sellers inside the Store Pickup Lockers.

A store pickup locker with two doors can also be used as a Counter Store Pickup Locker as well Drive-Thru Store Pickup Internal lockers.

Finally, many other features, objects and advantages of the present invention will be apparent to those of ordinary skill in the relevant arts, especially in-light of the foregoing discussions and the following drawings, exemplary detailed description and appended claims.

BRIEF DESCRIPTION OF THE DRAWINGS

Although the scope of the present invention is much broader than any particular embodiment, a detailed description of the preferred embodiment follows together with illustrative FIG.s, wherein like reference numerals refer to like components, and wherein:

FIG. 1 shows, in an overview use case diagram, the various locker installation functionality implemented in the preferred embodiment of the locker adaption system and method for Protected Consumer In-Door Goods Services, Protected Consumer Out-Door Goods Services and Protected Consumer Curbside Goods Services in accordance with the present invention.

FIG. 2 shows, in a flowchart, an overview of the various steps generally taken in providing access for installed Consumer Lockers through authorization and/or through advance authentication for Protected Consumer In-Door Goods Services, Protected Consumer Out-Door Goods Services and Protected Consumer Curbside Goods Services in accordance with the present invention.

FIG. 27 shows, in a class diagram, a high-level schema for a representative authorized owner database (44-8) as may be implemented for Protected Consumer In-Door Goods Services, Protected Consumer Out-Door Goods Services and Protected Consumer Curbside Goods Services in accordance with the present invention.

FIG. 28 shows, in a class diagram, a high-level schema for a representative authorized merchant database (44-9) as may be implemented for Protected Consumer In-Door Goods Services, Protected Consumer Out-Door Goods Services and Protected Consumer Curbside Goods Services in accordance with the present invention.

FIG. 29 shows, in a class diagram, a high-level schema for a representative authorized goods carrier database (44-10) as may be implemented for Protected Consumer In-Door Goods Services, Protected Consumer Out-Door Goods Services and Protected Consumer Curbside Goods Services in accordance with the present invention.

FIG. 30 shows, in a class diagram, a high-level schema for a representative locker database (44-11) as may be implemented for Protected Consumer In-Door Goods Services, Protected Consumer Out-Door Goods Services and Protected Consumer Curbside Goods Services in accordance with the present invention.

FIG. 31 shows, in a class diagram, a high-level schema for a representative locker authorization code database (44-12) as may be implemented for Protected Consumer In-Door Goods Services, Protected Consumer Out-Door Goods Services and Protected Consumer Curbside Goods Services in accordance with the present invention.

FIG. 32 shows, in a class diagram, a high-level schema for a representative locker authentication database (44-13) as may be implemented for Protected Consumer In-Door Goods Services, Protected Consumer Out-Door Goods Services and Protected Consumer Curbside Goods Services in accordance with the present invention.

FIG. 33 shows, in a class diagram, a high-level schema for a representative mobile device database (44-14) as may be implemented for Protected Consumer In-Door Goods Services, Protected Consumer Out-Door Goods Services and Protected Consumer Curbside Goods Services in accordance with the present invention.

FIGS. 34-L and 34-D show, in a class diagram, a high-level schema for a representative Add/Update Owner Information form as may be implemented for Protected Consumer In-Door Goods Services, Protected Consumer Out-Door Goods Services and Protected Consumer Curbside Goods Services in accordance with the present invention.

FIGS. 35-L and 35-D show, in a class diagram, a high-level schema for a representative Add/Update Merchant Information form as may be implemented for Protected Consumer In-Door Goods Services, Protected Consumer Out-Door Goods Services and Protected Consumer Curbside Goods Services in accordance with the present invention.

FIGS. 36-L and 36-D show, in a class diagram, a high-level schema for a representative Add/Update Goods Carrier Information form as may be implemented for Protected Consumer In-Door Goods Services, Protected Consumer Out-Door Goods Services and Protected Consumer Curbside Goods Services in accordance with the present invention.

FIGS. 37-L and 37-D show, in a class diagram, a high-level schema for a representative Add/Update Consumer Locker Information form as may be implemented for Protected Consumer In-Door Goods Services, Protected Consumer Out-Door Goods Services and Protected Consumer Curbside Goods Services in accordance with the present invention.

FIGS. 37-M-L and 37-M-D show, in a class diagram, a high-level schema for a representative Add/Update Store Pickup Locker Information form as may be implemented for Merchant Store Pickup Services in accordance with the present invention.

FIGS. 38-L, 38-S and 38-D show, in a class diagram, a high-level schema for a representative Add/Update Authcode Information form as may be implemented for Protected Consumer In-Door Goods Services, Protected Consumer Out-Door Goods Services and Protected Consumer Curbside Goods Services in accordance with the present invention.

FIGS. 39-L, 39-S and 39-D show, in a class diagram, a high-level schema for a representative Add/Update Mobile Device Information form as may be implemented for Protected Consumer In-Door Goods Services, Protected Consumer Out-Door Goods Services and Protected Consumer Curbside Goods Services in accordance with the present invention.

FIGS. 40-L and 40-D show, in a class diagram, a high-level schema for a representative Goods Carrier Information for owners as may be implemented for Protected Consumer In-Door Goods Services, Protected Consumer Out-Door Goods Services and Protected Consumer Curbside Goods Services in accordance with the present invention.

FIGS. 42-A and 42-R show, in a class diagram, a high-level schema for a representative Add/Update Authcode Information API as may be implemented for Protected Consumer In-Door Goods Services, Protected Consumer Out-Door Goods Services and Protected Consumer Curbside Goods Services in accordance with the present invention.

FIGS. 43-A and 43-R show, in a class diagram, a high-level schema for a representative Add/Update Authentication Information API as may be implemented for Protected Consumer In-Door Goods Services, Protected Consumer Out-Door Goods Services and Protected Consumer Curbside Goods Services in accordance with the present invention.

FIG. 46 shows a sample shipping label with Delivery Instructions.

FIG. 47 shows, various components of a generic Delivery/Pickup Drone and a generic Consumer Locker that can be used with.

FIG. 48 shows, various components of a generic Delivery/Pickup Truck and a generic Consumer Locker that can be used with.

FIG. 50 shows, in a class diagram, a high-level schema for a representative store pickup database (44-15) as may be implemented for Counter Store Pickup and for Drive-Thru Store Pickup in accordance with the present invention.

FIGS. 51-A and 51-R show, in a class diagram, a high-level schema for a representative Add/Update Authcode Information API as may be implemented for Counter Store Pickup and for Drive-Thru Store Pickup in accordance with the present invention.

FIGS. 52-A and 52-R show, in a class diagram, a high-level schema for a representative Add/Update Authentication Information API as may be implemented for Counter Store Pickup and for Drive-Thru Store Pickup in accordance with the present invention.

FIG. 53 shows, various components of a generic Counter Store Pickup and Drive-Thru Store Pickup and a generic Store Pickup Locker that can be used with.

DETAILED DESCRIPTION OF THE INVENTION

Although those of ordinary skill in the art will readily recognize many alternative embodiments, especially in-light of the illustrations provided herein, this detailed description is exemplary of the preferred embodiment of the present invention, the scope of which is limited only by the claims appended hereto.

Referring now to the locker adaption system for In-Door, Out-Door and Curbside Goods Delivery and Pickup Services in accordance with the present invention comprises a service provider, a locker owner, a merchant, a goods carrier, an authorized user, a delivery person, a drone, a delivery truck and one or more lockers with one or more doors electronically controlled by networked locks communicating thru a wired or wireless network with a locker server or with one or more doors electronically controlled by stand-alone locks and works broadly for delivering packages at locker owner location which is not merchant location as following:

The locker owner would register with a service provider to manage lockers to receive In-Door Goods Services, Out-Door Goods Services and Curbside Goods Services (refer to FIGS. 19, 27, 34L and 34D).

Figure 20:
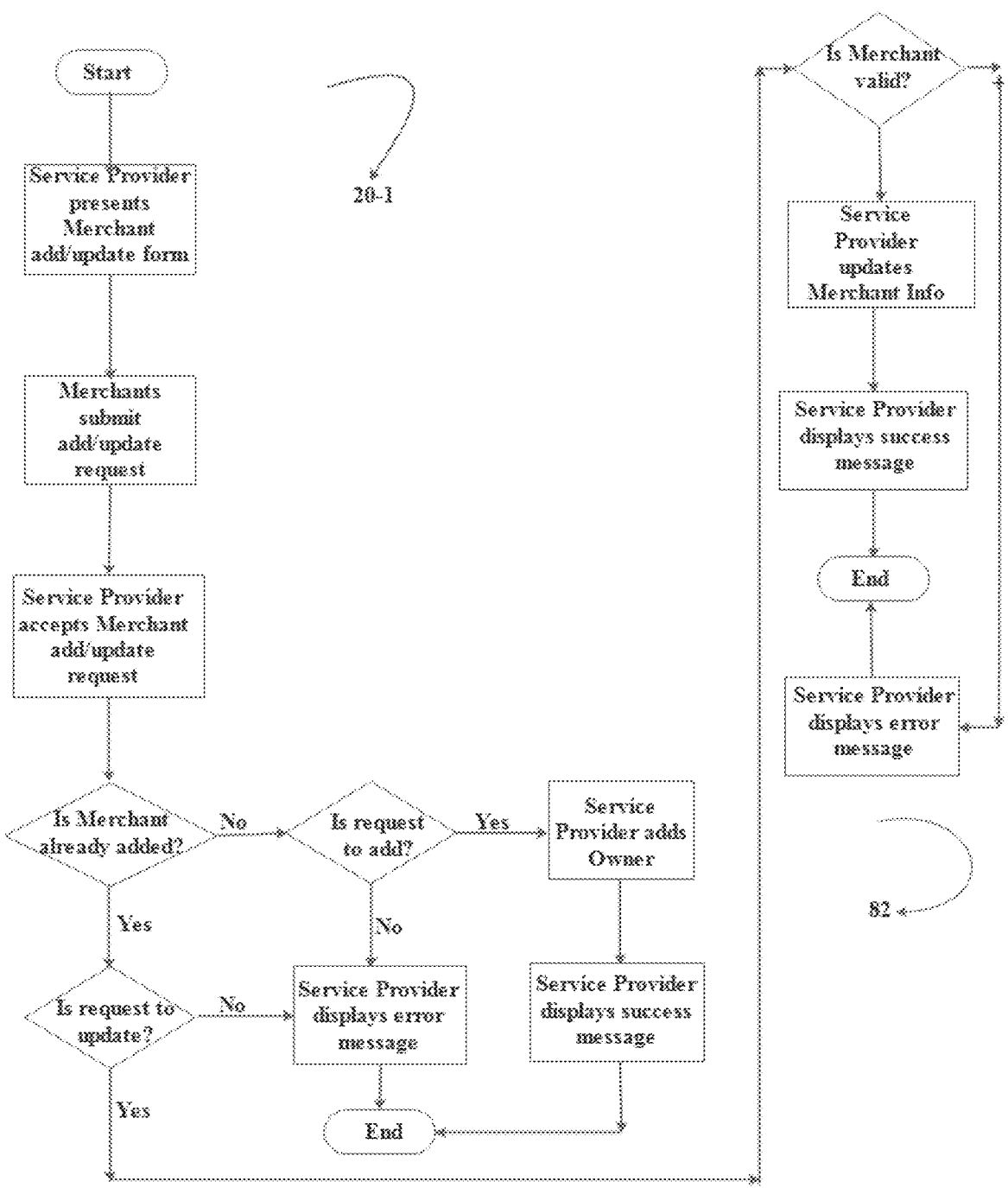
FIG. 20 shows, in a flowchart, an overview of the various steps generally taken in Merchant Registration.

The merchants would also register with the service provider to provide In-Door Goods Services, Out-Door Goods Services and Curbside Goods Services (refer to FIGS. 20, 28, 35-L and 35D).

The goods carrier would also register with the service provider to provide In-Door Goods Services, Out-Door Goods Services and Curbside Goods Services (refer to FIGS. 21, 29, 36L and 36-D).

The locker owner would also register lockers with the service provider where each the locker would be identified externally by a number, known as locker number, assigned by the locker owner, identified internally by the settings of a dip switch in the lock kit or by a serial number assigned to the lock kit by the lock kit manufacturer used by each electronically controlled door, the side to which each electronically controlled door is attached to and type of lock kit. The locker owner would display the external locker number. If the lock kit is a networked lock kit then the locker would be referred as networked locker, otherwise it will be referred as standalone locker. The locker owner would also display the internal identifier or owner id and locker number of each controlled electronic door in a machine-readable format such as QR Code, Bar Code, Text etc. If the lock kit is networked lock kit then the lock kit may also broadcast the internal identifier through a Beacon, RFID, Bluetooth, NFC etc. (refer to FIGS. 10 thru 15, 22, 30, 37-L and 37-D).

Since merchants can also own lockers, the merchants could also register lockers with the service provider where each the locker would be identified externally by a number, known as locker number, assigned by the locker owner, identified internally by the settings of a dip switch in the lock kit or by a serial number assigned to the lock kit by the lock kit manufacturer used by each electronically controlled door, the side to which each electronically controlled door is attached to. The owner id of merchant owned locker would consist of 3 parts separated by '-' where the first part would be 'M', the second part would be merchant id and the third part would be locations id. For example, the owner id of merchant owned locker would be 'M-8211-65' where 8211 could be merchant id and 65 could be location id. The service provider (P) could easily differentiate the type of owner of the locker from the content of owner id. The merchant owned locker can use only networked lock kit and the locker would be referred only as networked locker. The merchant would display the external locker number. The merchant would also display the internal identifier or owner id and locker number of each controlled electronic door in a machine-readable format such as QR Code, Bar Code, Text etc. The lock kit may also broadcast the internal identifier through a Beacon, RFID, Bluetooth, NFC etc. (refer to FIGS. 10, 53, 22, 30, 37-M-L and 37-M-D).

Figure 10:
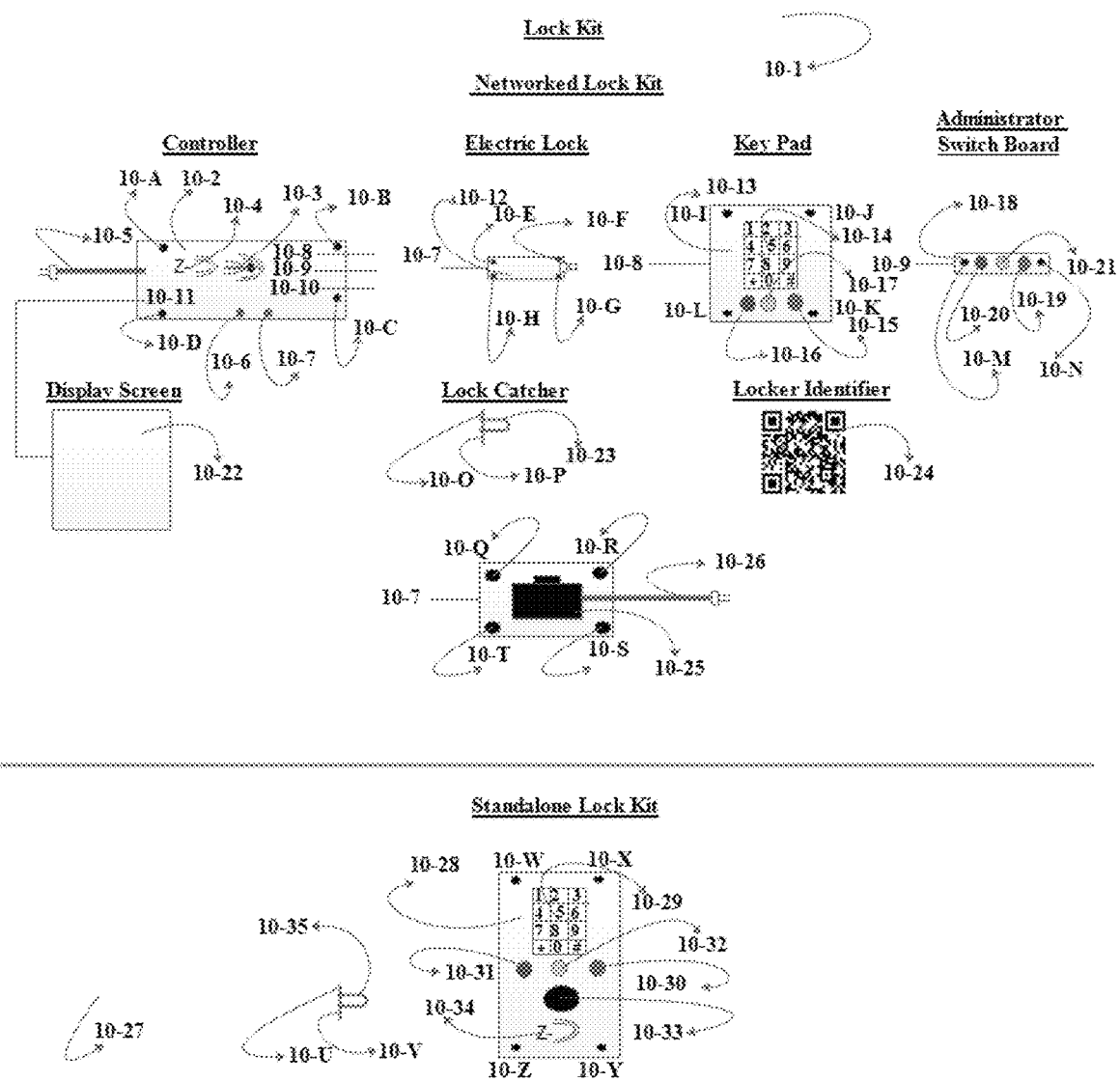
FIG. 10 shows, various components of generic Networked Lock Kit and Standalone Lock that can be used to control the doors of Consumer Lockers and Common Areas (Rooms, Garage and Fence Gates).

Each locker will use at least one controlled door that incorporates a lock kit that would control the unlocking and locking of the controlled door (refer to FIG. 10).

In case of networked locker, each the lock kit might provide Administrator Switch Board as well Key Pad to unlock and lock doors by the lock kits where the Administrator Switch Board would be accessible only to owners of lockers namely consumer locker owners or store pickup locker owners (refer to FIG. 10).

Figure 23:
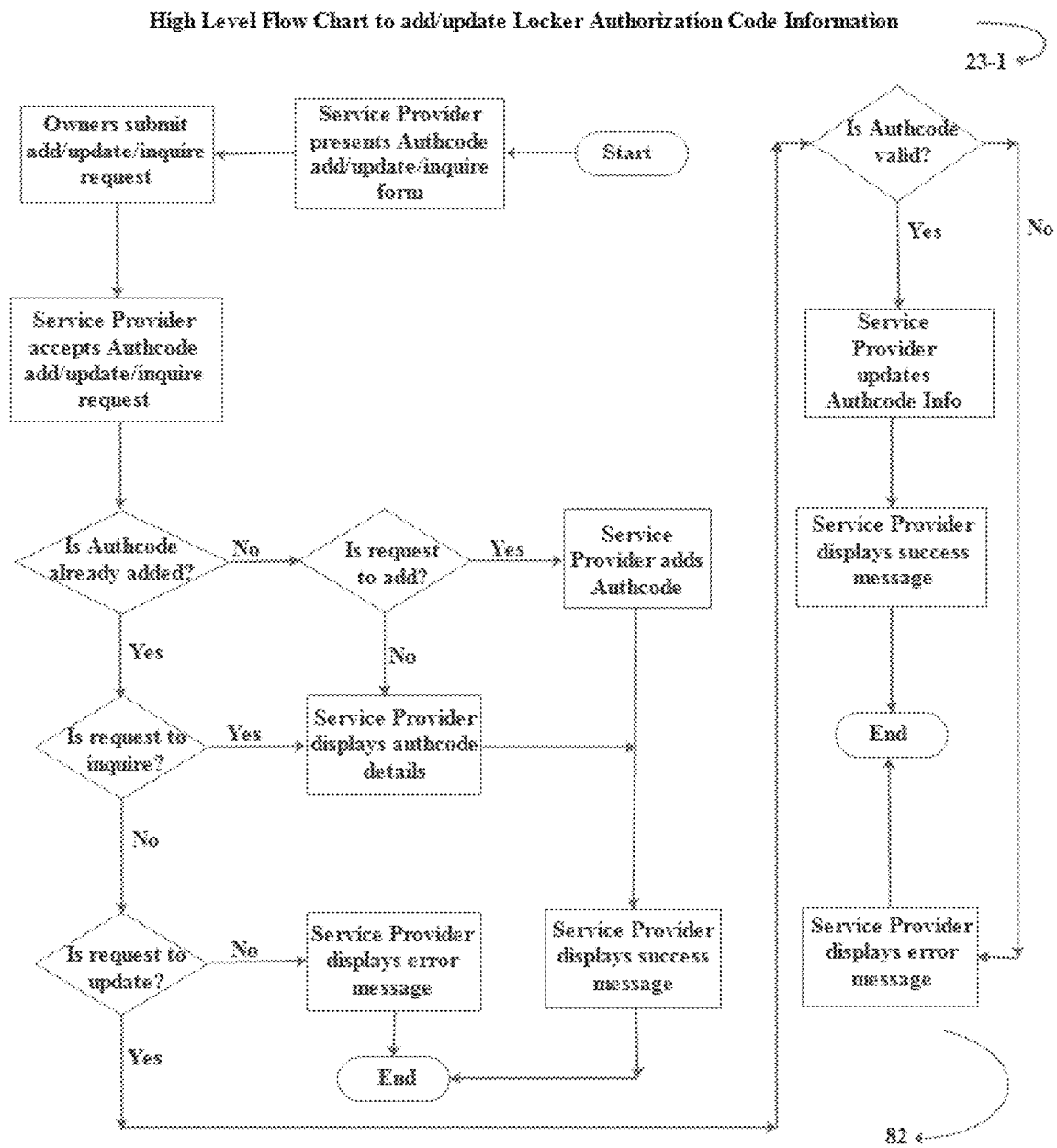
FIG. 23 shows, in a flowchart, an overview of the various steps generally taken in Authcode Request from Consumer Locker owners.

In case of networked locker, the consumer locker owner (O), if the locker owner is not a merchant, would also use a mobile app or a web site based on the specifications provided by the service provider to set and/or request codes as one-time authorization codes as well as unlimited use authorization codes that can be used to unlock any specified electronic door where the one-time and/or unlimited use authorization codes might expire in a specific date and time (refer to FIGS. 23, 31, 38-L, 38-S and 38-D).

The consumer locker owner (O), if the locker owner is not a merchant, would also use a mobile app or a web site based on the specifications provided by the service provider to request the service provider to set a specific mobile device as an authorized mobile device that can be used as a joint owner mobile device or delivery/pick-up person mobile device of any specified locker where setting of the mobile device as an authorized mobile device would expire in a specific date and time. The consumer locker owner (O) would also be able to remove the mobile devices from authorized mobile devices. (refer to FIGS. 33, 39L, 39-S and 39-D). Joint owner mobile device can be used to unlock and/or lock both front and back doors whereas delivery/pick-up person mobile device can be used to unlock and/or lock only front door.

In case of standalone locker, the consumer locker owner would also use the key pad provided by the standalone lock kit to set codes as one-time authorization codes as well as unlimited use authorization codes that can be used to unlock any specified door where the one-time and/or unlimited use authorization codes might be deleted by the locker owner any time. In addition to setting the codes in standalone locks, the consumer locker owners would also be able to save those authorization codes in the authorization code database (refer to FIGS. 23, 31, 38-L, 38-S and 38-D).

Figure 41:
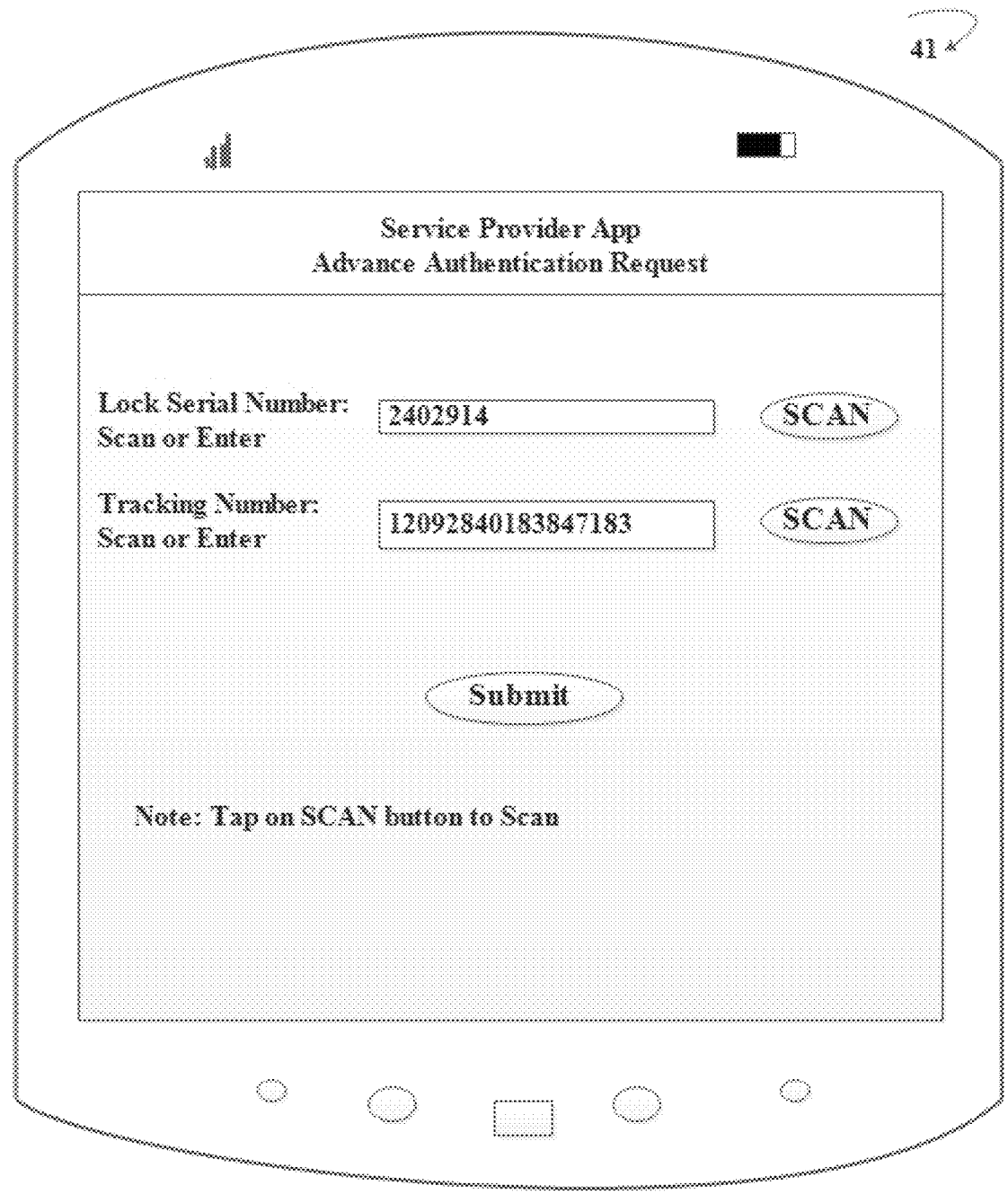
FIG. 41 shows, in a top plan representation of a mobile telecommunications device screen, an example of an advance authentication request such as may be implemented in accordance with the present invention.

The consumer locker owners, joint owners and authorized users would also use a mobile app provided by service provider to request for advance authentication/autocade request for a specific door (refer to FIG. 41).

Figure 25:
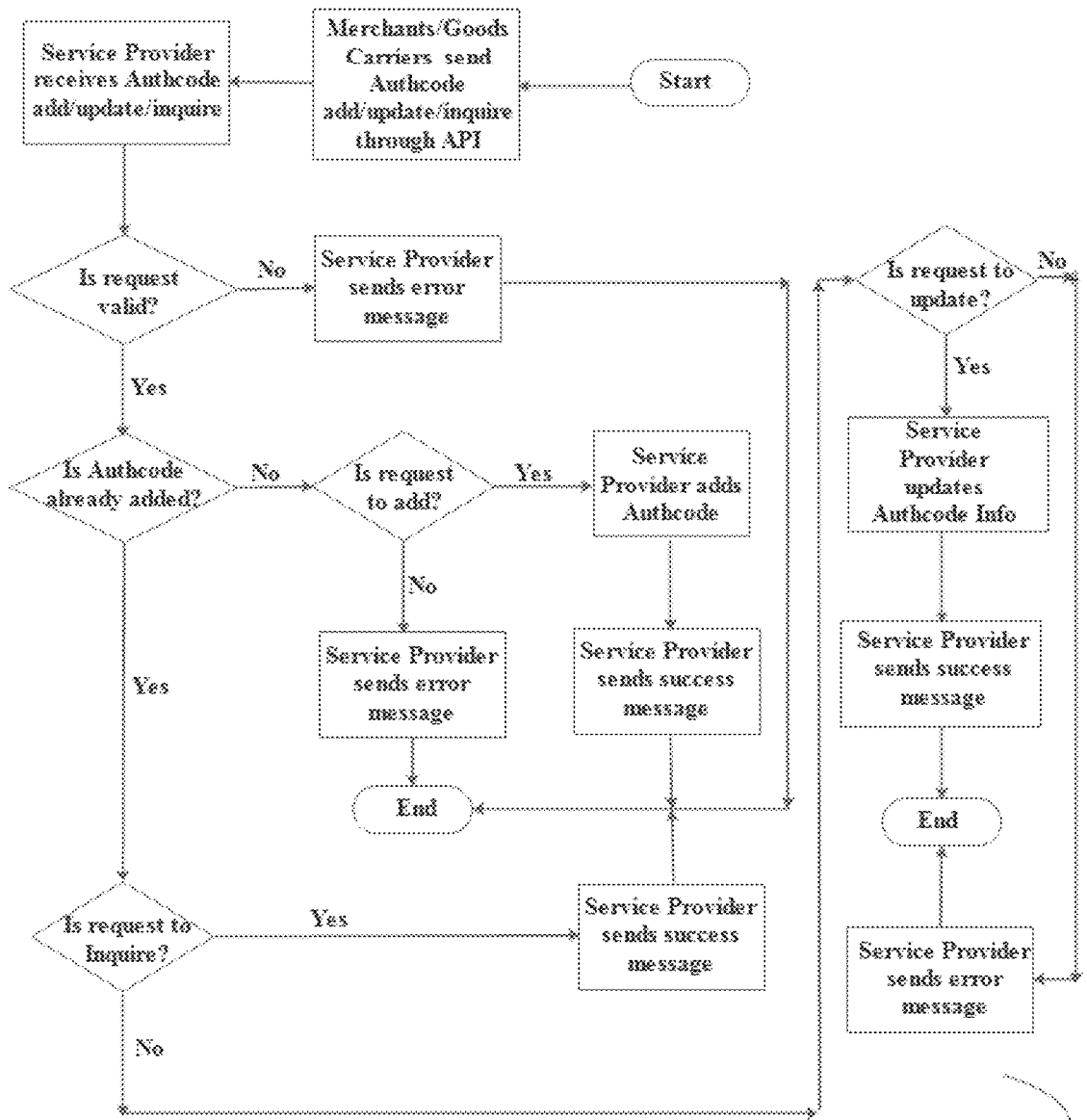
FIG. 25 shows, in a flowchart, an overview of the various steps generally taken in Authcode Request API from Merchants and/or Goods Carriers.

The merchants and goods carriers would also use an API based on the specifications provided by the service provider to inquire and/or request and receive one-time authorization codes that can be used to unlock any specified door of any networked locker where the one-time authorization code might expire in a specific date and time (refer to FIGS. 25, 42-A and 42-R).

Figure 26:
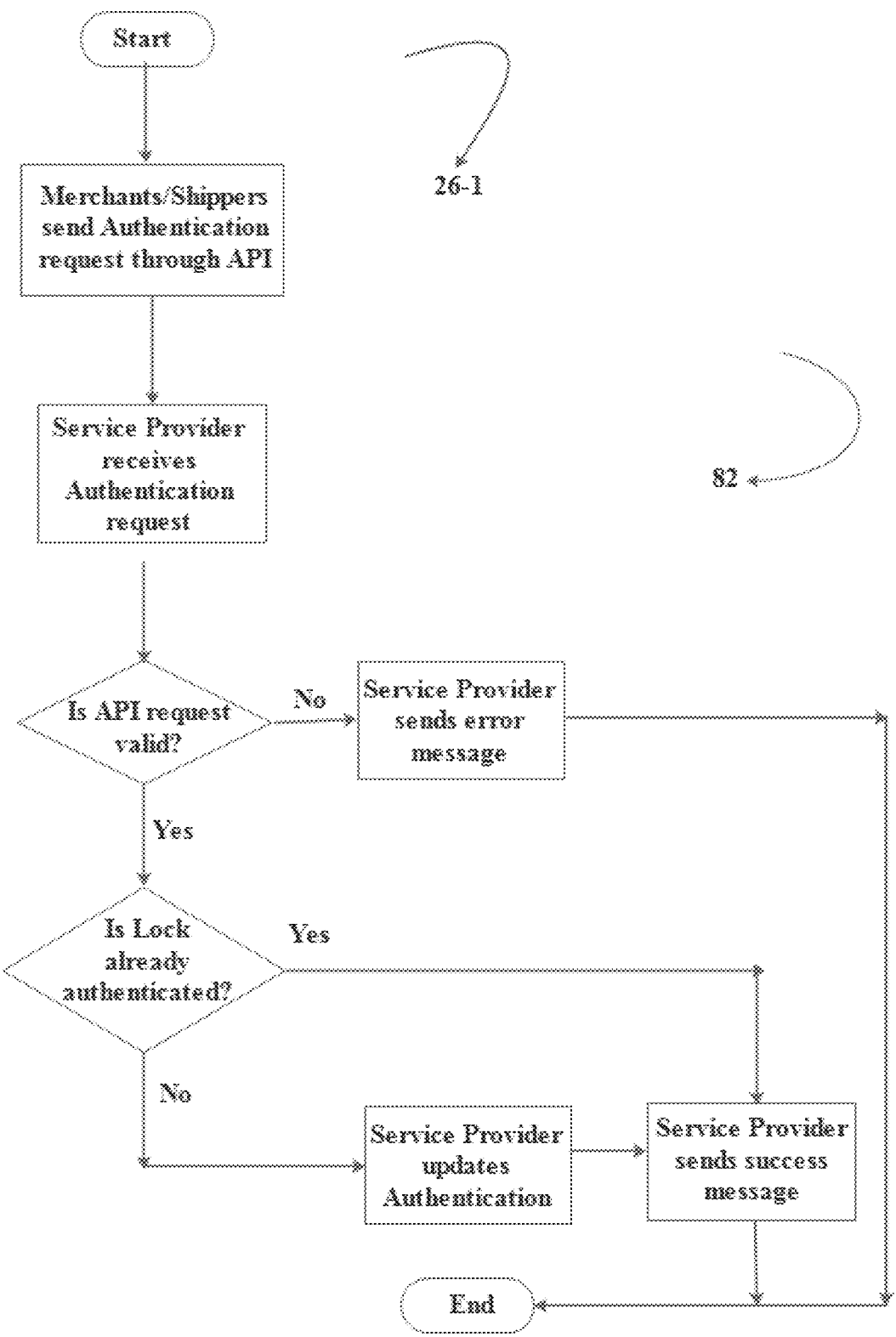
FIG. 26 shows, in a flowchart, an overview of the various steps generally taken in Authentication API from Merchants and/or Goods Carriers.

The merchants and goods carriers would also use an API based on the specifications provided by the service provider to request for advance authentication for any specified door remotely where the specified door is controlled by networked locks (refer to FIGS. 26, 43-A and 43-R).

A user where the user may be a human being acting on behalf of the merchant or goods carrier providing goods delivery or pickup services could request the merchant or goods carrier for a one-time authorization code that might expire in a specific date and time.

A user where the user may be a human being acting on behalf of the merchant or goods carrier providing goods delivery or pickup services could request the merchant or goods carrier for an advance authentication for a specific door where the specific door must be a networked door and such advance authentication would expire in a very short period of pre-determined time.

A drone where the drone being acting on behalf of the merchant or goods carrier providing goods delivery or pickup services could request the merchant or goods carrier for an advance authentication for a specific door where the specific door must be a networked door and such advance authentication would expire in a very short period of pre-determined time.

A delivery truck where the delivery truck acting on behalf of the merchant or goods carrier providing goods delivery or pickup services could request the merchant or goods carrier for an advance authentication for a specific door where the specific door must be a networked door and such advance authentication would expire in a very short period of pre-determined time.

A registered merchant, upon completing a sales transaction, would use an API interface, based on service provider provided specification, to set a code as a one-time use authorization code or to receive a one-time authorization code with a pre-determined expiration date and time for a specific order and save the order tracking number and the code for future use. The API interface would include the order delivery location and optionally would include a specific locker external or internal number if the specific locker external or internal number is provided by the buyer of the goods. If the request is successful, the merchant would save the one-time authorization code, order tracking number and optionally a locker external number along with directions and map for the location of the locker. The one-time authorization code along with other information like locker number and the directions to the locker number would be printed on the shipping label.

A registered goods carrier upon receiving a package for delivery would decide whether to get a one-time locker authorization code based on the information provided on the shipping label. If a one-time locker authorization code is required then the registered goods carrier would use an API interface, based on service provider provided specification, to set a code as a one-time use authorization code or to receive a one-time authorization code with a pre-determined expiration date and time for a specific order and save the order tracking number and the code for future use. The API interface would include the order delivery location and optionally would include a specific locker external or internal number if the specific locker external or internal number is provided by the shipper of the package. If the request is successful, the goods carrier would save the one-time authorization code, order tracking number and optionally a locker number along with directions and map for the location of the locker. The one-time authorization code along with other information like locker number and the directions to the locker number would be printed on the shipping label.

The person delivering the package would use the directions printed on the mailing slip to locate the locker and enter the one-time authorization code in a key pad attached to the locker and press unlock button to open the locker door to leave the goods inside the locker. If a one-time authorization code is not printed on the mailing slip or if the one-time authorization code does not work then the delivery person can use a mobile app, based on service provider provided specification, to scan the QR Code, if one is available, printed on any locker.

If the mobile app is provided by a registered merchant then the merchant would use an API interface, based on service provider provided specification, would request the service provider to provide an advance authentication for the person delivering the package. If the mobile app is provided by a registered goods carrier then the goods carrier would use an API interface, based on service provider provided specification, would request the service provider to provide advance authentication for the person delivering the package. If the mobile app is provided by the service provider and the mobile device is an authorized mobile device to make the request, then the mobile device would request the service provider to provide advance authentication for the person delivering the package. In case of standalone locks, instead of providing advance authentication, the service provider (P) would respond with an authorization code. Upon receiving a successful response, the delivery person would open the locker by pressing the unlock button with or without entering a code in the key pad and leave the goods inside the locker. If a successful response is not received then the delivery person would follow the instructions provided on the locker, for example the instructions may be to use 4 characters starting from $5^{th}$ character or to use last 6 digits of tracking number. If the locker is opened successfully the delivery person would leave the goods inside the locker, otherwise would leave the goods outside the locker.

A drone delivering the package would communicate with the merchant or the goods carrier based on whether the drone is controlled by the merchant or goods carrier, the goods carrier or the merchant would use an API interface, based on service provider provided specification, would request the service provider to provide advance authentication for a specific door. Upon receiving a successful response, the drone would open the locker, select the package or packages to be delivered and leave them inside the locker.

A delivery truck delivering the package would communicate with the merchant or the goods carrier based on whether the delivery truck is controlled by the merchant or goods carrier, the merchant or the goods carrier would use an API interface, based on service provider provided specification, would request the service provider to provide advance authentication for a specific door. Upon receiving a successful response, the delivery truck would open the locker, select the package or packages to be delivered and leave them inside the locker.

The consumer locker owner would use a mobile app provided by the service provider or use a multi-use code to open the lockers to retrieve the delivered goods.

Referring now to the locker adaption system in accordance with the present invention comprises a service provider, a locker owner, a merchant, a goods carrier, an authorized user, a drone, a delivery truck and one or more lockers with one or more doors electronically controlled by networked locks communicating thru a wired or wireless network with a locker server or with one or more doors electronically controlled by standalone locks and works broadly for picking packages for shipping as following:

- The locker owner or joint owners would use a mobile app provided by the service provider or use a multi-use code to open the lockers to leave a package for pick up.
- The locker owner would request a goods carrier for a package pick up by providing pick up address and optionally with a tracking number and/or a code number.
- In case of standalone locker or in case of a person picking up the package and the person does not use a mobile device to open the standalone locker, then the locker owner would add an autocade in the authcode database where the authcode would be a default code for the tracking number or a code made of a random number
- If a standalone locker is used by the locker owner, then the locker owner would also manually add the authcode to the standalone locker
- The pickup person, upon arriving at the pickup location would use a code provided to the pick up person by goods carrier or use a default code based on the tracking number provided to the pick up person by goods carrier or use a mobile app to scan the QR Code attached to the locker to get a code or to get advance authentication.
- The pickup drone, upon arriving at the pick-up location would scan the QR Code attached to the locker or electronically receive an identifier from the locker to get advance authentication.
- The pickup truck, upon arriving at the pick-up location would scan the QR Code attached to the locker or electronically receive an identifier from the locker to get advance authentication.
- Optionally, the pick-up person or pick up drone or pickup truck would also receive a bin number where the package for shipping can be picked up.
- Upon entering a code or upon getting advance authentication the pick-up person or pick up drone or pickup truck would open the locker to pick up the package for shipping.

Figure 1:
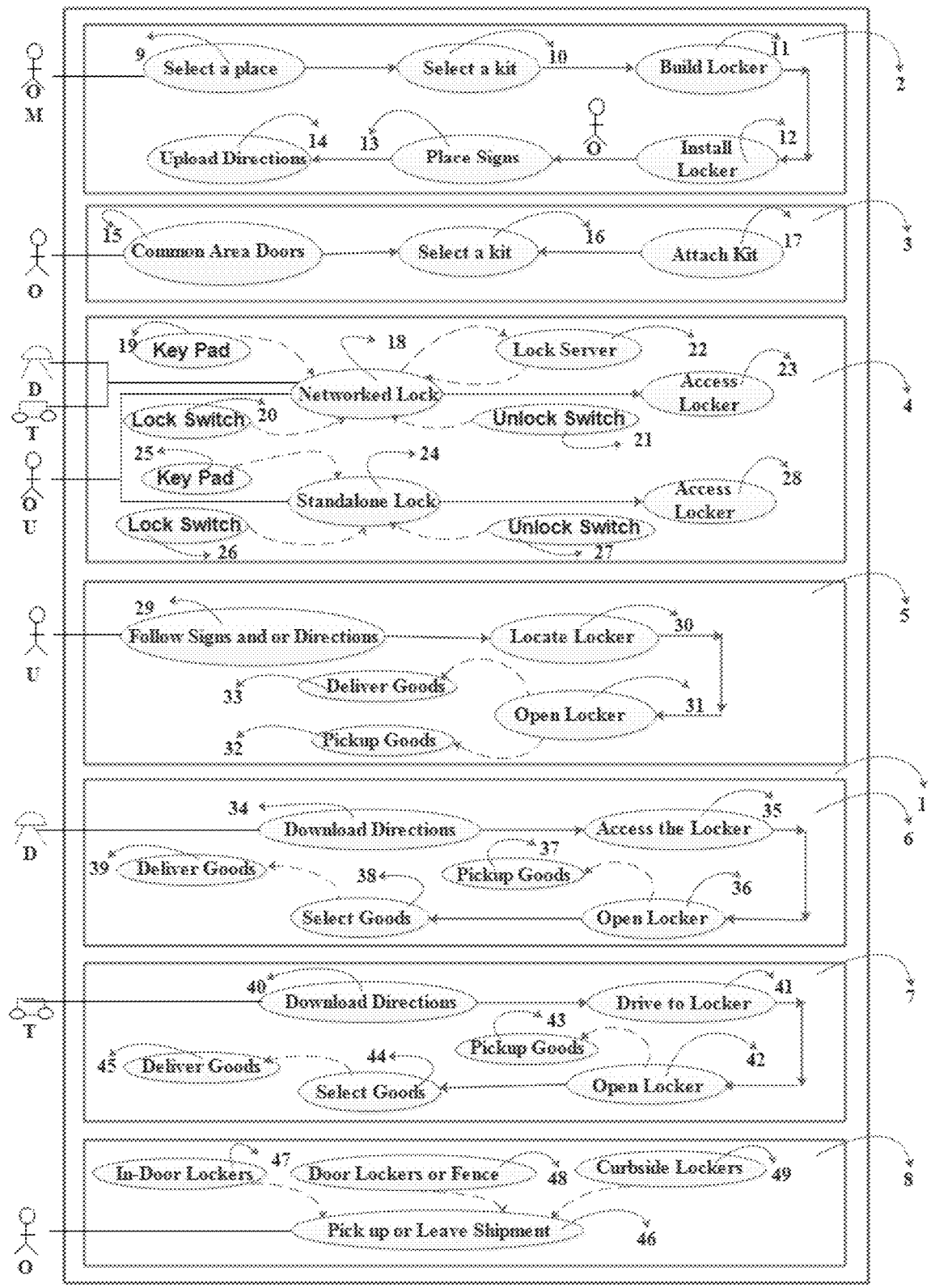
FIGS. 1 and 2 show, in an overview use case diagrams, the various basic functionality implemented in the preferred embodiment of the locker adaption system and method of the present invention.

Referring now to the locker adaption system for Merchant Store Pickup Services in accordance with the present invention comprises a service provider, a merchant who is also a locker owner, an associate accepting orders, an associate handling orders and one or more store pickup lockers with one or more doors electronically controlled by networked locks communicating thru a wired or wireless network with a locker server and works broadly for delivering orders to buyers at merchant location as following:

- The buyer opting to pick up orders at the store either inside of the seller's building or at the seller's drive-thru lane would place the orders in advance
- The buyer opting to pick up orders at the store inside of the seller's building with an order in advance would check-in by scanning a QR Code
- The buyer opting to pick up orders at the store inside of the seller's building without an order in advance would place an order at the seller's building inside.
- The buyer placing order at the seller's building inside and opting to pick up orders at the store inside of the seller's building would be pre-checked and need not check-in using the QR Code
- The buyer opting to pick up orders at the store inside of the seller's building after placing the order in advance or at the store would receive a Counter Store Pickup locker number from an order display monitor The buyer opting to pick up orders at the store inside of the seller's building scan a QR Code or enter an authcode displayed on the Counter Store Pickup locker where the order to be picked up is stored to open the locker and pick up the order The buyer opting to pick up orders at the store from seller's drive-thru lane with an order in advance would enter the drive-thru lane thru a controlled arm or thru a signal The buyer opting to pick up orders at the store from seller's drive-thru lane without an order in advance would place an order at the drive-thru lane and then enter the drive-thru lane thru a controlled arm or thru a signal The buyer opting to pick up orders at the seller's drive-thru lane would scan QR Code or enter an authcode displayed on the Drive-Thru Store Pickup locker to lock the locker and wait for the locker to be unlocked by the seller and pick up the order Referring now to the FIG.s, and to FIG. 1 particular, the Consumer Locker Adaption for Protected In-Door Goods Services, for Protected Consumer Out-Door Goods Services and for Protected Consumer Curbside Goods Services 1 of the present invention, the locker installation, goods delivery and goods pickup are shown to generally comprise a service provider (P), an operative combination of a plurality of consumer locker owners (O) implemented use cases 2, 3, 4 and 8, a plurality of locker authorized users (U) implemented use cases 4 and 5, a plurality of delivery drones (D) implemented use cases 4 and 6 and a plurality of delivery trucks (T) implemented use cases 4 and 7. The use case 2 which is for installing lockers by consumer locker owners is further detailed in a very high lever flow chart 3-1 in FIG. 3 in accordance with the present invention. The use case 2 which is for installing lockers by store pickup locker owners is further detailed in a very high lever flow chart 49-1 in FIG. 49 in accordance with the present invention.

Figure 4:
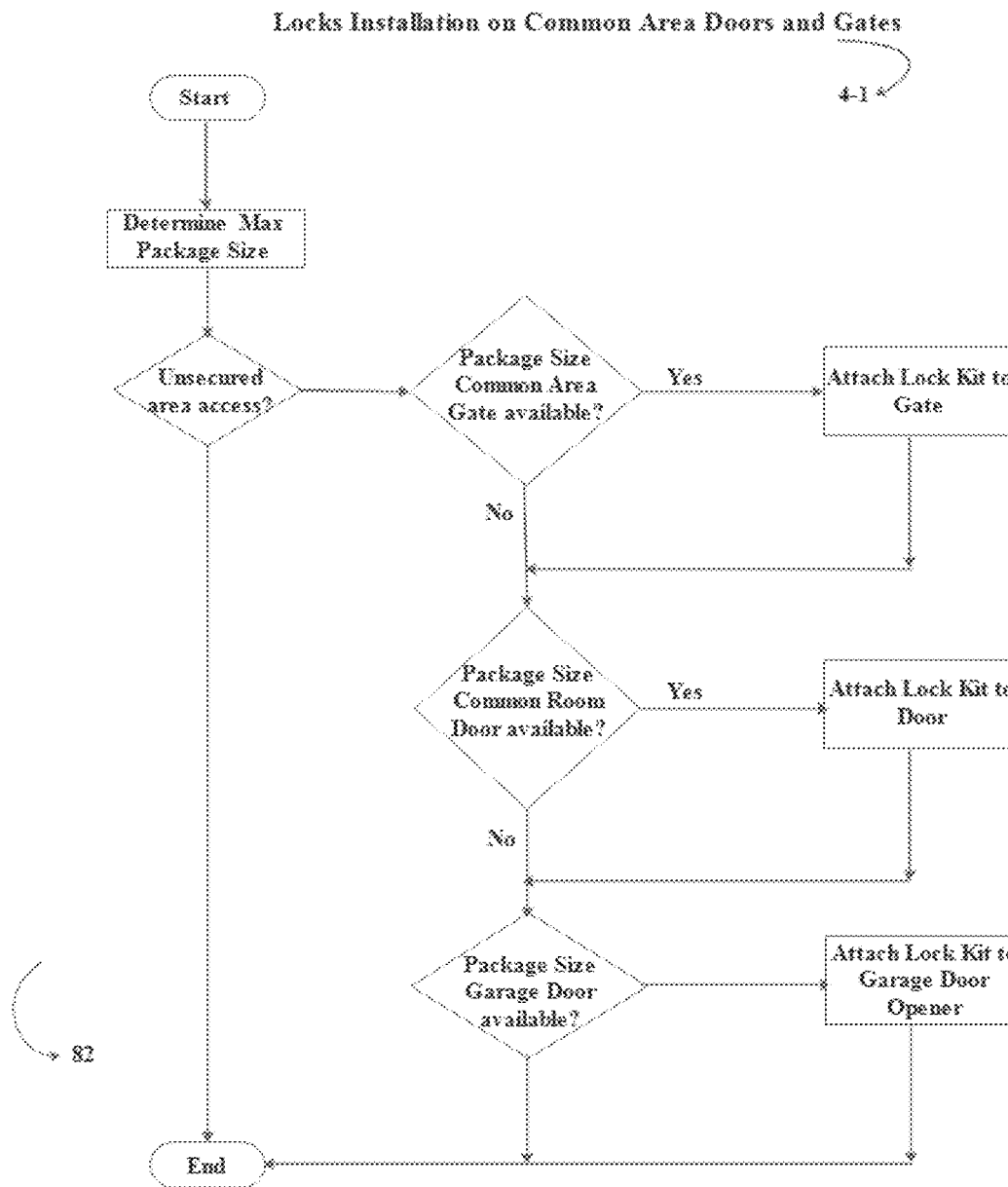
FIG. 4 shows, in a flowchart, an overview of the various steps generally taken in installing Locks to Common Area Doors for Protected Consumer In-Door Goods Services.

The use case 3 which is for installing locks in common area doors and gates is further detailed in a very high lever flow chart 4-1 in FIG. 4 in accordance with the present invention. The use case 4 which is for lock management is further detailed in a very high lever flow chart 5-1 in FIG. 5 in accordance with the present invention. The use case 5 which is for providing goods services by authorized users (U) is further detailed in a very high lever flow chart 6-1 in FIG. 6 in accordance with the present invention. The use case 6 which is for providing goods services by drones (D) is further detailed in a very high lever flow chart 7-1 in FIG. 7 in accordance with the present invention. The use case 7 which is for providing goods services by authorized trucks (T) is further detailed in a very high lever flow chart 8-1 in FIG. 8 in accordance with the present invention. The use case 8 which is for receiving goods services by consumer locker owners (O) is further detailed in a very high lever flow chart 9-1 in FIG. 9 in accordance with the present invention.

Figure 2:
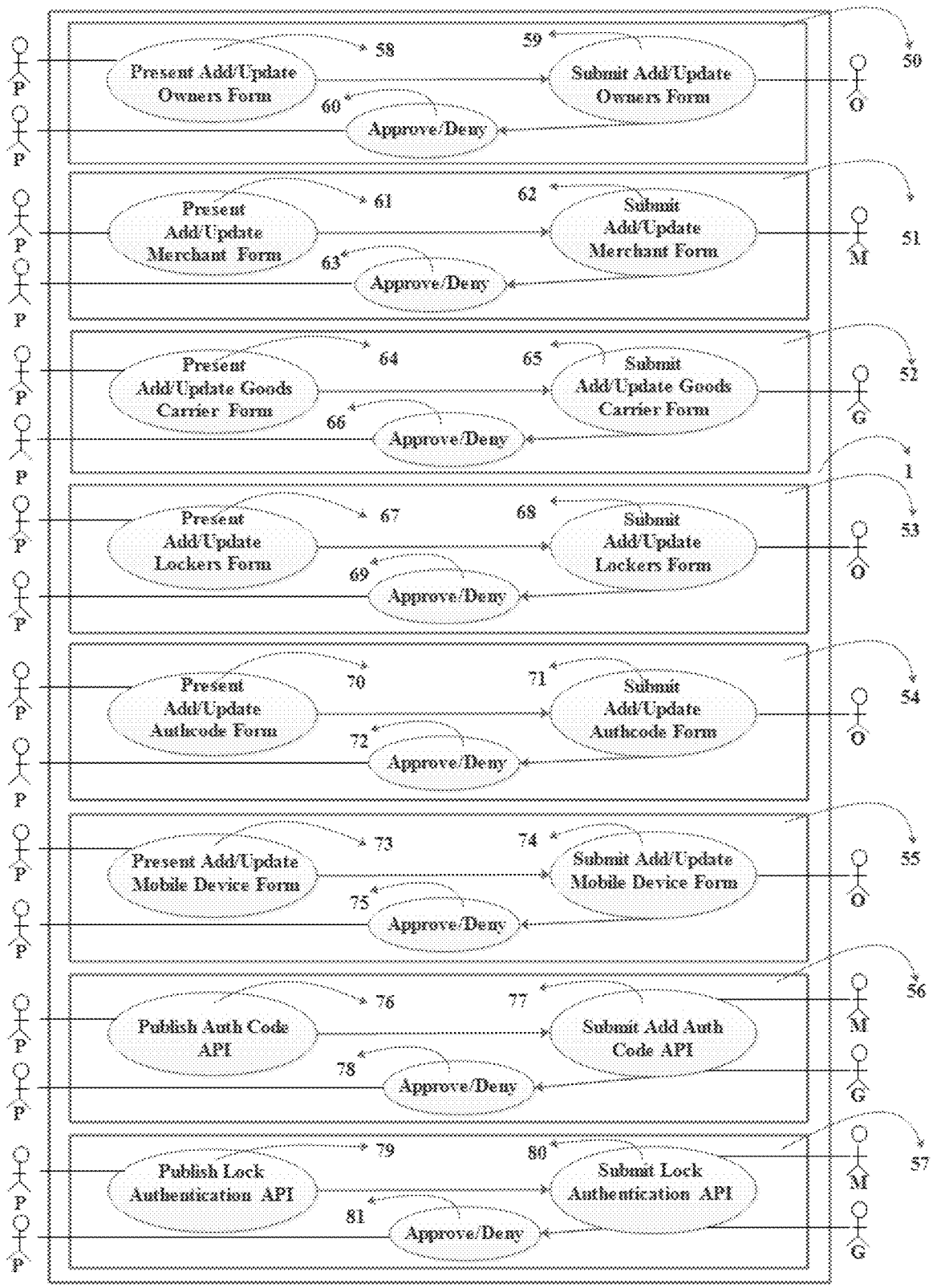

Referring now to the FIG.s, and to FIG. 2 in particular, the Consumer Locker Adaption for Protected In-Door Goods Services, for Protected Consumer Out-Door Goods Services and for Protected Consumer Curbside Goods Services 1 of the present invention, the locker authorization and/or lock management is shown to generally comprise an operative combination of a plurality of service providers (P) implemented use cases 50, 51, 52, 53, 54, 55, 56 and use cases 57, a plurality of merchants (M) implemented use cases 51, 56 and 57 and a plurality of goods carriers (G) implemented use cases 56 and use 57. The use case (82) which is for consumer locker owners (O) to register with service provider (P) is further detailed in a very high lever flow chart 19-1 in FIG. 19 in accordance with the present invention. The use case 51 which is for merchants (M) to register with service provider (P) is further detailed in a very high lever flow chart 20-1 in FIG. 20 in accordance with the present invention. The use case 52 which is for goods carriers (G) to register with service provider (P) is further detailed in a very high lever flow chart 21-1 in FIG. 21 in accordance with the present invention. The use case 53 which is for consumer locker owners (O) to register lockers with service provider (P) is further detailed in a very high-level flow chart 22-1 in FIG. 22 in accordance with the present invention. The use case 54 which is for consumer locker owners (O) to request for authcode with service provider (P) is further detailed in a very high lever flow chart 23-1 in FIG. 23 in accordance with the present invention. The use case 54 which is for consumer locker owners (O) to add/update mobile devices with service provider (P) is further detailed in a very high lever flow chart 24-1 in FIG. 24 in accordance with the present invention. The use case 56 which is for merchants (M) and goods carriers (G) to inquire/add/update authorization codes with service provider (P) is further detailed in a very high lever flow chart 25-1 in FIG. 25 in accordance with the present invention. The use case 57 which is for merchants (M) and goods carriers (G) to request for advance authentication with service provider (P) is further detailed in a very high lever flow chart 26-1 in FIG. 26 in accordance with the present invention.

In general, to implement the use case 2, as also shown in FIG. 1, the locker owner (O) of the present invention will generally use the means 9 to locate a place, use the means 10 to select a lock kit, use the means 11 to build a locker, use the means 12 to install the locker, use the means 13 to place signs and use the means 14 to upload the directions.

In general, to implement the use case 2, as also shown in FIG. 1, the merchants (M) who also own store pickup lockers (MO) of the present invention will generally use the means 9 to locate a place, use the means 10 to select a lock kit, use the means 11 to build a locker and use the means 12 to install the locker.

In general, to implement the use case 3, as also shown in FIG. 1, the locker owner (O) of the present invention will generally use the means 15 to locate common area door/gate, use the means 16 to select a lock kit, use the means 17 to attach the kit.

In general, to implement the use case 4, as also shown in FIG. 1, the delivery Drones (D) and delivery Trucks (T) of the present invention will generally use the means 18 to get locker number, use the means 22 to request the lock server for advance authentication, use the means 21 to unlock the lock and use the means 23 to access the inside of the locker.

In general, to implement the use case 4, as also shown in FIG. 1, the consumer locker owners (O) and authorized users (U) of the present invention will generally use the means 18 to use the networked lock, use the means of 19 to enter the authcode in the key pad or use the means 22 to request the lock server for advance authentication, use the means 21 to unlock the locker and use the means 23 to access the inside of the locker. The consumer locker owners (O) can also use the means 22 to request for advance authentication and use the means 20 to lock the locker.

In general, to implement the use case 4, as also shown in FIG. 1, the consumer locker owners (O) and authorized users (U) of the present invention will also generally use the means 24 to use the standalone locker, use the means of 25 to enter the authcode in the key pad, use the means 27 to unlock the locker and use the means 28 to access the inside of the locker. The consumer locker owners (O) can also use the means 25 to enter the authcode in the key pad and use the means 26 to lock the locker.

In general, to implement the use case 5, as also shown in FIG. 1, the authorized users (U) of the present invention will generally use the means 29 to get the signs and directions, use the means of 30 to locate the locker, use the means 31 to open the locker, user the means 32 to pick up the goods for shipping and/or use the means 33 to deliver the goods. As part of the means 31 to open the locker the authorized users (U) would use the means 18 and the associated means in case of networked locks or the means 24 and the associated means in case of standalone locks to open the locker.

In general, to implement the use case 6, as also shown in FIG. 1, the authorized drones (D) of the present invention will generally use the means 34 to download the directions, use the means of 35 to access the locker, use the means 36 to open the locker, user the means 37 to pick up the goods for shipping and/or use the means 38 and 39 to deliver the goods. As part of the means 36 to open the locker the authorized drones (D) would use the means 18 and the associated means to open the locker.

In general, to implement the use case 7, as also shown in FIG. 1, the authorized trucks (T) of the present invention will generally use the means 40 to download the directions, use the means of 41 to access the locker, use the means 42 to open the locker, user the means 43 to pick up the goods for shipping and/or use the means 44 and 45 to deliver the goods. As part of the means 42 to open the locker the authorized trucks (T) would use the means 18 and the associated means to open the locker.

In general, to implement the use case 8, as also shown in FIG. 1, the authorized owners (O) of the present invention will generally use the means of 46 and 47 to leave the goods for shipping and or pick the delivered goods from protected in-door lockers, use the means of 46 and 48 to leave the goods for shipping and or pick the delivered goods from protected out-door lockers and use the means of 46 and 49 to leave the goods for shipping and or pick the delivered goods from protected curbside lockers.

In general, to implement the use case 50, as also shown in FIG. 2, the service provider (P) of the present invention will generally provide a means 58 for consumer locker owners to access a form to add or update electronic goods pick-up box. The locker owner (O) will generally use the means 59 to submit the request to add or update locker owners. The service provider (P) will generally use the means 60 to approve or deny the locker owner's request.

In general, to implement the use case 51, as also shown in FIG. 2, the service provider (P) of the present invention will generally provide a means 61 for merchants (M) to access a form to add or update merchants. The merchant (M) will generally use the means 62 to submit the request to add or update goods carriers. The service provider (P) will generally use the means 63 to approve or deny the merchant's request.

In general, to implement the use case 52, as also shown in FIG. 2, the service provider (P) of the present invention will generally provide a means 64 for goods carriers (G) to access a form to add or update goods carriers. The goods carrier (G) will generally use the means 65 to submit the request to add or update goods carriers. The service provider (P) will generally use the means 66 to approve or deny the goods carrier's request.

In general, to implement the use case 53, as also shown in FIG. 2, the service provider (P) of the present invention will generally provide a means 67 for consumer locker owners (O) to access a form to add or update lockers. The locker owner (O) will generally use the means 68 to submit the request to add or update lockers. The service provider (P) will generally use the means 69 to approve or deny the locker owner's request.

In general, to implement the use case 54, as also shown in FIG. 2, the service provider (P) of the present invention will generally provide a means 70 for consumer locker owners (O) to access a form to add or update authcode. The consumer locker owners (O) will generally use the means 71 to submit the request to add or update authcode. The service provider (P) will generally use the means 72 to approve or deny the locker owner's request In general, to implement the use case 55, as also shown in FIG. 2, the service provider (P) of the present invention will generally provide a means 73 for consumer locker owners (O) to access a form to add or mobile devices. The locker owner (O) will generally use the means 74 to submit the request to add or update mobile devices. The service provider (P) will generally use the means 75 to approve or deny the locker owner's request.

In general, to implement the use case 56, as also shown in FIG. 2, the service provider (P) of the present invention will generally provide a means 76 for merchants (M) and goods carriers (O) to receive authcode API specification. The merchants (M) and the goods carriers (G) will generally use the means 77 to submit the API to add or update authcode. The service provider (P) will generally use the means 78 to approve or deny the merchant's and/or goods carrier's request.

In general, to implement the use case 57, as also shown in FIG. 2, the service provider (P) of the present invention will generally provide a means 79 for merchants (M) and goods carriers (O) to set locker authentication API specification. The merchants (M) and the goods carriers (G) will generally use the means 80 to submit the API to add or update advance authentication. The service provider (P) will generally use the means 81 to approve or deny the merchant's and/or goods carrier's request.

Referring now then to FIGS. 3 through 9 in particular, the Consumer Locker Adaption method 82 of the present invention as operative upon the described Consumer Locker Adaption for Protected Consumer In-Door Goods Services, for Protected Consumer Out-Door Goods Services and for Protected Consumer Curbside Goods Services system 1 is shown to generally comprise various series of interactions between Consumer Locker Owners (O) and Consumer Lockers (L) that can be used by authorized users (U) to provide Protected Consumer In-Door Goods Services, Protected Consumer Out-Door Goods Services and Protected Consumer Curbside Goods Services, between Lock Owners (O) and common area doors (C) that can be used by authorized users (U) to provide Protected Consumer In-Door Goods Services, between Consumer Locker Owners (O) and Consumer Lockers (L) that can be used by delivery drones (D) to provide Protected Consumer In-Door Goods Services, Protected Consumer Out-Door Goods Services and Protected Consumer Curbside Goods Services, between Consumer Locker Owners (O) and Consumer Lockers (L) that can be used by delivery trucks (T) to provide Protected Consumer Curbside Goods Services, between authorized users (U) and Consumer Lockers (L) and common area doors (C) that can be used by authorized users (U) to provide Protected Consumer In-Door Goods between delivery drones (D) and Consumer Lockers (L) that can be used by delivery drones (D) to provide Protected Consumer In-Door Goods Services, Protected Consumer Out-Door Goods Services and Protected Consumer Curbside Goods Services, between delivery trucks (T) and Consumer Lockers (L) that can be used by delivery trucks (T) to provide Protected Consumer Curbside Goods Services, between Consumer Locker Owners (O), Consumer Lockers (L) and common areas (C) that can be used by consumer locker owners (O) to pick-up delivered goods and/or to leave packages for shipping thru Protected Consumer In-Door Delivery Services, Protected Door Delivery Services and Protected Curbside Delivery Services.

Figure 3:
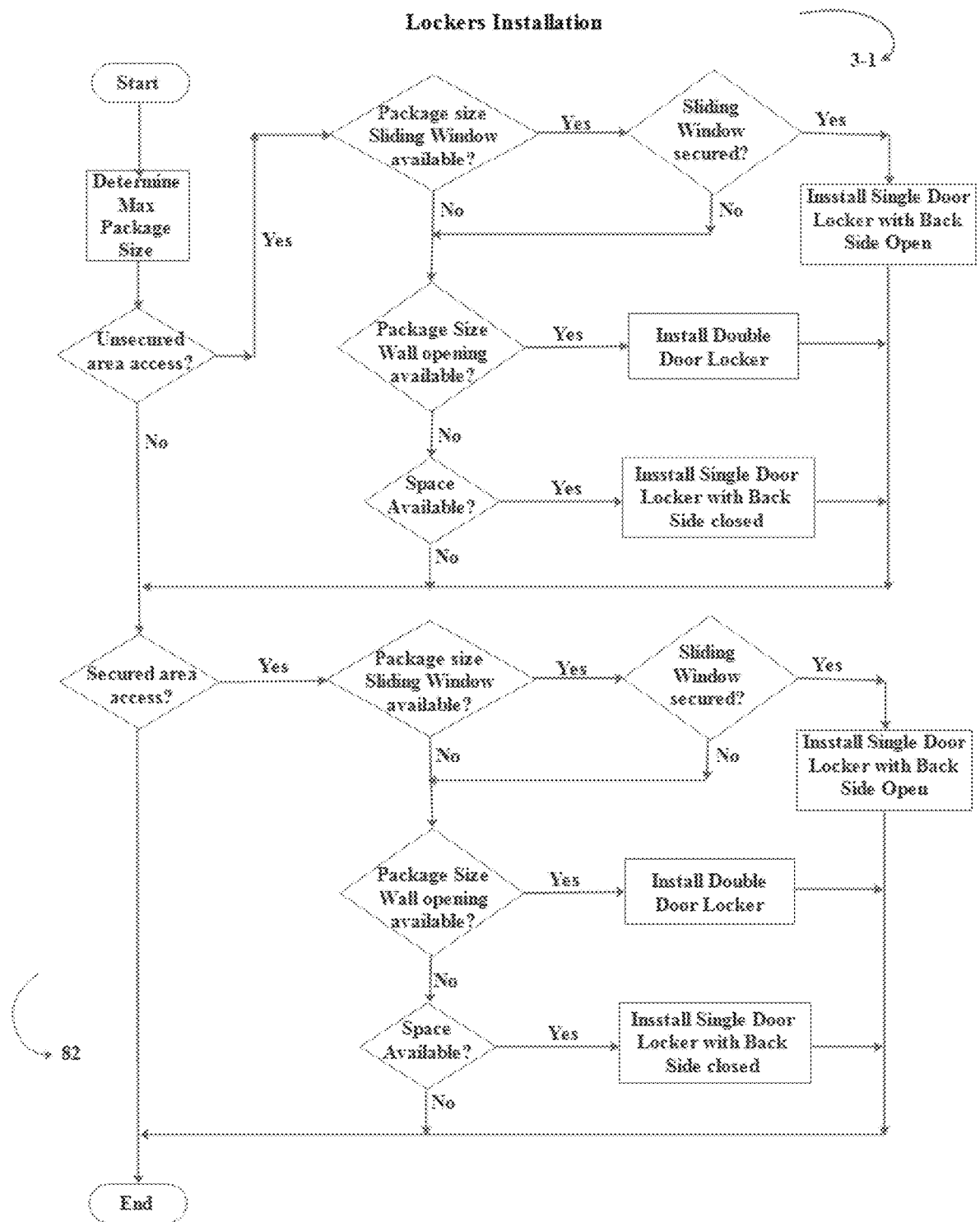
FIG. 3 shows, in a flowchart, an overview of the various steps generally taken in installing Consumer Lockers for Protected Consumer In-Door Goods Services, Protected Consumer Out-Door Goods Services and Protected Consumer Curbside Goods Services.

As particularly shown in FIG. 3, the Consumer Lockers Adaption method 82 of the present invention generally comprises consumer locker owners (O) installing Consumer Lockers (L) for authorized users U, for delivery drones (D) and for delivery trucks (T) to provide Protected In-Home Goods Services, Protected Door Goods Services and Protected Consumer Curbside Goods Services.

The installation of Consumer Lockers (L) by consumer locker owners (O) generally comprises determining a package size and installing Consumer Lockers (L) in unsecured areas as well as in secured areas within the boundaries of the locker owners' (O) property. Unsecured area is an area where the area is not enclosed by fences and/or compound walls so that authorized users (U) and/or delivery trucks (T) can access the Consumer Lockers (L) whereas secured area is an area where the area is enclosed by fences and/or compound walls and authorized users (U) cannot access the Consumer Lockers (L) but drones (D) can access the Consumer Lockers. Further, the installation of Consumer Lockers (L) by consumer locker owners (O) generally comprises selecting an appropriate permanently or temporarily protected barrier connecting the exterior with the interior of the consumer locker owners (O) secured building thru the permanently or temporarily protected barrier and big enough for the determined package size, determining the number of doors in the Consumer Lockers based on the protected barrier type, assembling Consumer Lockers and installing Consumer Lockers (L) in the permanently or temporarily protected barrier. Further the installing of Consumer Lockers (L) by consumer locker owners (O) also comprises selecting an appropriate place outside locker owners' (O) secured building but within the boundaries of locker owners' (O) property, determining the size of the Consumer Lockers (L) based on the determined package size and installing lockers at the appropriate place with at least one door.

As particularly shown in FIG. 4, the in-door delivery method (82) of the present invention generally comprises consumer locker owners (O) attaching locks to common area doors (C) for authorized users (U) to provide Protected Consumer In-Door Goods Services The attachment of locks by consumer locker owners (O) to common area doors (C) generally comprises determining a package size, selecting common area doors (C) big enough for the determined package size that is accessible from unsecured areas by authorized users (U) within the boundaries of the locker owners' (O) property and attaching lock kits to the common area doors C.

Figure 5:
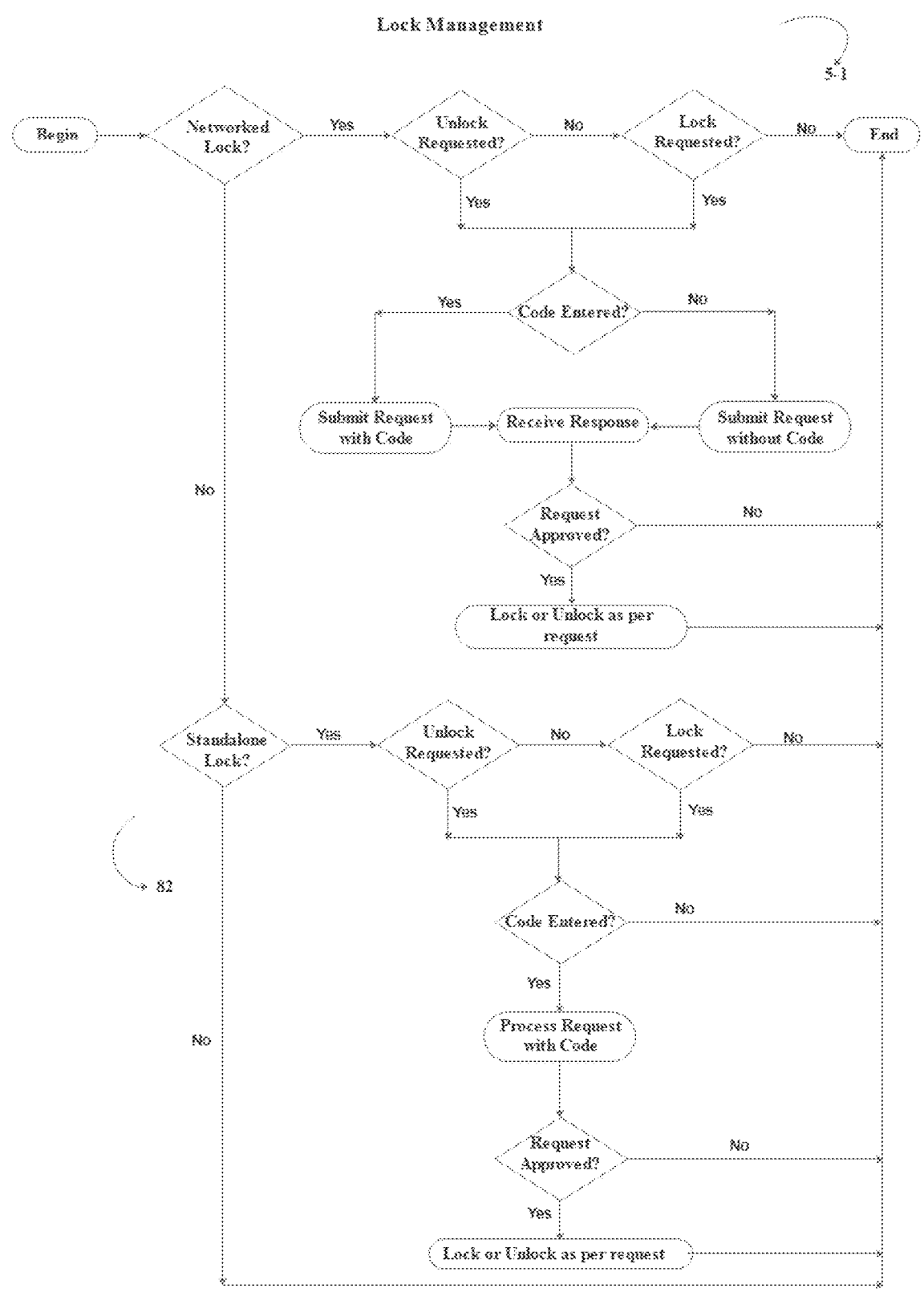
FIG. 5 shows, in a flowchart, an overview of the various steps generally taken in Lock Management.

As particularly shown in FIG. 5, the Consumer Lockers Adaption method (82) of the present invention generally comprises Consumer Lockers (L) providing lock management for consumer locker owners (O), for authorized users U, for delivery drones (D) and for delivery trucks (T) to provide Protected Consumer In-Door Goods Services, Protected Consumer Out-Door Goods Services and Protected Consumer Curbside Goods Services.

The lock management provided by Consumer Lockers (L) generally comprises lock management by Networked Consumer Lockers and by Standalone Consumer Lockers. The lock management by Networked Consumer Lockers generally comprises selection of lock or unlock switch, an optional input of code, submitting a request to a lock server to which the lock of the locker is part of, receiving a response from the locker and locking or unlocking or leaving the status as it is depending on the receipt of the response. The lock management by Standalone Consumer Lockers generally comprises selection of lock or unlock switch, an input of code, processing the request internally by the Standalone Locker, and locking or unlocking or leaving the status as it is, depending on the outcome of the request.

Figure 6:
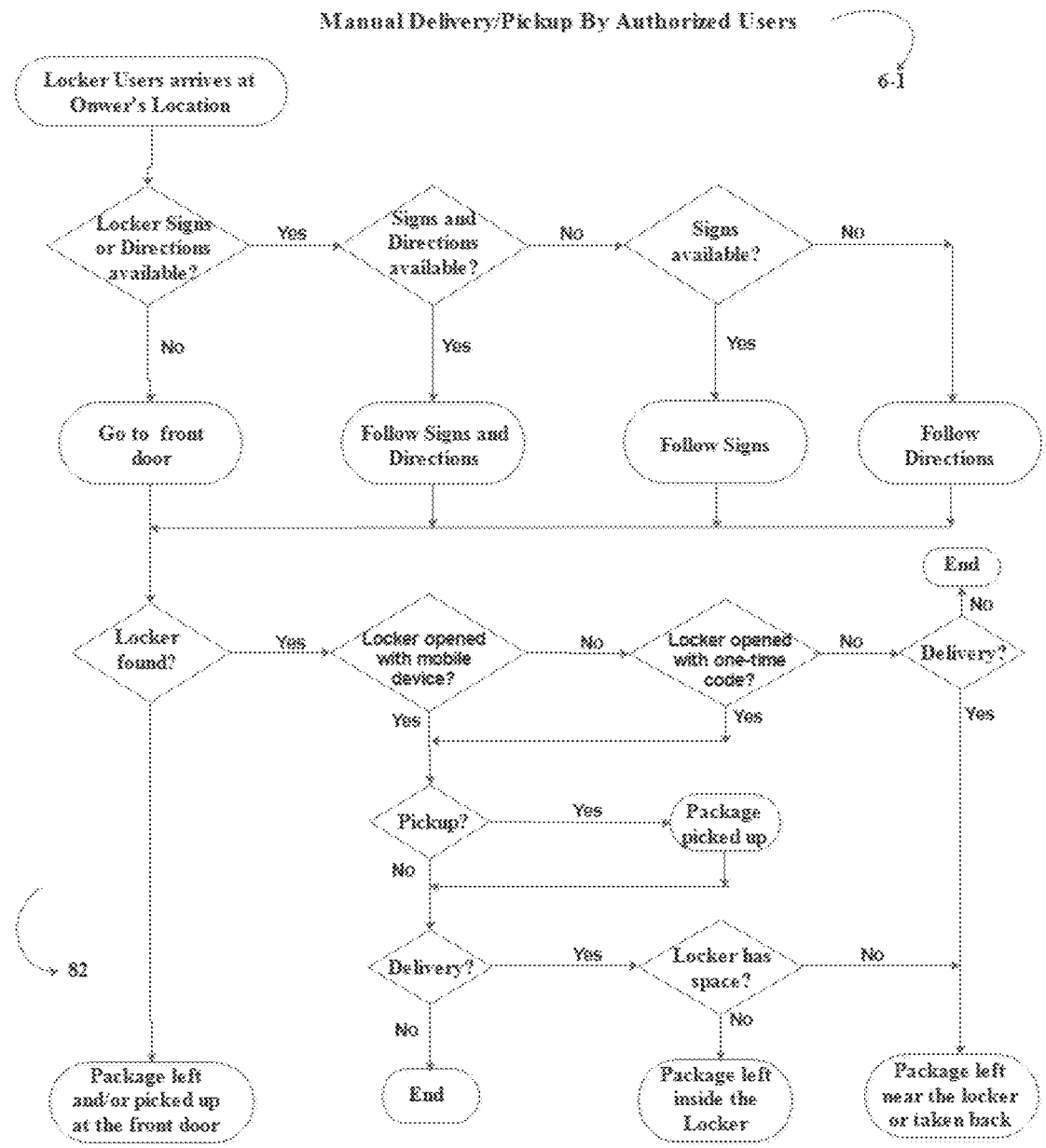
FIG. 6 shows, in a flowchart, an overview of the various steps generally taken in Manual Delivery/Pickup by Authorized Users.

As particularly shown in FIG. 6, the Consumer Lockers Adaption method (82) of the present invention generally comprises authorized users (U) providing Protected In-Home Goods Services, Protected Door Goods Services and Protected Consumer Curbside Goods Services.

The Protected Consumer In-Door Goods Services, Protected Consumer Out-Door Goods Services and Protected Consumer Curbside Goods Services provided by authorized users (U) generally comprises following signs and directions to locate Consumer Lockers (L) and/or common area doors C, opening the Consumer Lockers (L) using a mobile device or using a code or opening the common area doors (C) using a mobile device or using a code, picking up any packages for shipping left by the consumer locker owners (O), and leaving any packages where intended recipients of the packages are the owners of the Consumer Lockers (L) and/or common area doors (C).

Figure 7:
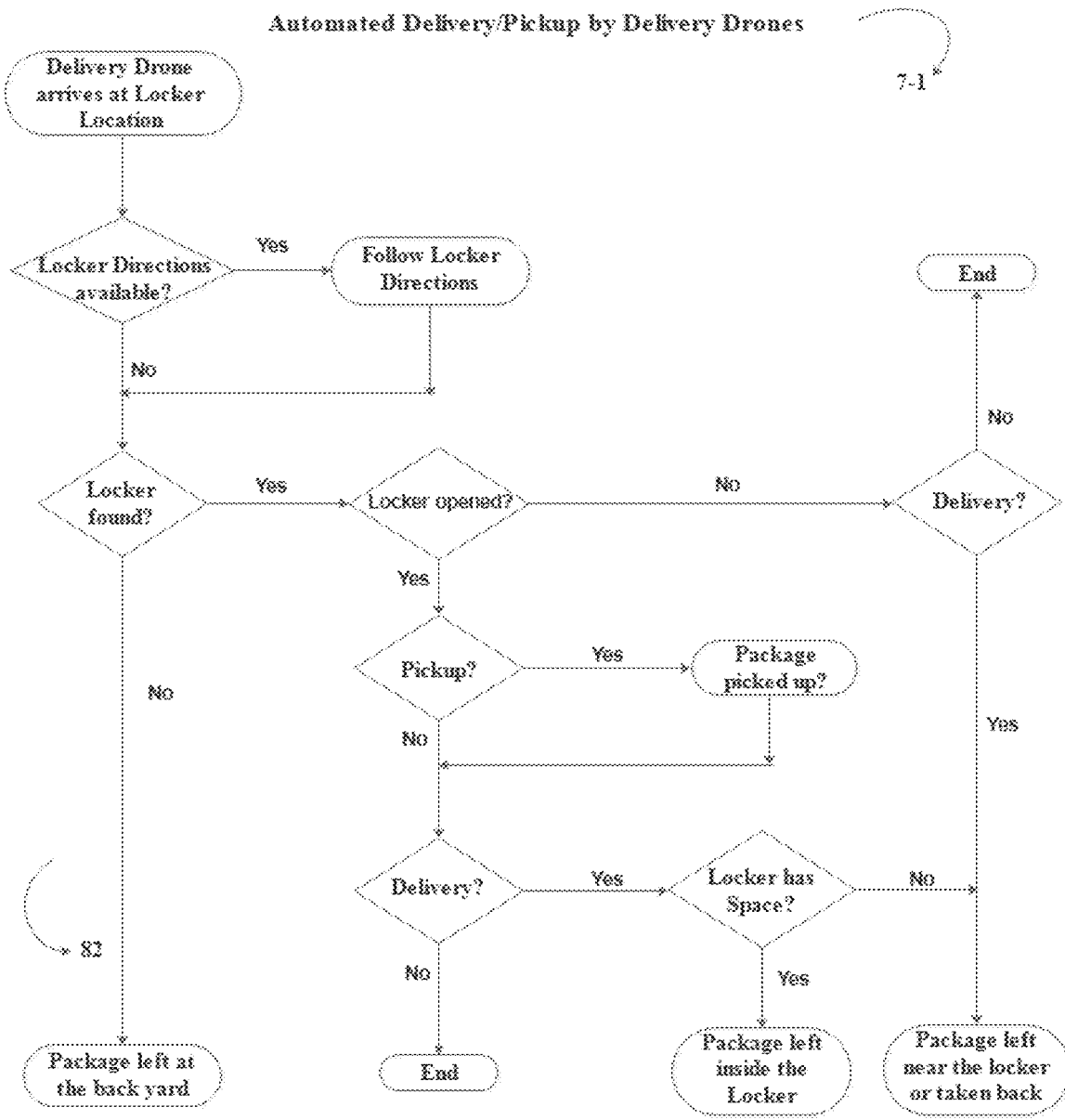
FIG. 7 shows, in a flowchart, an overview of the various steps generally taken in Drone Delivery/Pickup by Drones.

As particularly shown in FIG. 7, the Consumer Lockers Adaption method (82) of the present invention generally comprises drones (D) providing Protected Consumer In-Door Goods Services, Protected Door Goods Services and Protected Consumer Curbside Goods Services.

The Protected Consumer In-Door Goods Services, Protected Consumer Out-Door Goods Services and Protected Consumer Curbside Goods Services provided by drones (D) generally comprises downloading and following directions to locate Consumer Lockers (L), opening the Consumer Lockers (L), picking up any packages for shipping left by the consumer locker owners (O), and leaving any packages where intended recipients of the packages are the owners of the Consumer Lockers (L).

Figure 8:
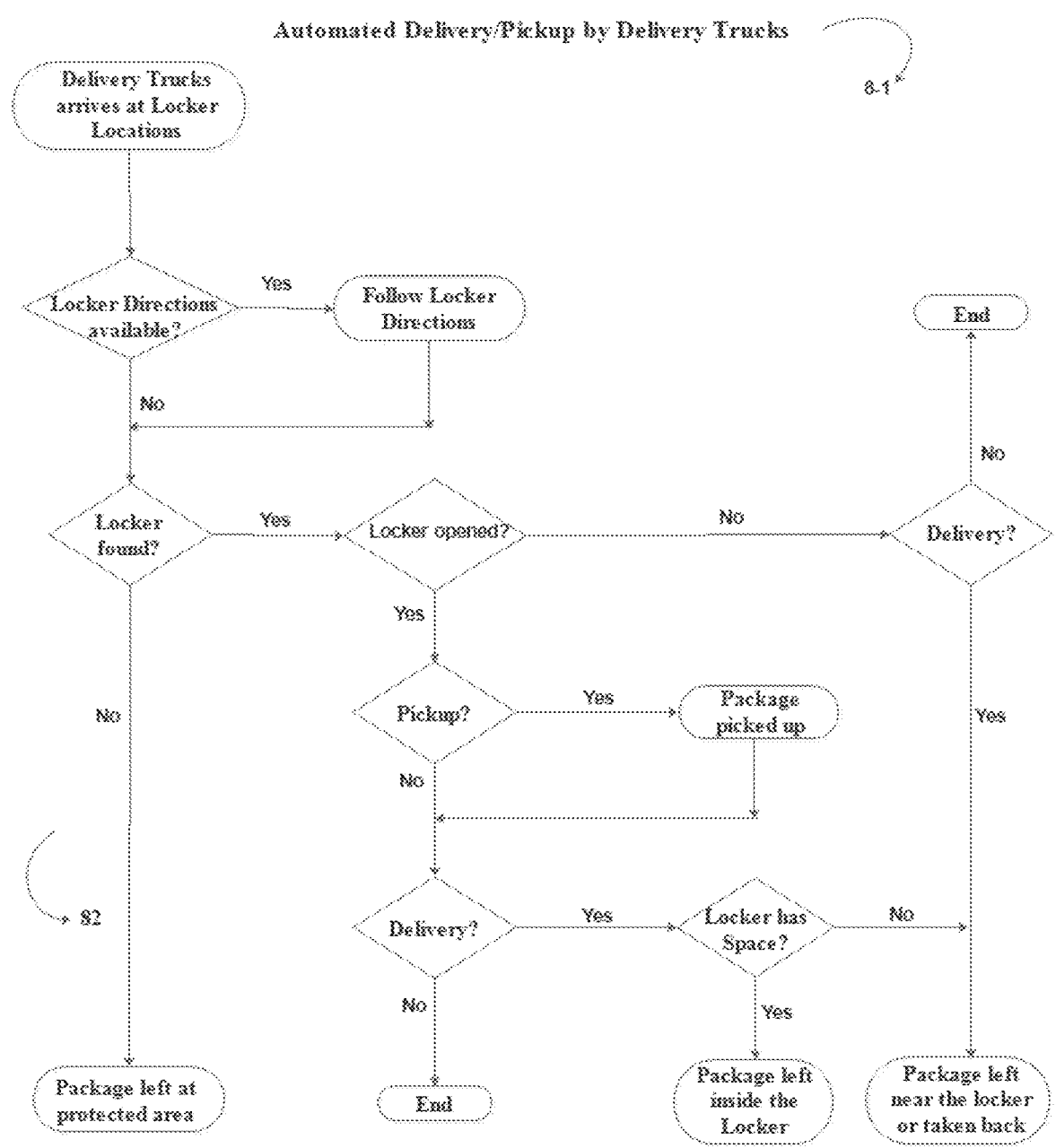
FIG. 8 shows, in a flowchart, an overview of the various steps generally taken in Truck Delivery Delivery/Pickup by Driver-Driven or Driver-Less Delivery Trucks.

As particularly shown in FIG. 8, the Consumer Lockers Adaption method (82) of the present invention generally comprises driver-driven or driver-less delivery trucks (T) providing Protected Consumer Curbside Goods Services.

The Protected Consumer Curbside Goods Services provided by driver-driven or driver-less delivery trucks (T) generally comprises downloading and following directions to locate Curbside Consumer Lockers (L), opening the Curbside Consumer Lockers (L), picking up any packages for shipping left by the consumer locker owners (O), and leaving any packages where intended recipients of the packages are the owners of the Consumer Lockers (L).

Figure 9:
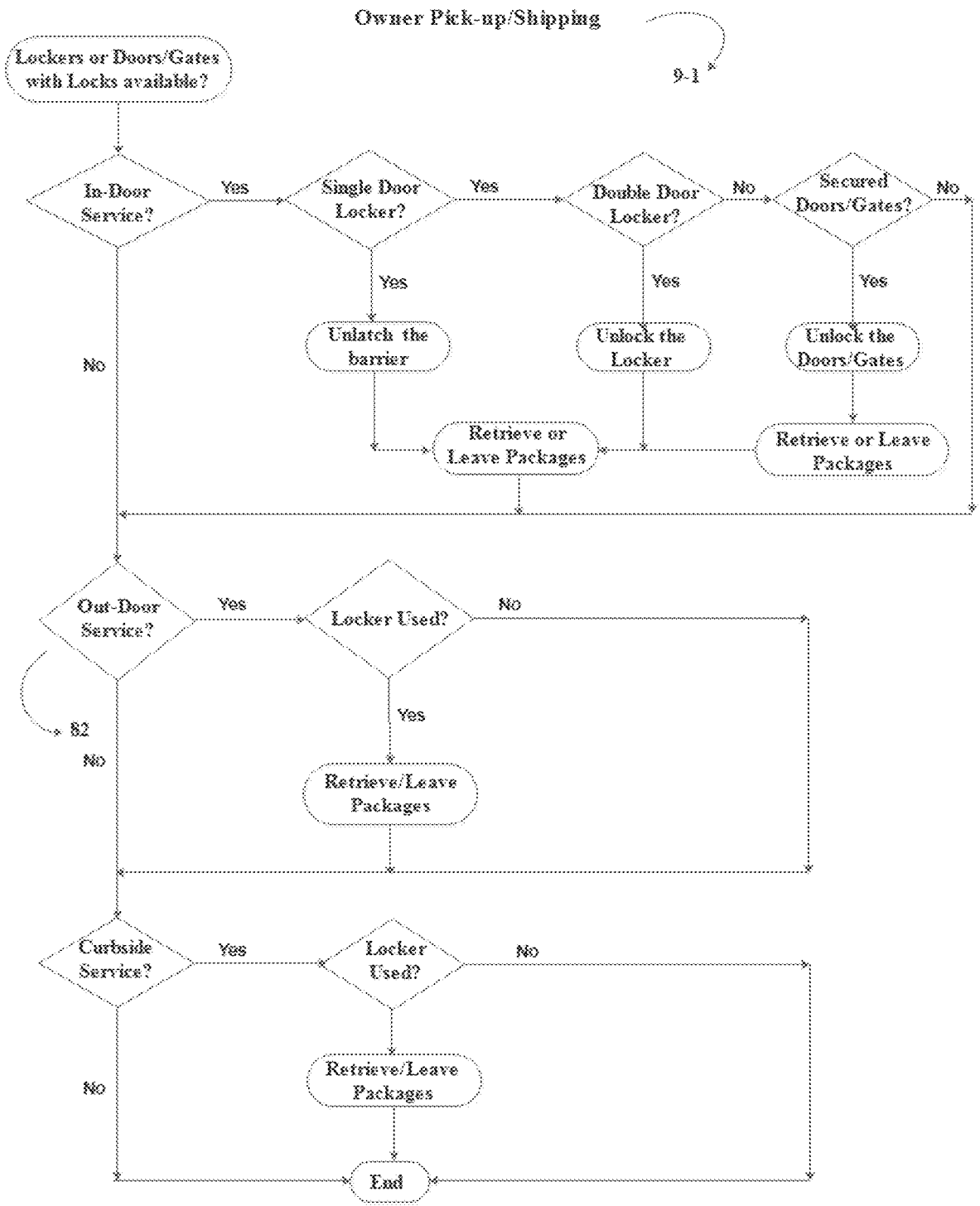
FIG. 9 shows, in a flowchart, an overview of the various steps generally taken in Owner Pick-up of Deliveries or Owner Placement of Packages for Shipping.

As particularly shown in FIG. 9, the Consumer Lockers Adaption method (82) of the present invention generally comprises consumer locker owners (O) receiving Protected Consumer In-Door Goods Services, Protected Consumer Out-Door Goods Services and Protected Consumer Curbside Goods Services.

The Protected Consumer In-Door Goods Services, Protected Consumer Out-Door Goods Services and Protected Consumer Curbside Goods Services received by consumer locker owners (O) generally comprises leaving packages for shipping and picking up packages that are delivered in Consumer Lockers (L) and in common areas (C).

Figure 11:
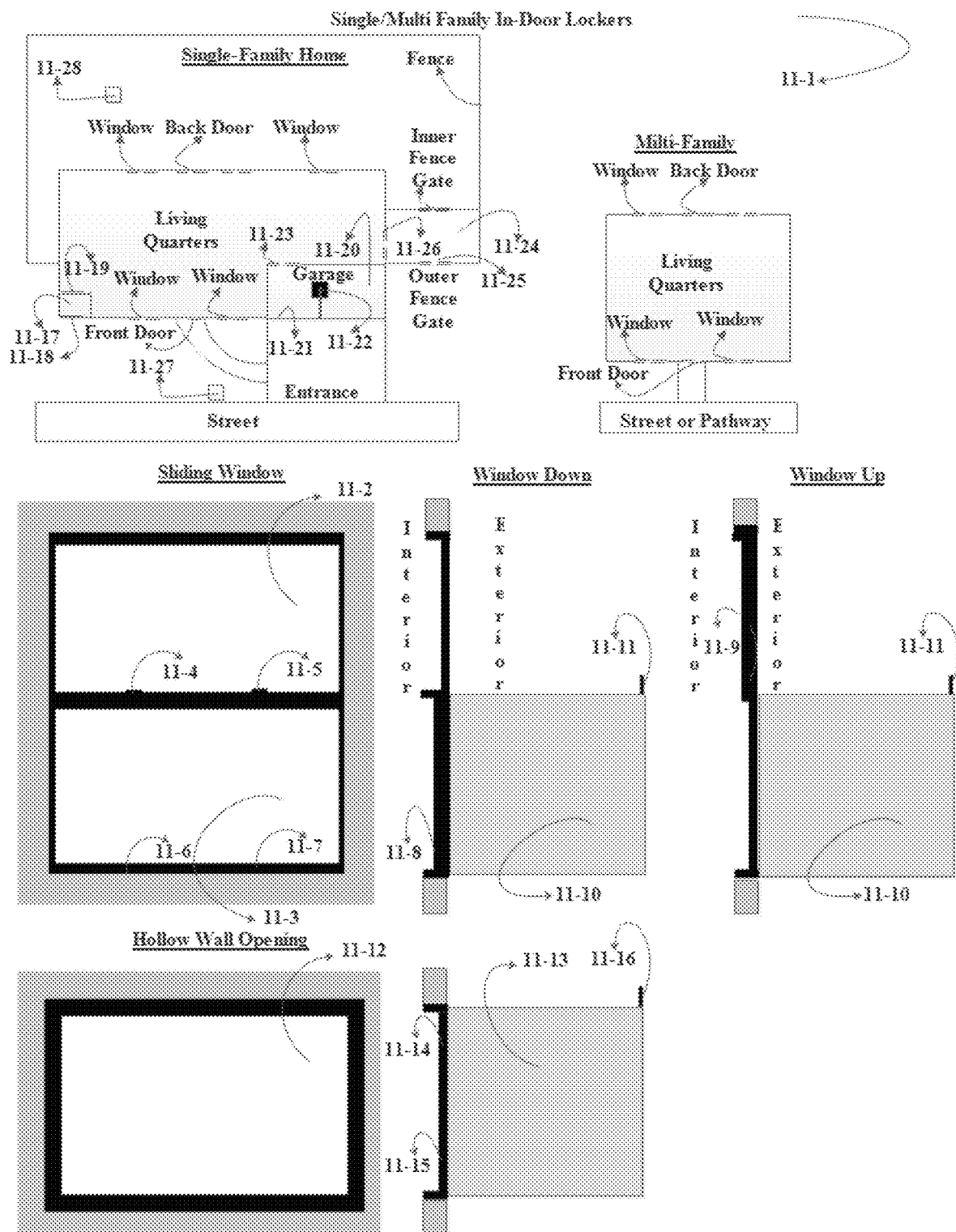
FIG. 11 shows, a generic layout of Single and Multi-Family Home that can be used as an example in selecting location for In-Door Goods Consumer Lockers.
Figure 12:
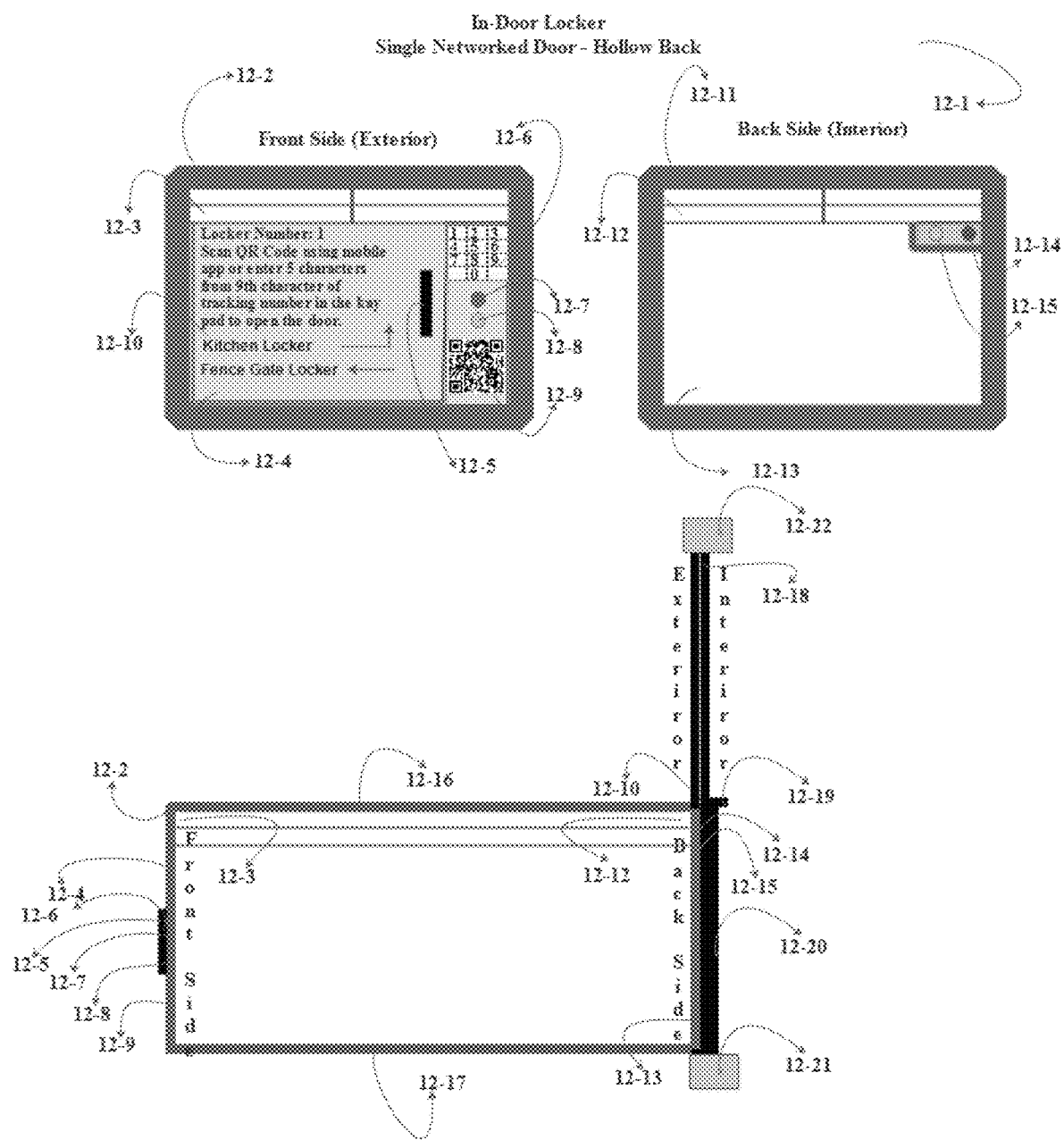
FIG. 12 shows, various components of an Networked Consumer Locker with a Single Door and with a hollow backside.
Figure 13:
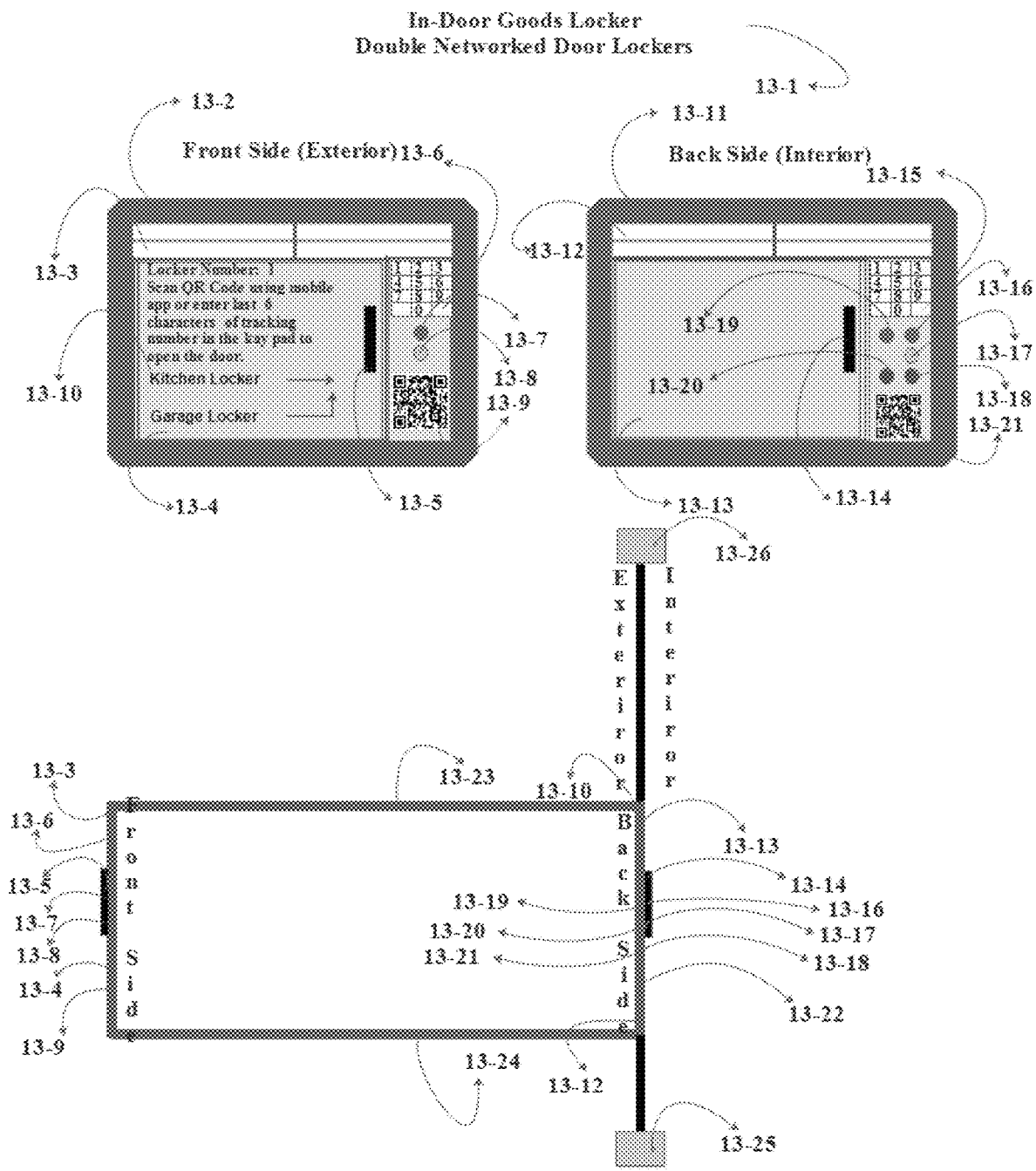
FIG. 13 shows, various components of an Networked Consumer Locker with Double Doors.
Figure 14:
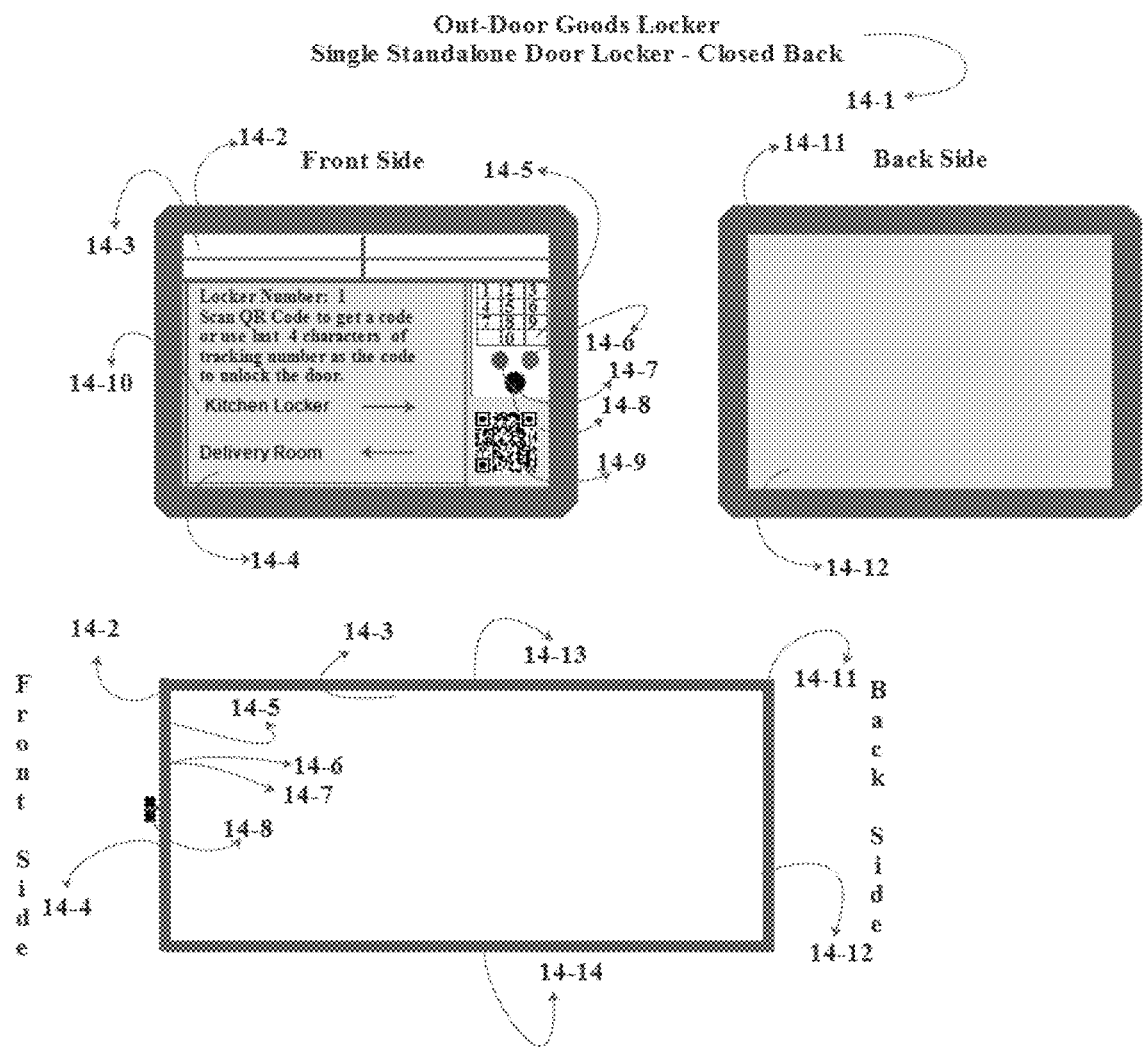
FIG. 14 shows, various components of a Standalone Consumer Locker with a Single Door and with a closed backside.
Figure 15:
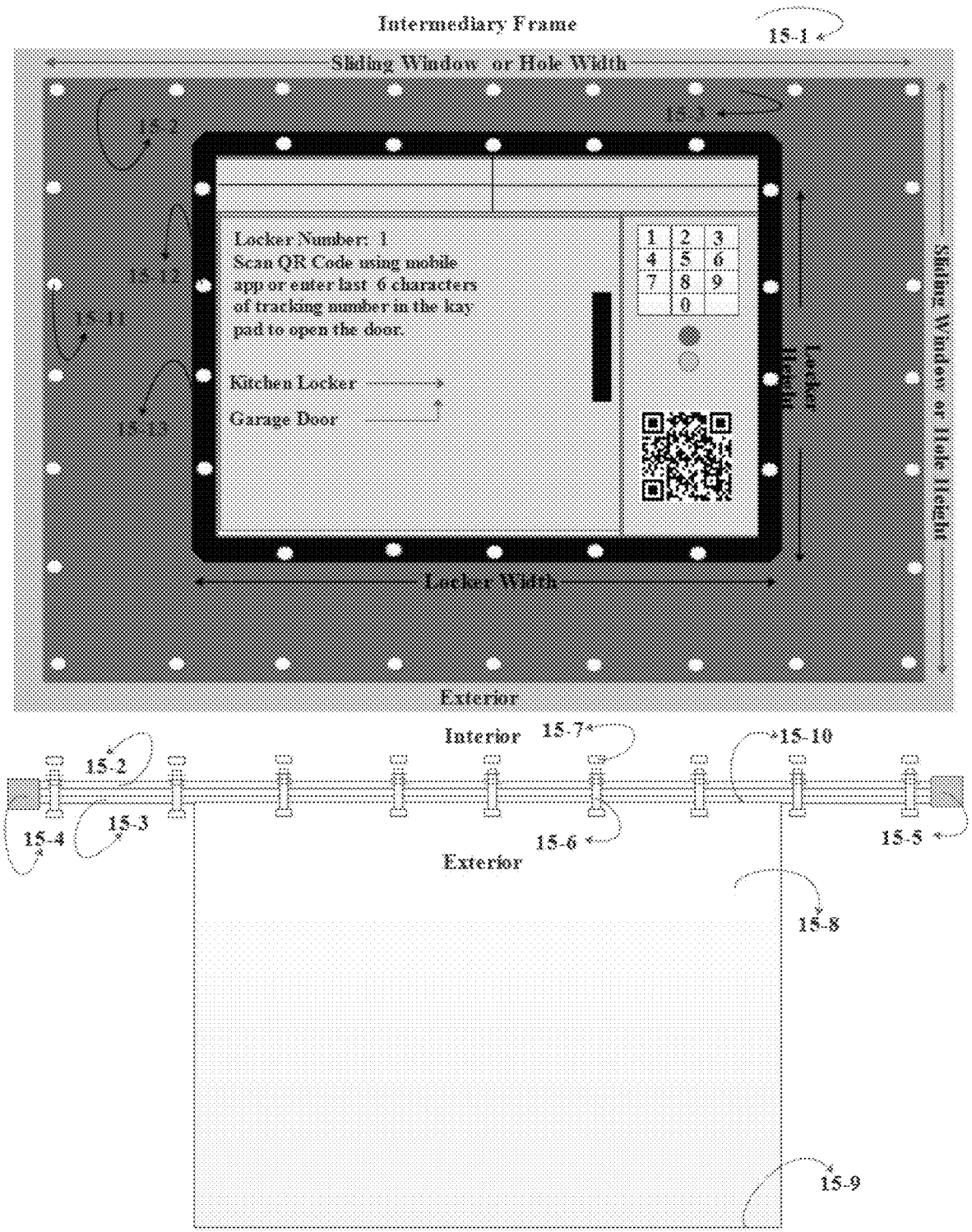
FIG. 15 shows, Intermediary Frame that connects Owner Exterior with Owner Interior through Consumer Lockers.

In order to better understand the architecture in providing Protected Consumer In-Door Goods Services, Protected Consumer Out-Door Goods Services and Protected Consumer Curbside Goods Services, in accordance with the present invention, a schematic diagram of a networked electric lock 10-1 as well as standalone electric lock 10-27 as shown in FIG. 10, a locker location diagram as shown in FIG. 11, a locker assembly diagram for a single door with back side open as shown in FIG. 12, a locker assembly diagram with two doors as shown in FIG. 13, a locker installation diagram for a single door with back side closed as shown in FIG. 14, a locker mounting diagram as shown in FIG. 15, a lock attachment to a gate diagram as shown 16, a lock attachment to a door diagram as shown 17, a lock attachment to a garage as shown 18 are provided in detail.

As shown in FIG. 10, the service providers (P) provided networked locks 10-1 could be used to lock/unlock connected locker doors as well as connected doors, gates and garage doors remotely. As also shown in FIG. 10 consumer locker owners (O) provided standalone locks 10-27 can be used to lock/unlock connected locker doors as well as connected doors, gates and garage doors manually.

Referring now then to FIGS. 10 through 18 in particular, present invention as operative upon the described Consumer Locker Adaption for Protected Consumer In-Door Goods Services, for Protected Consumer Out-Door Goods Services and for Protected Consumer Curbside Goods Services system 1 is shown to generally comprise various series of instructions in installing Consumer Lockers (L) that securely connect exterior with interior of secured buildings of consumer locker owners (O), in installing Consumer Locker (L) outside buildings but within the boundaries of properties of consumer locker owners (O), in installing Consumer Lockers (L) at curbsides within the boundaries of properties of consumer locker owners (O) and in attaching locks to common area doors and/or gates (C) separating common area from private area within the boundaries of properties of consumer locker owners (O).

As particularly shown in FIG. 10, the present invention generally comprises the general diagram of various components associated with a generic networked lock and with a generic standalone lock that can be used in implementing the present invention.

Before continuing, however, it is noted that while the major components of generic networked lock and standalone lock depicted in FIG. 10 is exemplary of network lock and standalone lock that can be used in the present invention, it is in no manner meant to be all encompassing or otherwise limiting of the wide range of networked locks and standalone locks as are possible. In addition, it is noted that the present invention does not comprise the invention of networked lock or standalone lock and generic network lock and standalone lock are used only to explain various embodiments of the present invention. Still further, it is noted that while for clarity of discussion various hardware and software elements of networked lock and standalone lock are segregated no such segregation should be deemed as required in any networked lock or standalone lock that can be used in the present invention.

As particularly shown in FIG. 10, the present invention generally comprises the usage of networked lock and/or standalone lock by consumer locker owners (O) in receiving Protected Consumer In-Door Goods Services, Protected Consumer Out-Door Goods Services and Protected Consumer Curbside Goods Services.

Now referring to networked lock, the networked lock broadly consists of controller, electric lock, keypad, switches and display monitor where the controller is a programmable controller having a set of instructions through a loaded software. The controller 10-2 is the brain behind the networked lock receiving power through a power plug 10-5 or using a built-in power supply (batteries), communicating with networked lock server through wi-fi connector 10-3 and/or Z-wave connector 10-4 or communicating with networked lock server through a combination of Bluetooth and wi-fi connectors or directly connected to computer which in turn communicating with networked lock server or the computer serving as a network lock server, connecting to an electric lock 10-12 through a cable 10-8, connecting to a key pad 10-13 through one or more cables 10-9, connecting to administrator switch board 10-18 through one or more cables 10-10 and optionally connecting to a display monitor 10-22 through one or more cables 10-11. The controller is mounted on a controller board that can be installed inside or outside of any box to convert the box into a networked locker and the controller board is provided with 4 holes 10-A, 10-B, 10-C and 10-D where the 4 holes can be used to install the controller inside or outside of the box. The controller may also have 2 indicators 10-6 and 10-7 to indicate the availability of wi-fi or the availability or Bluetooth or dedicated connection to lock network 10-6 and to indicate the status of the lock whether the lock is powered or not 10-7.

Electric locks can have 2 positions namely locked and unlocked positions. Also, the electric locks can be 2 types namely Fail Safe or Fail Secure. Fail Safe electric locks will take locked position when the electric lock is powered, and it will take unlocked position when it is not powered while Fail Secure electric locks will take locked position when the electric lock is not powered, and it will take unlocked position when it is now powered. Also, the electric locks can use different locking mechanisms namely magnetic, solenoid and motors etc. The example of the electric lock shown in FIG. 10 is only for solenoid locks, but any electric lock with any locking mechanism can be used. So, the type of electric locks that can be used in the present invention is not limited to solenoid locks. Irrespective of types and mechanisms the electric locks and garage doors will be controlled by the controller based on the input the controller receives directly from users and/or from networked lock servers. Also, the direct input can be manual by way of keypads and switches or through machine readable code scanners such as bar code scanners or QR code scanners or the like or through contactless devices such as blue tooth, radio frequency identifiers, near field communication devices or the like. Continuing then with FIG. 10, the electric lock 10-12 is mounted on a lock board, which in turn can be mounted to the locker either to the door of the locker or to the locker itself. The Lock board can be mounted to the door of the locker or to the locker itself using the holes 10-E, 10-F, 10-G and 10-H provided in the lock board. In either way the electric lock 10-12 will engage with the lock catcher 10-23 to lock the door. So, if the lock 10-12 is mounted to the locker then the lock catcher 10-23 will be mounted to the door of the locker and vice versa. The lock catcher 10-23 will have 2 holes 10-0 and 10-P that can be used to mount the lock catcher 10-23 to the door of the locker or to the locker. In case of a magnetic lock, instead of a solenoid lock 10-12 and lock catcher 10-23, a magnetic lock and an armature plate will be used. In case of a locking mechanism with motor a lock controlled by the motor and a catcher will be used.

As already stated, the controller 10-2 is connected to a key pad 10-13 thru one or more cables 10-9. The keypad generally will have switches 10-15 and 10-16 along with key buttons 10-14 for the consumer locker owners (O) and authorized users (U) to request the controller to unlock or lock the Consumer Lockers (L) with or without any key input. The keypad generally will also have an indicator 10-17 to indicate the result of a request. For example, if the indicator 10-17 lights up in green upon a request, then the request is valid, otherwise it is not. The key pad 10-13 will also have 4 holes 10-I, 10-J, 10-K and 10-L that can be used to mount on the Consumer Locker (L) in such way that the key pad 10-13 will be accessible to consumer locker owners (O) and authorized users (U).

As already stated, the controller 10-2 is connected to an administrator switch board 10-18 thru one or more cables 10-10. The administrator switch board generally will be accessible only to consumer locker owners (O) and will have switches 10-19 and 10-20 and an indicator 10-21 for the consumer locker owners (O) to unlock and lock the Consumer Locker (L). If the indicator 10-17 lights up for example, in green color, upon a request by pressing the switch 10-19 to unlock or by pressing the switch 10-20 to lock, then the request is valid, otherwise it is not. If the request is valid then the electric lock 10-12 will be locked or unlocked as per the request. The administrator switch board 10-18 will also have 2 holes 10-M and 10-N that can be used to mount on the Consumer Locker (L) in such way that the administrator switch board 10-18 will be accessible only to consumer locker owners (O).

In order to facilitate for consumer locker owners (O), authorized users (U), delivery drones (D) and driver-driven and driver-less trucks (T) to unlock and lock Consumer Locker door without entering a code thru the key buttons 10-14 in the key pad 10-13 a bar code and/or a QR code 10-24 can be displayed near the Consumer Locker door to be unlocked or locked and/or near the unlock 10-15 and lock 10-16 switches and is accessible to the consumer locker owners (O), authorized users (U), delivery drones (D) and driver-driven and driver-less trucks (T).

In addition to electric locks garage doors can also be used. When a garage door is used the controller, board can be installed inside or outside of the garage using 4 holes 10-A, 10-B, 10-C and 10-D to attach to a wall. The 4 holes 10-I, 10-J, 10-K and 10-L of the key pad 10-13 can be used to mount the key pad 10-13 to the exterior wall of the garage in such way that the key pad 10-13 will be accessible to consumer locker owners (O) and authorized users (U). The 2 holes 10-M and 10-N of the administrator switch board 10-18 can be used to mount the administrator switch board 10-18 to the interior wall of the garage in such way that the administrator switch board 10-18 will be accessible to consumer locker owners (O) only. The controller 10-2 can be connected to a garage door opener 10-25 through a cable 10-8. The 4 holes 10-Q, 10-R, 10-S and 10-T of the garage door opener 10-25 can be used to mount the garage door opener to the ceiling of the garage. The garage door opener will be powered by its own power supply 10-26. The controller 10-2 would control the opening and closing of the garage door in the same way it controls the locking and unlocking of the electric locks.

All the components namely controller, electric lock, key pad and administrative key board can be pre-assembled together in a single piece or in any combination by the networked lock manufacturer. It is beyond the scope of this invention on how these components are manufactured and/or assembled. The information provided herein is only to illustrate how any networked lock can be used in the present invention.

Now referring to standalone lock in FIG. 10, the standalone lock broadly consists of built-in controller, electric lock, keypad and switches. Unlike the controller in networked lock, the standalone lock 10-27 does not have a wi-fi connector and cannot be connected to a computer. The standalone lock 10-27 can store a limited number of one-time code as well as permanent codes to unlock and lock the standalone locks. Just like networked lock the standalone lock has its own controller 10-28, key buttons 10-29, unlock button 10-30, lock button 10-31, LED indicator 10-32 and a handle 10-33. The 4 holes 10-W, 10-X, 10-Y and 10-Z provided in the standalone lock can be used to mount the standalone lock.

The consumer locker owners (O) or authorized users (U) can enter the code through the key button 10-29, push unlock button 10-30 and then turn the handle 10-33 to unlock or enter the code through key button 10-29 and push lock button 10-31 to lock. Upon pressing the unlock button 10-30 or lock button 10-31, the LED indicator 10-32 would light up in green or red to indicate the response. The standalone lock can also use Z-wave connector 10-34 to accept requests from home automation servers and systems. The standalone lock will engage with the lock catcher 10-35 to lock the Locker. So, if the lock unit 10-28 is mounted to the locker then the lock catcher 10-35 will be mounted to the door of the locker and vice versa. The 2 holes 10-U and 10-V provided in the lock catcher can be used to mount the lock catcher.

All the components namely controller, key pad and switches can be pre-assembled together in a single piece or in any combination by the standalone lock manufacturer. If is beyond the scope of this invention on how these components are manufactured and/or assembled. The information provider herein is only to illustrate how any standalone lock can be used in the present invention. The Z-wave connector 10-4 used by Networked locks and 10-34 used by Standalone locks are optional and not required and can be used to connect with any home automation servers and systems. Devices such as Networked locks and Standalone locks connected with home automation servers and systems can respond to commands received through the home automation servers and systems.

As particularly shown in FIG. 11, the present invention generally comprises the selection of locations within secured private area of consumer locker owners (O) and type of Consumer Lockers (L) that would provide Protected Consumer In-Door Goods Services. The choice for locations would depend on the availability of temporarily and permanently secured barrier between the exterior and interior of secured private area within the boundaries of locker owners' (O) property.

In a Single/Multi Family In-Door Consumer Lockers 11-1, the example for temporarily secured barrier between the exterior and the interior of secured private area would be vertical sliding or horizontal sliding or hanging window with one or more latches where the exterior being the area available for Protected Consumer In-Door Goods Services providers and interior being the area available for Protected Consumer In-Door Goods Services recipients. A locker with a single door in the front and hollow opening in the back with any temporarily secured barrier can be used for Protected Consumer In-Door Goods Services. One such temporary barrier as shown in FIG. 11 is a vertical sliding window 11-3 and one such locker is a locker with a single door and opening in the back 11-10. The window 11-2 above the sliding window 11-3 may be fixed in place. The vertical sliding window 11-3 can be moved up and down and the latches 11-4 and 11-5 when latched will hold the sliding window 11-3 in the bottom position secured and cannot be moved up or down from interior or from exterior. The optional sensors 11-6 and 11-7 would be part of protected area monitoring system so that when the monitoring system is armed and if the vertical sliding window 11-3 is moved or broken into, the monitoring system would go off. The sliding window can be only in the down position 11-8 when the sliding window is locked with the latches 11-4 and 11-5. The sliding window 11-3 can be locked with the latches 11-4 and 11-5 only when the sliding window 11-3 is in the bottom position. The sliding window can be in the top position 11-9 when only the sliding window is not locked with the latches 11-4 and 11-5. The optional stand 11-11 may be used to post instructions for the authorized users (U) to open the lock would be posted above the front door of the lock. The instructions would be on how to use a mobile app or how to get a code from the tracking number to open the door. It may also include directions on which locker to be, used based on the size and type of goods to be delivered or to be picked up. Instead of using the optional stand 11-11 the authorized owners (O) may also post the instructions on the front door itself.

The example for permanent opening between the exterior and the interior of secured private area would be an opening in the wall between the exterior and the interior where the exterior being the area available for Protected Consumer In-Door Goods Services providers and interior being the area available for Protected Consumer In-Door Goods Services recipients. A locker with a double door with any permanent opening can be used for Protected Consumer In-Door Goods Services where the front door of the locker would be accessible to the exterior and the back door of the locker would be accessible to the interior and when the back door facing the interior is locked the interior will be secured. One such permanent opening is a hollow wall opening between exterior and the interior is shown as 11-12 and one such locker with double door is shown as 11-13. Sensors 11-14 and 11-15 that can be monitored by private area monitoring system, if any, can also be installed in the back door of the locker. The optional stand 11-16 may be used to post instructions for the authorized users (U) to open the lock would be posted above the front door of the lock. The instructions would be on how to use a mobile app or how to get a code from the tracking number to open the door. It may also include directions on which locker to be used based on the size and type of goods to be delivered or to be picked up. Instead of using the optional stand 11-16 the authorized owners (O) may also post the instructions on the front door itself.

The example of Common Area shown as 11-17 is in between the exterior and interior of secured Private Area with a connecting outer door 11-18 and a connecting inner door 11-19. The common area outer door 11-18 can be used by authorized users (U) to leave deliveries inside the Common Area 11-17 or to pick up packages for shipping from the Common Area 11-17. The common area inner door 11-19 can be used by consumer locker owners (O) to pick up deliveries from the Common Area 11-17 or to leave packages for shipping inside the Common Area 11-17. The authorized users will not have permission unlock inner door 11-19.

The example of Common Area which is a garage shown as 11-20 is in between the exterior and interior of secured Private Area with a connecting outer garage door 11-21 and a connecting inner door 11-23. The common area outer garage door 11-21 can be used by authorized users (U) to leave deliveries inside the Common Area 11-20 or to pick up packages for shipping from the Common Area 11-20. The common area inner door 11-23 can be used by consumer locker owners (O) to pick up deliveries from the Common Area 11-20 or to leave packages for shipping inside the Common Area 11-20. The outer garage door 11-21 is accessible to authorized users (U). The garage door 11-21 can be opened and closed by the garage door opener 11-22 which is controlled by a Networked or Standalone Lock. The authorized users will not have permission unlock inner door 11-23.

The example of Common Area which is in between outer and inner fences shown as 11-24 is also in between the exterior and interior of secured Private Area with a connecting outer fence gate 11-25 and a connecting inner door 11-26. The common area outer fence gate 11-25 can be used by authorized users (U) to leave deliveries inside the Common Area 11-24 or to pick up packages for shipping from the Common Area 11-24. The common area inner door 11-26 can be used by consumer locker owners (O) to pick up deliveries from the Common Area 11-24 or to leave packages for shipping inside the Common Area 11-24. The outer fence gate 11-25 is accessible to authorized users (U). The authorized users will not have permission unlock connecting door 11-26.

The example of Curbside Consumer Locker shown as 11-27 is placed outside Private Area, but within the boundaries of locker owners' property. The Curbside Consumer Locker 11-27 is accessible to authorized users (U) for manual transfer of goods and Delivery Trucks (T) for automatic transfer goods into Curbside Consumer Lockers and from Curbside Consumer Lockers.

The example of Drone Consumer Locker shown as 11-28 is placed outside Private Area, but within the boundaries of locker owners' property. The Drone Consumer Locker 11-28 is accessible to Drones. The Drone Consumer Locker can also be used as indoor locker by installing the Drone Consumer Locker in temporarily secured barriers like sliding windows or by installing the Drone Consumer Locker in permanently secured barriers like openings in walls.

As particularly shown in FIG. 12, the present invention generally comprises the installation of Single Door with hollow back side Consumer Lockers (L) in temporarily secured barriers between the exterior and interior of secured private area within the boundaries of consumer locker owners (O) property that would provide Protected Consumer In-Door Goods Services.

In an installation of Single Door with hollow back side Consumer Lockers 12-1, the example for temporarily secured barrier between the exterior and the interior of secured private area would be vertical sliding or horizontal sliding or hanging window. As shown in FIG. 12, the Single Door with hollow back side Consumer Lockers (L) would consist of a front side outer frame 12-2, one or more compartments with flip doors 12-3, a front door 12-4, a handle 12-5 attached to the front door 12-4, a key pad 12-6, an unlock button 12-7, an LED indicator 12-8, a QR Code display 12-9, optional display of locker number and instructions on how to use a mobile app or how to get a code from the tracking number to open the door and directions for other lockers 12-10, a back side outer frame 12-11, a back side of one or more open compartments 12-12, a hollow back 12-13, an authorized owner (O) lock button 12-14, an authorized owner (O) LED indicator 12-15, Consumer Locker (L) top side 12-16, Consumer Locker bottom side 12-17, left and right side of Consumer Locker (L). The temporarily secured barrier consists of a top fixed window 12-18, handles 12-19 to lift the bottom window 12-20 as well as to lock into latches so that the bottom window 12-20 cannot be lifted, bottom physical structure 12-21 and top physical structure 12-22 holding the temporarily secured barrier.

The compartments 12-3 on the front side of the locker can be used to receive less valuable deliveries. The delivery person simply lifts the door of a compartment and leaves the deliveries inside of a compartment. The authorized owner can pick up the delivered packages from the compartments 12-12 on the back side.

Authorized users (U) will have access only to the front door because the front door is facing the exterior of the Private Area and authorized users (U) have access only to exterior of Private Area. Authorized users (U) can use the Consumer Locker (L) to deliver or pickup packages. Authorized users (U) can simply scan a QR Code or enter a code in the keypad to open the Consumer Locker (L) from the front side which will be facing the exterior of the secured Private Area. Once the Consumer Locker (L) is opened, the authorized users (U) can pick up the packages for shipping from inside the Consumer Locker (L) or leave deliveries to be made inside the Consumer Locker (L). Consumer Locker owners (O) can pick up the packages that are delivered from the Consumer Lockers and/or leave packages for shipping inside the Consumer Lockers (L). Consumer Locker owners (O) will access the Consumer Lockers (L) from interior of the secured Private Area.

As particularly shown in FIG. 13, the present invention generally comprises the installation of Double Door Consumer Lockers (L) having one door at the front and another door at the back in permanently secured barriers between the exterior and interior of secured private area within the boundaries of consumer locker owners (O) property that would provide Protected Consumer In-Door Goods Services.

In an installation of Double Door Consumer Lockers 13-1 one door at the front and another door at the back, the example for permanently secured barrier between the exterior and the interior of secured Private Area would be a hollow inside the walls separating the interior from the exterior of the secured Private Area. As shown in FIG. 13, the Double Door Consumer Lockers (L) would consist of a front side outer frame 13-2, one or more compartments with flip doors 13-3, a front door 13-4, a handle 13-5 attached to the front door 13-4, a key pad 13-6, an unlock button 13-7, an LED indicator 13-8, a QR Code display 13-9, optional instructions on how to use a mobile app or how to get a code from the tracking number to open the door and directions for other lockers 13-10, a back side outer frame 13-11, a back side of one or more open compartments 13-12, a back door 13-13, a handle 13-14 attached to the back door 13-13, a key pad 13-15 for the back door 13-13, an unlock button 13-16 for the back door 13-13, an LED indicator 13-17 for the back door 13-13, a lock button 13-18 for the back door 13-13 an unlock button 13-19 for the front door 13-4, an LED indicator 13-20, a lock button 13-21 for the front door 13-4, a QR Code display 13-22 for the back door 13-13, a top side 13-23, a bottom side 13-24, bottom physical structure 13-25 and top physical structure 13-26 holding the permanently secured barrier.

Authorized users (U) will have access only to the front door because the front door is facing the exterior of the Private Area and authorized users (U) have access only to exterior of Private Area. Authorized users (U) can use the Consumer Locker (L) to deliver or pickup packages. Authorized users (U) can simply scan a QR Code 13-9 or enter a code in the keypad 13-6 to open the Consumer Locker (L) from the front side which will be facing the exterior of the secured Private Area. Once the Consumer Locker (L) is opened, the authorized users (U) can pick up the packages for shipping from inside the Consumer Locker (L) or leave deliveries that are to be made inside the Consumer Locker (L). Consumer Locker owners (O) can pick up the packages that are delivered from the Consumer Lockers and/or leave packages for shipping inside the Consumer Lockers (L). Consumer Locker owners (O) will access the Consumer Lockers (L) from interior of the secured Private Area. Consumer Locker owners (O) can simply scan a QR Code 13-21 or enter a code in the keypad 13-15 and press unlock button 13-16 to open the Consumer Locker (L) from the back side which will be facing the interior of the secured Private Area. Consumer Locker owners (O) can simply press lock button 13-18 to lock the back door of the Consumer Locker (L) where the back door will be facing the interior of the secured Private Area. Consumer Locker owners (O) can also simply press unlock button 13-19 or lock button 13-20 to lock or unlock the front door of the Consumer Locker (L) respectively.

As particularly shown in FIG. 14, the present invention generally comprises the installation of Single Door Consumer Lockers (L) having the single door at the front with a closed back side is securely placed outside of secured private area within the boundaries of consumer locker owners (O) property that would provide Protected Consumer Out-Door Goods Services. As previously mentioned electronic doors of Consumer Lockers (L) can have Networked Lock or Standalone Lock. As an example, the Single Door Consumer Locker (L) with the back side closed as shown in FIG. 14 is using a Standalone Lock.

In an installation of Single Door Consumer Lockers 14-1 with a closed back side, the example for a Consumer Locker (L) placed outside of secured Private Area and outside of secured Common Area but placed within boundaries of the boundaries of Private Property where legal owners of the Private Property and the owners of the Consumer Locker are one and the same.

As shown in FIG. 14, the Single Door Consumer Lockers (L) with a closed back side would consist of a front side outer frame 14-2, one or more compartments with flip doors 14-3, a front door 14-4, a key pad 14-5, an unlock button 14-6, a lock button 14-7, a handle 14-8 attached to the front door 14-4, a QR Code display 14-9, optional instructions to get a code from the tracking number to open the door and directions for other lockers 14-10, back side outer frame 14-11, closed back side 14-12, top side 14-13 and bottom side 14-14. The authorized users (U) would enter a code and press unlock button 14-6 to unlock the front door and pickup packages for shipping from inside the Consumer Locker (L) and/or leave deliveries inside the Consumer Locker (L). The consumer locker owners (O) would enter a code and press unlock button 14-6 to unlock the front door and pickup goods delivered inside the Consumer Locker and leave packages for shipping from inside the Consumer Locker (L). The authorized users (U) and consumer locker owners (O) can use a mobile app to scan the displayed QR Code to get a previously stored authorization code.

As particularly shown in FIG. 15, the present invention that would provide Protected Consumer In-Door Goods Services, generally comprises the installation of Single Door Consumer Lockers (L) with a hollow back side in temporarily secured barriers between the exterior and interior of secured Private Area within the boundaries of consumer locker owners (O) property and the installation of Double Door Consumer Lockers (L) in permanently secured barriers between the exterior and interior of secured Private Area within the boundaries of consumer locker owners (O) property using an intermediary frame.

As shown in FIG. 15, the dimension of the intermediary frame 15-1 that could be used to install Consumer Lockers (L) in temporarily or permanently secured barriers would be same as the dimension of the temporarily or permanently secured barriers and would be larger or equal to the dimension of the Consumer Lockers (L) to be installed. The intermediary frame 15-3 would be attached to the inner frame 15-2 of the temporarily or permanently secured barriers and the inner frame will be attached to the building structure of 15-4 and 15-5. The inner frame 15-2 may be just a hollow frame and the intermediary frame will have a hole to fit the Consumer Locker 15-8 where the Consumer Locker 15-8 would be attached to the intermediary frame 15-3. The inner frame 15-2 and the intermediary frame 15-3 will be attached thru rivets or bolt 15-6 and nuts 15-7. The front side 15-9 of the Consumer Locker 15-8 will be facing the exterior and the back side 15-10 of the Consumer Locker 15-8 will be facing the interior. The thickness of the inner frame and the intermediary frame would depend on the weight of the package to be put inside the Consumer Locker 15-8. The holes 15-11 will be used to join the intermediary frame 15-3 to the inner frame 15-2 and the holes 15-12 will be used to join the locker frame 15-13 to intermediary frame 15-3.

Figure 16:
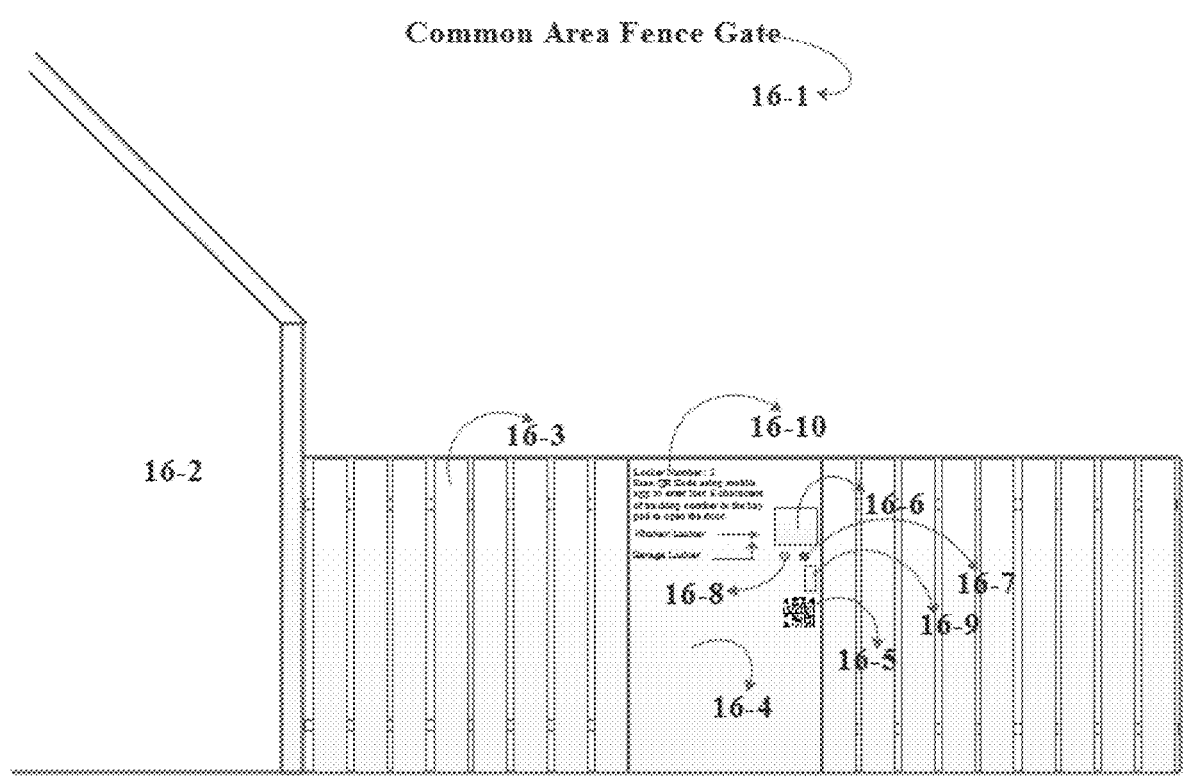
FIG. 16 shows, Installation of Networked Locks to Common Area Fence Gates.
Figure 17:
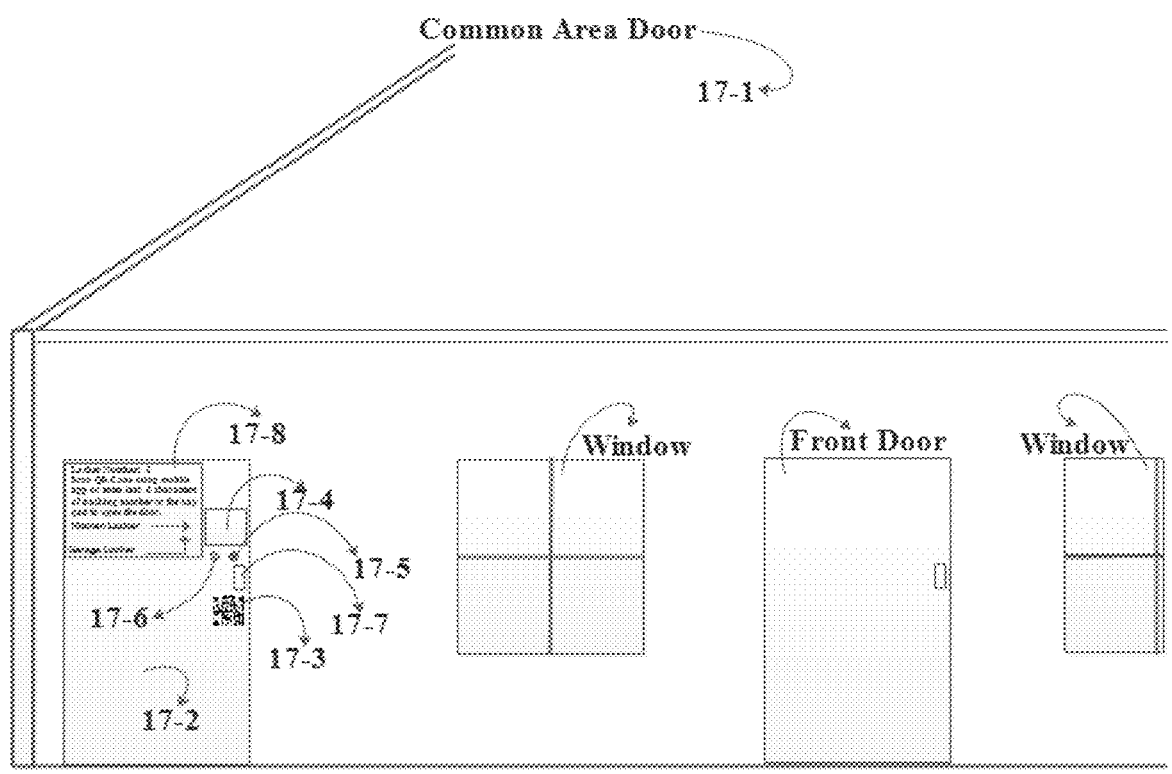
FIG. 17 shows, Installation of Networked Locks to Common Area Door.
Figure 18:
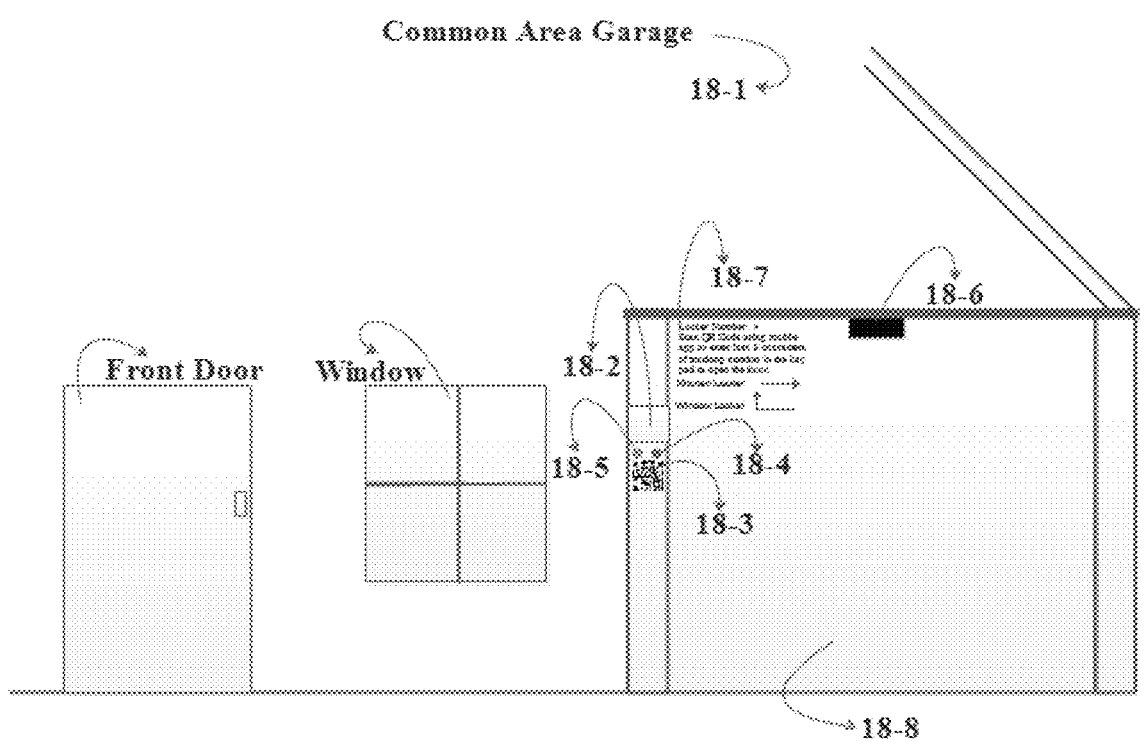
FIG. 18 shows, Installation of Networked Locks to Common Area Garage Door.

Referring now then to FIGS. 16 through 18 in particular, the present invention as operative upon the described Consumer Locker Adaption for Protected Consumer In-Door Goods Services, for Protected Consumer Out-Door Goods Services and for Protected Consumer Curbside Goods Services system 1 is shown to generally comprise various series of interactions between Consumer Locker Owners (O) and Locks that can be used by authorized users (U) to provide Protected Consumer In-Door Goods Services through protected Common Areas such as rooms, garages and fenced in areas.

As particularly shown in FIG. 16, the present invention that would provide Protected Consumer In-Door Goods Services generally includes the installation of Locks on common area outer fence gates which are gates attached to outer fences that are in between exterior and interior of secured common areas which are surrounded by outer fence, inner fence and secured Private Area.

As shown in FIG. 16, when a Networked or Standalone Lock is used to secure a common area surrounded by outer fence 16-3 which may be connected to secured Private Area 16-2 through a private door and the outer fence 16-3 will have a fence gate 16-4, to which a QR Code display 16-5, a key pad 16-6, an unlock button 16-7, a LED indicator 16-8, a handle 16-9 and optional instructions on how to use a mobile app or how to get a code from the tracking number to open the door and directions for other lockers 16-10 will be attached. With a Networked Lock, the consumer locker owners (O) and/or authorized users (U) would scan the QR Code 16-5 using their mobile device and press the unlock button 16-7 to open the common area outer fence gate 16-3. With a Standalone Lock, the consumer locker owners (O) and/or authorized users (U) would scan the QR Code 16-5 using their mobile device to get a one-time authorization code. The consumer locker owners (O) and/or authorized users (U) would enter a code in the key pad 16-6 and press the unlock button 16-7 to open the common area outer fence gate 16-3. Upon pressing the unlock button 16-7, the LED indicator 16-8 would light up in green or red to indicate the response As particularly shown in FIG. 17, the present invention that would provide Protected Consumer In-Door Goods Services generally includes the installation of Locks on common area outer doors which are as already defined doors that are common between outside of Secured Area and inside of Common Area and facing outside of Secured Area.

As shown in FIG. 17, the common area outer door 17-2 will be accessible to consumer locker owners (O) and to authorized users (U). When a Networked or Standalone Lock is used to secure common area outer door 17-2, the common area outer door 17-2 will have a QR Code display 17-3, a key pad 17-4, an unlock button 17-5, LED indicator 17-6, a handle 17-7 and optional instructions on how to use a mobile app or how to get a code from the tracking number to open the door and directions for other lockers 17-8. With a Networked Lock, the consumer locker owners (O) and/or authorized users (U) would scan the QR Code 17-3 using their mobile device and press the unlock button 17-5 to open the common area outer door 17-2. With a Standalone Lock, the consumer locker owners (O) and/or authorized users (U) would scan the QR Code 16-5 using their mobile device to get an authorization code and enter the code in the key pad 17-4 and press the unlock button 17-5 to open the common area outer door 17-2. Upon pressing the unlock button 17-5, the LED indicator 17-6 would light up in green or red to indicate the response.

As particularly shown in FIG. 18, the present invention that would provide Protected Consumer In-Door Goods Services generally includes the installation of Locks on common area garage doors which are garage doors that are common between outside of Secured Area and inside of Common Garage Area and facing outside of Secured Area.

As shown in FIG. 18, the common area garage door 18-8 will be accessible to consumer locker owners (O) and to authorized users (U). When a Networked or Standalone Lock is used to secure common area garage door 18-8, the structure supporting the common area garage door 18-8 will have a QR Code display 18-3, a key pad 18-2, an unlock button 18-4, LED indicator 18-5 and optional instructions on how to use a mobile app or how to get a code from the tracking number to open the door and directions for other lockers 18-7. With a Networked Lock, the consumer locker owners (O) and/or authorized users (U) would scan the QR Code 18-3 using their mobile device and press the unlock button 18-4 to open the common area garage door 18-8. With a Standalone Lock, the consumer locker owners (O) and/or authorized users (U) would scan the QR Code 18-3 using their mobile device and get a one-time authorization code and enter the code in the key pad 18-2 and press the unlock button 18-4 to open the common area garage door 18-8. Upon pressing the unlock button 18-4, the LED indicator 18-5 would light up in green or red to indicate the response.

Referring now then to FIGS. 19 through 26 in particular, the Consumer Locker Adaption method (82) of the present invention as operative upon the described Consumer Locker Adaption for Protected Consumer In-Door Goods Services, for Protected Consumer Out-Door Goods Services and for Protected Consumer Curbside Goods Services system 1 is shown to generally comprise various series of procedures in registering Consumer Locker owners (O) by locker owners, in registering Merchants (M) by merchants, in registering Goods Carriers (G) by goods carriers, in registering lockers (L) by consumer locker owners (O), in adding/updating authcode by consumer locker owners (O), in registering mobile phone numbers and mobile device identifiers by consumer locker owners (O), in adding/updating authcodes through an API by merchants (M) and/or goods carriers (G), in adding/updating advance authentications through an API by merchants (M) and/or goods carriers (G).

Figure 44:
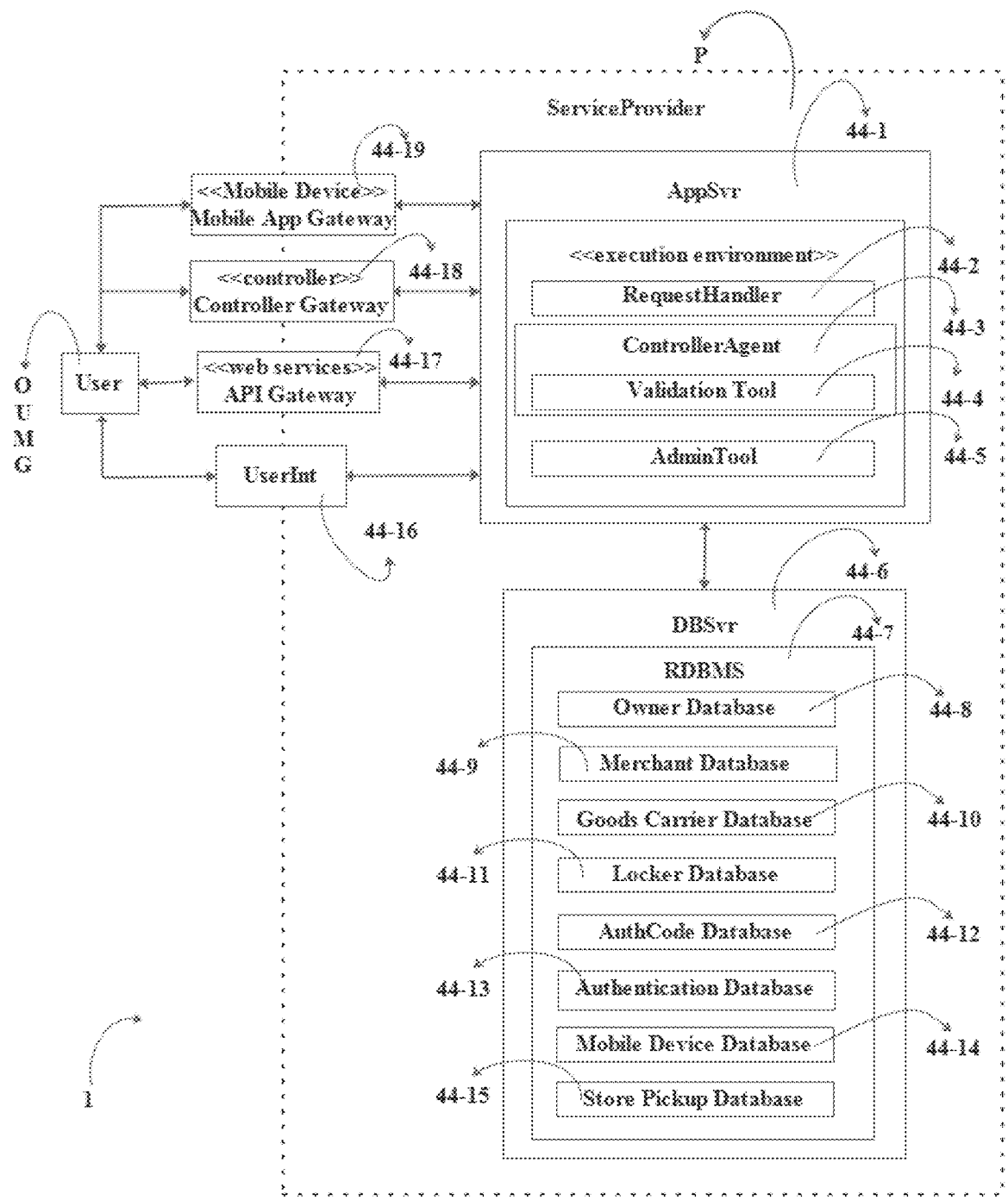
FIG. 44 shows, in a deployment diagram, an exemplary hardware and software implementation of the locker adaption system and method of the present invention.

In order, to better describe these critical aspects of the present invention, however, reference is now made to the deployment diagram of FIG. 44, wherein there is shown the various elements of an exemplary hardware and software based implementation of a locker adaption system 1 constructed in accordance with the teachings of the present invention. Before continuing, however, it is noted that while the implementation depicted in FIG. 44 is exemplary of the locker adaption system 1 of the present invention, it is in no manner meant to be all encompassing or otherwise limiting of the wide range of implementations as are possible. In addition, it is noted that while some elements are in FIG. 44 shown to comprise hardware and others software, virtually any element could be implemented in either hardware or software or any combination thereof. Still further, it is noted that while for clarity of discussion various hardware elements are segregated between different machines and various software elements are segregated into various components, no such segregation should be deemed as required unless specifically stated herein and further or differing division into various particular components, modules, classes, objects or the like should be taken as within the scope of the present invention as limited only by the claims appended hereto. Finally, to the extent that any structural (including software) element is stated as being adapted to perform some function, such language is to be taken as a positive structural limitation imposed upon the referenced element whereby the element is required to be actually adapted, programmed, configured or otherwise provided with the actual capability for performing the specified function. In no case shall such language be taken as merely a statement of intended use or the like, but to the contrary such language shall be in every case taken to read on all structures of the referenced element that are in any manner actually in the present tense configured to perform the specified function (as opposed to being merely capable of adaption for the conduct of the specified function).

Turning then to FIG. 44, a service provider P (such as, for example, may comprise a specialized provider of the locker adaption services of the present invention; a provider of other products or services having need of locker adaption services, such as, for example, any business, shipping companies, banks, airport, government buildings or the like) is shown for purposes of this exemplary discussion to have associated therewith one or more application servers 44-1 or database servers 44-6 upon which may be hosted software functionality necessary to operation within the framework of the present invention. In particular, an application server 44-1 would accept data through mobile app gateway 44-19, controller gateway 44-18, thru API Gateway 44-17 as well as thru user interface 44-16. Input from microcontrollers in Networked Locks (controller requests) and responses (request responses) from service providers (P) would be communicated thru controller gateway 44-18, merchants' (M) and goods carriers' (G) server requests (external system requests) and responses (request responses) from service providers (P) would be communicated through API gateway 44-17, whereas locker owners' (O), merchants' (M) and goods carriers' (G) inputs and responses would be communicated thru user interface 44-16. In particular, an application server 44-1 may host a request handler software component 44-2 adapted to handle mobile app requests communicated through mobile app gateway 44-19, controller requests communicated through controller gateway 44-18 and to handle external system requests communicated through API gateway 44-17 and all other inputs through user interface 44-16 as well as to produce responses for controller requests, external system requests and for other inputs as may be necessary in the operation of the present invention.

Additionally, the application server 44-1 may host a controller agent 44-3 adapted to handle or otherwise control all aspects of the controller request within the realm of responsibility of the service provider (P), including receiving controller requests, storing and/or retrieving data pertinent to the processing of such requests and directing the validation of controller requests submitted for controller and respond based upon the results of such validations.

In order to improve efficiency, the authorizing agent component 44-3 may comprise one or more further specialized components such as, for example, a validation tool 44-4 adapted to conduct the specialized task of comparing received authorization code within the controller request with one of the saved authorization code for the device identified by device identifier within the controller request or confirming the existence of pre-approved authentication for the device identified by device identifier within the controller request.

Still further, the application server 44-1 may also host an administration tool 44-5 through which various aspects of the setup, maintenance and operation of the hardware and software systems of the service provider (P) may be managed.

In order, to efficiently manage and handle the large quantity of data that may typically be stored in connection with an implementation of the present invention, one or more dedicated database servers 44-6 hosting database management systems 44-7 are generally desired. As shown in FIG. 44, a typical database management system 44-7 may include a locker owner database 44-8 for storing a wide variety of generally locker owner centric data as may be required in the operation of the present invention, a merchant database 44-9 for storing a wide variety of generally merchant centric data as may be required in the operation of the present invention, a goods carrier database 44-10 for storing a wide variety of generally goods carrier centric data as may be required in the operation of the present invention, a locker database 44-11 for storing a wide variety of generally locker centric data generally as may be required in the operation of the present invention, an authorization code database 44-12 for storing a wide variety of generally authorization code centric data generally associated with the conduct of individual transactions in the operation of the present invention, an authentication database 44-13 for storing a wide variety of generally authentication centric data generally associated with the conduct of individual transactions in the operation of the present invention, a mobile device database 44-14 for storing a wide variety of generally mobile device centric data as may be required in the operation of the present invention and a store pickup database 44-15 for storing a wide variety of generally store pickup centric data as may be required in the operation of the present invention.

Although those of ordinary skill in the art will recognize that virtually unlimited alternatives are possible, FIG. 27 shows a very high-level but generally representative schema 27-1 for an owner database 44-8, FIG. 28 shows a very high-level but also generally representative schema 28-1 for a merchant database 44-9, FIG. 29 shows a very high-level but also generally representative schema 29-1 for a goods carrier database 44-10, FIG. 30 shows a very high-level but also generally representative schema 30-1 for a locker database 44-11, FIG. 31 shows a very high-level but also generally representative schema 31-1 for an authorization code database 44-12, FIG. 32 shows a very high-level but also generally representative schema 32-1 for an authentication database 44-13 and FIG. 33 shows a very high-level but also generally representative schema 33-1 for a mobile device database 44-14 each of which will be described in greater detail further herein in connection with an exemplary description of the conduct of a typical transaction.

Additionally, a preferably controller gateway 44-18 is provided for use in receiving controller requests and issuing authorization responses. As will be appreciated by those of ordinary skill in the art, such a controller gateway 44-18 may be utilized to receive controller requests from lockers and doors as shown in FIGS. 15 thru 18 and transmit generated responses to lock or unlock or keep in the same position the requested door. The controller requests and responses may be in any of a plurality of message formats such as, and not limited to, a comma or special character delimited message, an XML formatted message, a JASON formatted message, over any of a plurality of languages such as and not limited to, HTML (HTTP or HTTPS or SOAP), JavaScript, (C) programs, C++ programs, .NET and based on the Application Programming Interfaces (API) specification provided by the service provider (P).

Additionally, a preferably mobile app gateway 44-19 is provided for use in receiving mobile app requests and issuing responses. As will be appreciated by those of ordinary skill in the art, such a mobile app gateway 44-19 may be utilized to receive mobile requests from mobile devices as shown in FIG. 41 and transmit generated responses back to mobile devices.

Still further, the administration tool 44-5 also executes batch jobs scheduled to run frequently to update the status of authcode and authentication. The status of authcode will be updated as 'E' (Expired), if the current date and time is past the existing expiration date and time in authcode database 44-12 for each individual active authcode as per the very high-level but also generally representative schema 31-1 as shown in FIG. 31. The status of authentication will be updated as 'E' (Expired), if the current date and time is past the existing expiration date and time in authentication database 44-13 for each individual active authentication as per the very high-level but also generally representative schema 32-1 as shown in FIG. 32.

The consumer locker owners and the mobile devices authorized by the consumer locker owners as joint owners would be considered as administrators whereas all other users are considered as non-administrators. The service provider (P) can accept a controller request from any valid networked controller supported by the service provider (P) where the accepted controller request would always include a serial number of the controller, a password, an authorization code where the authorization code is a code entered into a key pad attached to the controller and captured by the controller from the key pad or the authorization code would be blank when no code is entered into the key pad and there is no data to capture for the controller and a request type where the request type would depend on the button being activated to initiate the controller request.

For example, the request type could be 'N' if the request has originated from key pad UNLOCK button or 'O' if the request has originated from key pad LOCK button or 'U', if the request has originated from administrator UNLOCK button or 'L' if the request has originated from administrator LOCK button.

The administrator UNLOCK and/or the administrator LOCK button may not be available to non-administrators. The controller would send the controller request upon a non-administrator or an administrator UNLOCK or LOCK button is pressed to the service provider (P) as shown in FIGS. 10 thru 18. Upon receiving a request from the controller, the service provider (P) would process the request as explained in Controller Gateway section and return a response. If the controller receives an approval response, then the controller would Unlock or Lock the lock attached to the controller and would indicate the approval response through the LED indicator attached to the controller by blinking the LED indicator in green color. If the controller receives a decline response, then the controller would indicate the decline response through the LED indicator attached to the controller by blinking the LED indicator in red color.

Additionally, a preferably an API gateway 44-17 is provided for use in receiving API requests and responding with response messages as well as for use in sending API requests and receiving response messages. The service provider (P) issues specification for merchants (M) and for goods carriers (G) to use the service. Although the usage of such API may take a wide variety of forms and for a wide variety of interfaces depending upon the circumstances of any particular implementation, a typical API usage could be authcode request API from merchants (M) and/or goods carriers (G) to service provider where the request and the response are shown in FIGS. 42-A and 42-R, authentication request API from merchants (M) and/or goods carriers (G) to service provider where the request and the response are shown in FIGS. 43-A and 43-R and package pickup API from service provider (P) to goods carriers (G).

Figure 45:
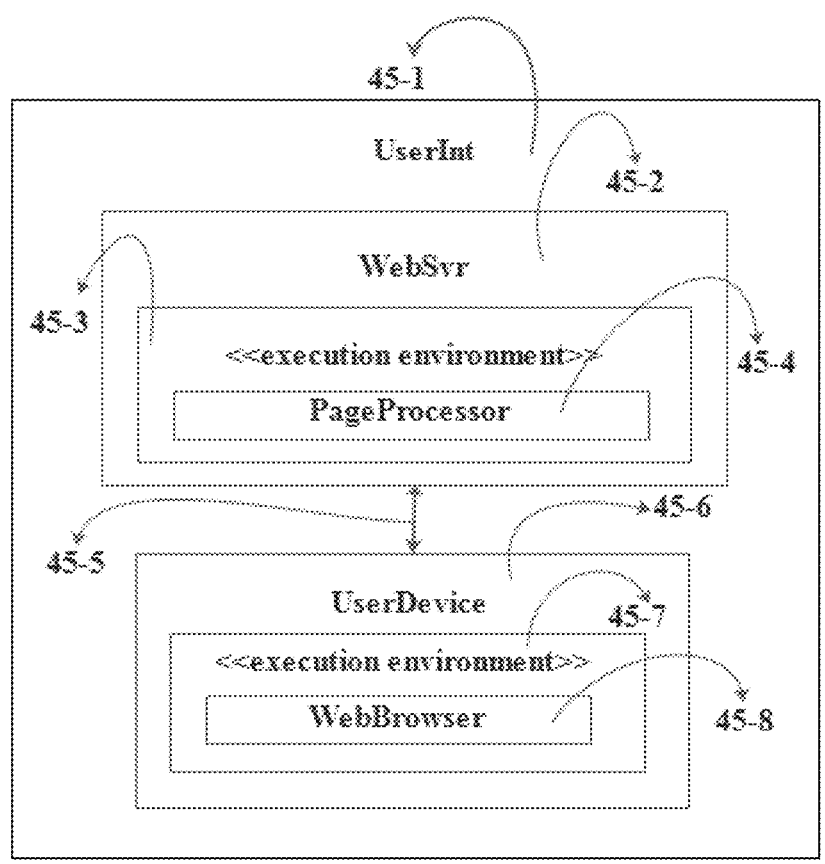
FIG. 45 shows, in a deployment diagram, various details of at least one particular implementation of a user interface for use in connection with the exemplary hardware and software implementation of FIG. 44.

Although the user interface 44-16 may take a wide variety of forms depending upon the circumstances of any particular implementation, a typical user interface may be implemented as a web interface 45-1 as shown in FIG. 45, wherein there may be provided a page processor 45-4 hosted on an appropriate execution environment 45-3 installed on a dedicated web server 45-2 in an internet communication 45-5 with a user device 45-6, such as, for example, a personal computer, smart phone or the like, and on which is installed and/or hosted a web browser 45-8 running in a provided execution environment 45-7. In any case, as will be appreciated by those of ordinary skill in the art, the provision of a user interface 44-16, which of course should be secured, enables the various users, owners (O), merchants (M) and goods carriers (G), to maintain and/or otherwise manage the data stored in the owner database 44-8, merchant database 44-9, goods carrier database 44-10, locker database 44-11, authorization code database 44-12, authentication database 44-13 and mobile device database 44-14 as may be appropriate as well as to generally manage and maintain the implemented locker adaption system 1.

Figure 47:
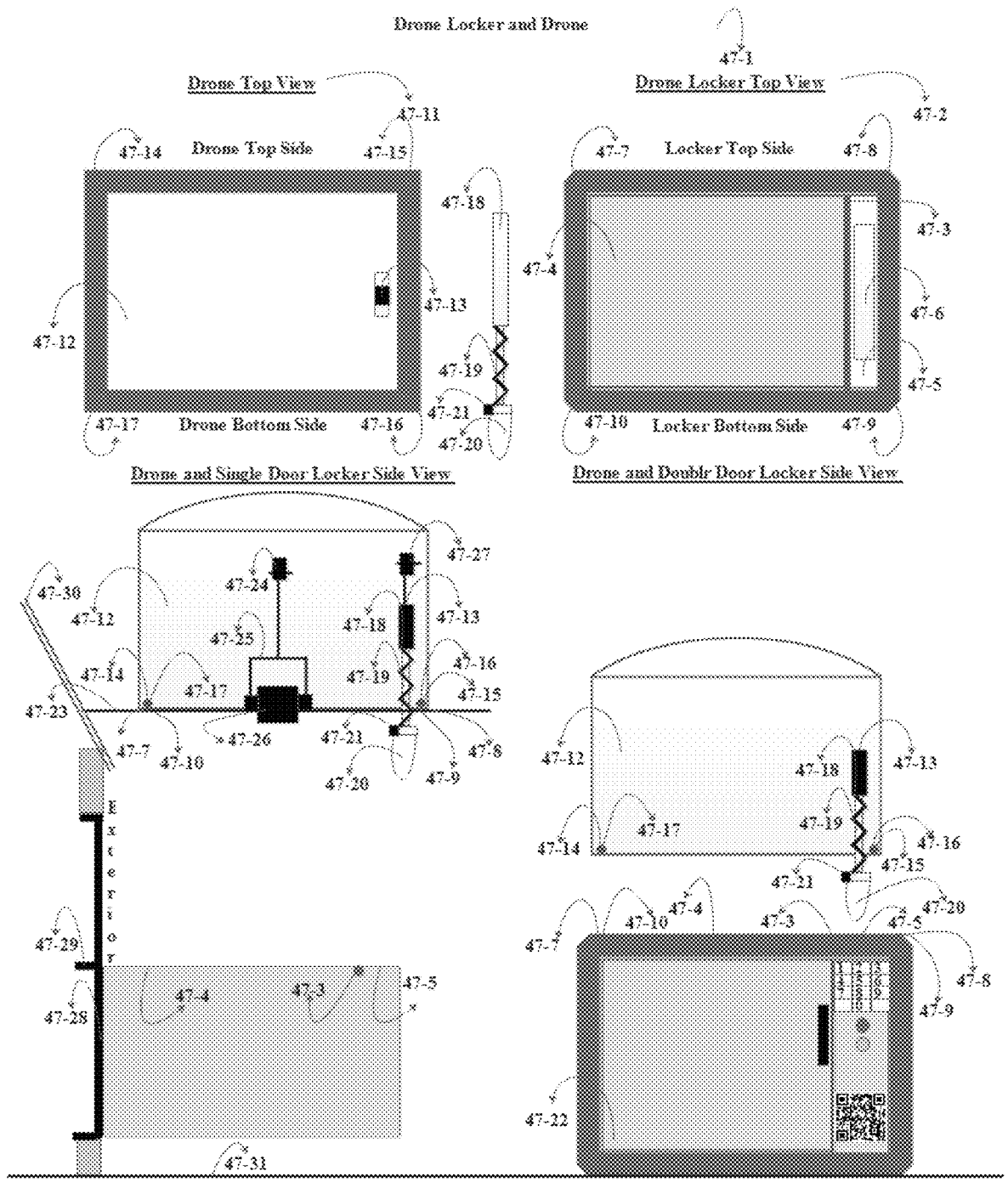

Although those of ordinary skill in the art will recognize that virtually unlimited alternatives are possible, a very high-level but generally representative drawing 47-1 of a generic Delivery/Pickup Drone and a generic Consumer Locker that can be used with the generic Delivery/Pickup Drone is shown in FIG. 47. The locker capable of accepting deliveries from drones and/or capable of storing pickups for drones to pick up packages is generally referred as drone lockers 47-2 as shown in FIG. 47. The drone lockers 47-2 can also be dummy lockers where the front door or the drone lockers 47-2 may not be controlled by a lock.

Instead of installing the front door on the front side of the locker, the front door 47-3 is installed on the top side of the locker as shown in FIG. 47 where the front door 47-3 is attached to the front side lock based on the representative schema 30-1 as shown in FIG. 30 and the front door 47-3 would be used by the drone (D) to leave packages that have to be delivered and/or to pick up that have to be picked up. Also, the front door will have a pivot point 47-3 around which the longer portion 47-4 and shorter portion 47-5 of the front door would move. The amount of movement caused on the longer portion 47-4 by the movement on the shorter side 47-5 would depend on the position of the pivot that separate the front door into longer portion 47-4 and shorter portion 47-5. In any event, any movement on shorter portion 47-5 would cause significantly more movement on the longer portion 47-4.

Since the drone lockers can be installed in secured areas such as within a fenced area, the front side of the locker need not have a lock. If a lock has to be installed on the front door then, the lock on the front door can be installed on either side of the pivot. Whether the lock is installed on the longer portion 47-4 or shorter portion 47-5, when the lock is locked both longer 47-4 and shorter 47-5 portions cannot be opened. Similarly, whether the lock is installed on the longer portion 47-4 or shorter portion 47-5, when the lock is unlocked and one portion is opened the other portion will also be opened. Similarly, when a lock is not installed and if one portion is opened the other portion will also be opened. Only the longer portion 47-4 will be used to leave packages or to pick up packages. Also, only shorter portion 47-5 will be used to open the longer portion 47-4. If a lock is installed then the non-administrator UNLOCK switch shown as 47-6 in FIG. 47 will be installed on the shorter portion 47-5 and when pressure is applied anywhere on the non-administrator UNLOCK switch the controller would communicate with the service provider (P) and the controller would unlock the front lock which is connected to front door where the front door is installed on the top side of the locker, if the controller receives a successful response. If a lock is not installed, then the non-administrator UNLOCK switch shown as 47-6 in FIG. 47 will not be installed and when pressure is applied anywhere on the shorter portion 47-5 the front door installed on the top side of the locker will be opened.

Any indoor locker with a single or double door and any outdoor locker can be easily converted into drone locker. If an indoor locker is converted into drone locker then the locker owner (O) can retrieve the delivered package or place any package for shipment from inside of their private area. If an outdoor locker is converted into drone locker then the locker owner (O) can retrieve the delivered package or place any package for shipment from outside of their private area but within secured area. To convert an indoor or outdoor locker into a drone locker, the locker owner (O) simply place the front door on top of the locker, modify the front door to include a pivot and place beacons on top of the front door at 4 corners of the front door.

A double door outdoor locker with the back side door 47-22 is converted into a drone locker where the front side of the double door locker is shown as 47-4 and 47-5 with a pivot 47-3 is shown in FIG. 47. A single door indoor locker with the hollow back side 47-28 is converted into a drone locker where the front side of the single door locker with hollow back is shown as 47-4 and 47-5 with a pivot 47-3 is shown in FIG. 47. A double door indoor locker as shown in FIG. 13 can also be converted into a drone locker. For the purpose of illustration, only single door indoor locker is shown in FIG. 47. The sliding window 47-29 that protects the hollow back is shown in FIG. 47. When an indoor locker is used, a drone landing platform 47-23 in a position exactly above the indoor locker, a horizontal rotating drum with cable also known as winch 47-24, a package holder 47-25 and a horizontal rotating drum with cable also known as winch 47-27 are used to deliver or pickup package 47-26. Also, the beacons 47-7, 47-8, 47-9 and 47-10 will be installed on four corners of the landing platform 47-23. The drone landing platform 47-23 is attached to the roof 47-30. The double door outdoor locker with the back side door 47-22 can be placed on the floor 47-31 as shown in FIG. 47. The single indoor locker with the hollow back side 47-28 can be attached to the window on the exterior side as shown in FIG. 47.

The drone would get the LockSerialNumber and exact GPS coordinates (LockerLatitude and LockerLongitude) of locker for each package to be delivered or to be picked up from the goods carrier (G). The drone (D) would use the exact GPS coordinates of the locker along with a mapping software such as Google Map to land and take off from the locker. To assist the drone (D) further in landing and taking off from the locker, the locker may have one or more beacons installed on the locker and the drone (D) may have one or more Bluetooth readers installed on the drone. Beacons are small Bluetooth radio transmitters that send out its identifiers as frequently as 10 times in a second. Bluetooth readers are readers that can read the data transmitted by the beacons. The signal strength of the data received by the Bluetooth readers would depend on the strength of the data being transmitted by the beacons and the proximity of the beacons to the Bluetooth readers. As an example, the locker 47-2 with beacons and the drone (D) 47-11 with Bluetooth readers are shown in FIG. 47. As shown in FIG. 47, the locker can have 4 beacons 47-7, 47-8, 47-9 and 47-10 one on each corner of the front door of the locker facing upward. The beacon 47-7 installed at the top left corner of the front door of the locker would transmit the front side lock serial number of the locker plus a text of 'TL'. The beacon 47-8 installed at the top right corner of the front door of the locker would transmit the front side lock serial number of the locker plus a text of 'TR'. The beacon 47-9 installed at the bottom right corner of the front door of the locker would transmit the front side lock serial number of the locker plus a text of 'BR'. The beacon 47-10 installed at the bottom left corner of the front door of the locker would transmit the front side lock serial number of the locker plus a text of 'BL'. The drone compatible to automatically deliver or pick up goods from the lockers would be Bluetooth enabled and may have 4 Bluetooth readers 47-14, 47-15, 47-16 and 47-17 one on each corner facing downward. Again, as shown in n FIG. 47, the Bluetooth reader 47-14 installed at the top left corner of the drone would try to locate the beacon that transmits the front side lock serial number plus a text of 'TL'. The Bluetooth 47-15 reader installed at the top right corner of the drone would try to locate the beacon that transmits the front side lock serial number plus a text of 'TR'. The Bluetooth 47-16 reader installed at the bottom right corner of the drone would try to locate the beacon that transmits the front side lock serial number plus a text of 'BR'. The Bluetooth 47-17 reader installed at the bottom left corner of the drone (D) would try to locate the beacon that transmits the front side lock serial number plus a text of 'BL'.

The drone (D) 47-11 has a payload area 47-12 where the packages to be delivered and/or packages picked up for shipping are stored in an orderly manner so that the drone (D) 47-11 can identify each stored package.

The drone would use a retractable or fixed plunger 47-13 where the plunger 47-13 would consist of a plunger header 47-18, plunger spring 47-19 and a plunger tip 47-20.

If a lock is not installed, then the non-administrator UNLOCK switch shown as 47-6 in FIG. 47 will not be installed.

When non-administrator UNLOCK switch is installed and when the drone (D) 47-11 using the plunger 47-13 press on the non-administrator UNLOCK button 47-6, the shorter portion 47-5 would be pressed down by the plunger tip 47-20 thru the plunger spring 47-19 by the plunger head 47-18, the controller would unlock the lock attached to the front side of the locker and longer portion 47-4 would open upwards and the longer portion 47-14 would press the switch or activate sensor 47-21 to notify the drone that the longer portion is completely opened and the drone can start delivering the package or picking up the page, if the lock attached to the front side of the locker has been authenticated in advance. When non-administrator UNLOCK switch is installed and when the drone (D) 47-11 using the plunger 47-13 press on the non-administrator UNLOCK button 47-6, the shorter portion 47-5 would be pressed down by the plunger tip 47-20 thru the plunger spring 47-19 by the plunger head 47-18, the controller would not unlock the lock attached to the front side of the locker and longer portion 47-4 would not open upwards, if the lock attached to the front side of the locker has not been authenticated in advance. When non-administrator UNLOCK switch is installed and when the lock attached to the front side of the locker is not unlocked, the plunger spring 47-19 would compress and the plunger tip 47-20 would not press hard enough on the shorter portion 47-5 to open. When the plunger spring 47-19 is completely compressed and if the switch or sensor 47-21 is not pressed or activated, then the drone would terminate the process of opening the longer portion 47-4 and the process of delivering goods and/or picking up goods.

When non-administrator UNLOCK switch is not installed and when the drone (D) 47-11 using the plunger 47-13 press on the short portion 47-5, the shorter portion 47-5 would be pressed down by the plunger tip 47-20 thru the plunger spring 47-19 by the plunger head 47-18 and longer portion 47-4 would open upwards and the longer portion 47-14 would press the switch or activate sensor 47-21 to notify the drone that the longer portion is completely opened and the drone can start delivering the package or picking up the page.

If the owners of the drone locker wish to pick up delivered goods and/or wish to leave goods to be picked up directly from their private area, then the locker owner can use a drone locker physically attached to their Private Area and install a drone landing platform exactly above the drone locker and the drone would land on the landing platform 47-23. The platform would be like an antenna attached to the roof. The beacons 47-7, 47-8, 47-9 and 47-10 would be installed on the landing platform 47-23. After the drone lands on the landing platform 47-23, the drone would pick up any package to be picked up and/or would deliver any package to be delivered from the locker by lowering the package holder 47-25 with the package to be delivered and/or raising the package holder with the package to be picked up using the horizontal rotating drum with cable also known as winch 47-24 and lowering the plunger 47-13 using the horizontal rotating drum with cable also known as winch 47-27.

When non-administrator UNLOCK switch is installed, the plunger 47-13 would land on the non-administrator UNLOCK switch 47-6 which, because of the weight of the plunger 47-13, would be activated and the controller would send the non-administrator UNLOCK request to the service provider (P) and receive a response. When non-administrator UNLOCK switch is installed and if the response is successful, the longer portion 47-4 of the front door will open upwards and make a contact with the switch or sensor 47-21 to notify the drone that the longer portion is completely opened, and the drone can start delivering the package or picking up the package. When non-administrator UNLOCK switch is installed and if the response is not successful the longer portion 47-4 of the front door will not open upwards and will not make a contact with the switch or sensor 47-21 and the delivery and/or pickup process will be terminated.

When non-administrator UNLOCK switch is not installed, the plunger 47-13 would land on the shorter portion 47-5 of the front door and the longer portion 47-4 of the front door will open upwards and make a contact with the switch or sensor 47-21 to notify the drone that the longer portion is completely opened, and the drone can start delivering the package or start picking up the package.

In certain embodiments instead of using beacons and Bluetooth readers, any hardware and software combination can be used for drone lockers and drones to coordinate their position with each other.

Figure 48:
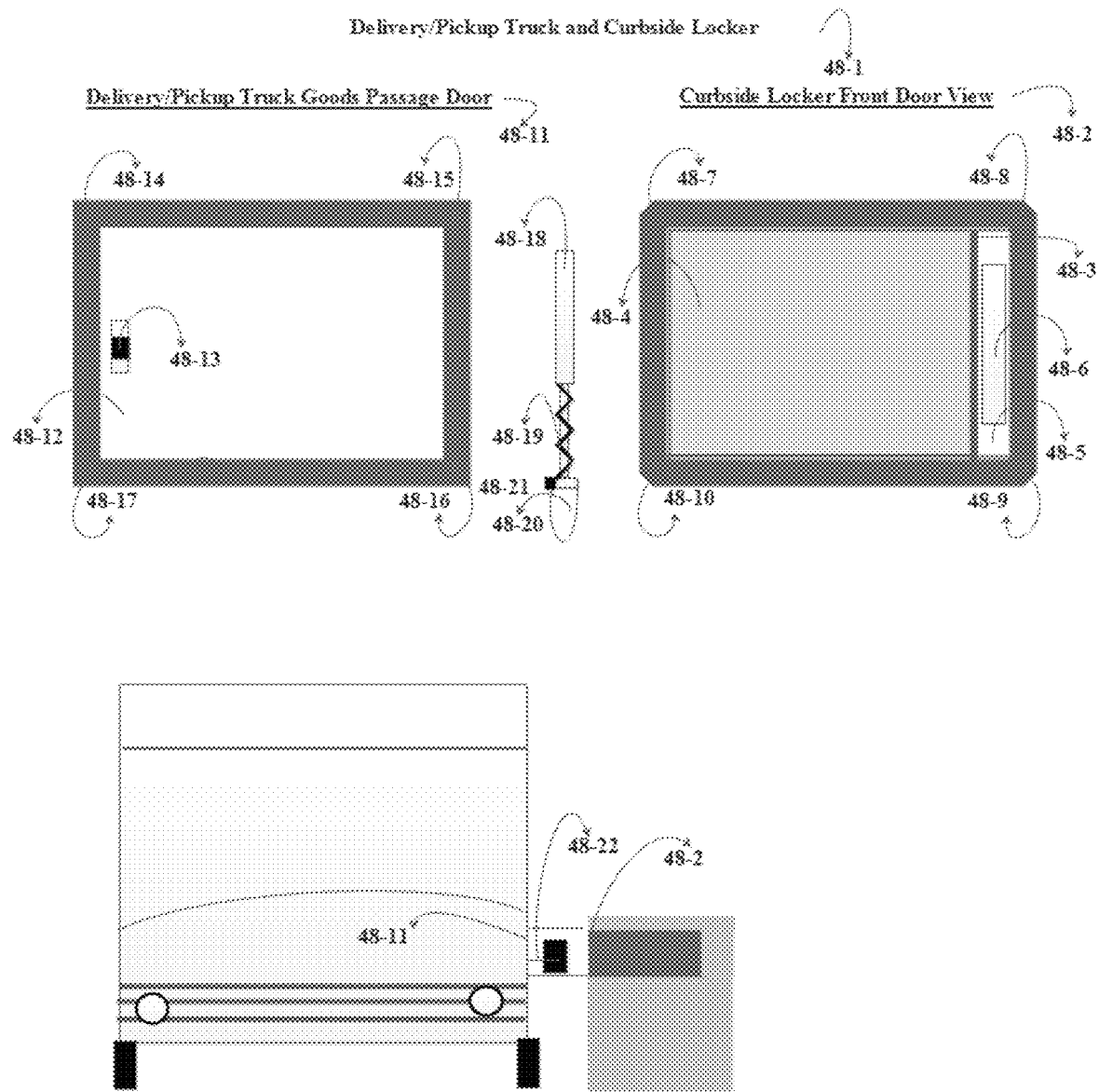

Although those of ordinary skill in the art will recognize that virtually unlimited alternatives are possible, a very high-level but generally representative drawing 48-1 of a generic Delivery/Pickup Truck and a generic Consumer Locker that can be used with the generic Delivery/Pickup Truck is shown in FIG. 48. The locker capable of accepting deliveries from trucks and/or capable of storing pick-ups for trucks to pick-up packages is generally referred as curbside lockers 48-2 as shown in FIG. 48 because the locker must be located near the curbside so that the trucks can access the locker. Instead of installing the front door of the curbside locker with a hinge for opening and closing the door, the front door will have a pivot point 48-3 around which the longer portion 48-4 and shorter portion 48-5 of the front door would move. The amount of movement caused on the longer portion 48-4 by the movement on the shorter side 48-5 would depend on the position of the pivot 48-3 that separate the front door into longer portion 48-4 and shorter portion 48-5. In any event, any movement on shorter portion 48-5 would cause significantly more movement on the longer portion 48-4. The lock on the front door can be installed on either side of the pivot. Whether the lock is installed on the longer portion 48-4 or shorter portion 48-5, when the lock is locked both longer 48-4 and shorter 48-5 portions cannot be opened. Similarly, whether the lock is installed on the longer portion 48-4 or on the shorter portion 48-5, when the lock is unlocked and when one portion is opened the other portion will also open. Only the longer portion 48-4 will be used to leave packages or to pick up packages. Also, only shorter portion 48-5 will be used to open the longer portion 48-4. The non-administrator UNLOCK switch shown as 48-6 in FIG. 48 will be installed on the shorter portion 48-5. So, when pressure is applied anywhere on the non-administrator UNLOCK switch 48-6 the controller would communicate with the service provider (P) and the controller would unlock the front lock which is connected to front door, if the controller receives a successful response. On the other hand, if the controller receives an error response the pushing of non-administrator UNLOCK switch 48-6 would not open the shorter portion 48-5, so the longer portion 48-6 also would not open.

Any outdoor single or double door locker can be easily converted into curbside locker. Any outdoor single door locker will have a closed back side. Any outdoor double door locker will have a back door controlled by mechanical or electric standalone or electric networked locks. If an outdoor locker is converted into curbside locker then the locker owner (O) can retrieve the delivered package or place any package for shipment from outside of their secured area but within the boundaries of their property. To convert an outdoor locker into a curbside locker, the locker owner (O) simply modify the front door to include a pivot 48-3 and place beacons in front of the front door at 4 corners of the front door. A single or double door outdoor locker where the front side of the single or double door locker is shown as longer portion 48-4 and shorter portion 48-5 with a pivot 48-3 as shown in FIG. 48.

Any truck that is carrying packages for delivery and/or carrying packages that have been picked up can be converted into trucks that can deliver and pickup packages automatically just by having an opening with a door on the curbside of the truck and a package movement mechanism similar to package movement used in any goods carrier (G) warehouse. The opening with a door would be used for passage of goods from the truck (T) to curbside locker as well as for passage of goods from curbside lockers to trucks (T). In order, for the opening with a door could be used for passage of goods, the truck must be parked at a particular position which would be closest to the curbside locker and also parallel to the front door of the curbside locker.

The truck would get the LockSerialNumber and exact GPS coordinates (LockerLatitude and LockerLongitude) of locker for each package to be delivered or to be picked up from the goods carrier (G). The truck (T) would use the exact GPS coordinates of the locker along with a mapping software such as Google Map to reach the locker. To assist the truck (T) further in accessing the curbside locker close enough to deliver or pickup packages, the curbside locker will have one or more beacons installed on the curbside locker and the truck (T) may have one or more Bluetooth readers installed on the door of the opening that would be used for passage of goods. Beacons are small Bluetooth radio transmitters that send out its identifiers as frequently as 10 times in a second. Bluetooth readers are readers that can read the data transmitted by the beacons. The signal strength of the data received by the Bluetooth readers would depend on the strength of the data being transmitted by the beacons and the proximity of the beacons to the Bluetooth readers. As an example, the curbside locker 48-2 with beacons and the truck (T) 48-11 with Bluetooth readers are shown in FIG. 48. As shown in FIG. 48, the curbside locker can have 4 beacons 48-7, 48-8, 48-9 and 48-10 one on each corner of the front door of the locker facing towards the path of trucks. The beacon 48-7 installed at the top left corner of the front door of the locker would transmit the front side lock serial number of the locker plus a text of 'TL'. The beacon 48-8 installed at the top right corner of the front door of the locker would transmit the front side lock serial number of the locker plus a text of 'TR'. The beacon 48-9 installed at the bottom right corner of the front door of the locker would transmit the front side lock serial number of the locker plus a text of 'BR'. The beacon 48-10 installed at the bottom left corner of the front door of the locker would transmit the front side lock serial number of the locker plus a text of 'BL'. The truck compatible to automatically deliver or pick up goods from the lockers would be Bluetooth enabled and may have 4 Bluetooth readers 48-14, 48-15, 48-16 and 48-17 one on each corner facing towards the curbside on the delivery side. Again, as shown in n FIG. 48, the Bluetooth reader 48-14 installed at the top left corner of the truck would try to locate the beacon that transmits the front side lock serial number plus a text of 'TL'. The Bluetooth 48-15 reader installed at the top right corner of the truck would try to locate the beacon that transmits the front side lock serial number plus a text of 'TR'. The Bluetooth 48-16 reader installed at the bottom right corner of the truck would try to locate the beacon that transmits the front side lock serial number plus a text of 'BR'. The Bluetooth 48-17 reader installed at the bottom left corner of the truck (T) would try to locate the beacon that transmits the front side lock serial number plus a text of 'BL'.

The truck (T) 48-11 would have a payload area 48-12 where the packages to be delivered and/or packages picked up for shipping are stored in an orderly manner so that the truck (T) 48-11 can identify each stored package for delivery as well as each picked up package for shipping. The hardware and software installed within the truck would select the package to be delivered and move the package to the opening with the door that would be used for passage of the packages into the curbside locker. The hardware and software installed within the truck would also select the package to be picked up from the curbside locker and move the package through the opening with the door that would be used for passage of the packages into the truck payload area.

The truck would use a retractable 48-13 where the plunger 48-13 would consist of a plunger header 48-18, plunger spring 48-19 and a plunger tip 48-20. When the truck (T) 48-11 using the plunger 48-13 push the non-administrator UNLOCK button 48-6, the shorter portion 48-5 would be pushed by the plunger tip 48-20 thru the plunger spring 48-19 by the plunger head 48-18, the controller would unlock the lock attached to the front side of the curbside locker and longer portion 47-4 would open outwards and the longer portion 48-14 would press the switch or activate sensor 48-21 to notify the truck that the longer portion is completely opened and the truck can start delivering the package or picking up the package using the package holder 48-22, if the lock attached to the front side of the curbside locker has been authenticated in advance.

When the truck (T) 48-11 using the plunger 48-13 press on the non-administrator UNLOCK button 48-6, the shorter portion 48-5 would be pushed by the plunger tip 48-20 thru the plunger spring 48-19 by the plunger head 48-18, the controller would not unlock the lock attached to the front side of the curbside locker and longer portion 48-4 would not open outwards, if the lock attached to the front side of the curbside locker has not been authenticated in advance. When the lock attached to the front side of the curbside locker is not unlocked, the plunger spring 48-19 would compress and the plunger tip 48-20 would not press hard enough on the shorter portion 48-5 to open.

In certain embodiments instead of using beacons and Bluetooth readers, any hardware and software combination can be used for curbside lockers and trucks to coordinate their position with each other.

In certain embodiments, the merchants (sellers) can also be locker owners where the Owner Id in the owner database 44-8 would be an identification to represent the combination of Merchant Id and Location Id. In such embodiments the merchants selling goods and services would be sellers and administrators of the lockers and customers buying goods and services from the merchants would be buyers and non-administrators of the lockers.

Although those of ordinary skill in the art will recognize that virtually unlimited alternatives are possible, a very high-level but generally representative drawing 53-1 of a generic Counter Store Pickup and Drive-Thru Store Pickup and a generic Store Pickup Locker that can be used with the generic Counter Store Pickup and Drive-Thru Store Pickup are shown in FIG. 53. The store pickup lockers accessible for buyers from seller waiting area is generally referred as Counter Store Pickup locker 53-16 as shown in FIG. 53. The store pickup lockers accessible for buyers from drive thru lanes of sellers is generally referred as Drive-Thru Store Pickup Internal lockers 53-13 and Drive-Thru Store Pickup External lockers 53-15 as shown in FIG. 53. Buyers can place orders in advance or at the seller location 53-2 in the buyer waiting area 53-3 or in the drive-thru lane 53-12 as shown in FIG. 53.

Any Networked single door on the front side and hollow on the back side or any Networked double door locker can be easily converted into Counter Store Pickup locker 53-16 or Drive-Thru Store Pickup Internal locker. Any Networked single door on the front side and a swinging door without lock on the top side can be easily converted into Drive-Thru Store Pickup External locker. Any Networked double door with a door on the front side and a swinging door with a lock on the top side can be easily converted into Drive-Thru Store Pickup External locker.

The sellers use one or more computer applications in each seller's location. The seller computer application would use Store Pickup Locker Status Request API provided by the service provider (P) as shown in 52-A and receive the response as shown in 52-R as needed. The seller computer application would use the data received in response to control the access for buyers to the drive-thru lane using an arm to raise or lower or a signal to turn green or red, to display status of orders in the display monitor 53-18 for the buyers waiting in the waiting area 53-3 and to display and maintain data in order display monitors 53-8, the seller computer applications would communicate with the service provider (P) thru Store Pickup Locker Status Request API process under API Gateway section to get the lock status of all doors in all lockers in real time.

Buyers picking up the orders from the seller waiting area 53-3 and have not placed the orders in advance would place the order with an associate over the counter 53-6. Buyers picking up the orders from the seller drive-thru lane 53-12 and have not placed the orders in advance 53-9 would stop at the counter and place the order with an associate from the drive-thru lane. The same live associate not only can take orders from walk-in buyers from waiting area 53-3 but also can take orders from driving thru lanes. The live associate could use any point of sale system 53-7 which is placed on the partition shown as 53-6 dividing the merchant location into walk-in buyers waiting area 53-3 and order preparation area 53-4. When a buyer places an order in advance or at the seller location 53-2 with an associate the seller would add the order information into store pickup database 44-15 as per the schema 50-1 as shown in FIG. 50 using the order number and the consumer id of the buyer thru the store pickup authcode request API provided by the service provider (P) to sellers and as shown in FIG. 51-A. The consumer id could be maintained by the seller or provided to the seller by a wallet service provider who can same as the service provider (P). When an order is placed over the counter the checked in information will be automatically set to 'Y'. If a customer id is not available for example customers placing orders at the location and making payment outside of wallet service provider, the customer id could be blank.

When an order is placed in advance, the seller computer application would submit a request to add a row of information into store pickup database 44-15 based on the API specification as shown in FIG. 51-A and the submitted store pickup authcode request would be processed by the service provider (P) as explained in Store Pickup Authcode API Process under API Gateway. The seller would provide the values for MerchantId, LocationId, Password, 'A' for AccessType, OrderNumber, ConsumerId, 'N' for CheckedIn, blank for LockSerialNumber, blank for AuthCode, blank for Authenticated, valid values for ExpirationDate and ExpirationTime. Upon receiving a request from seller for a store pickup authcode, the service provider (P) would process the request as explained in Store Pickup Authcode API process under API Gateway section and return a response. The seller would evaluate the response. If the value for ReturnCode is '1' in the response, then the request is successful, the service provider (P) would have added a row of information into store pickup database 44-15 and a value for authcode would have been returned in the response, otherwise the request is not successful. If the request is successful, then the seller computer application would include the authcode value in the receipt given or sent to the buyer.

When an order is placed at the location at the drive-thru lane, the seller computer application would submit a request to add a row of information into store pickup database 44-15 based on the API specification as shown in FIG. 51-A and the submitted store pickup authcode request would be processed by the service provider (P) as explained in Store Pickup Authcode API Process under API Gateway. The seller would provide the values for MerchantId, LocationId, Password, 'A' for AccessType, OrderNumber, ConsumerId, 'N' for CheckedIn, blank for LockSerialNumber, blank for AuthCode, valid values for ExpirationDate and ExpirationTime.

Upon receiving a request from seller for a store pickup authcode, the service provider (P) would process the request as explained in Store Pickup Authcode API process under API Gateway section and return a response. The seller would evaluate the response. If the value for ReturnCode is '1' in the response, then the request is successful, the service provider (P) would have added a row or information into store pickup database 44-15 and a value for authcode which can be a random number or a number based on the order number would have been returned in the response, otherwise the request is not successful. If the request is successful, then the seller computer application would include the AuthCode value in the receipt given or sent to the buyer.

When an order is placed at the location from the buyer waiting area, the seller computer application would submit a request to add a row of information into store pickup database 44-15 based on the API specification as shown in FIG. 51-A and the submitted store pickup authcode request would be processed by the service provider (P) as explained in Store Pickup Authcode API Process under API Gateway. The seller would provide the values for MerchantId, LocationId, Password, 'A' for AccessType, OrderNumber, ConsumerId, 'Y' for CheckedIn, blank for LockSerialNumber, blank for AuthCode, valid values for ExpirationDate and ExpirationTime.

Upon receiving a request from seller for a store pickup authcode, the service provider (P) would process the request as explained in Store Pickup Authcode API process under API Gateway section and return a response. The seller would evaluate the response. If the value for ReturnCode is '1' in the response, then the request is successful, the service provider (P) would have added a row or information into store pickup database 44-15 and a value for AuthCode would have been returned in the response, otherwise the request is not successful. If the request is successful, then the seller computer application would include the AuthCode value in the receipt given or sent to the buyer.

When an order is placed in advance or at the location the buyer would receive an electronic and/or paper receipt where the receipt would include an authorization code and an order number where the authorization code is assigned by the service provider. For the orders placed in advance, the seller can also track the buyer's vehicle, if available, within a short radius from seller's location to estimate the arrival time of buyer's vehicle to pick up the order. Buyers picking up the orders from the seller waiting are 53-3 and have placed the orders in advance have to check-in so that the seller would know that the buyer is ready to pick up the order whereas the buyer placed an order with an associate over the counter 53-6 would be automatically checked in.

Buyers picking up the orders from the seller waiting area 53-3 and have not checked in must scan the QR Code 53-17 using a mobile device and using an application provided by the seller or by the service provider (P) to check-in. The QR Code could identify the required action, the merchant id and the location id where the required action would be to check-in to pick up the order and the merchant id and the location id are the identifiers saved by the seller in the merchant database 44-9 and an example for such a QR Code could be 30-778127-82. The buyer could use a mobile app provided by the seller or by the service provider (P). If the buyer uses an app provided by the seller, then the seller would verify consumer id based on the mobile device and update the store pickup database 44-15 with checked-in information using the consumer id, AccessType as 'C' and CheckedIn as 'Y' thru the store pickup authcode API. If the buyer uses an app provided by the service provider (P), then the service provider (P) who may be also same as the wallet service provider for the seller would verify the consumer id and update the store pickup database 44-15 with the checked in information. If for some reason the app used by the buyer cannot update the store pickup database 44-15 with the checked in information just by scanning the QR Code, then the app would capture the order number from the buyer and follow the same procedure using order number instead of consumer id to update the store pickup database.

Buyers picking up the orders from the seller waiting area 53-3, already placed the orders and already checked in would wait for the locker number to be displayed on the display monitor 53-18.

Buyers picking up the orders from the seller drive-thru lane 53-12 and have already placed the order online or at the drive-thru lane shown as 53-9 would stop at the entrance shown as 53-10 to the drive-thru lane 53-12 and wait for the arm blocking the drive-thru lane to raise 53-11 or for a signal to turn green 53-11.

The seller computer application controlling the access for buyers to the drive-thru lane using an arm to raise and lower or a signal to turn green and red will determine the total number of available Drive-Thru Store Pickup lockers by combining Drive-Thru Store Pickup Internal and Drive-Thru Store Pickup External lockers together from the status of all doors in all lockers received from the service provider (P). If the total number of available Drive-Thru Store Pickup lockers is one or more, then the seller computer application would allow one vehicle at a time to pass through the arm 53-11 or signal 53-11 at the entrance of the drive-thru lane and deduct the total number of available Drive-Thru Store Pickup lockers by one at a time. When the total number of available Drive-Thru Store Pickup lockers reaches 0, then the seller computer application would determine the total number of available Drive-Thru Store Pickup lockers by combining Drive-Thru Store Pickup Internal and Drive-Thru Store Pickup External lockers together from the status of all doors in all lockers received from the service provider (P) by using the Store Pickup Locker Status Request API process under API Gateway section. Once the arm blocking the drive-thru lane 53-11 raises or for the signal 53-11 turns green the buyer would drive to one of the available locker. All the lockers where the front door is unlocked will be available for the buyers to request for their pickup orders. The locker capable of accepting requests from buyers for order pick-ups from drive thru lanes is generally referred as Drive-Thru Store Pickup Internal lockers 53-13 and Drive-Thru Store Pickup External lockers 53-15 as shown in FIG. 53 because the locker must be located near the drive thru lanes 53-12 so that the buyers can access the locker from drive-thru lanes. Drive-Thru Store Pickup Internal lockers 53-13 are attached to the building 53-2 of the seller whereas Drive-Thru Store Pickup External lockers 53-15 are not attached to the building 53-2 of the seller and orders can be transported from seller order preparation area 53-4 to the Drive-Thru Store Pickup External lockers 53-15 by drones or thru transport pipes or by any other means. Buyers' vehicles 53-10 driven thru the drive-thru lane 53-12 can be parked near any internal locker 53-13 or external locker 53-15 to pick up the orders from the lockers. When the buyer accesses an available locker, the buyer would be instructed to scan a QR Code displayed on the locker using their mobile device or to enter a code printed on their sales receipt or to enter a specific number of digits from the order number and to press non-administrator LOCK button that is part of the locker. The buyer using a mobile device and using an application provided by the seller or by the service provider (P) could scan the QR Code displayed on the locker where the QR Code is to identify required action and the data and an example for such a QR Code could be 27-340192 where '27' could be for advance authentication and 340192 could be the locker serial number. The application provided by the seller or by the service provider by scanning the code would know that the user is scanning the QR Code for an advance authentication to lock or unlock the locker. If the buyer used the application provided by the seller then the seller would verify the buyer and use the consumer id of the buyer, the locker serial number and access type 'N' in the store pickup authcode API to authenticate the buyer in the store pickup database 44-15, so that when the buyer press non-administrator LOCK button the locker would lock. If the buyer used the application provided by the service provider, then the service provider would verify the buyer and use the consumer id of the buyer and the locker serial number to update the field Authenticated to 'Y' in store pickup database 44-15, so that when the buyer presses non-administrator LOCK button the locker would lock The buyer instead of using a mobile device for an advance authentication, can also enter an authorization code in the key pad attached to the locker and press the non-administrator LOCK button. The paper and/or the electronic receipt given to the buyer when the order was placed by the buyer has an authorization code that can be used to lock the non-administrator LOCK.

When the non-administrator LOCK button is pressed, the controller attached to the non-administrator LOCK button would communicate with the service provider (P) and if the response is successful, then the controller would lock the front door of the locker. The response will be successful only if the buyer has placed an order and the order is waiting to be picked up.

Buyers picking up the orders from the seller drive-thru lane 53-12 and have already placed the orders and already have selected and locked an available locker from the seller drive thru lane would wait for the locked locker to unlock and then pick up the order from the unlocked locker.

Based on the information received from the service provider thru Store Pickup Locker Status Request API, the seller computer application would display all the orders that are ready to be prepared in the order display monitors 53-8 with a locker number already assigned for the order or without a locker number. If the pickup of the order is from Drive-Thru Store Pickup locker than the order would already have a Drive-Thru Store Pickup locker number, otherwise the order handler have to assign a Counter Store Pickup locker number to the order. For the orders that are to be placed inside Drive-Thru Store Pickup locker, the order handler would simply place the order inside the designated Drive-Thru Store Pickup locker and press the administrator UNLOCK button. If the assigned locker is Drive-Thru Store Pickup External locker then the transporter 53-14 in the order preparation area 53-4 will be used to transport the orders from the order preparation area 53-4 to Drive-Thru Store Pickup external lockers 53-15. The transporter would automatically press administrator UNLOCK button after placing the order inside the Drive-Thru Store Pickup External locker. Then the buyer would pick up the order from the unlocked Drive-Thru Store Pickup locker and the Drive-Thru Store Pickup locker would again be available for buyers picking up orders from Drive-Thru Store Pickup lockers.

For the orders that are to be placed inside Counter Store Pickup locker, the order handler would simply select Counter Store Pickup locker number for any orders that do not have a designated Counter Store Pickup locker number in the order display monitor and place the order in the Counter Store Pickup locker. When the order handler selects a Counter Store Pickup locker number for a specific order in the order display monitor, the seller computer application would communicate with the service provider (P) using Store Pickup Authcode API Process with the value 'L' for AccessType, order handler selected order number for OrderNumber and lockserialnumber of the order handler selected Counter Store Pickup locker for LockSerialNumber. Then the buyers waiting to pick up orders could view the Counter Store Pickup locker number in the order display status monitor 53-18. Buyers can open Counter Store Pickup lockers by scanning the QR Code attached to the Counter Store Pickup lockers and by pressing the non-administrator UNLOCK button or by entering a code in a key pad attached to the Counter Store Pickup lockers and by pressing the non-administrator UNLOCK button to pick up the orders. The unlocked Counter Store Pickup lockers can lock itself automatically or can be locked by order handlers using the administrator LOCK button when they are unlocked. Locked Counter Store Pickup lockers would be available for order handlers to load the order again.

Before continuing with any particular example to generally describe further details of the implementation with respect to deployment diagram as shown in FIG. 44, it should be noted that consumer locker owners (O) using at least one lock should be registered with the service provider (P) to receive a unique owner id. The service provider can assign unlimited number of unique owner ids. The consumer locker owners (O) should also complete the initial setup which consists of populating the locker owner database 44-8 as per the very high-level but generally representative schema 27-1 using the form 34-D provided by the service provider (P) in a web site or in a mobile app, populating the locker database 44-11 as per the very high-level but generally representative schema 30-1 using the form 37-D provided by the service provider (P) in a web site.

Before continuing with any particular example to generally describe further details of the Merchant StorePickup Services implementation with respect to deployment diagram as shown in FIG. 44, it should be noted that store pickup locker owners (MO) should also complete the initial setup which consists of populating the locker owner database 44-8 as per the very high-level but generally representative schema 27-1 using the form 34-M-D provided by the service provider (P) in a web site or in a mobile app, populating the locker database 44-11 as per the very high-level but generally representative schema 30-1 using the form 37-M-D provided by the service provider (P) in a web site.

Figure 19:
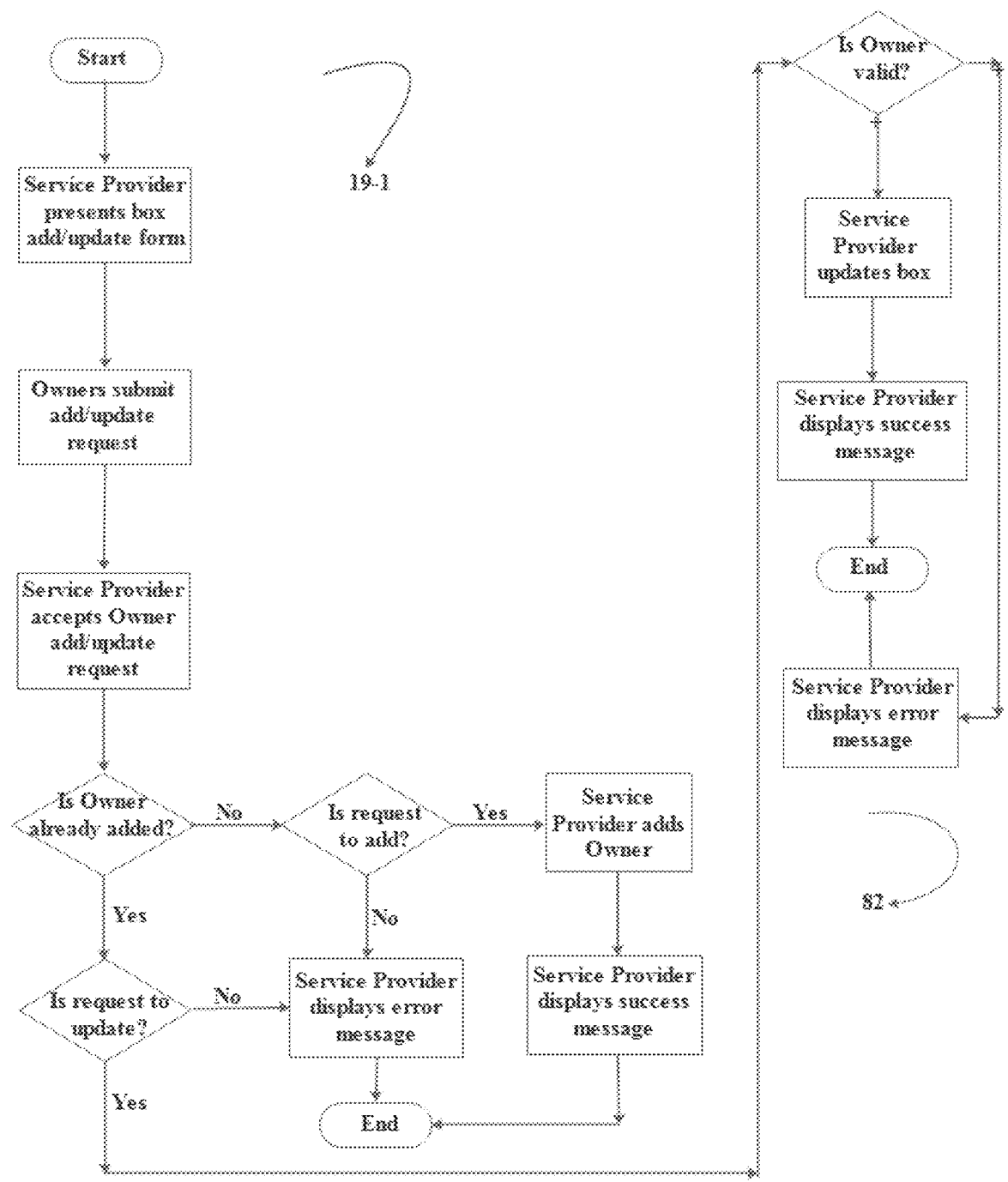
FIG. 19 shows, in a flowchart, an overview of the various steps generally taken in Owner Registration.

As particularly shown in FIG. 19, the Consumer Lockers Adaption method (82) of the present invention generally comprises the registration of users where the users are referred as locker owners. FIG. 19 shows, in a flowchart, an overview of the various steps generally taken in adding/updating users also referred as locker owners.

As shown in FIG. 19, the service provider (P) would use the very high-level flow chart 19-1 as per the use case (82) of the present invention for the consumer locker owners (O) to add/update locker owners' (O) information. The service provider (P) would provide a form 34-D as shown in FIG. 34-D, in a web site or in a mobile application for the locker owner (O) to add/update locker owners' information. Before providing the form 34-D to add/update locker owners' information, the service provider (P) would require that the locker owner (O) be authenticated. The locker owner (O), would be presented with a log-in form 34-L as shown in FIG. 34-L and the locker owner (O) would use the password provided by the service provider (P) and maintained by the Consumer Locker owner (O) to log-in. The locker owner (O) would enter owner id and password into the log-in form 34-L as shown in FIG. 34-L. If the submitted credentials are valid then the locker owner (O) would be authenticated, otherwise the service provider would terminate the process. Instead of using user id and password to log-in, locker owner (O) can also use a mobile authentication application with a biometric verification such as MslWallet where the locker owner (O) would just scan a QR Code displayed on the log-in page as shown in FIG. 34-L to log-in. In either case, if the locker owner is authenticated, the service provider (P) would generally continue to populate the fields in the form 34-D as shown in FIG. 34-D, otherwise it will terminate the process. To populate the fields in the form 34-D, the service provider (P) would use the owner id and get the most recent values for the owner id from the locker owner database (44-8) using the representative schema 27-1 as shown in FIG. 27. If the locker owner (O) does not exist in the locker owner database (44-8) then the service provider (P) would populate the fields in the form 34-D with blanks.

Once the form as shown in FIG. 34-D is presented, the locker owner (O) would enter the required information into appropriate fields and click on submit button. The service provider (P) would validate the submitted information and if the submitted information is valid then the service provider (P) would update the locker owner database (44-8), otherwise the service provider (P) would terminate the validation process, display an error message and wait to receive the data again. The validation process includes validation of values of each individual field namely status, first name, middle name, last name, address line 1, address line 2, city, state, zip 1, zip 2, phone, mobile phone number, mobile device identifier, eMail address, latitude, longitude and new password. The owner id is a unique number provided by service client (P) to each individual locker owner.

If the status is Active or Inactive then, the validation process will continue otherwise, the validation process will terminate. If the first name or last name or email address or is blank, then the validation process will terminate otherwise it will continue. The value for middle name is optional. If email address is a valid email address, then the process will continue otherwise it will terminate. If phone is blank or valid phone number then the process will continue, otherwise it will terminate. If mobile phone number is not blank and valid mobile phone number then the process will continue, otherwise it will terminate. If the same mobile phone number is used for more than one owner id then the process will terminate, otherwise it will continue. If mobile device identifier is not blank, then the process will continue, otherwise it will terminate. If the same mobile device identifier is used for more than one owner id then the process will terminate, otherwise it will continue. If the latitude and longitude are valid for the entered address then the validation process will continue, otherwise it will terminate. If the validation process terminates anytime during the validation process an error message will be displayed in the form 34-D and the service provider (P) will wait to receive the data again. If the validation process does not terminate and the entered values of all the fields as shown in FIG. 34-D are valid, then the service provider (P) would update the locker owner database (44-8) as per the schema 27-1 as shown in FIG. 27. If owner id does not exist in the locker owner database (44-8) then, the locker owner information will be added in the locker owner database (44-8) otherwise, the locker owner information will be updated in the locker owner database (44-8). If the password is blank, then the last previously set password will be carried forward.

Figure 22:
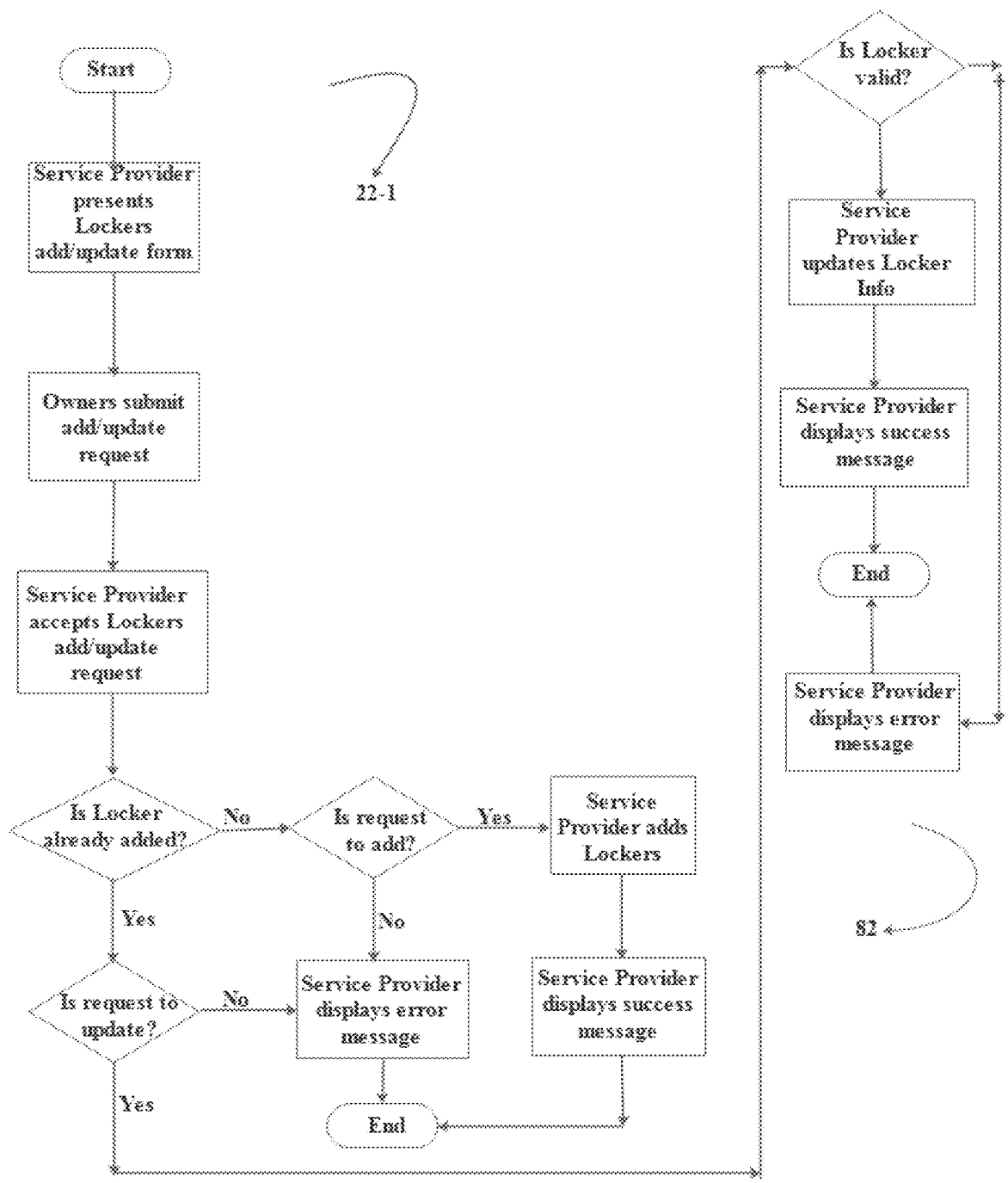
FIG. 22 shows, in a flowchart, an overview of the various steps generally taken in Consumer Locker Registration.

As shown in FIG. 22, the service provider (P) would use the very high-level flow chart 22-1 as per the use case 53 of the present invention for the consumer locker owners (O) to add/update locker (L) information. The service provider (P) would provide a form 37-D as shown in FIG. 37-D, in a web site or in a mobile application for the locker owner (O) to add/update locker information. Before providing the form 37-D to add/update locker information, the service provider (P) would require that the locker owner (O) be authenticated. The locker owner (O), would be presented with a log-in form 37-L as shown in FIG. 37-L and the locker owner (O) would use the password provided by the service provider (P) and maintained by the locker owner (O) to log-in. The locker owner (O) would enter locker owner id, locker number and password into the log-in form 37-L as shown in FIG. 37-L. If the submitted credentials are valid then the locker owner (O) would be authenticated, otherwise the service provider would terminate the process. Instead of using user id and password to log-in, locker owner (O) can also use a mobile authentication application with a biometric verification such as MslWallet where the locker owner (O) would just scan a QR Code displayed on the log-in page as shown in FIG. 37-L to log-in. In either case, if the locker owner (O) is authenticated, the service provider (P) would generally continue to populate the fields in the form 37-D as shown in FIG. 37-D, otherwise it will terminate the process. To populate the fields in the form 37-D, the service provider (P) would use the locker owner id and locker number and get the most recent values for the locker number owned by the locker owner id from the locker database (44-11) using the representative schema 30-1 as shown in FIG. 30. If the locker number under the locker owner (O) does not exist in the locker database (44-11) then the service provider (P) would populate the fields in the form 37-D with blanks.

Once the form as shown in FIG. 37-D is presented, the locker owner (O) would enter the required information into appropriate fields and click on submit button. The service provider (P) would validate the submitted information and if the submitted information is valid then the service provider (P) would update the locker database (44-11), otherwise the service provider (P) would terminate the validation process, display an error message and wait to receive the data again. The validation process includes validation of values of each individual field namely status, location type, number of doors, front side lock type, front side lock serial number, back side lock type, back side lock serial number, back side cover, admin switch restricted, package size width, package size height, package size depth, number of bins, drone access allowed, truck access allowed, locker latitude, locker longitude, directions text and directions map. The combination of locker owner id and locker number is unique and provided by service client (P) to each individual locker owner.

If the status is Active or Inactive then, the validation process will continue otherwise, the validation process will terminate. If the locker location type 'I', or 'D' or 'K' or 'G' or 'R' or 'F' or 'C' or 'O' and number of doors is 1 or 2 and front side lock type is 'N' or 'S' or 'B' and admin switch restricted is 'Y' or 'N' and front side lock serial number is not blank then the validation process will continue otherwise it will terminate. If number of doors is 1 and if back side lock type is 'B' and back side lock serial number is blank, then the validation process will continue otherwise it will terminate. If number of doors is 2 and if back side lock type is 'B' or back side lock serial number is blank, then the validation process will terminate otherwise it will continue. If the package size width is a number and in between 1 and 72 then the validation process will continue, otherwise it will terminate. If the package size height is a number and in between 1 and 72 then the validation process will continue, otherwise it will terminate. If the package size depth is a number and in between 1 and 72 then the validation process will continue, otherwise it will terminate. If the number of bins is a number then the validation process will continue, otherwise it will terminate. If the drone access allowed is 'Y' or 'N' then the validation process will continue, otherwise it will terminate. If the truck access allowed is 'Y' or 'N' then the validation process will continue, otherwise it will terminate. If the manual access allowed is 'Y' or 'N' then the validation process will continue, otherwise it will terminate. If front side lock type is 'B' and if truck access allowed is 'Y' or manual access allowed is 'Y' then the validation process will terminate. If the locker latitude is not blank and is a number then the validation process will continue, otherwise it will terminate. If the locker longitude is not blank and is a number then the validation process will continue, otherwise it will terminate. If locker directions map is not blank and if the locker directions map location is not found by the web site or by the mobile application, then the validation process will terminate otherwise it will continue. If the validation process does not terminate and the entered values of all the fields as shown in FIG. 37-D are valid, then the service provider (P) would update the locker database (44-11) as per the schema 30-1 as shown in FIG. 30. If locker owner Id and locker number combination does not exist in the locker database (44-11) then, the locker information will be added in the locker database (44-11) otherwise, the locker information will be updated in the locker database (44-11). When the locker information is updated the last previously set values for front side lock status and back side lock status will be carried forward.

Merchants (M), prior to using authorization code API and/or authentication API offered by the service provider (P) or before registering a locker, could register with the service provider (P) to receive unique merchant id and location id and complete the setup. The service provider can assign unlimited number of unique merchant ids and unlimited number of unique location ids within each merchant id so that merchants (M) can have unlimited number of locations within a merchant. The merchants (M) setup consists of populating the merchant database 44-9 as per the very high-level but generally representative schema 28-1 using the form 35-D provided by the service provider (P) in a web site or in a mobile application.

As shown in FIG. 20, the service provider (P) would use the very high-level flow chart 20-1 as per the use case 51 of the present invention for the merchant (M) to add/update merchants' (M) information. The service provider (P) would provide a form 35-D as shown in FIG. 35-D, in a web site or in a mobile application for the merchant (M) to add/update merchants' information. Before providing the form 35-D to add/update merchants' information, the service provider (P) would require that the merchant (M) be authenticated. The merchant (M) would be presented with a log-in form 35-L as shown in FIG. 35-L and the merchant (M) would use the password provided by the service provider (P) and maintained by the merchant (M) to log-in. The merchant (M) would enter merchant id, location id and password into the log-in form 35-L as shown in FIG. 35-L. If the submitted credentials are valid then the merchant (M) would be authenticated, otherwise the service provider would terminate the process. Instead of using user id and password to log-in, merchant (M) can also use a mobile authentication application with a biometric verification such as MslWallet where the merchant (M) would just scan a QR Code displayed on the log-in page as shown in FIG. 35-L to log-in. In either case, if the merchant (M) is authenticated, the service provider (P) would generally continue to populate the fields in the form 35-D as shown in FIG. 35-D, otherwise it will terminate the process. To populate the fields in the form 35-D, the service provider (P) would use the merchant id and location id and get the most recent values for the merchant id and location id from the merchant database (44-9) using the representative schema 28-1 as shown in FIG. 28. If the merchant (M) does not exist in the merchant database (44-9), then the service provider (P) would populate the fields in the form 35-D with blanks.

Once the form as shown in FIG. 35-D is presented, the merchant (M) would enter the required information into appropriate fields and click on submit button. The service provider (P) would validate the submitted information and if the submitted information is valid then the service provider (P) would update the merchant database (44-9), otherwise the service provider (P) would terminate the validation process, display an error message and wait to receive the data again. The validation process includes validation of values of each individual field namely status, merchant name, location name, contact first name, contact last name, address line 1, address line 2, city, state, zip 1, zip 2, phone, mobile phone number, eMail address, IP address, latitude, longitude, service area (Radius in Miles), authcode API, authentication API and new password. The combination of merchant id and location id is a unique provided by service client (P) to each individual merchant. If the merchant does not have a location, then merchant id and location id can be same.

If the status is Active or Inactive then, the validation process will continue otherwise, the validation process will terminate. If the merchant name, location name, contact first name or contact last name or email address or address line 1 or the city or the state or state or email address or latitude or longitude or service area (radius in miles) or authcode API or authentication API is blank, then the validation process will terminate otherwise it will continue. If email address is a valid email address, then the process will continue otherwise it will terminate. If phone is blank or valid phone number then the validation process will continue, otherwise it will terminate. If mobile phone number is blank or valid mobile phone number then the validation process will continue, otherwise it will terminate. If mobile phone number is not blank and the same mobile phone number is used for more than one merchant id and location id combination then the validation process will terminate, otherwise it will continue. If authcode API is 'Y' or 'N' then the validation process will continue, otherwise it will terminate. If authentication API is 'Y' or 'N' then the validation process will continue, otherwise it will terminate. If the validation process terminates anytime during the validation process an error message will be displayed in the form 35-D and the service provider (P) will wait to receive the data again. If the validation process does not terminate and the entered values of all the fields as shown in FIG. 35-D are valid, then the service provider (P) would update the merchant database (44-9) as per the schema 28-1 as shown in FIG. 28. If merchant Id and location id combination does not exist in the merchant database (44-9) then, the merchant information will be added in the merchant database (44-9) otherwise, the merchant information will be updated in the merchant database (44-9). If the password is blank, then the last previously set password will be carried forward.

As shown in FIG. 22, the service provider (P) would use the very high-level flow chart 22-1 as per the use case 53 of the present invention for the store pickup locker owners (MO) to add/update locker (ML) information. The service provider (P) would provide a form 37-M-D as shown in FIG. 37-M-D, in a web site or in a mobile application for the locker owner (MO) to add/update locker information. Before providing the form 37-M-D to add/update locker information, the service provider (P) would require that the locker owner (MO) be authenticated. The locker owner (MO), would be presented with a log-in form 37-M-L as shown in FIG. 37-M-L and the locker owner (O) would use the password provided by the service provider (P) and maintained by the Merchant (M) who is the locker owner (MO) to log-in. The locker owner (MO) would enter locker owner id, locker number and password into the log-in form 37-M-L as shown in FIG. 37-M-L. The format for the locker owner id would be three parts separated by '-' where the first part would be 'M', the second part would be merchant id and the third part would be location id. If the submitted credentials are valid then the locker owner (MO) would be authenticated, otherwise the service provider would terminate the process. Instead of using user id and password to log-in, locker owner (MO) can also use a mobile authentication application with a biometric verification such as MslWallet where the locker owner (MO) would just scan a QR Code displayed on the log-in page as shown in FIG. 37-M-L to log-in. In either case, if the locker owner (MO) is authenticated, the service provider (P) would generally continue to populate the fields in the form 37-M-D as shown in FIG. 37-M-D, otherwise it will terminate the process. To populate the fields in the form 37-M-D, the service provider (P) would use the locker owner id and locker number and get the most recent values for the locker number owned by the locker owner id from the locker database (44-11) using the representative schema 30-1 as shown in FIG. 30. If the locker number under the locker owner (MO) does not exist in the locker database (44-11) then the service provider (P) would populate the fields in the form 37-M-D with blanks.

Once the form as shown in FIG. 37-M-D is presented, the locker owner (O) would enter the required information into appropriate fields and click on submit button. The service provider (P) would validate the submitted information and if the submitted information is valid then the service provider (P) would update the locker database (44-11), otherwise the service provider (P) would terminate the validation process, display an error message and wait to receive the data again. The validation process includes validation of values of each individual field namely status, location type, number of doors, front side lock type, front side lock serial number, back side lock type, back side lock serial number, back side cover, and admin switch restricted. The service provider (P) would automatically set blank for the fields package size width, package size height, package size depth, number of bins, truck access allowed, drone access allowed, manual access allowed, locker latitude, locker longitude, directions text and directions map. The combination of locker owner id and locker number is unique and provided by service client (P) to each individual locker owner.

If the status is Active or Inactive then, the validation process will continue otherwise, the validation process will terminate. If the locker location type or 'W' or 'B' and number of doors is 1 or 2 and front side lock type is 'N' and admin switch restricted is 'Y' or 'N' and front side lock serial number is not blank, then the validation process will continue otherwise it will terminate. If number of doors is 1 and if back side lock type is 'B' and back side lock serial number is blank, then the validation process will continue otherwise it will terminate. If number of doors is 2 and if back side lock type is 'B' or back side lock serial number is blank, then the validation process will terminate otherwise it will continue.

If the validation process does not terminate and the entered values of all the fields as shown in FIG. 37-M-D are valid, then the service provider (P) would update the locker database (44-11) as per the schema 30-1 as shown in FIG. 30. If locker owner Id and locker number combination does not exist in the locker database (44-11) then, the locker information will be added in the locker database (44-11) otherwise, the locker information will be updated in the locker database (44-11). When the locker information is updated the last previously set values for front side lock status and back side lock status will be carried forward.

Goods Carriers (G) prior to using authorization code API and/or authentication API offered by the service provider (P) could register with the service provider (P) to receive unique goods carrier id and location id and complete the setup. The service provider can assign unlimited number of unique goods carrier ids and unlimited number of unique location ids within each goods carrier id so that goods carriers (G) can have unlimited number of locations within a goods carrier. The goods carriers (G) setup consists of populating the goods carrier database 44-10 as per the very high-level but generally representative schema 29-1 using the form 36-D provided by the service provider (P) in a web site or in a mobile application.

Figure 21:
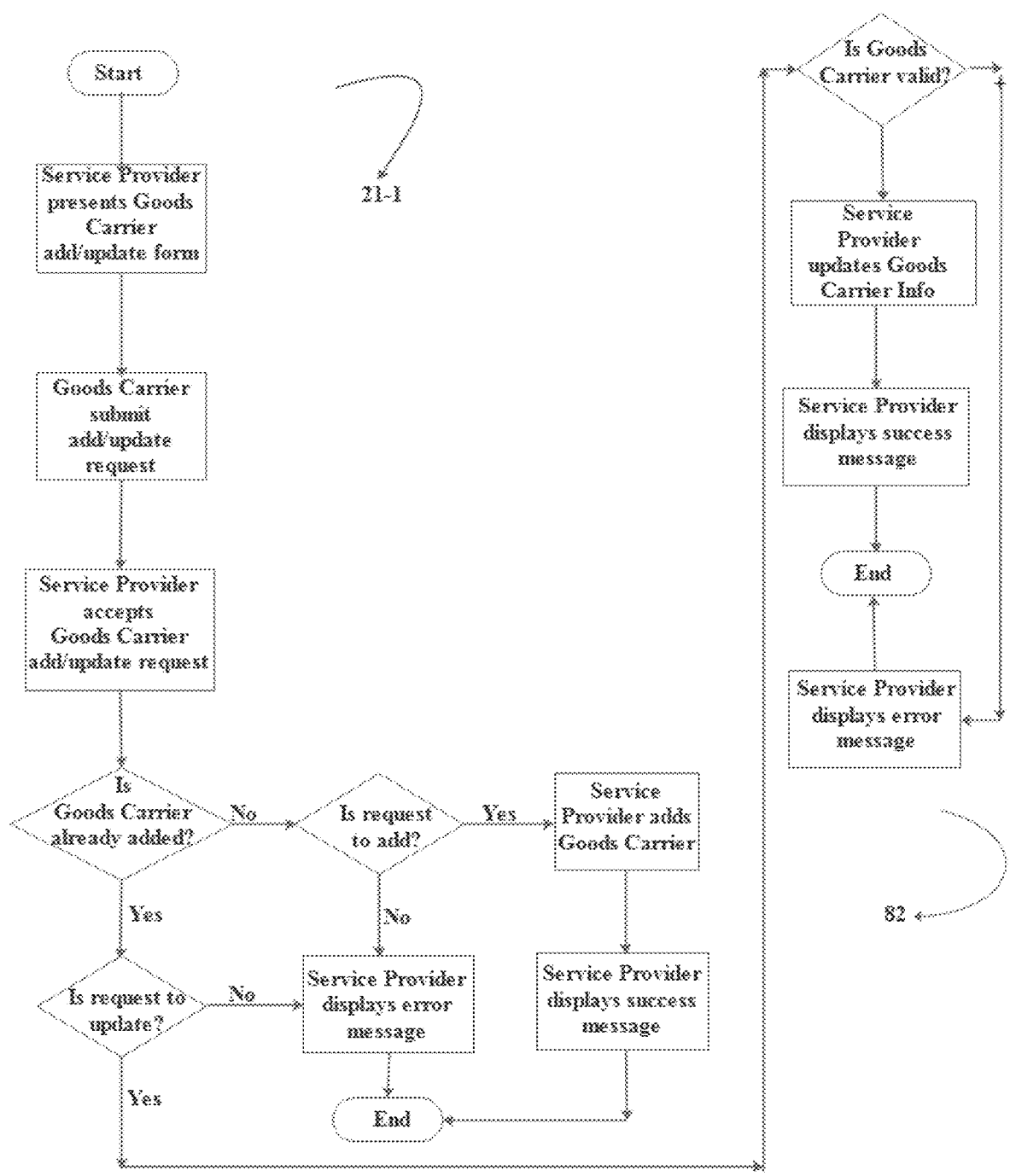
FIG. 21 shows, in a flowchart, an overview of the various steps generally taken in Goods Carrier Registration.

As shown in FIG. 21, the service provider (P) would use the very high-level flow chart 21-1 as per the use case 52 of the present invention for the goods carriers (G) to add/update goods carriers' (G) information. The service provider (P) would provide a form 36-D as shown in FIG. 36-D, in a web site or in a mobile application for the goods carrier (G) to add/update goods carriers' information. Before providing the form 36-D to add/update goods carriers' information, the service provider (P) would require that the goods carrier (G) be authenticated. The goods carrier (G), would be presented with a log-in form 36-L as shown in FIG. 36-L and the goods carrier (G) would use the password provided by the service provider (P) and maintained by the goods carrier (G) to log-in. The goods carrier (G) would enter goods carrier id, location id and password into the log-in form 36-L as shown in FIG. 36-L. If the submitted credentials are valid then the goods carrier (G) would be authenticated, otherwise the service provider would terminate the process. Instead of using user id and password to log-in, goods carrier (G) can also use a mobile authentication application with a biometric verification where the goods carrier (G) would just scan a QR Code displayed on the log-in page as shown in FIG. 36-L to log-in. In either case, if the merchant (M) is authenticated, the service provider (P) would generally continue to populate the fields in the form 36-D as shown in FIG. 36-D, otherwise it will terminate the process. To populate the fields in the form 36-D, the service provider (P) would use the goods carrier id and location id and get the most recent values for the goods carrier id and location id from the goods carrier database (44-10) using the representative schema 29-1 as shown in FIG. 29. If the goods carrier (G) does not exist in the goods carrier database (44-10) then the service provider (P) would populate the fields in the form 36-D with blanks.

Once the form as shown in FIG. 36-D is presented, the goods carrier (G) would enter the required information into appropriate fields and click on submit button. The service provider (P) would validate the submitted information and if the submitted information is valid then the service provider (P) would update the goods carrier database (44-10), otherwise the service provider (P) would terminate the validation process, display an error message and wait to receive the data again. The validation process includes validation of values of each individual field namely status, goods carrier name, location name, contact first name, contact last name, address line 1, address line 2, city, state, zip 1, zip 2, phone, mobile phone number, eMail address, IP address, latitude, longitude, service area (Radius in Miles), authcode API, authentication API, package pickup API and new password. The combination of goods carrier id and location id is unique and provided by service client (P) to each individual goods carrier. If the goods carrier does not have a location, then goods carrier id and location id can be same.

If the status is Active or Inactive then, the validation process will continue otherwise, the validation process will terminate. If the goods carrier name, location name, contact first name or contact last name or email address or address line 1 or the city or the state or state or email address or latitude or longitude or service area (radius in miles) is blank, then the validation process will terminate otherwise it will continue. If email address is a valid email address, then the process will continue otherwise it will terminate. If phone is blank or valid phone number then the validation process will continue, otherwise it will terminate. If mobile phone number is blank or valid mobile phone number then the validation process will continue, otherwise it will terminate. If mobile phone number is not blank and the same mobile phone number is used for more than one goods carrier id and location combination then the validation process will terminate, otherwise it will continue. If authcode API is 'Y' or 'N', then the validation process will continue, otherwise it will terminate. If authentication API is 'Y' or 'N', then the validation process will continue, otherwise it will terminate. If package pickup API is 'Y' or 'N', then the validation process will continue, otherwise it will terminate.

If the validation process terminates anytime during the validation process an error message will be displayed in the form 36-D and the service provider (P) will wait to receive the data again. If the validation process does not terminate and the entered values of all the fields as shown in FIG. 36-D are valid, then the service provider (P) would update the goods carrier database (44-10) as per the schema 29-1 as shown in FIG. 29. If goods carrier Id and location id combination does not exist in the goods carrier database (44-10) then, the goods carrier information will be added in the goods carrier database (44-10) otherwise, the goods carrier information will be updated in the goods carrier database (44-10). If the password is blank, then the last previously set password will be carried forward.

In addition to registering with service providers (P) and adding lockers (L), the locker owner may need from time to time to add/update autocode, and mobile devices.

As shown in FIG. 23, the service provider (P) would use the very high-level flow chart 23-1 as per the use case 54 of the present invention for the consumer locker owners (O) to add/update authcode information for lockers (L). The service provider (P) would provide a form 38-D as shown in FIG. 38-D, in a web site or in a mobile application for the locker owner (O) to add/update authcode information. Before providing the form 38-D to add/update authcode information, the service provider (P) would require that the locker owner (O) be authenticated and a specific locker number and a specific locker side and a specific tracking number is selected. The locker owner (O), would be presented with a log-in form 38-L as shown in FIG. 38-L and the locker owner (O) would use the password provided by the service provider (P) and maintained by the locker owner (O) to log-in. The locker owner (O) would enter locker owner id and password into the log-in form 38-L as shown in FIG. 38-L. If the submitted credentials are valid then the locker owner (O) would be authenticated, otherwise the service provider would terminate the process. Instead of using user id and password to log-in, locker owner (O) can also use a mobile authentication application with a biometric verification where the locker owner (O) would just scan a QR Code displayed on the log-in page as shown in FIG. 38-L to log-in. In either case, if the locker owner (O) is authenticated, the service provider (P) would generally continue otherwise it will display an error message and terminate the process. If the locker number under the locker owner (O) does not exist or if the current status of the locker is not Active in the locker database (44-11), then the process will display an error message and will terminate. If the process continues, the form 38-S as shown in FIG. 38-S will be populated from all the latest rows based owner id, locker number, locker side, tracking number, entry date and entry time where the authentication code status for the selected rows are active from authcode database (44-12). In addition to the selected rows of information the form in 38-S as shown in FIG. 38-S will also be populated with an option to add a new tracking number for each active locker number and active locker side under the owner id. Once the form as shown in FIG. 38-S is presented, the locker owner (O) would select a row using a radio button and click on submit button. The service provider (P) would validate the submitted information and if the submitted information is valid the form 38-D as shown in FIG. 38-D will be populated using the data from authcode database (44-12) based on the selected information and will be presented.

If the locker (L) has more than one bin and if the request type is pick up then then the service provider (P) would provide an option for the locker owner (O) to select a bin number, otherwise the bin number 1 will be automatically be selected by the service provider (P).

When the locker owner (O) selects a tracking number that requires recipient's signature, then the recipient could put their signature with fingers for the tracking number as shown in FIG. 38-S.

When the locker owner (O) selects a goods carrier (G) and if the request type is pick up, then the service provider would display a message whether the pickup request would automatically have sent to the service provider (P).

Once the form as shown in FIG. 38-D is presented, the locker owner (O) would enter the required information into appropriate fields and click on submit button. The service provider (P) would validate the submitted information and if the submitted information is valid then the service provider (P) would update the authcode database (44-12), otherwise the service provider (P) would terminate the validation process, display an error message and wait to receive the data again. The validation process includes validation of values of each individual field namely tracking number, request type, authorization code, expiration date, expiration time, authcode status and usage type.

The combination of locker owner id, locker number, locker side and tracking number is unique to each individual authcode. If the tracking number or authorization code or expiration date or expiration time is blank, then the validation process will terminate otherwise it will continue. If the combination of expiration date and expiration time is valid and is in the future, then the process will continue otherwise it will terminate. If the authorization code status is not Active and if the tracking number for the selected owner id, locker number and locker side exist in the database 44-12 then the process will continue otherwise it will terminate. If the request type is 'D' which stands for delivery or 'P' which stands for pick up, then the validation process will continue otherwise it will terminate. If usage type is single or multiple, then the validation process will continue otherwise it will terminate.

If the validation process does not terminate and the entered values of all the fields as shown in FIG. 38-D are valid, then the service provider (P) would update the authcode database (44-12) as per the schema 31-1 as shown in FIG. 31. If locker owner Id, locker number, locker side and tracking number combination does not exist in the authcode database (44-12) then, the authorization code information will be added in the authcode database (44-12) otherwise, the authorization code information will be updated in the authcode database (44-12).

Figure 24:
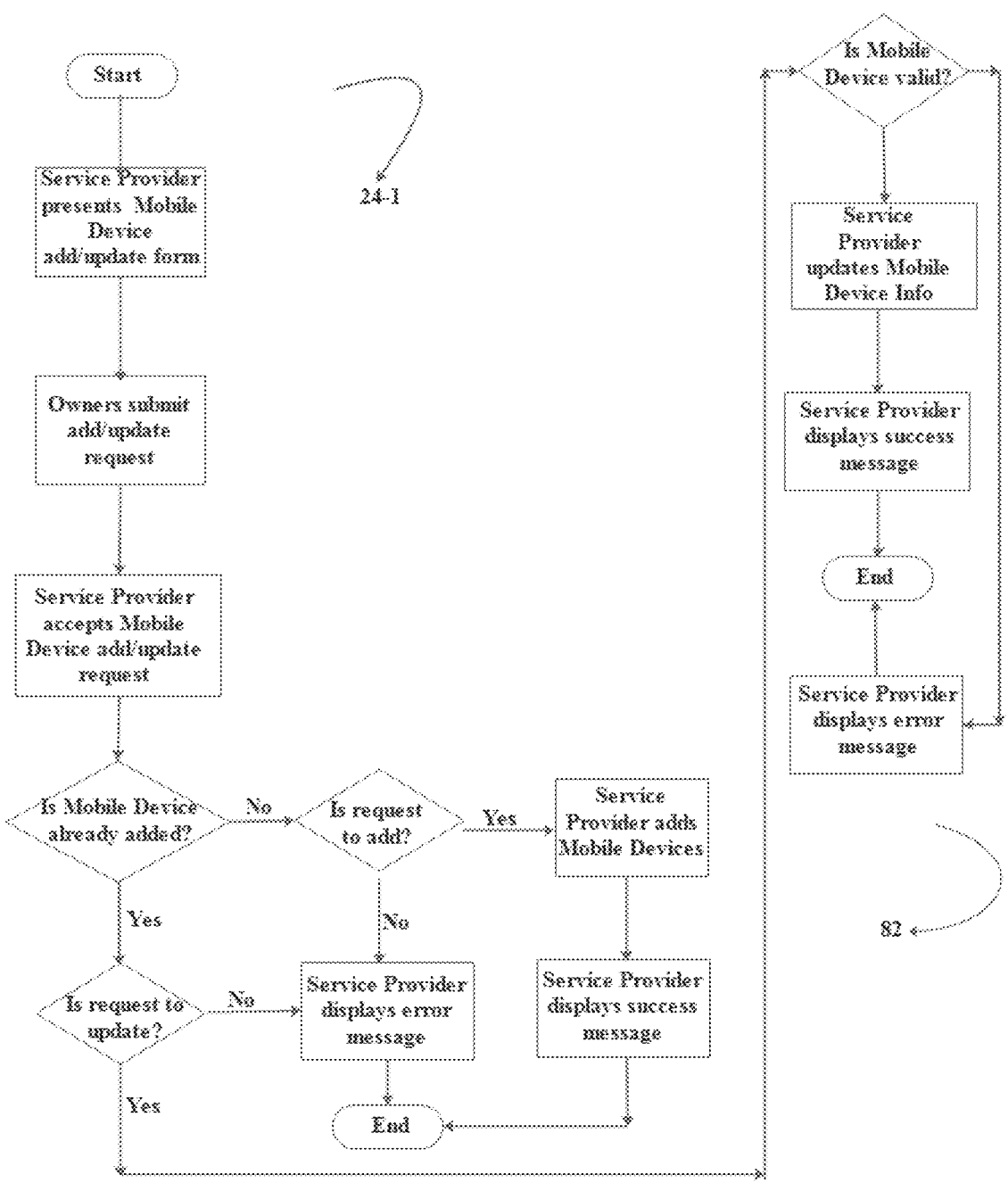
FIG. 24 shows, in a flowchart, an overview of the various steps generally taken in Mobile Device Registration by registered Owners

As shown in FIG. 24, the service provider (P) would use the very high-level flow chart 24-1 as per the use case 55 of the present invention for the consumer locker owners (O) to add/update mobile devices information. The service provider (P) would provide a form 39-D as shown in FIG. 39-D, in a web site or in a mobile application for the locker owner (O) to add/update mobile device information. Before providing the form 39-D to add/update locker information, the service provider (P) would require that the locker owner (O) be authenticated. The locker owner (O) would be presented with a log-in form 39-L as shown in FIG. 39-L and the locker owner (O) would use the password provided by the service provider (P) and maintained by the locker owner (O) to log-in. The locker owner (O) would enter locker owner id password into the log-in form 39-L as shown in FIG. 39-L. If the submitted credentials are valid then the locker owner (O) would be authenticated, otherwise the service provider would terminate the process. Instead of using user id and password to log-in, locker owner (O) can also use a mobile authentication application with a biometric verification such as MslWallet where the locker owner (O) would just scan a QR Code displayed on the log-in page as shown in FIG. 39-L to log-in. In either case, if the locker owner (O) is authenticated, the service provider (P) would generally continue to populate the fields in the form 39-S as shown in FIG. 39-S, otherwise it will terminate the process. If the process continues, the form 39-S as shown in FIG. 39-S will be populated from all the latest rows based on locker owner id and mobile device identification number from mobile device database (44-14). In addition to the selected rows of information the form in 39-S as shown in FIG. 39-S will also be populated with an option to add a new mobile device identification numbers for the locker owner id. Once the form as shown in FIG. 39-S is presented, the locker owner (O) would select a row using a radio button and click on submit button. The service provider (P) would validate the submitted information and if the submitted information is valid the form 39-D as shown in FIG. 39-D will be populated using the data from mobile device database (44-14) based on the selected information and will be presented. If the mobile device identifier under the locker owner (O) does not exist in the mobile device database (44-14) then the service provider (P) would populate the fields in the form 39-D with blanks.

Once the form as shown in FIG. 39-D is presented, the locker owner (O) would enter the required information into appropriate fields and click on submit button. The service provider (P) would validate the submitted information and if the submitted information is valid then the service provider (P) would update the mobile device database (44-14), otherwise the service provider (P) would terminate the validation process, display an error message and wait to receive the data again. The validation process includes validation of values of each individual field namely status, mobile device id, mobile phone number and joint owner yn. If the status is Active or Inactive then, the validation process will continue otherwise, the validation process will terminate. If the mobile phone number is not blank and is a valid phone number, then the validation process will continue otherwise it will terminate. If the joint owner yn is Yes or No, then the validation process will continue, otherwise it will terminate. If the mobile device identifier is being used by a locker owner (O) other than the current locker owner (O) then the validation process will terminate. An active mobile device identifier must be unique and can be assigned only for a specific locker owner (O) and cannot exist in both locker owner database 44-8 and mobile device database (44-14). If the mobile phone number is being used by a locker owner other than the current locker owner (O) then the validation process will terminate. An active mobile phone number must be unique and can be assigned only for a specific locker owner (O) and cannot exist in both locker owner database 44-8 and mobile device database (44-14).

If the validation process does not terminate and the entered values of all the fields as shown in FIG. 39-D are valid, then the service provider (P) would update the mobile device database (44-14) as per the schema 33-1 as shown in FIG. 33. If locker owner Id and mobile device identifier combination does not exist in the mobile device database (44-14) then, the mobile device information will be added in the mobile device database (44-14) otherwise, the mobile device information will be updated in the mobile device database (44-14).

In addition to registering with service providers (P), the merchants (M) and/or goods carriers (G) may need from time to time to add/update autocode using an API provided by the service providers (P).

As shown in FIG. 25, the service provider (P) would use the very high-level flow chart 25-1 as per the use case 56 of the present invention for the merchants (M) or goods carriers to request for an authcode. Upon receiving a request from the merchants (M) or goods carriers (G) for an authcode, the service provider (P) would process the request as explained in Authcode API process under API Gateway section and return a response.

In addition to registering with service providers (P), the merchants and goods carriers may need from time to time to add/update authentication using an API provided by the service providers (P).

As shown in FIG. 26, the service provider (P) would use the very high-level flow chart 26-1 as per the use case 57 of the present invention for the merchants (M) or goods carriers to submit an advance authentication request for a specific lock where the lock is referenced by a serial number. When an advance authentication flag is set to 'Y' for any lock then any human or drone or delivery truck can open the door connected to the lock without entering authcode in the keypad before the advance authentication flag expires. Upon receiving a request for an advance authentication from the merchants (M) or goods carriers (G), the service provider (P) would process the request as explained in Authentication API process under API Gateway section and return a response.

As shown in FIG. 41, the service provider (P) would provide a mobile app for the consumer locker owners (O), joint owners and authorized users (U) to request for an advance authentication in case of networked locks or to retrieve authcode in case of standalone locks. The mobile app would capture locker number and optionally a tracking number and would submit the mobile app request thru mobile app gateway to the service provider (P) and would receive a successful or error response. If the response is successful then the requestor (consumer locker owners (O), joint owners and authorized users (U)) would receive instructions on how to open the locker. The details of mobile app and the corresponding processing of the mobile app request by the service provider (P) is further explained under Mobile App Gateway section.

Continuing then with an example generally described with respect to FIG. 44, further details of the implementation are now described by way of the following detailed description of a possible use of the implementation for processing a delivery and/or pickup goods, which, for purposes of the example, shall be taken pertaining to a delivery or pickup order being conducted with a merchant (M) or a goods carrier (G).

When a delivery order is conducted, the entity initiating the delivery order with a merchant (M) or with a goods carrier (G) would provide the information about the location of the entity receiving the goods pertaining to the delivery order. The entity initiating the delivery order with a merchant (M) or with a goods carrier (G) would be referred as buyer, the merchant (M) or the goods carrier (G) participating in the delivery order would be referred as seller, the entity receiving the goods pertaining to the delivery order would be referred as recipient and the person making the deliveries, if any, would be referred as package handler. In some instances, the buyer and the recipient would be one and the same.

When the delivery order is concluded, the buyer would receive the name of the goods carrier (G), the tracking number and the package size and the buyer would forward the name of the goods carrier (G), the tracking number and the package size to the recipient.

The recipient, upon receiving the details about the delivery order, would start a decision process of whether any special delivery instructions have to be printed on the shipping label.

If the recipient decides, for any reason, that a specific locker identified by a locker number must be used for the delivery order then the recipient would decide to print delivery instructions on the shipping label and end the decision process.

If the decision process continues and if the recipient is using a standalone locker and has posted instructions near the standalone locker on how to determine a one-time default authorization code based on the tracking number then the recipient would simply program the standalone lock attached to the front side door of the locker with a one-time default authorization code specific for the tracking number, optionally would add the one-time default authorization code specific for the tracking number in the authcode database 44-10 using the service provided forms 38-L, 38-S and 38-D as shown in FIGS. 38-L, 38-S and 38-D respectively and the recipient would decide not to print special delivery instructions on the shipping label and end the decision process.

If the decision process continues and if the recipient is using a networked locker, then the recipient need to know whether the goods carrier (G) support authentication API so that the front door of the networked locker can be opened without a code being entered in the kay pad 10-13 as shown in FIG. 10. In order for the recipient to know whether the goods carrier (G) support authentication API or not, the recipient would use the form 40-L and 40-D.

The service provider (P) would provide information 40-D as shown in FIG. 40-D, in a web site or in a mobile application for the locker owner (O) to know whether the goods carrier (G) would support authentication API or not. Before providing the information 40-D, the service provider (P) would require that the recipient be authenticated. The recipient would be presented with a log-in form 40-L as shown in FIG. 40-L and the recipient would use the password provided by the service provider (P) and maintained by the recipient to log-in. The recipient would enter locker owner id password into the log-in form 40-L as shown in FIG. 40-L. If the submitted credentials are valid then the recipient would be authenticated, otherwise the service provider would terminate the process. Instead of using user id and password to log-in, recipient can also use a mobile authentication application with a biometric verification such as MslWallet where the recipient would just scan a QR Code displayed on the log-in page as shown in FIG. 40-L to log-in. In either case, if the recipient is authenticated, then the service provider (P) would generally continue to populate the fields in the information 40-D as shown in FIG. 40-D, otherwise it will terminate the process. If the process continues, the information 40-D as shown in FIG. 40-D will be populated from the latest row in goods carrier (G) database 44-10 based for a specific goods carrier (G). If the goods carrier (G) support authentication API, then the recipient would decide not to print any special delivery instructions on the shipping and end the decision process.

If the decision process continues or if the recipient decided to print special instructions on the shipping label then the recipient would start the delivery instructions printing process, otherwise the recipient would not start the delivery instructions printing process.

If the recipient starts delivery instructions printing process and if the seller is a merchant (M) and if the buyer and the recipient are one and the same and if the merchant (M) accepts delivery instructions where the delivery instructions would be printed on the shipping label, then the recipient would have an option to provide the delivery instructions to the merchant (M), otherwise the recipient would not have an option to provide the instructions to the merchant (M).

If the delivery instructions printing process continues and if the recipient did not have an option to provide the delivery instructions and if the goods carrier (G) accepts delivery instructions where the delivery instructions would be printed on the shipping label, then the recipient would have an option to provide the instructions to the goods carrier (G).

If the delivery instructions printing process continues and if the recipient has an option to provide delivery instructions to a merchant (M) or a goods carrier (G) then the delivery instructions printing process would continue, otherwise it will terminate.

If the delivery instructions printing process continues, then the recipient would start the process of providing delivery instructions to a merchant (M) or to a goods carrier (G) where the merchant (M) or the goods carrier (G) would be referred as seller. For the seller to start the process of accepting delivery instructions, the seller would provide a web site and/or a mobile app and/or an interactive voice response system and/or a text message option for the recipients to provide a tracking number, optional lock serial number where the lock serial number is the serial number of the lock controlling the front door of a locker and optional delivery instructions. If the optional lock serial number is not blank, then the optional delivery instructions must be blank. The seller would verify that the recipient is a registered customer of the seller by requiring the recipient to log into seller's web site using a user id and password or by some kind of authentication method. Upon successful verification of the recipient, the seller would verify that the address of the recipient in sellers' database matches the delivery address of the delivery order pertaining to the tracking number. Upon successful verification of the recipient and the tracking number the seller would continue the process of accepting delivery instructions otherwise it would terminate the process.

If the process of accepting delivery instructions continues, the seller would verify the delivery instructions and the lock serial number. If the delivery instructions are not blank and if the lock serial number is also not blank, then the seller would notify the recipient that the lock serial number must be blank when the delivery instructions is not blank, and the seller would terminate the process of accepting delivery instructions. If the process of accepting delivery instructions continues and if the delivery instructions is not blank, then the seller would save the delivery instructions, end the process of accepting delivery instructions and would print the delivery instructions on the shipping label pertaining to the tracking number.

If the process of accepting delivery instructions continues and if the seller is registered with a service provider (P) and the seller is authorized to submit an authcode request thru an API, then the seller would continue the process of accepting delivery instructions otherwise the seller would terminate the process of accepting delivery instructions.

If the process of accepting delivery instructions continues, then the seller would submit the authcode request based on the API specification as shown in FIG. 42-A and the submitted authcode request would be processed by the service provider (P) as explained in Authcode API Process under API Gateway.

Upon receipt of a response to an authcode request, the merchant (M) or the goods carrier (G) would save the values of variables received in the response namely RequestorType, RequestorId, RequestorSubId, ReturnCode, SuccessMsg, ErrorMsg, TrackingNumber, LockSerialNumber, Latitude, Longitude, DroneYN, TruckYN and ManualYN and start a validation process. If the seller was a merchant (M) then the merchant (M) would verify that the RequestorType is 'M', the RequestorId is their merchant id and the RequestorSubId is their location id. If the seller was a goods carrier (G) then the goods carrier (G) would verify that the RequestorType is 'G', the RequestorId is their goods carrier id and the RequestorSubId is their location id. Then the seller would verify that the TrackingNumber is the same tracking number as the seller submitted in the authcode request. If the verification is successful, then the seller would determine whether the request was successful or not based on the ReturnCode. If the ReturnCode is '1', then the request is successful, and the seller would print the text received in SuccessMsg on the shipping label and would fill in the delivery instructions check box to indicate that delivery instructions has already been printed and would not disclose the content of the SuccessMsg to the buyer, because it may contain authcode to open the locker.

If the ReturnCode is not '1' then the request is not successful, and the seller would disclose the ErrorMsg to the buyer and will not print the text in the shipping label. A sample of a shipping label with a SuccessMsg printed on the label is shown in FIG. 46.

The service provider would respond with an error or success message based on the validation process and the format of error or success message would be based on the schema 42-R as shown in FIG. 42-R and would be in the same format of the authcode request message. An example in xml format 42-R as shown in FIG. 42-R where if the value of ReturnCode is '1', then the request is successful and if the ReturnCode is anything other than then the request is not successful.

If the recipient decided to print special instructions on the shipping label but the recipient was not able to print special instructions. the recipient decided to use a networked locker and the recipient has posted instructions near the networked locker on how to determine a one-time default authorization code based on the tracking number, then the recipient would add the one-time default authorization code specific for the tracking number in the authcode database 44-10 using the service provided forms 38-L, 38-S and 38-D as shown in FIGS. 38-L, 38-S and 38-D respectively.

When a package pick-up is requested, the entity requesting the package pick up with a goods carrier (G) would provide the information about the location of the entity requesting the package pick up. The entity initiating the package pick up with a goods carrier (G) would be referred as shipper, the goods carrier (G) participating in the package pick up would be referred as goods carrier. The shipper must select a locker and optionally a bin number to leave the package where the package will fit in the locker based on the package size and on the locker size and a goods carrier (G) for the goods carrier to pick up the package.

If the goods carrier (G) is registered with the same service provider (P) as the shipper is registered with and if the registered goods carrier (G) also accepts the package pick up request through authcode information forms 38-L, 38-S and 38-D as shown in FIGS. 38-L, 38-S and 38-D respectively provided by service provider (P), then the goods carrier (G) can accept the package pick up request from the shippers through the authcode information forms. In order, for the shipper to know whether the goods carrier (G) has opted to accept package pickup request from service provider (P) or not, the shipper would use the form 40-L and 40-D provided by the service provider (P) as shown in FIGS. 40-L and 40-D respectively.

If the goods carrier (G) is registered with the same service provider (P) as the shipper is registered with and if the registered goods carrier (G) can also submit authentication request to the service provider (P) thru an authentication API as shown in 43-A in FIG. 43-A and receive a response from the service provider (P) as shown in 43-R in FIG. 43-R, then the shipper need not provide the tracking number to the goods carrier (G) when the shipper is requesting for a package pick up.

In order, for the shipper to know whether the goods carrier (G) has opted to submit authentication API or not, the shipper would use the form 40-L and 40-D provided by the service provider (P) as shown in FIGS. 40-L and 40-D.

The pickup request process would start with the shipper selecting a locker based on package size and the locker size. If the shipper is able to select a locker that would fit the package, then pick up request process will continue, otherwise it will terminate.

If the pickup request process continues and if the selected locker is a standalone locker, the goods carrier (G) is registered with the same service provider (P) as the shipper is registered with and the goods carrier (G) can also submit authentication API then the shipper would manually program the lock controlling the front door of the selected locker with a random code, save the random code as one-time authcode for future use.

If the pickup request process continues and a one-time authcode for future use has not been saved and if the selected locker is a standalone locker then the shipper would manually program the lock controlling the front door of the selected locker with default authorization code where the default authorization code is based on the tracking number and a pre-determined pattern posted near the locker, save the default authorization code as one-time authcode for future use.

If the pickup request process continues and a one-time authcode for future use has not been saved and if the selected locker is a networked locker, the goods carrier (G) is registered with the same service provider (P) as the shipper is registered with and the goods carrier (G) can also submit authentication API then save a blank value as one-time authcode for future use.

If the pickup request process continues and a one-time authcode for future use has not been saved and if the selected locker is a networked locker then the shipper would determine default authorization code where the default authorization code is based on the tracking number and a pre-determined pattern posted near the locker, save the default authorization code as one-time authcode for future use.

If the pickup request process continues and a one-time authcode for future use has been saved, then the shipper would add authcode information into authcode database 44-12 using the authorization information forms 38-L, 38-S and 38-D provided by service provider (P) and as shown in FIG. 38-L, 38-S AND 38-D. If the, goods carrier (G) has accepted the package pick up request through the authcode information forms then the pickup request process will end.

If the pickup request process continues and a one-time authcode for future use has been saved, then the shipper would request the goods carrier (G) for a package pick up. If the one-time authcode saved for future use is same as default authorization code for the tracking number, then the shipper would also provide the tracking number to the goods carrier (G).

Once a delivery or pickup order has been initiated, the process of delivering or picking up the package begins. In case of delivery, the merchant (M) would hand over the packages to the goods carrier (G) and if the shipping label of the package to be delivered does not have any special delivery instructions printed on the shipping label then the shipper might use authcode API to print any special delivery instructions.

Before initiating the process of delivering or picking up goods, however, the goods carrier (G) must schedule and commit the resources for a package delivery or pick up. In order to schedule and commit the resources, the goods carrier (G) has to determine the type of the resource to be used for each the package delivery or pick up. In general, the available types of services for goods carriers (G) are manual, drone and truck where the available types of services are not limited to only manual, drone and truck. The cost associated in each type of resource for delivering or picking up packages could vary considerably and also the level of service provided under each type of service also could vary considerably. For example, delivering and picking up a few packages at a time, the best type of service would be drone, if a recipient's locker can accept drone deliveries and pickups. At the same time the size and weight of package may restrict the use of drones.

In any event, in order for the goods carrier (G) to determine the type of service to be used, for each package, the goods carrier (G) could use authcode request API using an accesstype 'I'. Also, in case of drone or truck delivery, the goods carrier (G) might want the exact location of the locker rather than the general location of the locker owner. By using the authcode request API, the goods carrier (G) could determine the best type of service for each package to be delivered and picked up, lockserialnumber, lockerlatitude and lockerlongitude. If a specific type of service cannot be determined, then the goods carrier (G) can use a default type of service where the default type of service may vary from one goods carrier (G) to another and in general the default type of service could be manual.

Once the type of service for delivery and pick up packages have been determined then the delivery and pick up packages that are marked to use manual service would be handed over to delivery persons, the delivery and pick up packages that are marked to use done service would be loaded into drones and the delivery and pick up packages that are marked to use truck service would be loaded into trucks where the trucks can be driver driven or driver less.

The delivery person could use any means such as by foot or by vehicles such as delivery trucks to locations where the packages have to be delivered or to be picked up manually. The legal resident of package delivery or pick up location would have installed locker as shown in FIGS. 11 thru 14 and/or a lock to a door to a common area as shown in FIG. 16 and/or a lock to a fence gate as shown in FIG. 17 or a lock to a garage door as shown in FIG. 18 where the locker or door to common area or fence gate or garage door will be referred generally as locker where at least one the locker would be configured to manual access. Upon arriving at a package delivery or pick up location, the delivery person would follow directions posted at the delivery or pick up location to a specific locker based on the directions printed on the shipping label. If no directions are printed on the shipping label, then the delivery person can follow the directions posted at the delivery or pick up location to locate a locker. If no directions are printed on the shipping label and no directions are posted at the delivery or pick up location, then the delivery person would go to the main entrance or the front door of the location to locate a locker or get directions to a locker. Once a locker has been located the delivery person would determine on how to open the locker to leave the packages to be delivered or to pick up packages for shipping.

If the delivery person does not have a mobile device with an application loaded from the goods carrier (G) or from service provider (P) then the delivery person would locate a pre-determined pattern posted near the locker to determine a default authorization code based on the tracking number. If such a pre-determined pattern is posted and the delivery person is able to locate such a pre-determined pattern, then the delivery person would determine a default authorization code based on the tracking number and the pre-determined pattern, enter the default authorization code in the key pad attached to the locker and press the Non-Administrator UNLOCK button attached to the locker to unlock the locker. The Non-Administrator UNLOCK button may be labelled as 'UNLOCK' and will be accessible to delivery persons.

When the Non-Administrator UNLOCK button is pressed the controller attached to the Non-Administrator UNLOCK button would communicate with the service provider through controller gateway and receive a response. Upon receiving a request from the controller, the service provider (P) would process the request as explained in Controller Gateway section and return a response.

If the controller receives an approval response, then the controller would unlock the lock attached to the controller and would indicate the approval response to the delivery man through the LED indicator attached to the controller by blinking the LED indicator in green color.

If the controller receives a decline response, then the controller would indicate the decline response to the delivery man through the LED indicator attached to the controller by blinking the LED indicator in red color.

If the delivery person is able to unlock the locker then the delivery person would pick up the package for shipping and leave the package to be delivered inside the locker. If the delivery person is able to unlock the locker and if the tracking number is for a package delivery with a signature and if the recipient did not leave a delivery request with a signature, then the delivery person may not leave the package inside the locker. If the delivery person is unable to unlock the locker or if such a pre-determined pattern is not posted near the locker or the delivery person is unable to locate such a pre-determined pattern near the locker, then the delivery person would follow the directions from the goods carrier (G) which direction might be to leave the delivery package near the locker or take the delivery package back. If the delivery person is unable to unlock the locker, then in case of a package pick up the delivery person would leave without picking up the package for shipping.

If the delivery person has a mobile device with an application loaded from the goods carrier (G) or from service provider (P) then the delivery person would use the mobile application to scan or enter a tracking number and capture the identification data from the locker by scanning a QR Code displayed on the locker or by placing the mobile device near the locker. In case of package pick up the delivery person may not have a tracking number and may not scan or enter a tracking number. If the delivery person does not scan or enter a tracking number, then the mobile application would use a blank for tracking number. Once the mobile application receives the tracking number and captures the identification data from the locker, the mobile application would communicate with a server as per the instructions in the mobile application program. The server could be the goods carrier (G) server, if the mobile application was provided by the goods carrier (G) or the server could be service provider's (P) server if the mobile application was provided by the service provider (P).

If the mobile application is programmed to communicate with a goods carrier (G) server then the mobile application would communicate with the goods carrier (G) server where the goods carrier server (G) would communicate with the service provider's (P) server using the authentication API based on the specifications provided by the service provider (P) as shown in FIG. 43-A to request for advance authentication for the locker and receive a success or error message from the service provider (P) as shown in FIG. 43-R where the success or error message would be forwarded to the mobile application by the goods carrier (G). The service provider (P) would process the authentication request as explained in Authentication API Process under API Gateway.

If the mobile application is programmed to communicate with service provider (P) server then the mobile application would communicate with the service provider (P) server with a request for advance authentication for the locker and receive a success or error message from the service provider (P). The service provider (P) would process the mobile application request as explained in Mobile App Gateway.

Upon receiving a success or error response, the mobile application would display the same on the mobile device so that the delivery person can follow the directions. If the delivery person receives an error message and if the error message re-directs the delivery person to a different locker that can be used for the delivery or pick up, then the delivery person would locate the different locker. The delivery person upon locating the different locker would start the process of using the mobile application again to get a tracking number and to capture the identification data of the locker and follow the instructions received in response.

If a manual entry of a code in the key pad is required, then the code will be included in the success message. If recipient's signature is required for a package delivery then the success message would also include recipient's signature where the recipient's signature was provided by the recipient when the recipient added the authorization request using service provider (P) provided forms 38-L, 38-S and 38-D.

If the tracking number, used in the advanced authentication request, required recipient's signature as indicated by the goods carrier (G), then delivery person would confirm that the recipient's signature is included in the success message.

If the success message did not include the recipient's signature where the signature was required, then the delivery person would not press the Non-Administrator UNLOCK button to unlock the locker.

In case of package pick up, if the package has to be picked up from a specific bin within the locker, then the success message would also include the bin number.

When the Non-Administrator UNLOCK button is pressed the controller attached to the Non-Administrator UNLOCK button would communicate with the service provider (P) through controller gateway and receive a response. Upon receiving a request from the controller, the service provider (P) would process the request as explained in Controller Gateway section and return a response.

If the controller receives an approval response, then the controller would unlock the lock attached to the controller and would indicate the approval response to the delivery man through the LED indicator attached to the controller by blinking the LED indicator in green color.

If the controller receives a decline response, then the controller would indicate the decline response to the delivery man through the LED indicator attached to the controller by blinking the LED indicator in red color.

If the delivery person has unlocked the locker then the controller may be programmed to lock itself after a brief period to time say for example in 30 seconds. The delivery person can also lock the locker by pressing the Non-Administrator LOCK button if the Non-Administrator LOCK button is accessible to the delivery person. Upon receiving a request from the controller, the service provider (P) would process the request as explained in Controller Gateway section and return a response.

If the controller receives an approval response, then the controller would Lock the lock attached to the controller and would indicate the approval response to the delivery man through the LED indicator attached to the controller by blinking the LED indicator in green color.

If the controller receives a decline response, then the controller would indicate the decline response to the delivery man through the LED indicator attached to the controller by blinking the LED indicator in red color.

Before leaving the goods carrier (G) package distribution center, the drone (D) would communicate with the goods carrier (G) using authcode API using an inquire option to get LockSearialNumber, LockerLatitude, LockerLongitude and DroneYN information. If the information is not available, then the drone (D) would communicate with the goods carrier (G) using authcode API using an add option for drone access to get LockSearialNumber, LockerLatitude, Locker-Longitude and DroneYN information. If the information is available and if the value for DroneYN is 'Y' for each TrackingNumber then the drone (D) would accept those requests to make a delivery or to pick up package using drone. The LockSearialNumber is same as the front side lock serial number of the locker. Upon the drone (D), arriving at a specific locker location, the drone (D) would start the process of delivering the packages to the specific locker and/or picking up the packages from the specific locker. The various parts of the drone 4-11 and the drone locker 47-2 are shown in FIG. 47. Upon the drone (D) 47-11 arriving at a specific locker location, the drone (D) 47-11 would land at the specific locker location such a way that the packages to be delivered can be delivered into the locker and packages to be picked up can be picked up from the locker. In order for the drones (D) 47-11 to land correctly above the front door of the locker that consist of a longer portion 47-4 and a shorter portion 47-5 with a pivot 47-3 separating them, the locker may have one or more beacons installed on the locker and the drone (D) may have one or more Bluetooth readers installed on the drone.

The drone (D) would position itself where all 4 Bluetooth readers 47-14, 47-15, 47-16 and 47-17 installed at the four corners of the drone (D) are collectively at the middle of all 4 beacons 47-7, 47-8, 47-9 and 47-10 installed at the four corners of the front side of the locker or all 4 beacons 47-7, 47-8, 47-9 and 47-10 installed at the four corners of the front side of the locker are collectively at the middle of all 4 Bluetooth readers 47-14, 47-15, 47-16 and 47-17 installed at the four corners of the drone (D) without knocking over the locker. In order, to avoid knocking over the locker and also to measure the distance between the drone (D) and the locker, the 4 Bluetooth readers 47-14, 47-15, 47-16 and 47-17 installed at the four corners of the drone (D) would also measure the strength of signals received from the 4 beacons installed 47-7, 47-8, 47-9 and 47-10 at the four corners of the front side of the lockers. Once the drone (D) 47-11 reaches to the closest possible position from the locker 47-2 and also the drone (D) 47-11 positions itself in the center of the locker 47-2 the drone (D) would move up, down, left or right to make the Bluetooth reader 47-16 installed at the south east corner of the drone (D) 47-11 to be at the closest possible position to the beacon 47-9 installed at the south east corner of the front side of the locker that transmits the front side lock serial number plus a text of 'BR'. Once the drone (D) 47-11 positions itself on top of the locker 47-2, the drone (D) 47-11 would move higher to give enough space for the longer portion 47-4 to open. Once the drone (D) 47-11 finds the locker and position itself above the locker 47-2 as required, the delivery and/or pick up process would continue, otherwise it would terminate.

If the delivery and/or pick up process continues, then the drone would communicate with the goods carrier (G) and provide LockSerialNumber and TrackingNumber and request for an advance authentication. The goods carrier (G) would than submit an authentication request using authentication API as shown in FIG. 43-A and receive a response from the service provider (P) as shown in FIG. 43-R. The goods carrier (G) would then forward the response to the drone. If the response is a successful response, then the response would also include a recipient's signature, if a signature is required for any packages to be delivered. If the drone receives a successful response, then the delivery and/or pick up process will continue, otherwise it will terminate.

If the delivery and/or pick up process continues, then the drone would press down the retractable or fixed plunger 47-13, so that the plunger tip 47-20 would press the non-administrator UNLOCK switch 47-6 down which would trigger the controller connected to the non-administrator UNLOCK switch 47-6 to send the request to the service provider (P) and receive a response as explained in Controller Gateway section. If the response is successful then the longer portion of front door on the locker would open and the delivery and/or pick up process will continue, otherwise it will terminate.

If the delivery and/or pick up process continues and if a package has to be delivered, then the drone would select the package from the payload area and drop it inside the drone locker. If the delivery and/or pick up process continues and if a package has to be picked up, then the drone would pick up the package from the locker and place inside the payload area. In case of package pick up, if the package has to be picked up from a specific bin, then the drone would pick up the package from the specified bin inside the drone locker.

If the delivery and/or pick up process continues, then the drone would pick up any packages that are to be picked up from the locker. If the locker has more than one bin, then each bin would have a beacon and the drone would pick up the package, if any, from the bin. If the locker has only one bin, then the drone would pick up the package from the single bin. Then the drone would deliver the packages to be delivered, if any. If the drone is capable of handling more than one delivery package, then the drone would use a vertical or horizontal endless chain with hanging bins. Then the drone would select the package to be delivered from the hanging bins. If the drone is unable to pick up any package to be picked up and/or unable to deliver any package to be delivered, then the drone would terminate the delivery and/or pick up process, otherwise the drone would end the delivery and/or pick up process.

If the delivery and/or pick up process is terminated, then the drone would notify the goods carrier (G). If the delivery and/or pick up process is terminated or ended, the drone would leave the locker location.

Before leaving the goods carrier (G) package distribution center the truck (T) would communicate with the goods carrier (G) using authcode API using an inquire option to get LockSearialNumber, LockerLatitude, LockerLongitude and TruckYN information. If the information is not available or if the value for TruckYN is not 'Y' for any TrackingNumber then the truck (T) would accept those requests to make a delivery or to pick up package. The LockSearialNumber is same as the front side lock serial number of the locker.

Upon the truck (T), arriving at a specific locker location, the truck (T), would start the process of delivering the packages to the specific locker and/or picking up the packages from the specific locker. The various parts of the truck 4-11 and the curbside locker 47-2 are shown in FIG. 47. Upon the truck (T), 47-11 arriving at a specific curbside locker location, the truck (T), 48-11 would land at the specific locker location such a way that the packages to be delivered can be delivered into the curbside locker and packages to be picked up can be picked up from the curbside locker. In order for the trucks (T), 48-11 to park such a way that the opening in the truck, for packages passage, face the front door of the curbside locker that consist of a longer portion 48-4 and a shorter portion 48-5 with a pivot 48-3 separating them, the curbside locker may have one or more beacons installed on the curbside locker and the truck (T), may have one or more Bluetooth readers installed on the truck opening.

The truck (T), would position itself where all 4 Bluetooth readers 48-14, 48-15, 48-16 and 48-17 installed at the four corners of the opening of the package passage are collectively at the middle of all 4 beacons 48-7, 48-8, 48-9 and 48-10 installed at the four corners of the front side of the curbside locker or all 4 beacons 48-7, 48-8, 48-9 and 48-10 installed at the four corners of the front side of the curbside locker are collectively at the middle of all 4 Bluetooth readers 48-14, 48-15, 48-16 and 48-17 installed at the four corners of the truck without knocking over the locker. In order to avoid knocking over the locker and also to measure the distance between the truck (T), and the locker, the 4 Bluetooth readers 48-14, 48-15, 48-16 and 48-17 installed at the four corners of the truck (T) opening for package passage would also measure the strength of signals received from the 4 beacons installed 48-7, 48-8, 48-9 and 48-10 at the four corners of the front side of the curbside lockers. Once the truck (T), 47-11 reaches to the closest possible position from the curbside locker 48-2 and also the truck (T), 48-11 positions itself in the center of the curbside locker 48-2 the truck (T), would move to make the Bluetooth reader 48-16 installed at the bottom left corner of the truck (T), 48-11 to be at the closest possible position to the beacon 48-9 installed at the bottom left corner of the front side of the curbside locker that transmits the front side lock serial number plus a text of 'BL'. Once the truck (T), 48-11 positions itself in front of the curbside locker 48-2, the truck (T), 48-11 would move give enough space for the longer portion 47-4 to open. Once the truck (T), 48-11 finds the curbside locker and position itself in front of the curbside locker 48-2 as required, the delivery and/or pick up process would continue, otherwise it would terminate.

If the delivery and/or pick up process continues, then the truck (T) would communicate with the goods carrier (G) and provide LockSerialNumber and TrackingNumber and request for an advance authentication. The goods carrier (G) would than submit an authentication request using authentication API as shown in FIG. 43-A and receive a response from the service provider (P) as shown in FIG. 43-R. The goods carrier (G) would then forward the response to the drone. If the response is a successful response, then the response would also include a recipient's signature, if a signature is required for any packages to be delivered. If the truck (T) receives a successful response, then the delivery and/or pick up process will continue, otherwise it will terminate.

If the delivery and/or pick up process continues, then the truck (T) would push the retractable plunger 48-13, so that the plunger tip 48-20 would push the non-administrator UNLOCK switch 48-6 inside which would trigger the controller connected to the non-administrator UNLOCK switch 48-6 to send the request to the service provider (P) and receive a response as explained in Controller Gateway section. If the response is successful then the longer portion of front door on the locker would open and the delivery and/or pick up process will continue, otherwise it will terminate.

If the delivery and/or pick up process continues and if a package has to be delivered, then the drone would select the package from the payload area and drop it inside the curbside locker. If the delivery and/or pick up process continues and if a package has to be picked up, then the truck (T) would pick up the package from the curbside locker and place inside the payload area. In case of package pick up, if the package has to be picked up from a specific bin, then the truck (T) would pick up the package from a specified bin inside the curb side locker.

If the delivery and/or pick up process continues, then the truck would pick up any packages that are to be picked up from the curbside locker. If the curbside locker has more than one bin, then each bin would have a beacon and the truck (T) would pick up the package, if any, from a particular bin. If the curbside locker has only one bin, then the drone would pick up the package from the single bin. Then the truck (T) would deliver the packages to be delivered, if any. If the drone is unable to pick up any package to be picked up and/or unable to deliver any package to be delivered, then the truck (T) would terminate the delivery and/or pick up process, otherwise the truck (T) would end the delivery and/or pick up process.

If the delivery and/or pick up process is terminated, then the truck (T) would notify the goods carrier (G). If the delivery and/or pick up process is terminated or ended, the truck (T) would leave the curbside locker location.

Controller Gateway:

Service provider (P) can accept request from 4 distinctly different buttons namely Non-Administrator UNLOCK, Non-Administrator LOCK, Administrator UNLOCK and Administrator LOCK. The service provider (P), at a minimum, would receive the lockserialnumber, key pad entry and the identification of the button that initiated the request from a controller. The key pad entry may be blank or a text. If the requestor entered a value in the key pad then the key pad entry will be the text that was entered into the key pad, otherwise it will be blank. The key pad may support only numbers with back and cancel buttons or it may support alpha numeric characters with back and cancel buttons. So, the key pad entry may be blank or numbers or text. The value or identification of button would depend on the button that initiated the request. If Non-Administrator UNLOCK button initiated the request, then the value of identification of the button would be 'N'. If Non-Administrator LOCK button initiated the request, then the value of identification of the button would be 'O'. If Administrator UNLOCK button initiated the request, then the value of identification of the button would be 'U'. If Administrator LOCK button initiated the request, then the value of identification of the button would be 'L'. So, if the value of the identification of button is 'N' or 'O' or 'U' or 'L', then the service provider (P) would start a verification process, otherwise the service provider (P) would respond with an error message.

If a verification process is started, the service provider (P) would retrieve the most recent row of information from locker database 44-11 by using the lock serial number received from the controller associated with the valid request by matching the lock serial number with front side lock serial number or by matching the lock serial number with back side lock serial number of the locker database 44-11. If one row of information is retrieved and if the value of status in the retrieved row is 'A', then the verification process will continue, otherwise it will terminate.

If the verification process continues then the service provider (P) would verify the owner of the locker determined by the one row of information received from the locker database 44-11. If the owner id in the one row of information received from the locker database 44-11 consists 3 segments separated by '-' and the value in the first segment is 'M', then the service provider (P) would use merchant database 44-9 using the value in the second segment as merchant id and the value in the third segment as location id, otherwise the service provider would use the owner database 44-8 using the value the owner id in the one row of information received from the locker database 44-11. If the service provider is using merchant database 44-9, if most recent one row of information is received from the merchant database 44-9 and if the value of status in the most recent one row of information received from the merchant database 44-9 is 'A' then the locker will be store pickup locker and the verification process will continue, otherwise it will terminate. If the service provider is using owner database 44-8, if the most recent one row of information is received from the owner database 44-8 and if the value of status in the most recent one row of information received from the owner database 44-8 is 'A' then the locker will be a consumer locker and the verification process will continue, otherwise it will terminate.

If the verification process continues then the service provider (P) would verify the locker side. If the lock serial number received from the controller matched with back side lock serial number in the one row of information retrieved from locker database 44-11 and if the number of doors in the one row of information retrieved from locker database 44-11 is not 2 then the verification process will terminate.

If the verification process is terminated, then the service provider (P) would respond with a decline response so that the controller that initiated the request would receive the response.

If the verification process continues and if the lock serial number received from the controller matched with back side lock serial number in the one row of information retrieved from locker database 44-11 then lock is back side lock, otherwise it is front side lock.

If the verification process continues and the locker owner type (store pickup locker or consumer locker) and the side of the lock (back or front) in the locker are established the service provider (P) would select a specific procedure to be executed based on the value of the identification of button received from the controller and the locker owner type.

If the value of the identification of button is 'N' and if the locker owner type is store pickup locker then the service provider (P) would execute Store Pickup Non-Administrator UNLOCK procedure. If the value of the identification of button is 'N' and if the locker owner type is consumer locker then the service provider (P) would execute Consumer Non-Administrator UNLOCK procedure.

If the value of the identification of button is 'O' and if the locker owner type is store pickup locker then the service provider (P) would execute Store Pickup Non-Administrator LOCK procedure. If the value of the identification of button is 'O' and if the locker owner type is store consumer locker then the service provider (P) would execute Consumer Non-Administrator LOCK procedure.

If the value of the identification of button 'U' and if the locker owner type is store pickup locker then the service provider (P) would execute Store Pickup Administrator UNLOCK procedure. If the value of the identification of button 'U' and if the locker owner type is consumer locker then the service provider (P) would execute Consumer Administrator UNLOCK procedure.

If the value of the identification of button is 'L' and if the locker owner type is store pickup locker then the service provider (P) would execute Store Pickup Administrator LOCK procedure. If the value of the identification of button is 'L' and if the locker owner type is consumer locker then the service provider (P) would execute Consumer Administrator LOCK procedure.

Store Pickup Non-Administrator UNLOCK:

For store pick-up non-administrators (buyers) unlock is available only from waiting area (53-3). So, if the lock is front side lock and if the value of location in the one row of information retrieved from locker database 44-11 is 'W' or if the lock is back side lock and if the value of location in the one row of information retrieved from locker database 44-11 is 'B' then the verification process will continue, otherwise it will terminate.

If the verification process continues, then the service provider (P) would retrieve the most recent rows of information for each order from store pickup database 44-15 where the merchant id is same as second segment of owner id, location id is same as third segment of owner id, locker number is same as locker number in the one row of information retrieved from locker database 44-11, locker side is same as locker side in the one row of information retrieved from locker database 44-11 and authcode status is 'A' to create the final store pickup data.

If the value of the key pad entry received from the controller is not blank, then the service provider (P) would remove all the rows from key pad entry where the value of authcode in the final store pickup data is not same as the key pad entry received from the controller.

If the value of the key pad entry received from the controller is blank, then the service provider (P) would remove all the rows from key pad entry where the value of authenticated in the final store pickup data is not 'Y'.

If the number of rows in the final store pickup data is more than 0 then the verification process will continue, otherwise it will terminate.

If the verification process continues then the service provider (P) would update the store pickup database 44-15 with a value of 'N' for authenticated and with a value of 'U' for authcode status where the merchant id, location id, order number and maintenance sequence number in the store pickup database 44-15 are same as merchant id, location id, order number and maintenance sequence number in the final store pickup data.

If the verification process continues and if the update store pickup database 44-15 is not successful, then the service provider (P) would terminate the verification process.

If the verification process ends without being terminated, then the service provider (P) would respond with an approve response so that the controller that initiated the request would receive the response. If the verification process is terminated, then the service provider (P) would respond with a decline response so that the controller that initiated the request would receive the response.

Consumer Non-Administrator UNLOCK:

For consumer non-administrators unlock is available only from front side. So, if the lock is not front side lock then the service provider (P) will terminate verification process.

If the verification process continues, if the value of the key pad entry received from the controller is not blank, then the service provider (P) would retrieve the most recent row of information from authcode database 44-12 by matching owner id, locker number and locker side from authcode database 44-12 with owner id, locker number, and locker side from the one row of information retrieved from locker database 44-11 and authcode from authcode database 44-12 matching with the value of key pad entry received from the controller.

If the verification process continues, if the value of the key pad entry received from the controller is not blank, if one row of information is retrieved from authcode database 44-12 and if the authcode status in the one row of information retrieved from authcode database 44-12 is not 'A', then the service provider (P) would terminate the verification process. If the verification process continues, if the value of the key pad entry received from the controller is not blank and if one row of information is not retrieved from authcode database 44-12, then the service provider (P) would terminate the verification process. If the verification process continues, if the value of the key pad entry received from the controller is not blank, if one row of information is retrieved from authcode database 44-12 and if the authcode status in the one row of information retrieved is 'A' then the verification process will end.

If the verification process continues and if the value of the key pad entry received from the controller is blank, then the service provider (P) would retrieve the most recent row of information from authentication database 44-13 by matching owner id, locker number, locker side with owner id, locker number, and locker side from the one row of information retrieved from locker database 44-11 and the authentication status from authentication database 44-13 is 'A'. If the verification process continues and if one row of information is retrieved from authentication database 44-13 then the verification process will end otherwise it will terminate.

If the verification process ends without being terminated and one row of information was retrieved from authcode database 44-12 during the verification process, then the service provider (P) would update the authcode database 44-12 with a value of 'U' for authcode status for the same row as the one row of information retrieved from the authcode database 44-12 if usage type in the one row of information retrieved from the authcode database 44-12 is 'S'. If the verification process ends without being terminated, one row of information was retrieved from authcode database 44-12 during the verification process and if the update of the authcode database 44-12 is not successful, then the service provider would terminate the verification process.

If the verification process ends without being terminated and one row of information was retrieved from authentication database 44-13 during the verification process, then the service provider (P) would update the authentication database 44-13 with a value of 'U' for authentication status for the same row as the one row of information retrieved from the authentication database 44-13. If the verification process ends without being terminated, one row of information was retrieved from authentication database 44-13 during the verification process and if the update of the authentication database 44-13 is not successful, then the service provider would terminate the verification process.

If the verification process ends without being terminated, then the service provider (P) would respond with an approve response so that the controller that initiated the request would receive the response. If the verification process is terminated, then the service provider (P) would respond with a decline response so that the controller that initiated the request would receive the response.

Store Pickup Non-Administrator LOCK:

For store pick-up non-administrators (buyers) lock is available only from drive-thru lane (53-12). So, if the lock is front side lock and if the value of location in the one row of information retrieved from locker database 44-11 is 'L' or 'B' then the verification process will continue, otherwise it will terminate.

If the verification process continues, then the service provider (P) would retrieve the most recent rows of information for each order from store pickup database 44-15 where the merchant id is same as second segment of owner id, location id is same as third segment of owner id, locker number is same as locker number in the one row of information retrieved from locker database 44-11, locker side is same as locker side in the one row of information retrieved from locker database 44-11 and authcode status is 'A' to create the final store pickup data.

If the value of the key pad entry received from the controller is not blank, then the service provider (P) would remove all the rows from key pad entry where the value of authcode in the final store pickup data is not same as the key pad entry received from the controller.

If the value of the key pad entry received from the controller is blank, then the service provider (P) would remove all the rows from key pad entry where the value of authenticated in the final store pickup data is not 'Y'.

If the number of rows in the final store pickup data is more than 0 then the verification process will continue, otherwise it will terminate.

If the verification process continues then the service provider (P) would update the store pickup database 44-15 with a value of 'N' for authenticated and with a value of 'U' for authcode status where the merchant id, location id, order number and maintenance sequence number in the store pickup database 44-15 are same as merchant id, location id, order number and maintenance sequence number in the final store pickup data.

If the verification process continues and if the update store pickup database 44-15 is not successful, then the service provider (P) would terminate the verification process.

If the verification process ends without being terminated, then the service provider (P) would respond with an approve response so that the controller that initiated the request would receive the response. If the verification process is terminated, then the service provider (P) would respond with a decline response so that the controller that initiated the request would receive the response.

Consumer Non-Administrator LOCK:

For consumer non-administrators lock is available only from front side. So, if the lock is not front side lock then the service provider (P) will terminate verification process.

If the verification process continues and if the value of the key pad entry received from the controller is not blank, then the verification process will terminate.

If the verification process ends without being terminated, then the service provider (P) would respond with an approve response so that the controller that initiated the request would receive the response. If the verification process is terminated, then the service provider (P) would respond with a decline response so that the controller that initiated the request would receive the response.

Store Pickup Administrator UNLOCK:

For consumer administrators unlock is available from all sides.

If the verification process continues and if the value of admin switch restricted in the one row of information received from the locker database 44-11 is 'Y' and if the value of the key pad entry received from the controller is blank, then the verification process will end.

If the verification process continues and if the value of admin switch restricted in the one row of information received from the locker database 44-11 is 'Y' and if the value of the key pad entry received from the controller is not blank, then the verification process will terminate.

If the verification process continues and if the value of the key pad entry received from the controller is same as the value of password in the most recent row of information retrieved from owner database 44-8 then the verification process will end.

If the verification process continues and if the value of the key pad entry received from the controller is not blank and is not same as the value of password in the most recent row of information retrieved from owner database 44-8 then the verification process will terminate.

If the verification process continues and if the value of the key pad entry received from the controller is blank, then the service will continue, otherwise it will terminate.

If the verification process continues, then the service provider (P) would retrieve the most recent rows of information for each order from store pickup database 44-15 where the merchant id is same as second segment of owner id, location id is same as third segment of owner id, locker number is same as locker number in the one row of information retrieved from locker database 44-11, locker side is same as locker side in the one row of information retrieved from locker database 44-11 and authenticated is 'Y'. If the verification process continues and if one row of information is retrieved from store pickup database 44-15 then the verification process will continue otherwise it will terminate. If the verification process continues and if one row of information is retrieved from store pickup database 44-15 then the service provider (P) would update the store pickup database 44-15 with a value of 'N' for authenticated where the merchant id, location id, order number and maintenance sequence number in the store pickup database 44-15 are same as merchant id, location id, order number and maintenance sequence number in the final store pickup data.

If the verification process ends without being terminated, then the service provider (P) would respond with an approve response so that the controller that initiated the request would receive the response. If the verification process is terminated, then the service provider (P) would respond with a decline response so that the controller that initiated the request would receive the response.

Consumer Administrator UNLOCK:

For consumer administrators unlock is available from all sides.

If the verification process continues and if the value of admin switch restricted in the one row of information received from the locker database 44-11 is 'Y' and if the value of the key pad entry received from the controller is blank, then the verification process will end.

If the verification process continues and if the value of admin switch restricted in the one row of information received from the locker database 44-11 is 'Y' and if the value of the key pad entry received from the controller is not blank, then the verification process will terminate.

If the verification process continues and if the value of the key pad entry received from the controller is same as the value of password in the most recent row of information retrieved from owner database 44-8 then the verification process will end.

If the verification process continues and if the value of the key pad entry received from the controller is not blank and is not same as the value of password in the most recent row of information retrieved from owner database 44-8 then the verification process will terminate.

If the verification process continues and if the value of the key pad entry received from the controller is blank, then the service will continue, otherwise it will terminate.

If the verification process continues the service provider (P) would retrieve the most recent row of information from authentication database 44-13 by matching owner id, locker number, locker side from authentication database 44-13 with owner id, locker number, and locker side from the one row of information retrieved from locker database 44-11 and the authentication status from authentication database 44-13 is 'A' and the requestor type from authentication database 44-13 is 'O'. If the verification process continues and if one row of information is retrieved from authentication database 44-13 then the verification process will continue otherwise it will terminate. If the verification process continues and if one row of information is retrieved from authentication database 44-13 then the service provider (P) would set the value of authentication status with 'U' in the authentication database 44-13 by matching owner id, locker number, locker side from authentication database 44-13 with owner id, locker number, and locker side from the one row of information retrieved from locker database 44-11 and the authentication status from authentication database 44-13 is 'A' and the requestor type from authentication database 44-13 is 'O'.

If the verification process ends without being terminated, then the service provider (P) would respond with an approve response so that the controller that initiated the request would receive the response. If the verification process is terminated, then the service provider (P) would respond with a decline response so that the controller that initiated the request would receive the response.

Store Pickup Administrator LOCK:

If the verification process continues and if the value of admin switch restricted in the one row of information received from the locker database 44-11 is 'Y' and if the value of the key pad entry received from the controller.

If the verification process continues and if the value of admin switch restricted in the one row of information received from the locker database 44-11 is 'Y' and if the value of the key pad entry received from the controller.

If the verification process continues and if the value of the key pad entry received from the controller is same as the value of password in the most recent row of information retrieved from owner database 44-8 then the verification process will end.

If the verification process continues and if the value of the key pad entry received from the controller is not blank and is not same as the value of password in the most recent row of information retrieved from owner database 44-8 then the verification process will terminate.

If the verification process continues and if the value the key pad entry received from the controller is blank, then the verification process will continue, otherwise it will terminate.

If the verification process continues, then the service provider (P) would retrieve the most recent rows of information for each order from store pickup database 44-15 where the merchant id is same as second segment of owner id, location id is same as third segment of owner id, locker number is same as locker number in the one row of information retrieved from locker database 44-11, locker side is same as locker side in the one row of information retrieved from locker database 44-11 and authenticated is 'Y'. If the verification process continues and if one row of information is retrieved from store pickup database 44-15 then the verification process will continue otherwise it will terminate. If the verification process continues and if one row of information is retrieved from store pickup database 44-15 then the service provider (P) would update the store pickup database 44-15 with a value of 'N' for authenticated where the merchant id, location id, order number and maintenance sequence number in the store pickup database 44-15 are same as merchant id, location id, order number and maintenance sequence number in the final store pickup data.

If the verification process ends without being terminated, then the service provider (P) would respond with an approve response so that the controller that initiated the request would receive the response. If the verification process is terminated, then the service provider (P) would respond with a decline response so that the controller that initiated the request would receive the response.

Consumer Administrator LOCK:

If the verification process continues and if the value of admin switch restricted in the one row of information received from the locker database 44-11 is 'Y' and if the value of the key pad entry received from the controller.

If the verification process continues and if the value of admin switch restricted in the one row of information received from the locker database 44-11 is 'Y' and if the value of the key pad entry received from the controller.

If the verification process continues and if the value of the key pad entry received from the controller is same as the value of password in the most recent row of information retrieved from owner database 44-8 then the verification process will end.

If the verification process continues and if the value of the key pad entry received from the controller is not blank and is not same as the value of password in the most recent row of information retrieved from owner database 44-8 then the verification process will terminate.

If the verification process continues and if the value of the key pad entry received from the controller is blank, then the verification process will continue, otherwise it will terminate.

If the verification process continues the service provider (P) would retrieve the most recent row of information from authentication database 44-13 by matching owner id, locker number, locker side from authentication database 44-13 with owner id, locker number, and locker side from the one row of information retrieved from locker database 44-11 and the authentication status from authentication database 44-13 is 'A' and the requestor type from authentication database 44-13 is 'O'. If the verification process continues and if one row of information is retrieved from authentication database 44-13 then the verification process will continue otherwise it will terminate. If the verification process continues and if one row of information is retrieved from authentication database 44-13 then the service provider (P) would set the value of authentication status with 'U' in the authentication database 44-13 by matching owner id, locker number, locker side from authentication database 44-13 with owner id, locker number, and locker side from the one row of information retrieved from locker database 44-11 and the authentication status from authentication database 44-13 is 'A' and the requestor type from authentication database 44-13 is 'O'.

If the verification process ends without being terminated, then the service provider (P) would respond with an approve response so that the controller that initiated the request would receive the response. If the verification process is terminated, then the service provider (P) would respond with a decline response so that the controller that initiated the request would receive the response.

API Gateway:

The merchants (M) and goods carriers (G) would post a request through an Application Programming Interface for an authcode to the service provider's server through a communication channel provided by the service provider. This communication channel can be server to server communication between the merchants (M) or goods carriers (G) servers with service provider's (P) server. The communication channel may be an url and a sample of such url might be "https://www.mslwallet.com/authcode.cfm". The content of the request for an authcode would be based on the specification for authcode request API provided by the service provider (P) to the merchants (M) and goods carriers (G) and as shown in FIG. 42-A. The merchants (M) and goods carriers (G) would receive a response as shown in FIG. 42-R. The details of authcode API is given below under Authocode API Process.

The merchants (M) and goods carriers (G) would post a request through an Application Programming Interface to the service provider's server through a communication channel provided by the service provider. This communication channel can be server to server communication between the merchants (M) or goods carriers (G) servers with service provider's (P) server. The communication channel may be an url and a sample of such url might be "https://www.mslwallet.com/authentication.cfm". The content of the request would be based on the specification for advance authentication request API provided by the service provider (P) to the merchants (M) and goods carriers (G) and as shown in FIG. 43-A. The merchants (M) and goods carriers (G) would receive a response as shown in FIG. 43-R. The details of authentication API is given below under Authentication API Process.

Authcode API Process:

When the service provider (P) receives an authcode request for inquire or for add or for update from merchants (M) or goods carriers (G), the service provider (P) would verify the origin of the request and the content of the request. If the origin of the request and the content of the request are valid and if the access type is for inquire, then the service provider (P) would send a successful response back to the merchants (M) or goods carriers (G) along with authcode information. If the origin of the request and the content of the request are valid and the access type is for add or for update, then the service provider (P) would create an authcode or use an authcode provided by the merchants (M) or goods carriers (G) to add or update the authcode in the authcode database (44-12) and send a successful response back to the merchants (M) or goods carriers (G). On the other hand, if the origin of the request is invalid, then the service provider (P) may not send any response back to the requestor. If the origin of the request is valid, but the content of the request is invalid then the service provider (P) would send an error response back to the requestor.

When the service provider receives a request for an authcode inquire or for add or for update through a previously established communication channel by the service provider (P) from merchants (M) or goods carriers (G), the service provider (P) would initiate a validation process and the first and foremost task of the validation process would be to save the IP address from which the request was received and saving the values of a set of variables in the request which is shown as a sample in FIG. 42-A namely RequestorType, RequestorId, RequestorSubId, Password, RequestType, ServiceType, AccessType, GoodsCarrierName, TrackingNumber, LockSerialNumber, Address1, Address2, City, State, Zip, Latitude, Longitude, PackageWidth, PackageHeight, PackageDepth, ExpirationDate, and ExpirationTime. Then the service provider (P) would determine whether the request is received from a valid IP address by verifying the IP address of the request with the IP addresses provided by various merchants (M) and goods carriers (G). The merchants (M) and goods carriers (G) maintain their information in merchant (M) database (44-9) and goods carrier (G) database (44-10) respectively and as per the schema 28-1 and 29-1 as shown in FIG. 28 and FIG. 29 where the schema also includes the IP addresses. The service provider (P) would determine based on the IP address, the origin of the request by the requestor type, the requestor id and the requestor sub id. In case of merchants (M) the requestor type would be 'M', the requestor id would be merchant id and requestor sub id would be location id. In case of goods carriers (G) the requestor type would be 'G', the requestor id would be goods carrier id and requestor sub id would be location id. It is possible to have more than one requestor sub id for the sane requestor type and requestor id, because several locations under one merchant (M) or under one goods carrier (G) may share the same IP address. If the origin of the request is valid then the service provider (P) would compare requestor type, requestor id, requestor sub id and password from the database with the RequestorType, RequestorId, RequestorSubId and Password received by the service provider (P) in the content of the request to get a unique merchant (M) and a location id or a goods carrier (G) and a location id. If a unique merchant (M) and a location id or goods carrier (G) and a location id is identified then the validation process will continue, otherwise the validation process will terminate. The content can be in any number of formats such as xml, json, delimited text etc. An example in xml format 42-A is shown in FIG. 42-A.

If the validation process continues and if the RequestorType is 'M', then the service provider (P) would determine whether the unique merchant (M) has opted to use authcode API based on the value set for the field AuthcodeApiYN in merchant database 44-9 as per the very high-level but also generally representative schema 28-1 as shown in FIG. 28. If the service provider (P) determines that the merchant (M)

has opted to use authcode API, then the validation process will continue, otherwise the validation process will terminate.

If the validation process continues and if the RequestorType is 'G', then the service provider (P) would determine whether the unique goods carrier (G) has opted to use authcode API based on the value set for the field AuthcodeApiYN in merchant database 44-10 as per the very high-level but also generally representative schema 29-1 as shown in FIG. 29. If the service provider (P) determines that the goods carrier (G) has opted to use authcode API, then the validation process will continue, otherwise the validation process will terminate.

If the validation process continues, then the service provider (P) would validate the RequestType received in the content. If the RequestType is 'D' or 'A' then the validation process would continue, otherwise it would terminate. The RequestType 'D' is for delivery, and 'P' is for pick up.

If the validation process continues, then the service provider (P) would validate the AccessType received in the content. If the AccessType is 'I' or 'A' then the validation process would continue, otherwise it would terminate. The AccessType 'I' is for inquire, and 'A' is for add or update. If the AccessType is 'I' and if the RequestorType is 'M' then the validation process will terminate. If the AccessType is 'I' and ServiceType is not ' ' then the validation process will terminate. If the AccessType is 'I' and TrackingNumber is ' ' then the validation process will terminate.

If the validation process continues, then the service provider (P) would validate the ServiceType received in the content. If the ServiceType is 'D' or 'T' or 'M' or ' ' then the validation process would continue, otherwise it would terminate. The ServiceType is 'D' for drones, 'T' for trucks, 'M' for humans and ' ' for drones or trucks or humans. If the requestor RequestorType is 'M' and if the ServiceType is not blank, then the validation process would terminate.

If the validation process continues and if the AccessTye is 'I', then the service provider would access the most recent data from authcode database 44-12 for the TrackingNumber. If the most recent data for the TrackingNumber is not available, then validation process will terminate.

If the validation process continues and if the AccessTye is 'I', then the service provider (P) would validate authcode status from the authcode database 44-12. If the authcode status is not 'A' the validation process will terminate. If the validation process continues then the service provider (P) would validate Goods Carrier Id received from the database. If the RequestorType is 'G' and if the RequestorID does not match the Goods Carrier Id received from the authcode database 44-12 then the validation process will terminate. If the validation process continues, then the service provider (P) would validate Owner Id received from the authcode database 44-12. If the most recent information from the owner database 44-8 for the owner id from authcode database 44-12 does not match the address1, address2, city, state, zip, latitude or longitude then the validation process will terminate.

If the validation process continues and if the AccessTye is 'I', then the service provider (P) would set the value '1' to ReturnCode, set the value 'Success' to SuccessMsg, populate the values TrackingNumber, ExpirationDate and ExpirationTime from the content and LockSerialNumber, LockType, LockerLatitude, LockerLongitude, DroneYN, TruckYN and ManualYN from locker database 44-11 where the LockSerialNumber is the Front Side Lock Serial Number and LockType is Front Side Lock Type and send the response back to the requestor and end the validation process.

If the validation continues, then the service provider (P) would validate TrackingNumber. If the value of TrackingNumber is not blank the validation process will continue, otherwise it will terminate.

If the validation continues, then the service provider (P) would validate RequestType. If the value of RequestType is 'D', then the service provider (P) would process the authcode request for 'Delivery' of goods and the validation process will continue, otherwise it will terminate.

If the validation continues, then the service provider would validate the ExpirationDate and ExpirationTime based on current date and current time. The validation process would include that ExpirationDate and ExpirationTime would be a future date and time where the ExpirationDate and ExpirationTime is within a pre-determined number of days, hours and minutes where the pre-determined number of days, hours and minutes is set by the service provider (P) where the pre-determined number of days, hours and minutes are based on the RequestType and the pre-determined number of days, hours and minutes are reasonable for the service being provided by the service provider (P).

If the validation continues, then the service provider (P) would determine a specific owner id and a specific locker number based on the values received in the authcode request.

If the validation continues and if the LockSerialNumber is not blank then the service provider (P) would determine the owner id, locker number, front side lock type, maximum package width, maximum package height and maximum package depth using the LockSerialNumber from the locker database 44-11 based on the representative schema 30-1 as shown in FIG. 30. The LockSerialNumber should match the front side lock serial number in the locker database 44-11. If the LockSerialNumber is not blank and if the service provider (P) cannot determine an owner id, a locker number and front side lock type, then the validation process would terminate.

If the validation process continues and if the LockSerialNumber is not blank the service provider (P) would also verify locker owner information for the owner id from owner database 44-8 against the values received in the authcode request namely address1, address2, city, state and zip. If the owner information cannot be verified then the service provider (P) would terminate the validation process, otherwise it will continue.

If the validation process continues and if the LockSerialNumber is not blank, then the service provider (P) would also verify that the package based on the size in width, height and depth given in the authcode request would fit in the locker determined by the LockSerialNumber. If the package based on the size in width, height and depth would not fit in the locker determined by the LockSerialNumber then the service provider (P) would terminate validation process, otherwise it will continue.

If the validation process continues and if the LockSerialNumber is not blank and ServiceType is not ' ' then the service provider (P) would also verify that the locker access type from locker database 44-11 matches with the requested ServiceType. If ServiceType is 'D' and if the value of drone access allowed YN is 'N' from the locker database 44-11 for the LockSerialNumber then the service provider (P) would terminate validation process. If ServiceType is 'T' and if the value of truck access allowed YN is 'N' from the locker database 44-11 for the LockSerialNumber then the service provider (P) would terminate validation process. If ServiceType is 'M' and if the value of manual access allowed YN is 'N' from the locker database 44-11 for the LockSerialNumber then the service provider (P) would terminate validation process, otherwise it will continue.

If the validation continues and if the LockSerialNumber is blank, then the service provider (P) would determine the owner id based on the values for latitude and longitude received in the request and the values stored in the locker owner (O) database (44-8). If the distance between the delivery location as determined by the latitude and longitude in the received content and the locker owner (O) location as determined by the latitude and longitude stored in the locker owner database (44-8) is within a limit pre-established by the service provider (P) for example within 100 feet, then the validation process will continue otherwise it will terminate. If the validation process continues, the service provider (P) would narrow down in determining the owner id using additional information provided in the authcode request namely address1, address2, city, state and zip. If a single locker owner id is established the validation process will continue otherwise it will terminate. If the validation process continues, the service provider (P) would then select one or more lockers by locker numbers owned by the locker owner (O) where the selected one or more lockers can hold the package based on the package width, height and depth in the authcode request. If ServiceType is not ' ' then the service provider (P) would also verify that the locker access type from locker database 44-11 matches with the requested ServiceType. If ServiceType is 'D' and if the value of drone access allowed YN is 'N' from the locker database 44-11 for a selected locker in the one or more selected lockers, then the service provider (P) would remove the selected locker. If ServiceType is 'T' and if the value of truck access allowed YN is 'N' from the locker database 44-11 for a selected locker in the one or more selected lockers, then the service provider (P) would remove the selected locker. If ServiceType is 'M' and if the value of manual access allowed YN is 'N' from the locker database 44-11 for a selected locker in the one or more selected lockers, then the service provider (P) would remove the selected locker.

If at least one locker is selected, then the service provider (P) would select the first owner id and locker number from the selected one or more lockers where the value of front side lock type of the selected locker is 'N' as the determined owner id and locker number. If the service provider (P) is not able to determine a single owner id and locker number, then the service provider would select the first owner id and locker number from the selected one or more lockers as the determined owner id and locker number. If the service provider (P) is able to determine a single owner id and locker number then the validation process will continue, otherwise it will terminate.

If the RequestorType is 'G' then the service provider (P) would use the RequestorId and RequestorSubId as goods carrier id and location id respectively, otherwise the service provider would use goods carrier database 44-10 and GoodsCarrierName to determine the goods carrier id. If the service provider (P) identifies more than one goods carrier id for the GoodsCarrierName, then the service provider (P) would use the latitude, longitude and radius in miles information saved by the goods carrier in the goods carrier database 44-10 and the latitude and longitude information saved by the owner id in the locker owner database (44-8). The service provider (P) would select one or more goods carriers (G) where the locker owner (O) is within the goods carrier (G) service area. If the service provider (P) selected one or more goods carriers, then the validation process would continue, otherwise it will terminate. If the validation process continues, then the service provider (P) would select the closest goods carrier (G) to the locker owner (O) based on the goods carrier (G) location and the locker owner (O) owner location. Once a single goods carrier id and a location id is selected, the service provider would determine the value for AuthenticationApiYN from goods carrier database 44-10 using the value of goods carrier id and location id using the schema 29-1 as shown in FIG. 29. If a single carrier id and a location id cannot be determined, then the validation process would terminate.

If the validation process continues and if the front side lock type of the determined locker is 'N', if the AuthenticationApiYN is 'Y' and if the ServiceType is not 'D' then the service provider (P) would select the determined single owner id and locker number as the valid owner id and locker id and would populate SuccessMsg with the text "Scan the QR Code displayed on the locker number XX using the mobile app to deliver the goods" where the XX would be the locker number determined by the service provider (P) from the one or more lockers and end the validation process.

If the validation process continues the service provider (P) would create a random number of any length, but preferably 6 digits or a random text of any length, but preferably 6 characters long, the service provider (P) would use the random number or the random text as authcode. The service provider (P) would insert a row in AuthCode database 44-12 with valid owner id, locker number, locker side, good carrier id, TrackingNumber, RequestType, authcode, current date and time as entry date and time, ExpirationDate and ExpirationTime received in the authcode request, authcode status as 'A' and usage type as 'S' using the representative schema 31-1 as shown in FIG. 31. If the front door lock type of the owner id, lock number is 'S' then the service provider (P) would send a text message or an app notification to the locker owner to program the standalone lock connected to the front door of the locker with the authcode that was used to update the authcode database 44-12.

If the row insert into the AuthCode database 44-12 is successful then the validation process will continue, otherwise it will terminate.

If the validation process continues and if the front door lock type of the owner id, lock number is 'S' or 'N' then the service provider (P) would populate the SuccessMsg with the locker number and the authcode where an example of such a SuccessMsg would be "Locker Number: XX Authorization Code: YYYYYY to open the locker" where XX is the valid locker number and YYYYYY is the authcode otherwise the service provider (P) would populate the SuccessMsg with the locker number and a drone message where an example of such a SuccessMsg would be "Drone Consumer Locker Number: XX" where XX is the valid locker number.

If the validation process continues and if the RequestorType is 'G', then the service provider (P) would populate the values LockSerialNumber, LockType, Latitude, Longitude, DroneYN, TruckYN and ManualYN with the corresponding values from locker database 44-11 for valid owner id and locker number where the LockSerialNumber is the Front Side Lock Serial Number and LockType is Front Side Lock Type. If the validation process continues and if the RequestorType is 'M', then the service provider (P) would populate the values LockSerialNumber, LockType, Latitude, Longitude, DroneYN, TruckYN and ManualYN with blanks.

If the validation process is terminated, then the service provider (P) would populate the values LockSerialNumber, LockType, Latitude, Longitude, DroneYN, TruckYN and ManualYN with blanks.

If the validation process continues, then the service provider (P) would end the validation process.

If the validation process ended and if the SuccessMsg is populated then the service provider (P) would set the value '1' for ReturnCode. On the other hand, if the validation process terminated then the service provider (P) would set an appropriate value other than '1' for ReturnCode and populate the ErrorMsg with an appropriate text depending on where the validation process was terminated. For example, if LockSerialNumber is not blank and the service provider was not able to determine the owner id and locker number based on the LockSerialNumber, then the service provider (P) might set a value '10' for ReturnCode and populate the ErrorMsg with the text "Invalid Consumer Locker Serial Number". Once the values are populated based on the example shown in FIG. 42-R the service provider (P) would send the response back to the requestor requested the authcode using the authcode request API.

Authentication API Process:

When the service provider (P) receives an advance authentication request from merchants (M) or goods carriers (G), the service provider (P) would verify the origin of the request and the content of the request. If the origin of the request and the content of the request are valid then the service provider (P) would set the advance authentication flag to 'Y' for the requested lock. On the other hand, if the origin of the request is invalid, the service provider (P) may not send any response back to the requestor. If the origin of the request is valid, but the content of the request is invalid then the service provider (P) would send an error response back to the requestor.

When the service provider receives a request for an advance authentication through a previously established communication channel by the service provider (P) from merchants (M) or goods carriers (G), the service provider (P) would initiate a validation process and the first and foremost task of the validation process would be to determine whether the request is received from a valid IP address by verifying the IP address of the request with the IP addresses provided by various merchants (M) and goods carriers (G). The merchants (M) and goods carriers (G) maintain their information in merchant (M) database (44-9) and goods carrier (G) database (44-10) respectively and as per the schema 28-1 and 29-1 as shown in FIG. 28 and FIG. 29 where the schema also includes the IP addresses. The service provider (P) would determine based on the IP address of the origin of the request the requestor type, the requestor id and the requestor sub id. In case of merchants (M) the requestor type would be 'M', the requestor id would be merchant id and requestor sub id would be location id. In case of goods carriers (G) the requestor type would be 'G', the requestor id would be goods carrier id and requestor sub id would be location id. It is possible to have more than one requestor sub id for the same requestor type and requestor id, because several locations under one merchant (M) or under one goods carrier (G) may share the same IP address.

If the origin of the request is valid then the service provider (P) would compare requestor type, requestor id, requestor sub id and password with the RequestorType, RequestorId, RequestorSubId and Password received by the service provider (P) in the content to get a unique merchant (M) or goods carrier (G). If a unique merchant (M) or goods carrier (G) is identified then the validation process will continue, otherwise the validation process will terminate.

If the validation process continues and if the Requestor-Type is 'M', then the service provider (P) would determine whether the unique merchant (M) has opted to use authentication API based on the value set for the field AuthenticationApiYN in merchant database 44-9 as per the very high-level but also generally representative schema 28-1 as shown in FIG. 28. If the service provider (P) determines that the merchant (M) has opted to use authentication API, then the validation process will continue, otherwise the validation process will terminate.

If the validation process continues and if the Requestor-Type is 'G', then the service provider (P) would determine whether the unique goods carrier (G) has opted to use authentication API based on the value set for the field AuthenticationApiYN in goods carrier database 44-10 as per the very high-level but also generally representative schema 29-1 as shown in FIG. 29. If the service provider (P) determines that the goods carrier (G) has opted to use authentication API, then the validation process will continue, otherwise the validation process will terminate.

The content can be in any number of formats such as xml, j son, delimited text etc. An example in xml format 43-A is shown in FIG. 43-A. If the validation continues, then the service provider (P) would determine the single lock where the serial number of the lock would be same as the serial number in the content. If a single lock is identified and the single lock belongs to front side of a locker (L) then the verification will continue otherwise the verification will terminate.

If the verification continues and if the expiration minutes is within a preset limit set by the service provider (P) where the expiration minutes, for example, may be less than 30 seconds, then the verification process will continue, otherwise it will terminate.

If the verification continues and if the requestor type is 'M' or 'G' and if the tracking number received in the content is not blank then the service provider (P) would verify the tracking number using the authcode database 44-12. The service provider (P) would retrieve the most recent row of data from the authcode database 44-12 for the tracking number received in the content. If a row of information is retrieved and the authcode status in the retrieved row of information is not 'A' then the verification process will terminate.

If the verification continues the service provider (P) would add a row in the authentication database (44-13) with authentication status set to 'Y'. The service provider (P) would determine the owner id, locker id, locker side based on the lock serial number received in the content, would use the requestor type, requestor id, requestor sub id and tracking number received in the content, would calculate request date, request time, expired date and expiration time based on the expiration minutes received in the content.

If the verification continues and if the requestor type is 'M' or 'G' and if the tracking number received in the content is not blank and if the most recent row of data from the authcode database 44-12 for the tracking number received in the content is found and if the authcode status in the retrieved row of information is 'A' and the signature in the retrieved row of information is not blank then the service provider (P) would include the signature in the success message The service provider would send the successful or error message based on the validation process and the format of successful or error message would be in the same format of the authcode request message. An example in xml format 43-R as shown in FIG. 43-R where if the value of Return-Code is '1', then the request is successful and if the ReturnCode is anything other than '1' then the request is not successful. The requestor, merchant (M) or goods carrier (G) upon receiving a successful response would notify the human or the drone or the truck to open the door to which the lock identified by the serial number is attached to without entering an authcode in the key pad before the advance authentication expires.

Store Pickup Authcode API Process:

When the service provider (P) receives a store pickup authcode request the service provider (P) would verify the origin and the content of the request.

Figure 49:
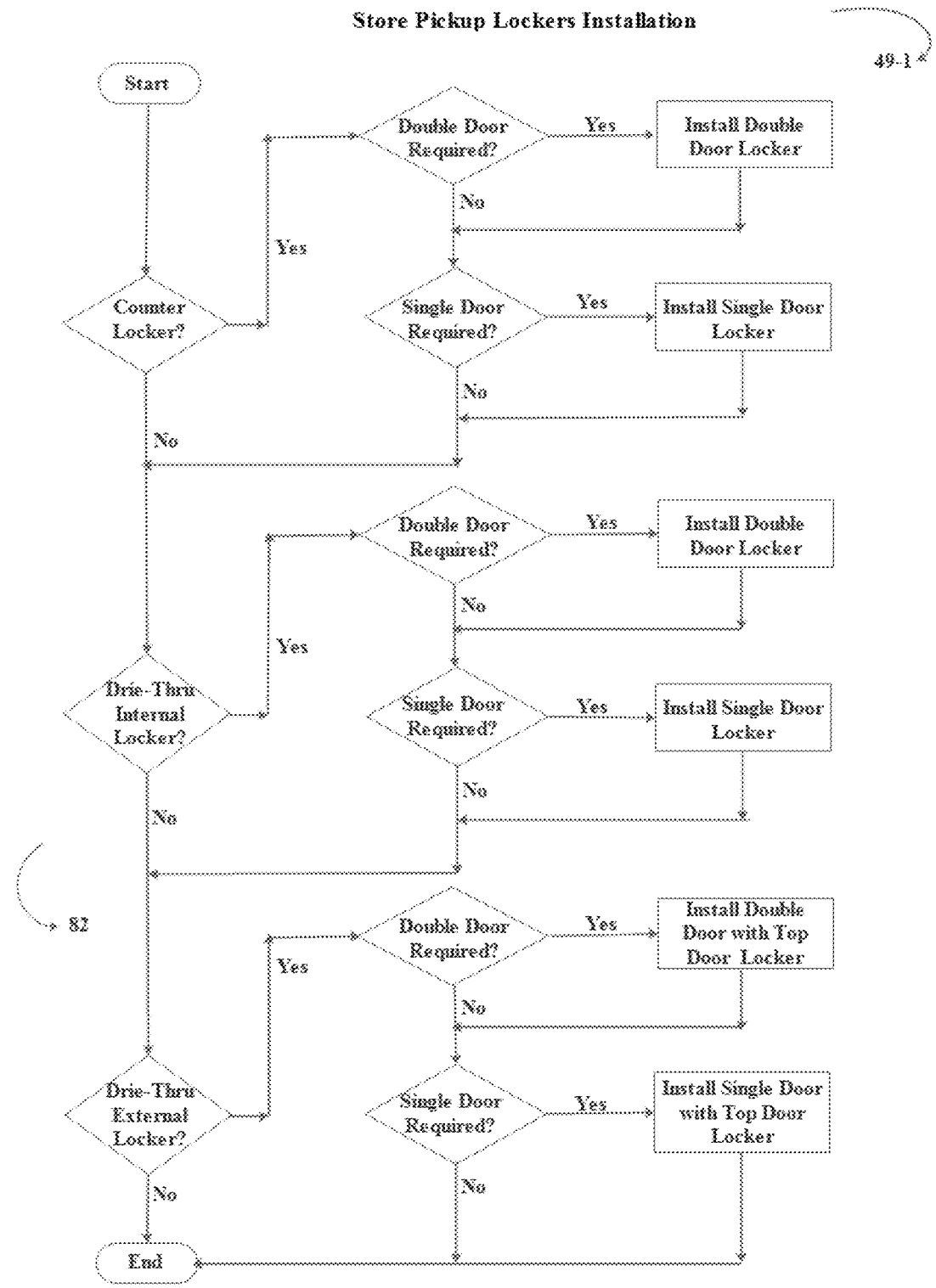
FIG. 49 shows, in a flowchart, an overview of the various steps generally taken in installing Store Pickup Lockers for Merchant Store Pickup Services.

When the service provider receives a store pickup authcode request through a previously established communication channel by the service provider (P) from merchants (M), the service provider (P) would initiate a validation process and the first and foremost task of the validation process would be to save the IP address from which the request was received and saving the values of a set of variables in the request which is shown as an sample in FIG. 49-A namely MerchantId, LocationId, Password, AccessType, OrderNumber, ConsumerId, CheckedIn, LockSerialNumber, AuthCode, ExpirationDate, and ExpirationTime. Then the service provider (P) would determine whether the request is received from a valid IP address by verifying the IP address of the request with the IP addresses provided by various merchants (M). The merchants (M) maintain their information in merchant (M) database (44-9) and as per the schema 28-1 as shown in FIG. 28 where the schema also includes the IP addresses. The service provider (P) would determine based on the IP address, the origin of the request by the merchantid and the locationid. It is possible to have more than one locationid for the same merchantid, because several locations under one merchant (M) may share the same IP address.

If the origin of the request is valid then the service provider (P) would compare MerchantId, LocationId and Password from the merchant database 44-9 with the MerchantId, LocationId and Password received by the service provider (P) in the content of the request to get a unique merchant (M) and a location. If a unique merchant (M) and a location is identified then the validation process will continue, otherwise the validation process will terminate.

If the validation process continues, then the service provider (P) would verify the value of AccessType. If AccessType is 'A' or 'I' or 'C' or 'N' or the validation process will continue, otherwise the validation process will terminate. The value in AccessType 'A' stands for add, 'I' stands for inquire, 'C' stands for check-in, 'N' stands for advance authentication and stands for order load. If the validation process continues, if the AccessType is 'A' and if the value of CheckedIn is not 'Y' and is not 'N', then the validation process will. If the validation process continues, if the AccessType is 'C' and if the value of CheckedIn is not 'Y', then the validation process will terminate. If the validation process continues, if the AccessType is 'N' and if the value of LockSerialNumber is blank, then the validation process will terminate. If the validation process continues, if the AccessType is 'L' and if the value of OrderNumber is blank or LockSerialNumber is blank, then the validation process will terminate. If the validation process continues, if the AccessType is not 'N' and if the AccessType is not and if the value of LockSerialNumber is not blank, then the validation process will terminate.

If the validation process continues and if the AccessType 'A', then the service provider would verify the values OrderNumber, ConsumerId, CheckedIn, LockSerialNumber, AuthCode, ExpirationDate, and ExpirationTime. If the validation process continues, if the AccessType 'A' and if the OrderNumber is blank then the validation process will terminate. If the validation process continues, if the AccessType 'A' and if the CheckedIn is 'Y' or 'N' then the validation process will continue, otherwise it will terminate. If the validation process continues, if the AccessType 'A' and if the LockSerialNumber is not blank or if the AuthCode is not blank then the validation process will terminate. If the validation continues and if the AccessType 'A', then the service provider would validate the ExpirationDate and ExpirationTime based on current date and current time and the validation process would include that ExpirationDate and ExpirationTime would be a future date and time where the ExpirationDate and ExpirationTime is within a pre-determined number of days, hours and minutes where the pre-determined number of days, hours and minutes is set by the service provider (P) where the pre-determined number of days, hours and minutes are reasonable for Store Pickup. If the validation process continues, if the AccessType 'A' and if the ExpirationDate is not valid or ExpirationTime is not valid then the validation process will terminate. If the validation process continues and if the AccessType 'A', then the service provider (P) would insert one row of data into store pickup database 44-15 using the values received in the content of the request setting a random number or part of OrderNumber for AuthCode where the random number or part of ordernumber is not being used by any other active row in the store pickup database 44-15, the value 'N' for Authenticated, blank for LockerlNumber and blank for LockerSide. If the validation continues and if the AccessType 'A' and if the insert of one row of data into store pickup database 44-15 is successful then the service provider (P) would set the value '1' to ReturnCode, set the value 'Success' to SuccessMsg, populate the values MerchantId, LocationId, OrderNumber, ConsumerId, CheckedIn, LockerNumber, LockerSide, Authenticated, AuthCode, ExpirationDate, and ExpirationTime from the one row of data inserted into the store pickup database 44-15, blank for LockSerialNumber and end the validation process, otherwise terminate the validation process.

If the validation process continues and if the AccessType 'C', then the service provider would verify the values OrderNumber, ConsumerId, CheckedIn and AuthCode. If the validation process continues, if the AccessType 'C' and if the value of CheckedIn is not 'Y', then the validation process will terminate.

If the validation process continues and if the AccessType 'N', then the service provider would verify the values OrderNumber, ConsumerId, LockSerialNumber and AuthCode. If the validation process continues, if the AccessType 'N' and if the value of LockSerialNumber is blank, then the validation process will terminate.

If the validation process continues and if the AccessType then the service provider would verify the values OrderNumber and LockSerialNumber. If the validation process continues, if the AccessType 'L' and if the value of OrderNumber is blank or LockSerialNumber is blank, then the validation process will terminate.

If the validation process continues and if the value of OrderNumber received in the content is not blank, then then service provider (P) would access the most recent row of data from store pickup database 44-15 where the OrderNumber received from the store pickup database 44-15 is same as the OrderNumber received in the content. If the value of OrderNumber received in the content is not blank and no row of data is retrieved from the store pickup database 44-15, then the service provider (P) would terminate the validation process. If the validation process continues, if the value of OrderNumber received in the content is not blank and if one row of data is retrieved from the store pickup database 44-15 and if the value of Authcode Status in the one row of data retrieved from the store pickup database 44-15 is not 'A', then the service provider (P) would terminate the validation process. If the validation process continues, if the value of OrderNumber received in the content is not blank, if the value of ConsumerId received in the content is not blank and one row is retrieved from the store pickup database 44-15 and if the value of Authcode Status in one row of data retrieved from the store pickup database 44-15 is 'A' and if the value of ConsumerId in one row of data retrieved from the store pickup database 44-15 is not same as the value of ConsumerId received in the content, then the service provider (P) would terminate the validation process. If the validation process continues, if the value of OrderNumber received in the content is not blank, if the value of AuthCode received in the content is not blank and one row is retrieved from the store pickup database 44-15 and if the value of Authcode Status in one row of data retrieved from the store pickup database 44-15 is 'A' and if the value of AuthCode in one row of data retrieved from the store pickup database 44-15 is not same as the value of AuthCode received in the content, then the service provider (P) would terminate the validation process. If the validation process continues, if the value of OrderNumber received in the content is not blank and one row is retrieved from the store pickup database 44-15 and if the value of Authcode Status in one row of data retrieved from the store pickup database 44-15 is not 'A', then the service provider (P) would terminate the validation process.

If the validation process continues, if the value of OrderNumber received in the content is blank and if the value of ConsumerId received in the content is not blank, then the service provider (P) would access the most recent rows of data from store pickup database 44-15 where the ConsumerId received from the store pickup database 44-15 is same as the ConsumerId received in the content. If the validation process continues, if the value of OrderNumber received in the content is blank, if the value of ConsumerId received in the content is not blank and no row of data is retrieved from the store pickup database 44-15, then the service provider (P) would terminate the validation process. If the validation process continues, if the value of OrderNumber received in the content is blank, if the value of ConsumerId received in the content is not blank and if one or more rows of data is retrieved from the store pickup database 44-15 and if the value of Authcode Status in all the rows of data retrieved from the store pickup database 44-15 is not 'A', then the service provider (P) would terminate the validation process.

If the validation process continues, if the value of OrderNumber received in the content is blank and if the value of AuthCode received in the content is not blank, then then service provider (P) would access the most recent rows of data from store pickup database 44-15 where the AuthCode received from the store pickup database 44-15 is same as the AuthCode received in the content. If the validation process continues, if the value of OrderNumber received in the content is blank, if the value of AuthCode received in the content is not blank and no row of data is retrieved from the store pickup database 44-15, then the service provider (P) would terminate the validation process. If the validation process continues, if the value of OrderNumber received in the content is blank, if the value of AuthCode received in the content is not blank and if one or more rows are retrieved from the store pickup database 44-15 and if the value of Authcode Status in all the rows of data retrieved from the store pickup database 44-15 is not 'A', then the service provider (P) would terminate the validation process.

If the validation process continues and one or more rows of data is retrieved from store pickup database 44-15, then the service provider would remove the row or rows of data from one or more rows of data retrieved from store pickup database 44-15 where the value of Authcode Status in one or more rows of data retrieved from store pickup database 44-15 is not 'A' to create the final store pickup data. If the validation process continues and if the value of ConsumerId received in the content is not blank, then the service provider (P) would remove the row or rows of data from the final store pickup data where the value of the ConsumerId in any row of data in the final store pickup data is not same as the value of ConsumerId received in the content. If the validation process continues and if the value of AuthCode received in the content is not blank, then the service provider (P) would remove the row or rows of data from the final store pickup data where the value of the AuthCode in any row of data in the final store pickup data is not same as the value of AuthCode received in the content.

If the validation process continues and the number of rows in the final store pickup data is 0, then the service provider (P) would terminate the validation process.

If the validation process continues and if the AccessTye is 'I' then the service provider (P) would set the value '1' to ReturnCode, set the value 'Success' to SuccessMsg, populate the values MerchantId, LocationId, OrderNumber, ConsumerId, CheckedIn, LockerNumber, LockerSide Authenticated, AuthCode, ExpirationDate, and ExpirationTime from the first row in the final store pickup data and set the value for LockSerialNumber as blank and end the validation process.

If the validation process continues and if the AccessTye is 'C' then the service provider (P) would update the store pickup database 44-15 by setting the value for CheckedIn as 'Y' for the row or rows of data in the final store pickup data. If the validation process continues, if the AccessTye is 'C' and if the update of the store pickup database 44-15 for the row or rows of data in the final store pickup data is not successful then the service provider (P) would terminate the validation process. If the validation process continues and if the AccessTye is 'C' then the service provider (P) would set the value '1' to ReturnCode, set the value 'Success' to SuccessMsg, populate the values MerchantId, LocationId, OrderNumber, ConsumerId, CheckedIn, LockerNumber, LockerSide, Authenticated, AuthCode, ExpirationDate, and ExpirationTime from the first row in the final store pickup data and set the value for LockSerialNumber as blank and end the validation process.

If the validation process continues and if the AccessTye is 'L' then the service provider (P) would start locker validation process to validate LockSerialNumber received in the content and update the values LockerNumber and LockerSide in store pickup database 44-15 for the OrderNumber in the first row of the final store pickup data. If the validation process continues and if the AccessTye is 'L' then the service provider would access the most recent row of data from locker database 44-11 where the OwnerId and FrontSide-LockSerialNumber received from the locker database 44-11 is 'M-' plus MerchantId received in the content, plus plus LocationId received in the content and LockSerialNumber received in the content respectively. If the validation process continues, if the AccessTye is 'L' and one row of data is not retrieved from locker database 44-11 then the locker validation process would terminate. If the validation process continues, if the AccessTye is 'L', if one row of data is retrieved from locker database 44-11 and if the value of status from the one row of data retrieved from locker database 44-11 is not 'A' then the locker validation process would terminate.

If the validation process continues, if the AccessTye is 'L' and if number of rows in final store pick up where the value of the Locker Number in final store pickup is same as locker number in the one row of data retrieved from locker database 44-11 is more than 0 then the service provider (P) would terminate the validation process.

If the validation process continues and if the AccessTye is 'L' then the service provider (P) would remove the row or rows of data from the final store pickup data where the value of the Locker Number in any row of data in the final store pickup data is not blank. If the validation process continues and the number of rows in the final store pickup data is 0, then the service provider (P) would terminate the validation process.

If the validation process continues, if the AccessTye is 'L', if the value of status from the one row of data retrieved from locker database 44-11 is 'A', if the value of location from the one row of data retrieved from locker database 44-11 type is 'W' if the value of front side lock status from the one row of data retrieved from locker database 44-1 is not 'L' then the service provider (P) would terminate the validation process. If the validation process continues, if the AccessTye is 'L', if the value of status from the one row of data retrieved from locker database 44-11 is 'A', if the value of location from the one row of data retrieved from locker database 44-11 type is 'W', if the value of front side lock status from the one row of data retrieved from locker database 44-1 is 'L' and if the number of rows in the final store pickup data is not 1 then the service provider (P) would terminate the validation process. If the validation process continues, if the AccessTye is 'L', if the value of status from the one row of data retrieved from locker database 44-11 is 'A', if the value of location from the one row of data retrieved from locker database 44-11 type is 'W', if the value of front side lock status from the one row of data retrieved from locker database 44-1 is 'L', if the number of rows in the final store pickup data is 1, if the locker number from the final store pickup data is blank and if the value of locker side from the final store pickup data is blank then the service provider (P) would update store pickup database 44-15 for the OrderNumber in the first row in the final store pickup data with locker number as locker number from the one row of data retrieved from locker database 44-11 and locker side as locker side from the one row of data retrieved from locker database 44-11.

If the validation process continues, if the AccessTye is 'L', if the value of status from the one row of data retrieved from locker database 44-11 is 'A', if the value of location from the one row of data retrieved from locker database 44-11 type is 'W', if the value of front side lock status from the one row of data retrieved from locker database 44-1 is 'L', if the number of rows in the final store pickup data is 1, if the locker number from the final store pickup data is blank and if the value of locker side from the final store pickup data is blank and if the updating of store pickup database 44-15 with values for LockerNumber, LockerSide is successful then the service provider (P) would set the value '1' to ReturnCode, set the value 'Success' to SuccessMsg, populate the values MerchantId, LocationId, OrderNumber, ConsumerId, CheckedIn, LockerNumber, LockerSide, Authenticated, AuthCode, ExpirationDate, and ExpirationTime from the updated row in store pickup database 44-15, set the value for LockSerialNumber same as LockSerialNumber received in the content and end the validation process.

If the validation process continues and if the AccessTye is 'L' then the service provider (P) would start locker validation process to validate LockSerialNumber received in the content and update the values LockerNumber and LockerSide in store pickup database 44-15 for the OrderNumber in the first row of the final store pickup data. If the validation process continues and if the AccessTye is 'L' then the service provider would access the most recent row of data from locker database 44-11 where the OwnerId and LockSerialNumber received from the locker database 44-11 is 'M-' plus MerchantId received in the content, plus LocationId received in the content and BackSideLockSerialNumber received in the content respectively. If the validation process continues, if the AccessTye is 'L' and one row of data is not retrieved from locker database 44-11 then the locker validation process would terminate. If the validation process continues, if the AccessTye is 'L', if one row of data is retrieved from locker database 44-11 and if the value of status from the one row of data retrieved from locker database 44-11 is not 'A' then the locker validation process would terminate.

If the validation process continues, if the AccessTye is 'L' and if number of rows in final store pick up where the value of the Locker Number in final store pickup is same as locker number in the one row of data retrieved from locker database 44-11 is more than 0 then the service provider (P) would terminate the validation process.

If the validation process continues and if the AccessTye is 'L' then the service provider (P) would remove the row or rows of data from the final store pickup data where the value of the Locker Number in any row of data in the final store pickup data is not blank. If the validation process continues and the number of rows in the final store pickup data is 0, then the service provider (P) would terminate the validation process.

If the validation process continues, if the AccessTye is 'L', if the value of status from the one row of data retrieved from locker database 44-11 is 'A', if the value of location from the one row of data retrieved from locker database 44-11 type is 'B' if the value of back side lock status from the one row of data retrieved from locker database 44-1 is not 'L' then the service provider (P) would terminate the validation process. If the validation process continues, if the AccessTye is 'L', if the value of status from the one row of data retrieved from locker database 44-11 is 'A', if the value of location from the one row of data retrieved from locker database 44-11 type is 'B', if the value of back side lock status from the one row of data retrieved from locker database 44-1 is 'L' and if the number of rows in the final store pickup data is not 1 then the service provider (P) would terminate the validation process. If the validation process continues, if the AccessTye is 'L', if the value of status from the one row of data retrieved from locker database 44-11 is 'A', if the value of location from the one row of data retrieved from locker database 44-11 type is 'B', if the value of back side lock status from the one row of data retrieved from locker database 44-1 is 'L', if the number of rows in the final store pickup data is 1, if the locker number from the final store pickup data is blank and if the value of locker side from the final store pickup data is blank then the service provider (P) would update store pickup database 44-15 for the Order- Number in the first row in the final store pickup data with locker number as locker number from the one row of data retrieved from locker database 44-11 and locker side as locker side from the one row of data retrieved from locker database 44-11.

If the validation process continues, if the AccessTye is 'L', if the value of status from the one row of data retrieved from locker database 44-11 is 'A', if the value of location from the one row of data retrieved from locker database 44-11 type is 'B', if the value of back side lock status from the one row of data retrieved from locker database 44-1 is 'L', if the number of rows in the final store pickup data is 1, if the locker number from the final store pickup data is blank and if the value of locker side from the final store pickup data is blank and if the updating of store pickup database 44-15 with values for LockerNumber, LockerSide is successful then the service provider (P) would set the value '1' to ReturnCode, set the value 'Success' to SuccessMsg, populate the values MerchantId, LocationId, OrderNumber, ConsumerId, CheckedIn, LockerNumber, LockerSide, Authenticated, AuthCode, ExpirationDate, and ExpirationTime from the updated row in store pickup database 44-15, set the value for LockSerialNumber same as LockSerialNumber received in the content and end the validation process.

If the validation process continues and if the AccessTye is 'N' then the service provider (P) would start locker validation process to validate LockSerialNumber received in the content and update the values LockerNumber, LockerSide and Authenticated in store pickup database 44-15 for the OrderNumber in the first row of the final store pickup data. If the validation process continues and if the AccessTye is 'N' then the service provider would access the most recent row of data from locker database 44-11 where the OwnerId and LockSerialNumber received from the locker database 44-11 is 'M-' plus MerchantId received in the content, plus LocationId received in the content and LockSerialNumber received in the content respectively. If the validation process continues, if the AccessTye is 'N' and one row of data is not retrieved from locker database 44-11 then the locker validation process would terminate. If the validation process continues, if the AccessTye is 'N', if one row of data is retrieved from locker database 44-11 and if the value of status from the one row of data retrieved from locker database 44-11 is not 'A' then the locker validation process would terminate.

If the advance authentication request is for drive-thru locker, then the front side of the locker must be unlocked, the drive-thru locker has not been assigned to any active order.

If the validation process continues, if the AccessTye is 'N', if the value of status from the one row of data retrieved from locker database 44-11 is 'A', if the value of location from the one row of data retrieved from locker database 44-11 type is or 'B' and if the value of front side lock status is not 'U' then the service provider (P) would terminate the validation process. If the validation process continues, if the AccessTye is 'N', if the value of status from the one row of data retrieved from locker database 44-11 is 'A', if the value of location from the one row of data retrieved from locker database 44-11 type is or 'B' and if the value of front side lock status is 'U' then the service provider (P) would determine the number of rows exist in store pickup database 44-15 where the locker number in the one row of data retrieved from locker database 44-11 is the locker number in store pickup database 44-15, locker side in the one row of data retrieved from the locker database 44-11 is the locker side in store pickup database 44-15 and authcode status in store pickup database 44-15 is 'A'. If the determined number of rows exist is more than 0 then the service provider (P) would terminate the validation process. If the validation process continues, if the AccessTye is 'N', if the value of status from the one row of data retrieved from locker database 44-11 is 'A', if the value of location from the one row of data retrieved from locker database 44-11 type is or 'B' and if the value of front side lock status is 'U' then the service provider (P) would update the values LockerNumber, LockerSide, Authenticated in store pickup database 44-15 for the OrderNumber in the first row in the final store pickup data with the values LockerNumber and LockerSide from the one row of data retrieved from locker database 44-11 and 'Y' for Authenticated, otherwise the service provider (P) would terminate the validation process. If the validation process continues, if the AccessTye is 'N', if the value of status from the one row of data retrieved from locker database 44-11 is 'A', if the value of location from the one row of data retrieved from locker database 44-11 type is 'L' or 'B', if the value of front side lock status is 'U' and if the updating of store pickup database 44-15 with values for LockerNumber, LockerSide, Authenticated is not successful then the service provider (P) would terminate the validation process. If the validation process continues, if the AccessTye is 'N', if the value of status from the one row of data retrieved from locker database 44-11 is 'A', if the value of location from the one row of data retrieved from locker database 44-11 type is 'L' or 'B', if the value of front side lock status is 'U' and if the updating of store pickup database 44-15 with values for LockerNumber, LockerSide, Authenticated is successful then the service provider (P) would set the value '1' to ReturnCode, set the value 'Success' to SuccessMsg, populate the values MerchantId, LocationId, OrderNumber, ConsumerId, CheckedIn, LockerNumber, LockerSide, Authenticated, AuthCode, ExpirationDate, and ExpirationTime from the updated row in store pickup database 44-15 and end the validation process.

If the advance authentication request is for counter locker, then the front side of the locker must be locked, and the counter locker has been assigned to the order in the advance authentication request.

If the validation process continues, if the AccessTye is 'N', if the value of status from the one row of data retrieved from locker database 44-11 is 'A', if the value of location from the one row of data retrieved from locker database 44-11 type is 'W' if the value of front side lock status from the one row of data retrieved from locker database 44-11 is not 'L' then the service provider (P) would terminate the validation process. If the validation process continues, if the AccessTye is 'N', if the value of status from the one row of data retrieved from locker database 44-11 is 'A', if the value of location from the one row of data retrieved from locker database 44-11 type is 'W', if the value of front side lock status from the one row of data retrieved from locker database 44-11 is 'L' and if the number of rows in the final store pickup data is not 1 then the service provider (P) would terminate the validation process. If the validation process continues, if the AccessTye is 'N', if the value of status from the one row of data retrieved from locker database 44-11 is 'A', if the value of location from the one row of data retrieved from locker database 44-11 type is 'W', if the value of front side lock status from the one row of data retrieved from locker database 44-11 is 'L' and if the value of locker Number from the one row of data retrieved from locker database 44-11 is not same as locker number from the final store pickup data then the service provider (P) would terminate the validation process. If the validation process continues, if the AccessTye is 'N', if the value of status from the one row of data retrieved from locker database 44-11 is 'A', if the value of location from the one row of data retrieved from locker database 44-11 type is 'W', if the value of front side lock status from the one row of data retrieved from locker database 44-11 is 'L' and if the value of locker side from the one row of data retrieved from locker database 44-11 is not same as locker side from the final store pickup data then the service provider (P) would terminate the validation process. If the validation process continues, if the AccessTye is 'N', if the value of status from the one row of data retrieved from locker database 44-11 is 'A', if the value of location from the one row of data retrieved from locker database 44-11 type is 'W', if the value of front side lock status from the one row of data retrieved from locker database 44-11 is 'L', if the number of rows in the final store pickup data is 1, if the value of locker number from the one row of data retrieved from locker database 44-11 is same as locker number from the final store pickup data and if the value of locker side from the one row of data retrieved from locker database 44-11 is same as locker side from the final store pickup data then the service provider (P) would update store pickup database 44-15 for the OrderNumber in the first row in the final store pickup data with 'Y' for Authenticated.

If the validation process continues, if the AccessTye is 'N', if the value of status from the one row of data retrieved from locker database 44-11 is 'A', if the value of location from the one row of data retrieved from locker database 44-11 type is 'W', if the value of front side lock status from the one row of data retrieved from locker database 44-11 is 'L', if the number of rows in the final store pickup data is 1, if the value of locker number from the one row of data retrieved from locker database 44-11 is same as locker number from the final store pickup data if the value of locker side from the one row of data retrieved from locker database 44-11 is same as locker side from the final store pickup data and if the updating of store pickup database 44-15 is not successful then the service provider (P) would terminate the validation process. If the validation process continues, if the AccessTye is 'N', if the value of status from the one row of data retrieved from locker database 44-11 is 'A', if the value of location from the one row of data retrieved from locker database 44-11 type is 'W', if the value of front side lock status from the one row of data retrieved from locker database 44-1 is 'L', if the number of rows in the final store pickup data is 1, if the value of locker number from the one row of data retrieved from locker database 44-11 is same as locker number from the final store pickup data if the value of locker side from the one row of data retrieved from locker database 44-11 is same as locker side from the final store pickup data and if the updating of store pickup database 44-15 is successful then the service provider (P) would set the value '1' to ReturnCode, set the value 'Success' to SuccessMsg, populate the values MerchantId, LocationId, OrderNumber, ConsumerId, CheckedIn, LockerNumber, LockerSide, Authenticated, AuthCode, ExpirationDate, ExpirationTime from the updated row in store pickup database 44-15 and set the value ' ' for LockSerialNumber and end the validation process If the advance authentication request is for counter locker that also shares with drive-thru locker, then the back side of the locker must be locked, and the counter locker has been assigned to the order in the advance authentication request.

If the validation process continues, if the AccessTye is 'N', if the value of status from the one row of data retrieved from locker database 44-11 is 'A', if the value of location from the one row of data retrieved from locker database 44-11 type is 'B' if the value of back side lock status from the one row of data retrieved from locker database 44-1 is not 'L' then the service provider (P) would terminate the validation process. If the validation process continues, if the AccessTye is 'N', if the value of status from the one row of data retrieved from locker database 44-11 is 'A', if the value of location from the one row of data retrieved from locker database 44-11 type is 'B', if the value of back side lock status from the one row of data retrieved from locker database 44-1 is 'L' and if the number of rows in the final store pickup data is not 1 then the service provider (P) would terminate the validation process. If the validation process continues, if the AccessTye is 'N', if the value of status from the one row of data retrieved from locker database 44-11 is 'A', if the value of location from the one row of data retrieved from locker database 44-11 type is 'B', if the value of back side lock status from the one row of data retrieved from locker database 44-11 is 'L' and if the value of locker Number from the one row of data retrieved from locker database 44-11 is not same as locker number from the final store pickup data then the service provider (P) would terminate the validation process. If the validation process continues, if the AccessTye is 'N', if the value of status from the one row of data retrieved from locker database 44-11 is 'A', if the value of location from the one row of data retrieved from locker database 44-11 type is 'B', if the value of back side lock status from the one row of data retrieved from locker database 44-11 is 'L' and if the value of locker side from the one row of data retrieved from locker database 44-11 is not same as locker side from the final store pickup data then the service provider (P) would terminate the validation process. If the validation process continues, if the AccessTye is 'N', if the value of status from the one row of data retrieved from locker database 44-11 is 'A', if the value of location from the one row of data retrieved from locker database 44-11 type is 'B', if the value of back side lock status from the one row of data retrieved from locker database 44-11 is 'L', if the number of rows in the final store pickup data is 1, if the value of locker number from the one row of data retrieved from locker database 44-11 is same as locker number from the final store pickup data and if the value of locker side from the one row of data retrieved from locker database 44-11 is same as locker side from the final store pickup data then the service provider (P) would update store pickup database 44-15 for the OrderNumber in the first row in the final store pickup data with 'Y' for Authenticated. If the validation process continues, if the AccessTye is 'N', if the value of status from the one row of data retrieved from locker database 44-11 is 'A', if the value of location from the one row of data retrieved from locker database 44-11 type is 'B', if the value of back side lock status from the one row of data retrieved from locker database 44-11 is 'L', if the number of rows in the final store pickup data is 1, if the value of locker number from the one row of data retrieved from locker database 44-11 is same as locker number from the final store pickup data if the value of locker side from the one row of data retrieved from locker database 44-11 is same as locker side from the final store pickup data and if the updating of store pickup database 44-15 is not successful then the service provider (P) would terminate the validation process. If the validation process continues, if the AccessTye is 'N', if the value of status from the one row of data retrieved from locker database 44-11 is 'A', if the value of location from the one row of data retrieved from locker database 44-11 type is 'B', if the value of back side lock status from the one row of data retrieved from locker database 44-11 is 'L', if the number of rows in the final store pickup data is 1, if the value of locker number from the one row of data retrieved from locker database 44-11 is same as locker number from the final store pickup data if the value of locker side from the one row of data retrieved from locker database 44-11 is same as locker side from the final store pickup data and if the updating of store pickup database 44-15 is successful then the service provider (P) would set the value '1' to ReturnCode, set the value 'Success' to SuccessMsg, populate the values MerchantId, LocationId, OrderNumber, ConsumerId, CheckedIn, LockerNumber, LockerSide, Authenticated, AuthCode, ExpirationDate, ExpirationTime from the updated row in store pickup database 44-15 and set the value ' ' for LockSerialNumber and end the validation process.

If the validation process is terminated then the service provider (P) would set a value other than '1' to ReturnCode, set an appropriate value to ErrorMsg where the validation process was terminated in the validation process, set values for OrderNumber, ConsumerId, CheckedIn, LockSerialNumber, AuthCode, ExpirationDate, and ExpirationTime from the values received in the content and set blank for LockerNumber, blank for LockerSide and blank for Authenticated.

The service provider would respond to the store pickup authcode request with the successful or error message based on the validation process and the format of successful or error message would be in the same format of the store pickup authcode request message. The store pickup authcode request message can be in any number of formats such as xml, j son, delimited text etc. An example in xml format 51-A is shown in FIG. 51-A.

Store Pickup Locker Status Request API Process:

When the service provider (P) receives a store pickup locker status request the service provider (P) would verify the origin and the content of the request.

When the service provider receives a store pickup locker status request through a previously established communication channel by the service provider (P) from merchants (M), the service provider (P) would initiate a validation process and the first and foremost task of the validation process would be to save the IP address from which the request was received and saving the values of a set of variables in the request which is shown as an sample in FIG. 52-A namely MerchantId, LocationId and Password. Then the service provider (P) would determine whether the request is received from a valid IP address by verifying the IP address of the request with the IP addresses provided by various merchants (M). The merchants (M) maintain their information in merchant (M) database (44-9) and as per the schema 28-1 as shown in FIG. 28 where the schema also includes the IP addresses. The service provider (P) would determine based on the IP address, the origin of the request by the merchantid and the locationid. It is possible to have more than one locationid for the same merchantid, because several locations under one merchant (M) may share the same IP address.

If the origin of the request is valid then the service provider (P) would compare MerchantId, LocationId and Password from the merchant database 44-9 with the MerchantId, LocationId and Password received by the service provider (P) in the content of the request to get a unique merchant (M) and a location. If a unique merchant (M) and a location is identified then the validation process will continue, otherwise the validation process will terminate.

If the verification process continues, then the service provider (P) would retrieve LockerNumber, LocationType, NoOfDoors, FrontSideLockType, FrontDoorLockSerialNumber, FrontSideLockStatus, BackSideLockType, BackDoorLockSerialNumber, BackSideLockStatus from the most recent rows of information for each locker from locker database 44-11 where the owner id is 'M-' plus MerchantId received in the content, plus '-', plus LocationId received in the content to create the final locker data.

If the verification process continues, then the service provider (P) would merge OrderNumber and CheckedIn from store pickup database 44-15 into the final locker data. If the verification process continues, then the service provider (P) would retrieve OrderNumber and CheckedIn from the most recent rows of information for each order from store pickup database 44-15 where a locker number has been assigned and same as a lockernumber in one of the rows in the final locker data and add the OrderNumber and CheckedIn into the one of rows in the final locker data.

The service provider would send the successful or error message based on the validation process and the format of successful or error message would be in the same format of the Store Pickup Locker Status Request. An example of the request message in xml format 52-A is shown in FIG. 52-A and an example of the response message in xml format 52-R is shown in FIG. 52-R.

If the verification process continues, then the service provider (P) would populate the response message by setting a value of '1' to ReturnCode, by setting the text 'Success' to SuccessMsg, by setting blank to ErrorMsg, by setting the number of rows of information in the final locker data to NoOnLocker and then populating LockerNumber, LockerType, NoOfDoors, FrontSideLockType, FrontDoorLockSerialNumber, FrontSideLockStatus, BackSideLockType, BackDoorLockSerialNumber, BackLockStatus, OrderNumber and CheckedIn for each locker using the corresponding values in the final locker data.

If the verification process terminated, then the service provider (P) would populate a value other than '1' to ReturnCode, by setting blank to SuccelassMsg, by setting an appropriate message depending on where the verification process was terminated to ErrorMsg, by setting a value '0' to NoOnLocker.

The service provider would respond to the Store Pickup Locker Status Request with the successful or error message based on the validation process and the requestor (seller) would use the successful or error message in one or more of their computer applications.

Mobile App Gateway:

The consumer locker owners (O), joint owners and authorized users (U) can use the mobile app distributed by the service provider. The consumer locker owners (O), joint owners and authorized users (U) are collectively referred as mobile app users. The mobile app users would submit a request through the mobile app where the request would be communicated to the service provider's server through mobile app gateway. The mobile app request would be a request for an advance authentication.

Upon successful validation of data, if the request relates to a networked lock then the service provider (P) would set the flag for advance authentication. Upon successful validation of data, if the request relates to a standalone lock then the service provider (P) would return an authcode. Upon successful validation of data, if the request relates to a tracking number that require a signature and if the recipient's signature is available, then the service provider (P) would include the signature in the response. When the mobile app users tap on the submit button in the mobile app as shown in FIG. 41, the mobile app would populate the variables DeviceIdentifier, MobileNumber, MobileLatitude, MobileLongitude, LockSearialNumber and TrackingNumber. The mobile app would get the information from the mobile device to populate the variables DeviceIdentifier, MobileNumber, MobileLatitude, MobileLongitude and the mobile app would capture the values from user input to populate the variables LockSearialNumber and TrackingNumber. The MobileLatitude and MobileLongitude are the GPS (Global Positioning System) coordinates based on the current location of the mobile device.

When the service provider (P) receives a mobile app request from a mobile device, the service provider (P) would verify the origin of the mobile app request and the content of the mobile app request. If the origin of the request and the content of the request are valid then the service provider (P) would set the advance authentication flag to 'Y' for the requested lock in case of networked locks or would respond with an authcode in case of standalone locks. On the other hand, if the origin of the request is invalid, then the service provider (P) may not send any response back to the mobile device. If the origin of the request is valid, but the content of the request is invalid then the service provider (P) would send an error response back to the mobile device.

When the service provider (P) receives a mobile app request the service provider (P) would populate required variables app_ownerid, app_lockernumber, app_lockerside, app_requestdate, app_requesttime, app_requestortype, app_requestorid, app_requestorsubid, app_trackingnumber, app_expirationdate, app_expirationtime, app_status, app_returnmsg, app_jointowneryn, app_lockernumber, app_side, app_locktype and app_process with blanks.

When the service provider (P) receives a mobile app request the service provider (P) would initiate a validation process and the first and foremost task of the validation process would be to determine whether the request is received from a specific valid mobile device by verifying DeviceIdentifier, MobileNumber. The locker owner (O) maintains mobile device identifier and mobile phone number in their locker owner database 44-8 as per the schema 27-1 where each mobile device identifier pertains to a single mobile device and each mobile phone number pertain to a single mobile device and each combination of mobile device identifier and mobile phone number pertain to a single mobile device and used by locker owners. The locker owner (O) also maintains mobile device identifier and mobile phone number in their mobile device database 44-14 as per the schema 33-1 where each mobile device identifier pertains to a single mobile device each mobile phone number pertain to a single mobile device and each combination of mobile device identifier and mobile phone number pertain to a single mobile device used by individual joint owners and authorized users (U). In case where the mobile device is not a mobile phone, for example an iPad or android pad, then the mobile number can be blank.

If a single most recent row of locker owner information can be retrieved from owner database 44-8 by matching DeviceIdentifier with mobile device identifier in the owner database 44-8 and MobileNumber with mobile phone number in the owner database 44-8 and if the value of status in the single most recent row of locker owner information from the owner database 44-8 is 'A', then the service provider (P) would populate the variables app_ownerid with the value of owner id in the single most recent row of locker owner information, app_requestortype with 'O', app_requestorid with app_ownerid and app_requestorsubid with app_ownerid and the validation process will continue otherwise if a single most recent row of mobile device information can be retrieved from mobile device database 44-14 by matching DeviceIdentifier with mobile device identifier in the mobile device database 44-14 and MobileNumber with mobile phone number in the mobile device database 44-14 and if the value of status in the single most recent row of mobile device information from the mobile device database 44-14 is 'A', then the service provider (P) would populate the variables app_ownerid with the value of owner id in the single most recent row of mobile device information, app_requestortype with 'D', app_requestorid with app_ownerid, app_requestorsubid with the value of mobile device identifier in the single most recent row of mobile device information and app_jointowneryn with the value of joint owner yn in the single most recent row of mobile device information and the validation process will continue otherwise it will terminate.

If the validation process continues and if LockSearialNumber is not blank then the validation process will continue otherwise it will terminate.

If the validation process continues, then the validation process will validate the LockSearialNumber. The service provider (P) would retrieve the most recent row of locker information from locker database 44-11 by matching the LockSearialNumber with front side lock serial number or with back side lock serial number of the locker database 44-11. If one row of locker information from locker database 44-11 is retrieved and if LockSearialNumber is sane as front side lock serial number in the most recent row of locker information then the service provider (P) would populate the variable app_locktype with front side lock type in the most recent row of locker information and app_side with 'F'. If one row of locker information from locker database 44-11 is retrieved and if LockSearialNumber is sane as back side lock serial number in the most recent row of locker information then the service provider (P) would populate the variable app_locktype with back side lock type in the most recent row of locker information and app_side with 'B'. If one row of locker information from locker database 44-11 is retrieved and the value of status in the one row of locker information is 'A' then the service provider (P) would populate app_lockernumber with locker number in the most recent row of locker information and the validation process will continue otherwise it will terminate.

If the validation process continues and if the value of app_ownerid is same as the value of owner id in the most recent row of locker information, then the validation process will continue otherwise it will terminate.

If the validation process continues and if app_side is 'B' and if app_jointowneryn is 'N' then the validation process will terminate.

If the validation process continues and if app_side is 'F' and if app_locktype is 'S' then the service provider (P) would populate app_process with 'A'.

If the validation process continues then the service provider would retrieve the most recent row of information from authcode database 44-12 by matching owner id with app_ownerid, locker number with app_lockernumber, locker side with app_lockerside and tracking number with TrackingNumber.

If the validation process continues if one row of information is retrieved from authcode database 44-12 and the value of authcode status in the one row of information is not 'A', then the service provider (P) would terminate the validation process.

If the validation process continues if one row of information is retrieved from authcode database 44-12, then the service provider (P) would set app_returnmsg with the value of authcode from the one row of information retrieved from authcode database 44-12.

If the validation process continues and if one row of information is retrieved from authcode database 44-12 and if the value of signature in the one row of information is not blank, then the service provider (P) would append app_returnmsg with the value of signature in the one row of information.

If the validation process continues and if one row of information is retrieved from authcode database 44-12 then the service provider (P) would append app_returnmsg with the text 'enter the code and press UNLOCK button' and end the validation process.

If the validation process continues and if app_process is 'A' then the service provider (P) would terminate the validation process.

If the validation process continues, then the service provider would retrieve the most recent row of information from authentication database 44-13 by matching owner id with app_ownerid, locker number with app_lockernumber, locker side with app_lockerside.

If the validation process continues and if one row of information is retrieved from authentication database 44-13 and the value of authentication status in the one row of information is 'A', then the service provider (P) would set app_returnmsg with the text 'Press unlock button' and end the validation process.

If the validation process continues and if one row of information is retrieved from authentication database 44-13, then the service provider (P) would terminate the validation process.

If the validation process continues, then the service provider (P) would set the values for app_expirationdate and app_expirationtime by adding a default expiration interval set by the service provider (P) which may be 30 seconds to the current date and time and the service provider (P) would insert one row of information into authentication database 44-13 using the values app_ownerid, app_lockernumber, app_lockerside, current date, current time, app_requestortype, app_requestorid, app_requestorsubid, app_trackingnumber, app_expirationdate, app_expirationtime and 'A' for the fields in the authentication database 44-13 respectively as shown in the representative schema 32-1 in FIG. 32.

If the validation process continues and if the insert of one row of information into authentication database 44-13 is successful, then the service provider (P) would set app_returnmsg with the text 'Press unlock button' and end the validation process.

If the validation process continues, then the service provider (P) would terminate the validation process.

If the validation process is terminated during validation, then the service provider (P) would set app_returnmsg with the text 'Request rejected'.

The service provider (P) would return the value of the variable app_returnmsg.

I claim:

1. A computer implemented system for controlling delivery of a good to a box the system comprising:
   a box having a first internal identifier, an external identifier associated with the first internal identifier, and at least one door secured by a lock having a secured and an unsecured position;
   at least one interface adapted to receive and transmit data in communication with a first party's application;
   at least one display adapted to receive data;
   one or more servers in secure communication with the at least one interface, the box, and at least one display, the one or more servers having:
   a first instruction embodied in a non-transitory computer readable medium, the first instruction operable to receive registration information received from the first party application through the at least one interface, the registration information comprising a first party identifier, the first internal identifier, and the external identifier;
   a second instruction embodied in the non-transitory computer readable medium, the second instruction operable to receive a first tracking identifier and a first one-time authorization code associated with the first internal identifier from the first party application through the at least one interface;
   a third instruction embodied in the non-transitory computer readable medium, the third instruction operable to transmit the first tracking identifier and the external identifier to the display;
   a fourth instruction embodied in the non-transitory computer readable medium, the fourth instruction operable to receive a second internal identifier and a second one-time authorization code from the box;
   a fifth instruction embodied in the non-transitory computer readable medium, the fifth instruction operable to switch the lock from a secured position to an unsecured position if the first internal identifier matches the second internal identifier and the first one-time authorization code matches the second one-time authorization code.

2. The computer implemented system for controlling delivery of a good to a box of claim 1 wherein the box further comprises a controller and an external input device configured to receive the second one-time authorization code wherein the controller is in communication with the one or more servers and the external input device.

3. The computer implemented system for controlling delivery of a good to a box of claim 2 wherein the controller sends the second internal identifier and the second one-time authorization code to the one or more servers.

4. The computer implemented system for controlling delivery of a good to a box of claim 3 wherein the fifth instruction further comprises sending an approval message to the controller wherein the controller then changes the lock to an unsecured position from a secured position.

5. A computer implemented system for controlling delivery of a good to a box, the system comprising:
   a box having a first internal identifier, an external identifier associated with the first internal identifier, and at least one door secured by a lock having a secured and an unsecured position wherein the box has a publicly displayed electronic code comprising a first party identifier and the first external identifier;
   at least one interface adapted to receive and transmit data in communication with a first party's application and a second party's application;
   one or more servers in secure communication with the at least one interface, the one or more servers having:
   a first instruction embodied in a non-transitory computer readable medium, the first instruction operable to receive registration information received from the first party application through the at least one interface, the registration information comprising the first party identifier, the first internal identifier, and the first external identifier;
   a second instruction embodied in the non-transitory computer readable medium, the second instruction operable to receive registration information received from the second party application through the at least one interface, the registration information comprising a first pickup identifier;
a third instruction embodied in the non-transitory computer readable medium, the third instruction operable to receive the first party identifier, a first tracking identifier, the first internal identifier, and a second pickup identifier;
a fourth instruction embodied in the non-transitory computer readable medium, the fourth instruction operable to send the first party identifier and the first external identifier to the second party's application through the at least one interface;
a fifth instruction embodied in the non-transitory computer readable medium, the fifth instruction operable to receive the second pickup identifier, a second first party identifier, a second external identifier from the second party application through the at least one interface;
a sixth instruction embodied in the non-transitory computer readable medium, the sixth instruction operable to switch the lock from a secured position to an unsecured position if the second pickup identifier matches the first pickup identifier, the first party identifier matches the second first party identifier, and the first external identifier matches the second external identifier.

6. The computer implemented system for controlling delivery of a good to a box of claim 5 wherein the box further comprises a controller wherein the sixth instruction further comprises sending an approval message to the controller wherein the controller then changes the lock to an unsecured position from a secured position.

7. A computer implemented system for controlling delivery of a good to a box, the system comprising:
a box having a first internal identification number, an external identification number associated with the first internal identifier, and at least one door secured by a lock having a secured and an unsecured position;
at least one interface adapted to receive and transmit data in communication with a first party's application and a second party's electronic device;
one or more servers in secure communication with the at least one interface and the box, the one or more servers having:
a first instruction embodied in a non-transitory computer readable medium, the first instruction operable to receive registration information received from the first party through the at least one interface, the registration information comprising a first party identifier, the first internal identifier, and the first external identifier;
a second instruction embodied in the non-transitory computer readable medium, the second instruction operable to receive a first tracking identifier, a first one-time authorization code, and the first internal identifier from the first party application through the at least one interface;
a third instruction embodied in the non-transitory computer readable medium, the third instruction operable to receive a second party identifier, a second tracking identifier, and a second one-time authorization code from the second party's electronic device through the at least one interface;
a fourth instruction embodied in the non-transitory computer readable medium, the fourth instruction operable to send the external identifier to the second party's device through the at least one interface if the first party identifier matches the second party identifier, the first one-time authorization matches the second one-time authorization code and the first tracking identifier matches the second tracking identifier.

8. The computer implemented system for controlling delivery of a good to a box of claim 7 wherein the one or more servers in secure communication with the at least one interface and the box, the one or more servers having a fifth instruction embodied in the non-transitory computer readable medium, the fifth instruction operable to switch the lock from a secured position to an unsecured position if the first internal identifier matches the second internal identifier and the first one-time authentication code matches the second one-time authentication code.

9. The computer implemented system for controlling delivery of a good to a box of claim 8 wherein the box further comprises a controller and an external input device configured to receive the second one-time authorization code wherein the controller is in communication with the one or more servers and the external input device.

10. The computer implemented system for controlling delivery of a good to a box of claim 9 wherein the box further comprises a controller and an external input device configured to receive the second one-time authorization code wherein the controller is in communication with the one or more servers and the external input device.

11. The computer implemented system for controlling delivery of a good to a box of claim 10 wherein the controller sends the second internal identifier and the second one-time authorization code to the one or more servers.

12. The computer implemented system for controlling delivery of a good to a box of claim 11 wherein the fifth instruction further comprises sending an approval message to the controller wherein the controller then changes the lock to an unsecured position from a secured position.

13. A computer implemented system for controlling delivery of a good to a box the system comprising:
a box having a first internal identifier, an external identifier associated with the first internal identifier, a controller, an external input device in communication with the controller, and at least one door secured by a lock having a secured and an unsecured position;
at least one interface adapted to receive and transmit data in communication with a first party's application;
one or more servers in secure communication with the at least one interface, and the controller, the one or more servers having:
a first instruction embodied in a non-transitory computer readable medium, the first instruction operable to receive registration information received from the first party application through the at least one interface, the registration information comprising a first party identifier, the first internal identifier, and the external identifier;
a second instruction embodied in the non-transitory computer readable medium, the second instruction operable to receive a first tracking identifier associated with the first internal identifier from the first party application through the at least one interface;
a third instruction embodied in the non-transitory computer readable medium, the third instruction operable to generate a first one-time authorization code;
a fourth instruction embodied in the non-transitory computer readable medium, the fourth instruction operable to receive a second internal identifier and a second one-time authorization code from the controller;

a fifth instruction embodied in the non-transitory computer readable medium, the fifth instruction operable to switch the lock from a secured position to an unsecured position if the first internal identifier matches the second internal identifier and the first one-time authorization code matches the second one-time authorization code.

14. The computer implemented system for controlling delivery of a good to a box of claim 1 wherein the controller receives the second one-time authorization code from the external input device.

15. The computer implemented system for controlling delivery of a good to a box of claim 2 wherein the fifth instruction further comprises sending an approval message to the controller wherein the controller then changes the lock to an unsecured position from a secured position.

* * * * *